(12) United States Patent
Vinegar et al.

(10) Patent No.: US 12,366,138 B2
(45) Date of Patent: *Jul. 22, 2025

(54) HYDROGEN PRODUCTION, STORAGE AND RECOVERY

(71) Applicant: TerraH2 LLC, Bellaire, TX (US)

(72) Inventors: Eva Vinegar, Austin, TX (US); Harold J. Vinegar, West Lake Hills, TX (US)

(73) Assignee: TerraH2 LLC, West Lake Hills, TX (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/993,688

(22) Filed: Nov. 23, 2022

(65) Prior Publication Data

US 2023/0167719 A1 Jun. 1, 2023

Related U.S. Application Data

(63) Continuation of application No. 17/665,707, filed on Feb. 7, 2022, now Pat. No. 11,680,466.

(Continued)

(51) Int. Cl.
*E21B 43/00* (2006.01)
*B65G 5/00* (2006.01)
(Continued)

(52) U.S. Cl.
CPC ............ *E21B 43/006* (2013.01); *B65G 5/00* (2013.01); *E21B 21/068* (2013.01);
(Continued)

(58) Field of Classification Search
CPC ............ E21B 43/2605; E21B 49/0875; E21B 21/068; E21B 43/12; E21B 43/164;
(Continued)

(56) References Cited

U.S. PATENT DOCUMENTS 4,709,577 A * 12/1987 Thompson ............ G01M 3/226
73/40.7
5,085,274 A * 2/1992 Puri ...................... E21B 43/164
166/266

(Continued)

FOREIGN PATENT DOCUMENTS

RU 2493366 C2 9/2013

OTHER PUBLICATIONS

Evans, M. (2016). Unconventional Hydrocarbons and the US Technology Revolution. In R. Grafton, I. Cronshaw, & M. Moore (Eds.), Risks, Rewards and Regulation of Unconventional Gas: A Global Perspective (pp. 59-91). Cambridge: Cambridge University Press.

(Continued)

*Primary Examiner* — Dany E Akakpo
(74) *Attorney, Agent, or Firm* — Momentum IP; Marc Van Dyke

(57) ABSTRACT

A method for operating a kerogen-rich unconventional gas reservoir characterized by there being multiple hydraulically-fractured wells drilled thereinto comprises: recovering a methane-containing gas from a first hydraulically-fractured well drilled into the gas reservoir, steam-methane reforming the recovered methane-containing gas to yield a hydrogen gas and an inorganic carbon-containing gas, injecting at least a portion of the hydrogen gas into a second hydraulically-fractured well drilled into the gas reservoir, and injecting at least a portion of the inorganic carbon-containing gas into a third hydraulically-fractured well drilled into the gas reservoir.

17 Claims, 34 Drawing Sheets

---

Step S01 recover a methane-containing gas 5 from a first hydraulically-fractured well 11₁

Step S02 steam-methane reform the recovered methane-containing gas 5 to yield a hydrogen gas 8 and an inorganic carbon-containing gas 9

Step S03 inject at least a portion of the hydrogen gas 8 into a second hydraulically-fractured well 11₂

Step S04 inject at least a portion of the inorganic carbon-containing gas 9 into a third hydraulically-fractured well 11₃

Related U.S. Application Data

(60) Provisional application No. 63/301,503, filed on Jan. 21, 2022, provisional application No. 63/294,139, filed on Dec. 28, 2021, provisional application No. 63/240,961, filed on Sep. 5, 2021, provisional application No. 63/195,151, filed on May 31, 2021, provisional application No. 63/146,847, filed on Feb. 8, 2021.

(51) Int. Cl.
| | |
|---|---|
| E21B 21/06 | (2006.01) |
| E21B 41/00 | (2006.01) |
| E21B 43/12 | (2006.01) |
| E21B 43/16 | (2006.01) |
| E21B 43/26 | (2006.01) |
| E21B 49/08 | (2006.01) |

(52) U.S. Cl.
CPC .......... *E21B 41/0057* (2013.01); *E21B 43/12* (2013.01); *E21B 43/164* (2013.01); *E21B 43/2605* (2020.05); *E21B 49/0875* (2020.05); *E21B 49/088* (2013.01)

(58) Field of Classification Search
CPC ...... E21B 49/088; E21B 34/16; E21B 43/168; E21B 47/11; E21B 47/057; B65G 5/00
See application file for complete search history.

(56) References Cited

U.S. PATENT DOCUMENTS

| | | | |
|---|---|---|---|
| 7,121,342 B2* | 10/2006 | Vinegar | E21B 36/02 166/57 |
| 7,152,675 B2* | 12/2006 | Heard | E21B 43/006 166/305.1 |
| 8,230,929 B2 | 7/2012 | Kaminsky | |
| 8,760,657 B2* | 6/2014 | Pope | E21B 47/113 250/269.1 |
| 9,810,064 B2* | 11/2017 | Garcia | G01N 33/0036 |
| 10,131,593 B2 | 11/2018 | Okada | |
| 11,680,466 B2 | 6/2023 | Vinegar et al. | |
| 11,959,364 B2 | 4/2024 | Vinegar et al. | |
| 2004/0200393 A1 | 10/2004 | Zauderer | |
| 2005/0109504 A1 | 5/2005 | Heard | |
| 2005/0220704 A1 | 10/2005 | Morrow et al. | |
| 2009/0115190 A1 | 5/2009 | Devine | |
| 2009/0255181 A1 | 10/2009 | Rhinesmith et al. | |
| 2011/0000133 A1 | 1/2011 | Rhinesmith et al. | |
| 2011/0223100 A1 | 9/2011 | Monereau et al. | |
| 2011/0229780 A1 | 9/2011 | Kershaw | |
| 2013/0240369 A1* | 9/2013 | McAlister | F03D 9/007 205/343 |
| 2014/0102885 A1 | 4/2014 | Devine | |
| 2014/0161533 A1 | 6/2014 | Oates | |
| 2014/0245827 A1* | 9/2014 | Pope | E21B 49/0875 73/152.36 |
| 2015/0285032 A1 | 10/2015 | Vinegar et al. | |
| 2015/0321846 A1 | 11/2015 | Strybos et al. | |
| 2016/0010220 A1 | 1/2016 | Bower | |
| 2016/0046443 A1 | 2/2016 | Oates | |
| 2016/0060038 A1 | 3/2016 | Oates | |
| 2016/0060738 A1 | 3/2016 | Nagao et al. | |
| 2016/0251217 A1 | 9/2016 | Fujisawa et al. | |
| 2016/0354622 A1 | 12/2016 | James | |
| 2016/0354625 A1 | 12/2016 | James | |
| 2017/0341936 A1 | 11/2017 | Wasserscheid et al. | |
| 2018/0312935 A1 | 11/2018 | Nagao et al. | |
| 2019/0219558 A1* | 7/2019 | Villar De Andrade E Silva | G01N 33/2823 |
| 2021/0404439 A1 | 12/2021 | Kinsella | |
| 2022/0034448 A1 | 2/2022 | Meheen et al. | |
| 2022/0064770 A1 | 3/2022 | Nagao | |
| 2022/0146048 A1 | 5/2022 | Ewan et al. | |
| 2022/0251935 A1 | 8/2022 | Vinegar et al. | |
| 2023/0077276 A1 | 3/2023 | Vinegar et al. | |
| 2023/0160284 A1 | 5/2023 | Vinegar et al. | |
| 2023/0167719 A1 | 6/2023 | Vinegar et al. | |
| 2023/0167720 A1 | 6/2023 | Vinegar et al. | |

OTHER PUBLICATIONS

Li W, Lu S, Li J, Zhang P, Wang S, Feng W, Wei Y. 2020. Carbon isotope fractionation during shale gas transport: Mechanism, characterization and significance. Science China Earth Sciences, 63: 674-689.
Ziarani, A.S., Aguilera, R. Knudsen's Permeability Correction for Tight Porous Media. Transp Porous Med 91, 239-260 (2012).
Zhang, T., Ellis, G. S., Ruppel, S. C., Milliken, K., & Yang, R. (2012). Effect of organic-matter type and thermal maturity on methane adsorption in shale-gas systems. Organic geochemistry, 47, 120-131.
Londe, L. F. (Dec. 2021). Four Ways to Store Large Quantities of Hydrogen. In Abu Dhabi International Petroleum Exhibition & Conference. OnePetro.
Mohammad, A. K., & Sabeeh, N. S. (2018). Comparative study for adsorption of hydrogen-methane mixtures on activated carbon and 5A molecular sieve. Brazilian Journal of Chemical Engineering, 35, 795-804.
Ehlig-Economides, Christine , and Dimitrios G. Hatzignatiou. "Blue Hydrogen Economy—A New Look at an Old Idea." Paper presented at the SPE Annual Technical Conference and Exhibition, Dubai, UAE, Sep. 2021.
Wang, X., & Sheng, J. (2017). Gas sorption and non-Darcy flow in shale reservoirs. Petroleum Science, 14(4), 746-754.
Osawa, S., Kusumi, S., & Ogino, Y. (1976). Physical adsorption of gases at high pressure: IV. an improvement of DA equation. J. Colloidal Interface Sci, 56, 83-91.
Underground Sun Storage: Final Report Public Jan. 13, 2020, Seite 1 von 172.
Kobos, Peter Holmes, Lord, Anna Snider, Borns, David James, & Klise, Geoffrey T. A life cycle cost analysis framework for geologic storage of hydrogen : a user's tool . . . United States. https://doi.org/10.2172/1029761, 2011.
Search report and written opinion of PCT/US22/15486 filed on Feb. 7, 2022 [Search report mailed by the PCT search authority ISA/US on Jun. 24, 2022.
RU2493366C2 Machine Translation (by google patents)— published Sep. 20, 2013; BP Exploration Operating Company.
Pichler, Assesment of Hydrogen—Rock Interactions During Geological Storage of CH4—H2 Mixtures, Masters thesis; Department Mineral Resources & Petroleum Engineering Chair of Reservoir Engineering; 2013.

\* cited by examiner

Step S07 perform surface geophysical monitoring to determine whether hydraulic fractures 32 are being extended by the injecting of the hydrogen gas 8 or of the inorganic carbon-containing gas 9

FIG. 10

Step S08 employ a gas phase tracer to verify that hydraulic fractures 32 of a given hydraulically-fractured well 11 drilled into the gas reservoir 35 do not extend into a fracture 32 that is in fluid communication with a different hydraulically-fractured well 11

FIG. 11

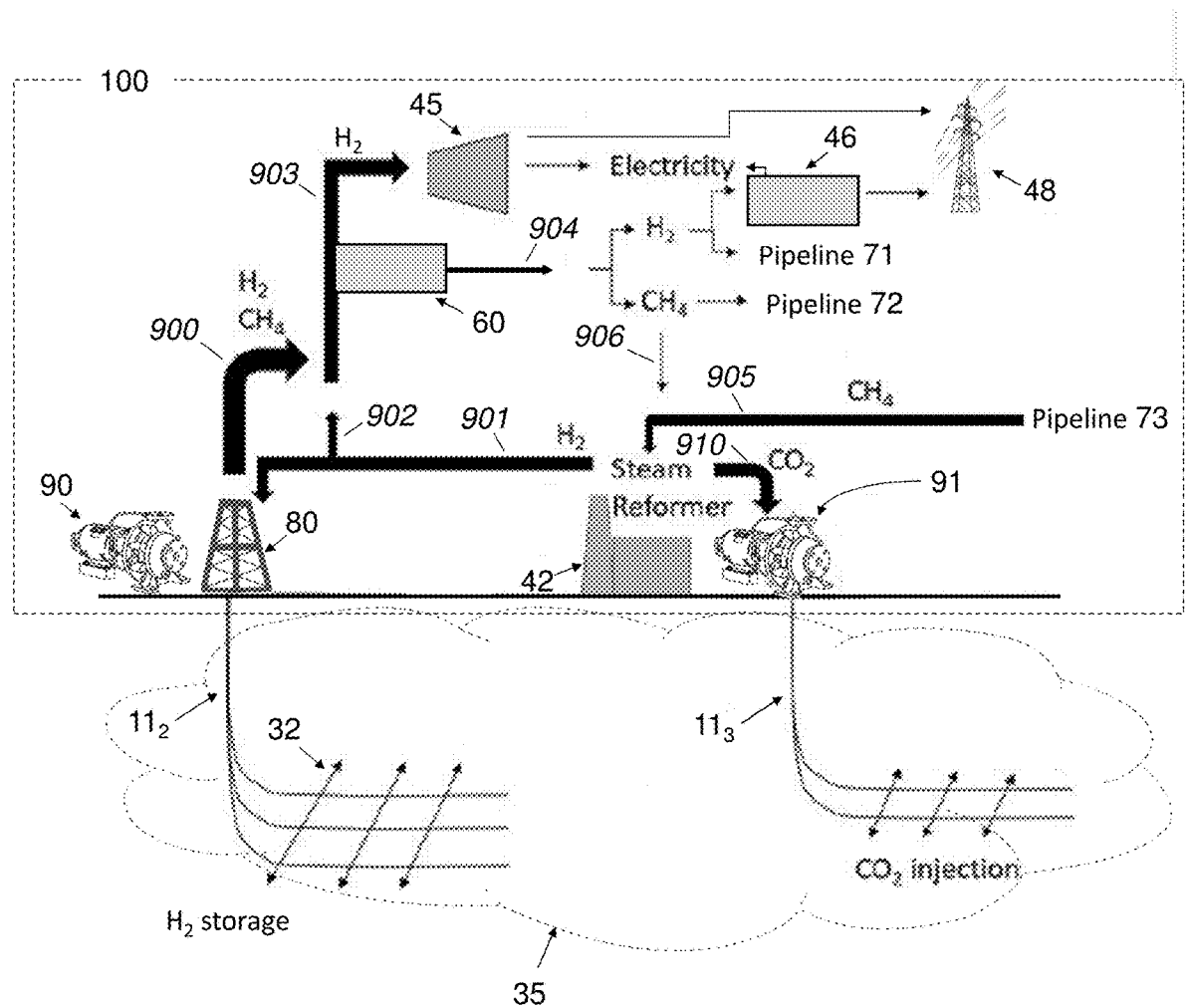

FIG. 12

Step S19 separate the yielded hydrogen gas from the yielded inorganic carbon-containing gas.

FIG. 16

Step S20 further recover, from the second hydraulically-fractured well 11₃, a methane-containing gas 5

FIG. 17

Step S17 perform surface geophysical monitoring to determine whether hydraulic fractures 32 are being extended by the injecting of the hydrogen gas 8 or of the inorganic carbon-containing gas 9

FIG. 18

Step S18 employ a gas phase tracer to verify that hydraulic fractures 32 of a given hydraulically-fractured well 11 drilled into the gas reservoir 35 do not extend into a fracture 32 that is in fluid communication with a different hydraulically-fractured well 11

FIG. 19

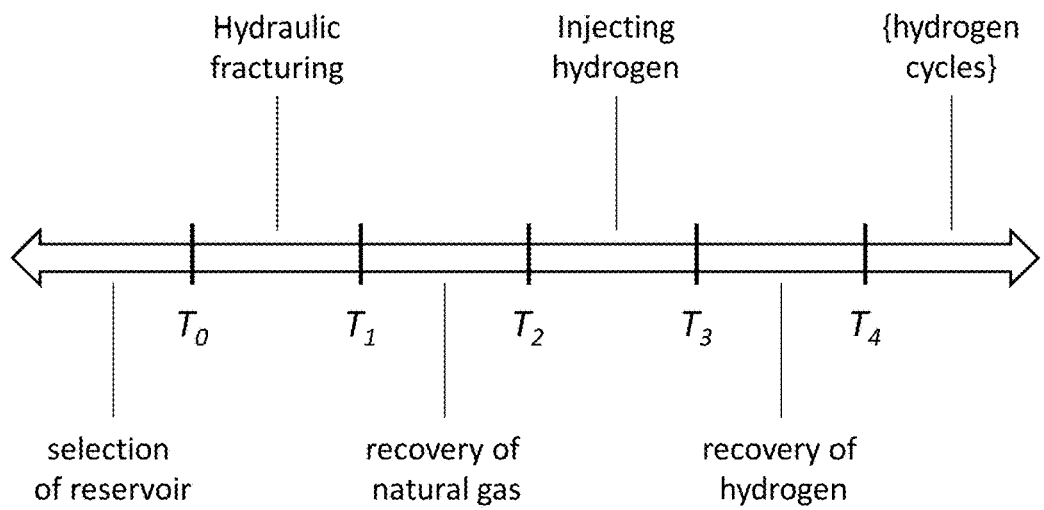

FIG. 21

Step S101 inject a fracturing fluid through a horizontal wellbore to cause fracturing within a geological formation Step S102 recover a methane-containing gas through the wellbore Step S103 monitor a current flow rate of the recovered methane-containing gas over time Step S104 inject hydrogen gas through the wellbore at a pressure higher than a current gas pressure at the wellbore Step S105 recover a portion of the hydrogen gas through the wellbore, with an $H_2$ molar fraction of at least 90%

FIG. 22

Step S111 inject hydrogen gas into a hydraulically-fractured, kerogen-rich, and partially-depleted reservoir of a methane-containing gas Step S112 recover a portion of the hydrogen gas through the wellbore, with an $H_2$ molar fraction of at least 90%

Step S121 select a reservoir based on a kerogen concentration in the reservoir

Step S111 inject hydrogen gas into a hydraulically-fractured, kerogen-rich, and partially-depleted reservoir of a methane-containing gas Step S112 recover a portion of the hydrogen gas through the wellbore, with an $H_2$ molar fraction of at least 90%

FIG. 34

Step S131 selecting a reservoir based on a fluid flow regime of the reservoir

Step S111 inject hydrogen gas into a hydraulically-fractured, kerogen-rich, and partially-depleted reservoir of a methane-containing gas Step S112 recover a portion of the hydrogen gas through the wellbore, with an $H_2$ molar fraction of at least 90%

FIG. 35

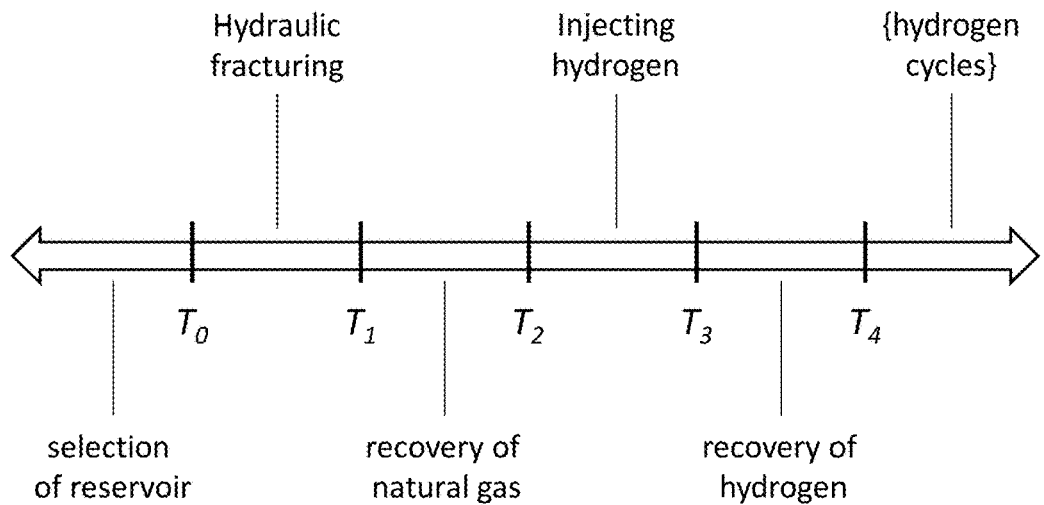

FIG. 36

Step S201 inject a fracturing fluid through a horizontal wellbore to cause fracturing within a geological formation Step S202 recover a methane-containing gas through the wellbore Step S203 monitor an isotopic signature of a molecular component of the recovered methane-containing gas Step S204 inject hydrogen gas through the wellbore at a pressure higher than a shut-in gas pressure Step S205 recover a portion of the hydrogen gas through the wellbore, with an $H_2$ molar fraction of at least 85%

FIG. 37

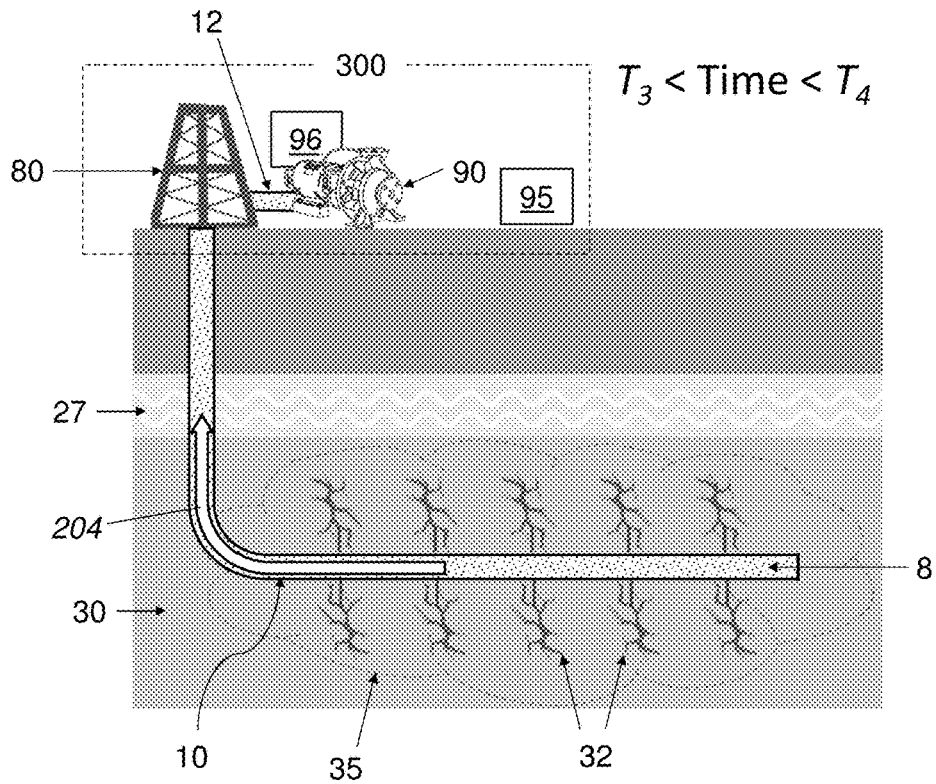

FIG. 44

Step S211 sample, at a plurality of times, a methane-containing gas recovered from the geological formation through a horizontal wellbore Step S212 determine, from each sampling, an isotopic signature of a molecular component in the sampled methane-containing gas Step S213 inject hydrogen gas through the wellbore into the unconventional gas reservoir at a pressure higher than a shut-in gas pressure at the wellhead Step S214 recover a portion of the hydrogen gas through the wellbore, with an $H_2$ molar fraction of at least 85%

FIG. 45

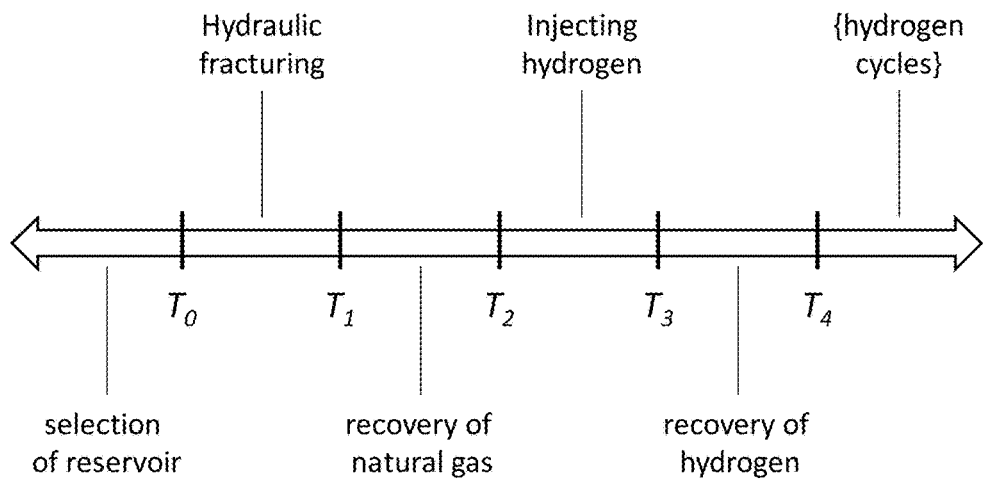

FIG. 46

Step S301 inject a fracturing fluid through a horizontal wellbore to cause fracturing within a geological formation Step S302 recover a methane-containing gas through the wellbore Step S303 project a reservoir isotope ratio value $I\text{-}RATIO_{RES}(T_{RES})$ for the recovered methane-containing gas 5 at each of a plurality of corresponding reservoir pressures $PRESSURE_{RES}(T_{RES})$ at respective reservoir times $T_{RES}$ Step S304 inject hydrogen gas through the wellbore 10 according to an isotopic-signature trigger criterion, based upon reservoir isotope ratio values $I\text{-}RATIO_{RES}(T_{RES})$ projected in Step S303

Step S305 recover a portion of the hydrogen gas through the wellbore, with an $H_2$ molar fraction of at least 85%

FIG. 47A

Step S303A sample a gas mixture recovered from a core sample to determine a plurality of core-sample value-pairs – a core-sample isotope ratio $I\text{-}RATIO_{CS}(T_{CS})$ value and a respective core-sample pressure value $PRESSURE_{CS}(T_{CS})$ – for respective core-sample times $T_{CS}$ Step S303B match $PRESSURE_{RES}(T_{RES})$ values with respective $PRESSURE_{CS}(T_{CS})$ values, to project $I\text{-}RATIO_{RES}(T_{RES})$ values based on $I\text{-}RATIO_{CS}(T_{CS})$ values corresponding to the matched respective $PRESSURE_{CS}(T_{CS})$ values

FIG. 47B

Step S303A-1 receive a core sample obtained from the gas reservoir in a core-sample holder Step S303A-2 introduce a methane-containing gas with a known isotope ratio $I\text{-}RATIO$ into the core-sample holder, while regulating an internal gas pressure of the core-sample holder to an initial core-sample pressure $PRESSURE_{CS\text{-}INIT}$ Step S303A-3 periodically sample a gas mixture produced by the core sample in the core-sample holder at a core-sample pressure $PRESSURE_{CS}(T_{CS})$ Step S303A-4 determine a core-sample isotope ratio $I\text{-}RATIO_{CS}(T_{CS})$ of the sampled gas mixture for each periodic sampling at respective values of $PRESSURE_{CS}(T_{CS})$

FIG. 47C

DETAIL "A" OF FIG. 6A

Step S311 inject a fracturing fluid through a horizontal wellbore to cause fracturing within a geological formation Step S312 recover a methane-containing gas through the wellbore Step S313 projecting an $H_2$ molar fraction $\chi(H_2)_{RES}(T_{RES})$ of a hydrogen-containing gas recovered from the gas reservoir at each of a plurality of corresponding reservoir pressures $PRESSURE_{RES}(T_{RES})$ at respective reservoir times $T_{RES}$ Step S314 inject hydrogen gas through the wellbore according to a hydrogen-purity trigger criterion, based upon the $H_2$ molar fraction values $\chi(H_2)_{RES}(T_{RES})$ projected in Step S13

Step S315 recover a portion of the hydrogen gas through the wellbore, with an $H_2$ molar fraction of at least 85%

FIG. 58A

Step S313A sample a recovered hydrogen-containing gas from a gas-reservoir core sample held in the core-sample holder, to determine a plurality of core-sample value-pairs –
an $H_2$ molar fraction value $\chi(H_2)_{CS}(T_{CS})$ and a respective core-sample pressure value $PRESSURE_{CS}(T_{CS})$
– for respective core-sample times $T_{CS}$ Step S313B match $PRESSURE_{RES}(T_{RES})$ values with respective $PRESSURE_{CS}(T_{CS})$ values, to project $\chi(H_2)_{RES}(T_{RES})$ values based on $\chi(H_2)_{CS}(T_{CS})$ values corresponding to the matched respective $PRESSURE_{CS}(T_{CS})$ values

FIG. 58B

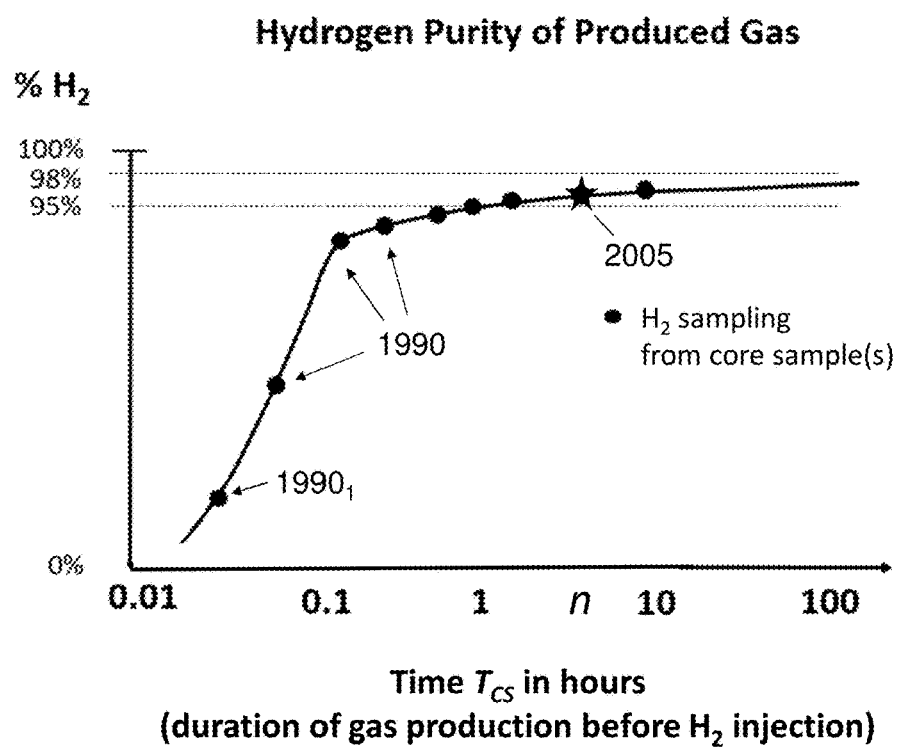

FIG. 59

Step S321 receive a core sample obtained from a gas reservoir in a core-sample holder Step S322 introduce into the core-sample holder, a methane-containing gas for which an isotope ratio *I-RATIO* is known, the introducing including regulating an internal gas pressure of the core-sample holder to an initial core-sample pressure $PRESSURE_{CS\text{-}INIT}$ Step S323 periodically sample a gas mixture produced by the core sample in the core-sample holder at a core-sample pressure $PRESSURE_{CS}(T_{CS})$ Step S324 determine a core-sample isotope ratio $I\text{-}RATIO_{CS}(T_{CS})$ of the sampled gas mixture for each periodic sampling at respective values of $PRESSURE_{CS}(T_{CS})$ Step S325 projecting a reservoir isotope ratio $I\text{-}RATIO_{RES}(T_{RES})$ value for a gas recovered from the gas reservoir at a corresponding reservoir pressure $PRESSURE_{RES}(T_{RES})$ at respective reservoir times $T_{RES}$, by using a recorded plurality of core-sample value pairs each including a $I\text{-}RATIO_{CS}(T_{CS})$ value and a corresponding $PRESSURE_{CS}(T_{CS})$ value

FIG. 62

Step S331 receive a core sample obtained from a gas reservoir in a core-sample holder Step S332 periodically sample a gas mixture comprising a hydrogen-containing gas produced by the core sample in the core-sample holder at a core-sample pressure $PRESSURE_{CS}(T_{CS})$ Step S333 determine a core-sample $H_2$ molar fraction $\chi(H_2)_{CS}(T_{CS})$ of the sampled gas mixture for each of a plurality of samplings Step S334 projecting a reservoir isotope ratio $\chi(H_2)_{RES}(T_{RES})$ value for a hydrogen-containing gas recovered from the reservoir at a corresponding reservoir pressure $PRESSURE_{RES}(T_{RES})$, by using a recorded plurality of core-sample value pairs each including a $\chi(H_2)_{CS}(T_{CS})$ value and a corresponding $PRESSURE_{CS}(T_{CS})$ value

FIG. 63

HYDROGEN PRODUCTION, STORAGE AND RECOVERY

CROSS-REFERENCE TO RELATED APPLICATIONS

This patent application is related to the following patent applications: U.S. patent application Ser. No. 17/665,707, filed on Feb. 7, 2022; PCT/US2022/015486 filed on Feb. 7, 2022; U.S. Provisional Patent Application No. 63/146,847, filed on Feb. 8, 2021; U.S. Provisional Patent Application No. 63/195,151, filed on May 31, 2021; U.S. Provisional Patent Application No. 63/240,961, filed on Sep. 5, 2021; U.S. Provisional Patent Application No. 63/294,139, filed on Dec. 28, 2021; and U.S. Provisional Patent Application No. 63/301,503, filed on Jan. 21, 2022; all of which are incorporated herein by reference in their entirety.

FIELD OF THE INVENTION

The present invention relates to methods and systems for production, storage and recovery of a hydrogen-containing gas in a geological formation comprising a partially-depleted unconventional gas reservoir, and particularly to methods and systems for recovering the hydrogen gas at a high level of purity.

BACKGROUND

Achieving a diversified low-carbon emissions energy economy has been limited by economic and technological limitations. Economic limitations include the cost of renewable energy projects compared to the value of the energy production, as well as competition from low-cost fossil fuels. Technological limitations are related to the energy production efficiency, storage of enormous amounts of excess energy, and ability to connect energy sources to users.

For example, renewable energy sources like solar and wind have intermittency challenges in which excess energy is produced with insufficient storage capacity. Thus, capital costs are increased because the solar and wind farms are built for peak power loads which are often twice or three times the mean (levelized) power loads. One of the ways to make renewable energy sources more economical is to provide large scale, inexpensive, geographically diversified, and energy efficient storage solutions. Currently, complex, expensive storage facilities are used to store excess energy (e.g. pumped hydroelectric storage, batteries, thermal storage), and the conversion efficiency is low.

The enormous scale of hydrogen storage that is required to support a green economy is so large that it necessitates some form of geological storage. This is because geological storage is the only form of storage that is both large enough and inexpensive enough to be practical at the present time. When combined with oxygen, hydrogen can be used in a fuel cell or combustion process to create electricity. However, hydrogen production and storage limitations make the transition to a hydrogen economy difficult. Therefore, there is a need for low-emissions systems and methods for large-scale energy-efficient storage and recovery of hydrogen where the recovered hydrogen is of high purity.

SUMMARY

A method is disclosed, according to embodiments of the invention, for operating a kerogen-rich unconventional gas reservoir characterized by there being multiple hydraulically-fractured wells drilled thereinto. The method comprises: recovering a methane-containing gas from a first hydraulically-fractured well drilled into the gas reservoir; steam-methane reforming the recovered methane-containing gas to yield a hydrogen gas and an inorganic carbon-containing gas; injecting at least a portion of the hydrogen gas into a second hydraulically-fractured well drilled into the gas reservoir; and injecting at least a portion of the inorganic carbon-containing gas into a third hydraulically-fractured well drilled into the gas reservoir.

A method is disclosed, according to embodiments of the invention, for operating a kerogen-rich unconventional gas reservoir characterized by there being multiple hydraulically-fractured wells drilled thereinto. The method comprises: receiving a methane-containing gas; steam-methane reforming the methane-containing gas to yield a hydrogen gas and an inorganic carbon-containing gas; injecting at least a portion of the hydrogen gas into a first hydraulically-fractured well drilled into the gas reservoir; and injecting at least a portion of the inorganic carbon-containing gas into a second hydraulically-fractured well drilled into the gas reservoir.

A method is disclosed, according to embodiments of the invention, for operating a kerogen-rich unconventional gas reservoir characterized by there being multiple hydraulically-fractured wells drilled thereinto by multiple hydraulically-fractured wells. The method comprises: (a) receiving a methane-containing gas; (b) steam-methane reforming the methane-containing gas to yield a hydrogen gas and an inorganic carbon-containing gas; (c) injecting at least a portion of the hydrogen gas into a first hydraulically-fractured well drilled into the gas reservoir; (d) injecting at least a portion of the inorganic carbon-containing gas into a second hydraulically-fractured well drilled into the gas reservoir; (e) recovering, from the first hydraulically-fractured well, a hydrogen-containing gas having an H2 molar fraction of at least 85%; and (f) generating electricity from at least a portion of the recovered hydrogen-containing gas.

According to embodiments of the invention, a system for producing, storing and subsequently recovering a hydrogen-containing gas comprises: (a) a steam-methane reformer for receiving and steam-reforming a methane-containing gas to yield a hydrogen gas and an inorganic carbon-containing gas; (b) pumping arrangements for the hydrogen-containing gas, disposed in fluid communication with a first partially-depleted, hydraulically-fractured well drilled into a kerogen-rich, unconventional reservoir of the methane-containing gas, and operative to inject the hydrogen gas through a respective horizontal wellbore into the first hydraulically-fractured well at a pressure higher than a current gas pressure at the wellbore, the partial depletion of the first hydraulically-fractured well being by a methane-containing-gas recovery process characterized by a maximum flow rate of $FLOW_{MAX}$, and a minimum flow rate of $FLOW_{MIN}$ that is at least 10% of $FLOW_{MAX}$ and not more than 20% of $FLOW_{MAX}$; (c) pumping arrangements for the inorganic carbon-containing gas, disposed in fluid communication with a second partially-depleted, hydraulically-fractured well drilled into the kerogen-rich, unconventional reservoir, and operative to inject the hydrogen gas through a respective horizontal wellbore into the second hydraulically-fractured well at a pressure higher than a current gas pressure at the wellbore, the partial depletion of the second hydraulically-fractured well being by a methane-containing-gas recovery process characterized by a maximum flow rate of $FLOW_{MAX}$, and a minimum flow rate of $FLOW_{MIN}$ that is at least 10% of $FLOW_{MAX}$ and not more than 30% of $FLOW_{MAX}$; and (d) gas-recovery equipment disposed in fluid communication with the first hydraulically-fractured well and operative to recover a portion of the hydrogen-containing gas through the respective horizontal wellbore, the recovered portion of the hydrogen-containing gas having an $H_2$ molar fraction of at least 85%.

A method is disclosed, according to embodiments of the invention, for storing hydrogen gas in a kerogen-rich geological formation. The method comprises: (a) injecting a fracturing fluid through a horizontal wellbore into the geological formation to cause fracturing within the geological formation; (b) recovering a methane-containing gas through the wellbore, the recovering characterized by a maximum flow rate $FLOW_{MAX}$; (c) monitoring a current flow rate $FLOW_{CURRENT}$ of the recovered methane-containing gas over time; (d) responsively to and contingent upon the monitored $FLOW_{CURRENT}$ being equal to or less than a flow-rate trigger criterion $FLOW_{TRIGGER}$, injecting a hydrogen gas through the wellbore into the geological formation at a pressure higher than a current gas pressure at the wellbore; and (e) recovering, through the wellbore, a hydrogen-containing gas having an $H_2$ molar fraction of at least 85%, wherein $FLOW_{TRIGGER}$ is equal to at least 10% of $FLOW_{MAX}$ and not more than 20% of $FLOW_{MAX}$.

A method is disclosed, according to embodiments of the invention, for storing and subsequently recovering a hydrogen gas. The method comprises: (a) injecting the hydrogen gas through a horizontal wellbore into a hydraulically-fractured, kerogen-rich, and partially-depleted reservoir of a methane-containing gas, at a pressure higher than a current gas pressure at the wellbore, the partial depletion of the reservoir being by a methane-containing-gas recovery process characterized by a maximum flow rate of $FLOW_{MAX}$, and a minimum flow rate of $FLOW_{MIN}$ that is at least 10% of $FLOW_{MAX}$ and not more than 20% of $FLOW_{MAX}$; and (b) recovering a portion of the hydrogen gas through the wellbore, the recovered portion of the hydrogen gas having an $H_2$ molar fraction of at least 90%.

According to embodiments of the invention, a system for storing and subsequently recovering a hydrogen-containing gas comprises: (a) pumping arrangements for hydrogen-containing gas, disposed in fluid communication with a hydraulically-fractured, kerogen-rich and partially-depleted reservoir of a methane-containing gas and operative to inject the hydrogen gas through a horizontal wellbore into the reservoir at a pressure higher than a current gas pressure at the wellbore, the partial depletion of the reservoir being by a methane-containing-gas recovery process characterized by a maximum flow rate of $FLOW_{MAX}$, and a minimum flow rate of FLOW/wry that is at least 10% of $FLOW_{MAX}$ and not more than 20% of $FLOW_{MAX}$; and (b) gas-recovery equipment disposed in fluid communication with the reservoir and operative to recover a portion of the hydrogen-containing gas through the wellbore, the recovered portion of the hydrogen-containing gas having an $H_2$ molar fraction of at least 90%.

A method is disclosed, according to embodiments of the invention, of storing and subsequently recovering hydrogen gas in a kerogen-rich unconventional gas reservoir. The method comprises: (a) injecting a fracturing fluid through a horizontal wellbore into the geological formation to cause fracturing within the gas reservoir; (b) recovering a methane-containing gas through the wellbore; (c) monitoring an isotopic signature respective of at least one molecular component of the recovered methane-containing gas; (d) responsively to and contingent upon reaching an isotopic-signature trigger criterion based upon the monitored isotopic signature, injecting hydrogen gas through the wellbore into the geological formation at a pressure higher than a shut-in gas pressure at a wellhead; and (e) recovering, through the wellbore, a hydrogen-containing gas having an $H_2$ molar fraction of at least 85%.

A method is disclosed according to embodiments, of storing and subsequently recovering hydrogen gas in a kerogen-rich, hydraulically-fractured unconventional gas reservoir. The method comprises: (a) sampling, at a plurality of times, a methane-containing gas recovered from the geological formation through a horizontal wellbore; (b) determining, from each sampling, an isotopic signature of a molecular component in the sampled methane-containing gas, the isotopic signature being based upon an isotope ratio; (c) responsively to and contingent upon detecting an increase in the isotopic signature of at least two successive samplings, injecting hydrogen gas through the wellbore into the geological formation at a pressure higher than a shut-in gas pressure, and (d) recovering, through the wellbore, a hydrogen-containing gas having an $H_2$ molar fraction of at least 85%.

According to embodiments disclosed herein, a system for storing and subsequently recovering a hydrogen-containing gas comprises: (a) pumping arrangements for a hydrogen-containing gas, disposed in fluid communication with a hydraulically-fractured, kerogen-rich and partially-depleted reservoir of a methane-containing gas and operative to inject the hydrogen gas through a horizontal wellbore into the reservoir at a pressure higher than a current gas pressure wellhead at a pressure higher than the shut-in gas pressure at a wellhead, the partial depletion of the reservoir being by a methane-containing-gas recovery process characterized by an initial isotope signature value $\delta(MC)_{INITIAL}$, a minimum isotopic signature value $\delta(MC)_{MIN}$, and a current isotopic signature value $\delta(MC)_{CURRENT}$ greater than $\delta(MC)_{MIN}$, wherein MC is a molecular component in the sampled methane-containing gas and $\delta(MC)$ is based upon an isotope ratio of the molecular component MC of the methane-containing gas, and (b) gas-recovery equipment disposed in fluid communication with the reservoir and operative to recover a portion of the hydrogen-containing gas through the wellbore, the recovered portion of the hydrogen-containing gas having an $H_2$ molar fraction of at least 85%.

A method is disclosed according to embodiments, for storing and recovering hydrogen gas in a kerogen-rich unconventional gas reservoir. The method comprises: (a) injecting a fracturing fluid through a horizontal wellbore into the gas reservoir to cause fracturing within the gas reservoir; (b) recovering a methane-containing gas through the wellbore; and (c) projecting a reservoir isotope ratio value I-$RATIO_{RES}(T_{RES})$ respective of one or more molecular components of a methane-containing gas recovered from the gas reservoir at each of a plurality of corresponding reservoir pressures $PRESSURE_{RES}(T_{RES})$ at respective reservoir times $T_{RES}$, wherein the projecting includes: (i) sampling a gas mixture recovered from a gas-reservoir core sample to determine a plurality of core-sample value-pairs for respective core-sample times $T_{CS}$, each core-sample value-pair including a core-sample isotope ratio I-$RATIO_{CS}(T_{CS})$ value and a respective core-sample pressure value $PRESSURE_{CS}(T_{CS})$, and (ii) matching $PRESSURE_{RES}(T_{RES})$ values with respective $PRESSURE_{CS}(T_{CS})$ values of the plurality of core-sample value-pairs to project I-$RATIO_{RES}(T_{RES})$ values based on respective I-$RATIO_{CS}(T_{CS})$ values corresponding to the matched respective $PRESSURE_{CS}(T_{CS})$ values. The method additionally comprises: (d) responsively to and contingent upon reaching an isotopic-signature trigger criterion based upon said projecting of reservoir isotope ratio values I-RATIO$_{RES}$(T$_{RES}$), injecting hydrogen gas through the wellbore into the geological formation at a shut-in gas pressure at a wellhead; and (e) recovering, through the wellbore, a hydrogen-containing gas having an H$_2$ molar fraction of at least 85%.

A method is disclosed, according to embodiments, for storing and recovering hydrogen gas in a kerogen-rich unconventional gas reservoir. The method comprises: (a) injecting a fracturing fluid through a horizontal wellbore into the gas reservoir to cause fracturing within the gas reservoir; (b) recovering a methane-containing gas through the wellbore; and (c) projecting an H$_2$ molar fraction χ(H$_2$)$_{RES}$(T$_{RES}$) of a hydrogen-containing gas recovered from the gas reservoir at each of a plurality of corresponding reservoir pressures PRESSURE$_{RES}$(T$_{RES}$) at respective reservoir times T$_{RES}$, the projecting including: (i) sampling a hydrogen-containing gas recovered from a gas-reservoir core sample held in the core-sample holder, to determine a plurality of core-sample value-pairs for respective core-sample times T$_{CS}$, each core-sample value-pair including an H$_2$ molar fraction value χ(H$_2$)$_{CS}$(T$_{CS}$) and a respective core-sample pressure value PRESSURE$_{CS}$(T$_{CS}$), and (ii) matching PRESSURE$_{RES}$(T$_{RES}$) values with respective PRESSURE$_{CS}$(T$_{CS}$) values of the plurality of core-sample value-pairs to project χ(H$_2$)$_{RES}$(T$_{RES}$) values based on respective χ(H$_2$)$_{CS}$(T$_{CS}$) values corresponding to the matched respective PRESSURE$_{CS}$(T$_{CS}$) values. The method additionally comprises: (d) responsively to and contingent upon reaching a hydrogen-purity trigger criterion based upon said projecting of H$_2$ molar fraction values χ(H$_2$)$_{RES}$(T$_{RES}$), injecting hydrogen gas through the wellbore into the gas reservoir at a shut-in gas pressure at a wellhead; and (e) recovering, through the wellbore, a hydrogen-containing gas having an H$_2$ molar fraction equal to or greater than the hydrogen-purity trigger criterion.

A method is disclosed, according to embodiments, for projecting an isotope ratio I-RATIO$_{RES}$ respective of one or more molecular components in a methane-containing gas recovered from a kerogen-rich unconventional gas reservoir. The method comprises: (a) receiving, in a core-sample holder, a core sample acquired from the gas reservoir; (b) introducing, into the core-sample holder, a methane-containing gas for which an isotope ratio I-RATIO is known, the introducing including regulating an internal gas pressure of the core-sample holder to an initial core-sample pressure PRESSURE$_{CS-INIT}$; (c) sampling, periodically, a gas mixture comprising a methane-containing gas produced by a core sample held in the core-sample holder at a core-sample pressure PRESSURE$_{CS}$(T$_{CS}$) at respective core-sample times T$_{CS}$; (d) determining a core-sample isotope ratio I-RATIO$_{CS}$(T$_{CS}$) of the sampled gas mixture for each of a plurality of samplings; and (e) projecting a reservoir isotope ratio I-RATIO$_{RES}$(T$_{RES}$) value for a methane-containing gas recovered from the gas reservoir at a corresponding reservoir pressure PRESSURE$_{RES}$(T$_{RES}$) at respective reservoir times T$_{RES}$, by using a recorded plurality of core-sample value pairs each including a I-RATIO$_{CS}$(T$_{CS}$) value and a corresponding PRESSURE$_{CS}$(T$_{CS}$) value.

A method is disclosed, according to embodiments, for projecting an H$_2$ molar fraction χ(H$_2$)$_R$ of a hydrogen-containing gas recovered from storage in a kerogen-rich unconventional gas reservoir. The method comprises: (a) receiving, in a core-sample holder, a core sample acquired from the gas reservoir; (b) sampling, periodically, a gas mixture comprising a hydrogen-containing gas produced by the core sample in the core-sample holder at a core-sample pressure PRESSURE$_{CS}$(T$_{CS}$); (c) determining a core-sample H$_2$ molar fraction χ(H$_2$)$_{CS}$(T$_{CS}$) of the sampled gas mixture for each of a plurality of samplings; and (d) projecting a reservoir isotope ratio χ(H$_2$)$_{RES}$(T$_{RES}$) value for a hydrogen-containing gas recovered from the reservoir at a corresponding reservoir pressure PRESSURE$_{RES}$(T$_{RES}$), by using a recorded plurality of core-sample value pairs each including a χ(H$_2$)$_{CS}$(T$_{CS}$) value and a corresponding PRESSURE$_{CS}$(T$_{CS}$) value.

According to embodiments of the invention, an apparatus comprises: (a) a core-sample holder for receiving a core sample acquired from a kerogen-rich unconventional gas reservoir; (b) pressure-regulating arrangements arranged to be placed in fluid communication with the core-sample holder and to evacuate the core-sample holder; and (c) at least one of: (i) a pressurized volume of a methane-containing gas for which an isotope ratio I-RATIO respective of one or more molecular components of the methane-containing gas is known, arranged to be placed in fluid communication with the evacuated core-sample holder and effective to achieve a gas pressure therein equal to the initial reservoir pressure PRESSURE$_{RES}$. INIT, and (ii) pressurized volume of a hydrogen-containing gas for which an H$_2$ molar fraction χ(H$_2$) is known, arranged to be placed in fluid communication with the evacuated core-sample holder and effective to achieve a gas pressure therein equal to the initial reservoir pressure PRESSURE$_{R\_INIT}$. The apparatus additionally comprises: (d) a pressure-control valve configured to allow passage therethrough of a gas mixture which comprises a methane-containing gas produced by the core sample, at a core-sample pressure PRESSURE$_{CS}$(T$_{CS}$) at respective core-sample times T$_{CS}$; (e) one or more gas-sampling containers arranged to receive the gas mixture passed through the pressure-control valve; and (f) instrumentation for measuring the core-sample pressure PRESSURE$_{CS}$(T$_{CS}$) and a core-sample isotope ratio I-RATIO$_{CS}$(T$_{CS}$) of the gas mixture at respective core-sample times T$_{CS}$.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIGS. 7-11 show flowcharts of methods and method steps for operating a kerogen-rich unconventional gas reservoir, according to embodiments of the present invention.

FIG. 12 is a schematic diagram of a system for producing, storing and subsequently recovering a hydrogen-containing gas comprising a steam-methane reformer, pumping arrangements for the hydrogen-containing gas and for an inorganic carbon-containing gas, gas-recovery equipment, gas transportation arrangements, and electricity generation and transmission arrangements, according to embodiments of the present invention.

FIGS. 13-20 show flowcharts of methods and method steps for operating a kerogen-rich unconventional gas reservoir, according to embodiments of the present invention.

FIG. 21 shows a timeline of activities related to a gas reservoir, according to embodiments of the present invention.

FIG. 22 is a flowchart showing steps of a method for storing hydrogen gas in a kerogen-rich geological formation, according to embodiments of the present invention.

FIG. 32 is a graph schematically showing the relationship between a minimum flow rate and a maximum flow rate in a gas-recovery process, according to embodiments of the present invention.

FIGS. 33, 34 and 35 are flowcharts showing steps of respective methods for storing and subsequently recovering a hydrogen gas, according to embodiments of the present invention.

FIG. 36 shows a timeline of activities related to a gas reservoir, according to embodiments of the present invention.

FIG. 37 is a flowchart showing steps of a method for storing hydrogen gas in a kerogen-rich geological formation, according to embodiments of the present invention.

FIG. 44 is a schematic illustration showing recovery of a hydrogen-containing gas from a geological formation through a horizontal wellbore, according to embodiments of the present invention.

FIG. 45 shows a flowchart of method steps for storing and subsequently recovering a hydrogen-containing gas, according to embodiments of the present invention.

FIG. 46 shows a timeline of activities related to a gas reservoir, according to embodiments of the present invention.

FIGS. 47A, 47B and 47C are flowcharts showing method steps for storing and recovering hydrogen gas in a kerogen-rich geological formation, according to embodiments of the present invention.

FIGS. 58A and 58B are flowcharts showing method steps for storing and recovering hydrogen gas in a kerogen-rich geological formation, according to embodiments of the present invention.

FIG. 59 is a chart showing an exemplary graphs of $H_2$ purity over time, of a core sample from an unconventional gas reservoir, according to embodiments of the present invention.

FIG. 62 shows a flowchart of method steps for projecting an isotope ratio respective of one or more molecular components in a methane-containing gas recovered from a kerogen-rich unconventional gas reservoir, according to embodiments of the present invention.

FIG. 63 shows a flowchart of method steps for projecting an $H_2$ molar fraction of a hydrogen-containing gas recovered from storage in a kerogen-rich unconventional gas reservoir.

Figure 1:
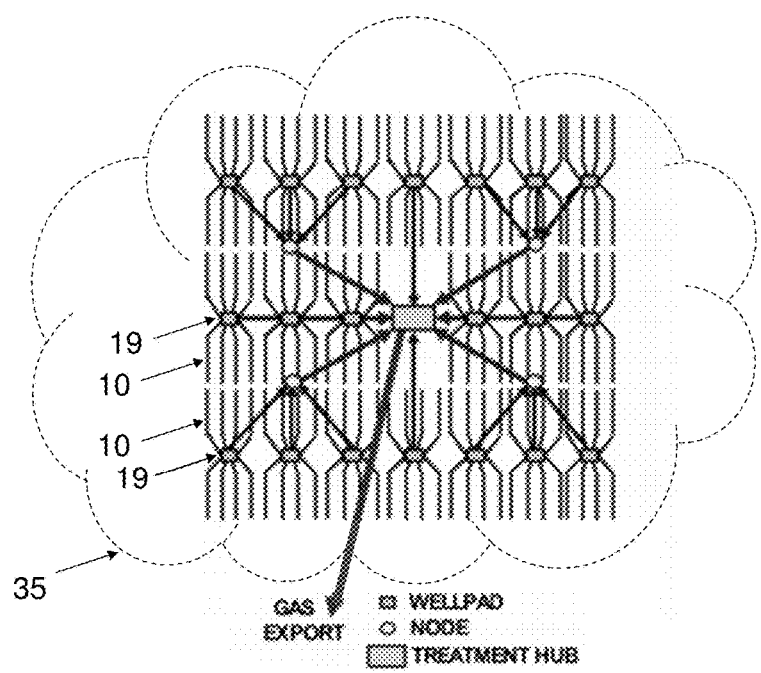
FIG. 1 is a schematic illustration showing multiple well-pads, and multiple wells drilled into a gas reservoir.

DETAILED DESCRIPTION OF THE
ILLUSTRATED EMBODIMENTS

The invention is herein described, by way of example only, with reference to the accompanying drawings. With specific reference now to the drawings in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

Embodiments disclosed herein relate to systems and methods for storage and recovery of hydrogen gas in geological formations. The term 'hydrogen gas' as used herein means a hydrogen-containing gas, i.e., a gas that includes hydrogen but that may also include other gases. For example, 'hydrogen gas' or the equivalent 'hydrogen-containing gas' can mean a gas mixture having an $H_2$ molar fraction of less than 100%, while the remaining percentage, i.e., 100% less the $H_2$ molar fraction, is composed of molecules of other gases, such as, for purposes of illustration, methane, ethane, propane, butane, and/or other hydrocarbons. The term 'hydrogen' if used herein means a 'hydrogen gas' unless otherwise specified, and the two terms may be used interchangeably in the present disclosure. The terms 'natural gas' and 'methane-containing gas' are used interchangeably to mean a gas mixture consisting primarily of methane. In a non-limiting example, natural gas comprises between 85% and 95% methane.

An unconventional gas reservoir is a reservoir of a methane-containing gas that is not necessarily recoverable by conventional means, but rather is at least partly recoverable by what until recent decades was considered unconventional means—for example, by using hydraulic fracturing, which includes the pressurized injection of a fracturing fluid into a geological formation, to facilitate the release of the natural gas for recovery. The terms 'hydraulic fracturing', and 'fracturing' are used interchangeably in the present disclosure. A 'well,' as the term is used herein, is drilled into the geological formation, or equivalently, into the unconventional gas reservoir, for recovery of natural resources, including natural gas. The term 'wellbore' as used herein is the actual hole that forms the well, and/or may refer to a pipe that forms a conduit for conveyance of fluids into and out of the well. Each well comprises a wellhead and a wellbore. A wellbore, including perforated casing, is horizontally-oriented at the depth of the geological formation, i.e., the shale formation, and can extend horizontally for tens, hundreds or thousands of meters. During hydraulic fracturing, a hydraulic-fracturing fluid is injected into (and through) the wellbore and thence into fractures. The injecting is effective to increase pressure at the target depth of the unconventional gas reservoir, e.g., based on the depth of the wellbore, to exceed that of the fracture gradient of the rock. At a fracture-initiating pressure known as a 'breakdown pressure', the deep rock surrounding the wellbore cracks with pressure. Once fracturing is initiated, pressure at the wellhead drops and then starts increasing, as the fracturing fluid 3 permeates the rock, further extending the fractures. This occurs at the fracture-extending pressure $FRAC_{EXT}$. Fractures predominantly perpendicular to the wellbore may reach lengths of a few hundred feet long; the height of the fractures is controlled by the stresses in the rock formations above and below the wellbore.

According to embodiments of the invention, an unconventional gas reservoir can be suitable for long-term and/or short-term storage of hydrogen gas after partial depletion of the natural gas. A single geological formation or a single unconventional gas reservoir 35 can have large numbers of multiple hydraulically-fractured wells drilled thereinto, as shown in FIG. 1. FIG. 1 illustrates multiple wells (indicated by respective wellbores 10) at each wellpad 19, and multiple wellpads 19 servicing the gas reservoir 35. In the non-limiting example of FIG. 1, gas flows through a network of transmission nodes to a central treatment hub that services the multiple wells. The example of FIG. 1 shows 8 wells, i.e., wellbores 10, operating from each wellpad 19. In other examples, not illustrated, there can be any number of wells, such as for example, 16, 32 or 64 wells. Similarly, there can be many wellpads servicing a single unconventional gas reservoir. As will be discussed below, specialized equipment, e.g., for recovery of gases from the well or for injection of fluids into the well, can be placed in fluid communication with specific wells. Pressure and flow measurements may be made using pressure and flow gauges at the wellhead while flowing or during shut-in. Pressure may also be measured downhole using downhole pressure gauges.

Each of the wells drilled into an unconventional gas reservoir serves first for recovery of natural gas from the reservoir. Nonetheless, if a well is drilled that produces gas poorly or is unsuitable for gas recovery, it might still be purposed for storage of other gases. The gas wells are fractured, and in many cases hydraulically fractured, to produce natural gas found within the organic material, such as kerogen, that can be present in a concentration of at least 1% or 2% or 3% in an unconventional gas reservoir exploited for natural gas recovery in accordance with any of the embodiments disclosed herein. For the purposes of the present disclosure, the term 'kerogen-rich' refers to a kerogen concentration of at least 1% organic content by volume, or at least 2%, or at least 3%, or at least 4%, or at least 5%. Kerogen concentration may be determined on cuttings or core material using the area under the S2 peak of a Rock-Eval analysis, or, in well logging, from the difference between the neutron and density porosities after accounting for the kerogen density and hydrogen index (HI) of clays or using a pulsed-neutron spectroscopy logging tool. Another method of measuring kerogen includes high frequency (e.g., 20 MHz) nuclear magnetic resonance (NMR) applied to core material. Kerogen concentration may also be determined from an equation based on total organic carbon (TOC). The adsorption on kerogen may be determined by integration of petrophysical analysis from lab and well logging data with $N_2$, $CH_4$, and $H_2$ adsorption isotherms. Recovered natural gas can include any or all of: (i) methane residing in fractures or inorganic pore spaces or pore spaces in the kerogen within the geological formation; (ii) methane adsorbed to kerogen surfaces; and (iii) methane dissolved in kerogen.

Some wells, once they are at least partly depleted of recoverable natural gas, can be repurposed and used for storage of other gases. In a first example, a hydrogen gas, or a hydrogen-containing gas, can be injected into a partially depleted well for storage and later recovery, e.g., to capture the economic value of the hydrogen via eventual use in energy conversion devices such as fuel cells, gas turbines and/or internal combustion engines installed in vehicles and electric power generation facilities. In a second example, an inorganic carbon-containing gas such as, for example carbon dioxide (CO2) or carbon monoxide (CO) can be injected into a partially depleted well for storage, e.g., to prevent the inorganic carbon-containing gas from being released into the atmosphere. Thus, the system disclosed here is configured to recover a valuable hydrocarbon—natural gas—and convert it to a non-polluting fuel while storing most of the greenhouse gas content in geological formations whose economic value has been largely exhausted by the prior recovery of the natural gas.

Storage of gases in the partially depleted wells can be long-term or short-term. For example, it can be that in a first partially depleted well drilled into a particular unconventional gas reservoir, hydrogen is stored for periods of days, hours, weeks, months or even years before being recovered for its economic value. In the same example, it can be that carbon dioxide is stored in a second partially depleted well drilled into the same unconventional gas reservoir, with no plan in place for ever recovering the carbon dioxide gas. Still yet in the same example, it can be that at least one other partially depleted well, i.e., a third well drilled into the same unconventional gas reservoir, is still being used in parallel to the storage and/or recovery of the hydrogen and carbon dioxide gases, for economic recovery of the natural gas produced from the well. Steps can be taken, as will be described hereinbelow, to ensure that hydraulic fractures in the respective wells do not intersect, i.e., communicate fluids to hydraulic fractures in other wells.

Hydrogen can be produced from natural gas in any one of a number of processes and the scope of the present invention does not limit the methods and equipment used for reforming methane to yield hydrogen. A preferred process is steam-methane reforming, in which steam at 700°–1000° C. is used to produce hydrogen ($H_2$) from methane ($CH_4$). An exemplary steam-methane reformer comprises multi-tubular packed-bed reactors, a type of plug flow reactor that includes an array of long, narrow tubes situated within the combustion chamber of a large industrial furnace, providing the necessary energy to keep the reactor at a constant temperature during operation. Furnace designs can be top-fired, bottom-fired, or side-fired. Inside the tubes, a mixture of steam and methane is put into contact with a high surface-area-to-volume nickel catalyst. Hydrogen gas and carbon monoxide (and a small amount of carbon dioxide) are produced in this process. In the water-gas shift reaction, more hydrogen and carbon dioxide are produced by combining steam and the carbon monoxide from the first process. The non-hydrogen components are then removed using pressure-swing adsorption. The steam-methane reforming reaction is $CH_4+H_2O \rightarrow CO+3H_2$, and the water-gas shift reaction is $CO+H_2O \rightarrow CO_2+H_2$.

The steam reforming process can receive methane that is recovered onsite from one or more wells drilled into the unconventional gas reservoir. Additionally, or alternatively, the process can receive methane that is transported to the site, e.g., via a pipeline or tanker truck, railcar or ship (e.g., as compressed or liquified gas).

Figure 2A:
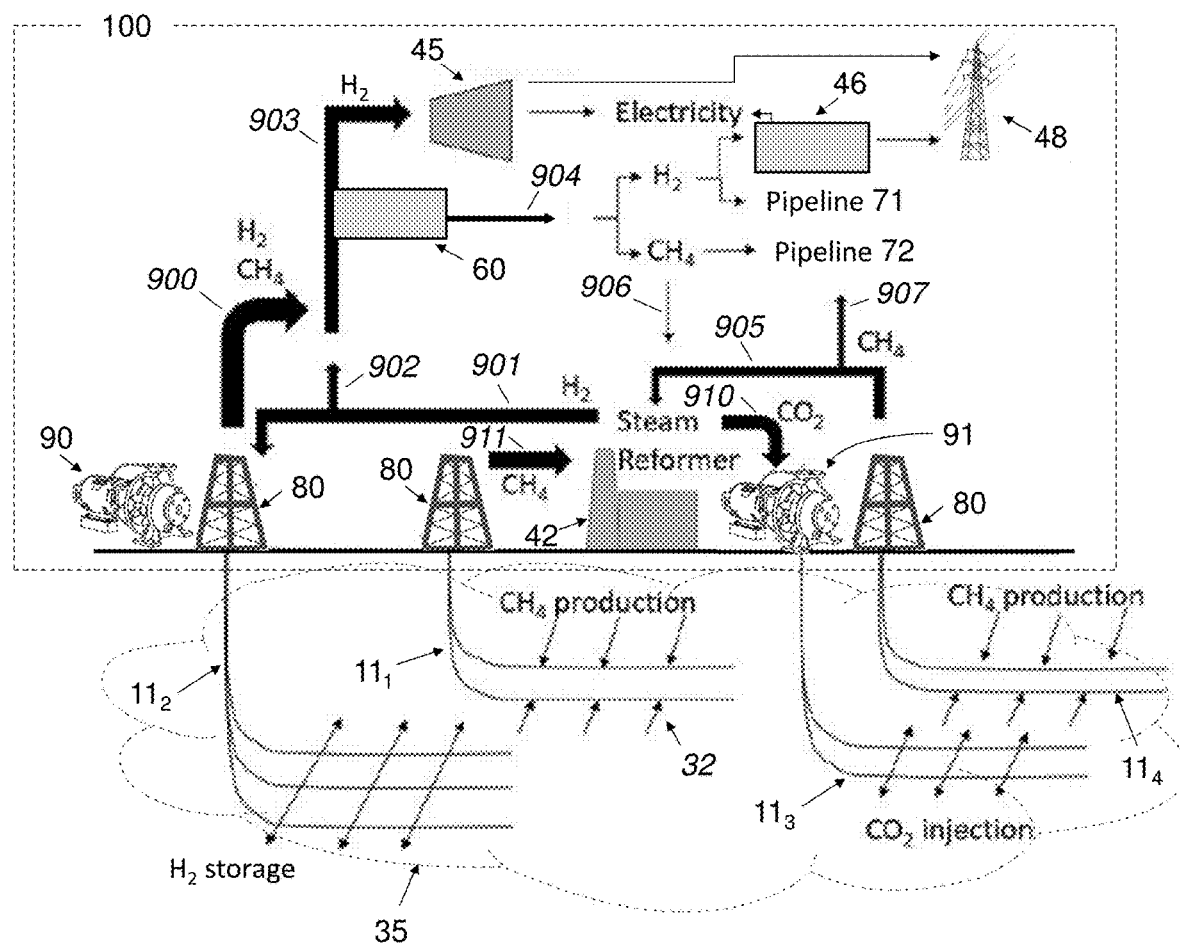
FIG. 2A is a schematic diagram of a system for producing, storing and subsequently recovering a hydrogen-containing gas comprising a steam-methane reformer, pumping arrangements for the hydrogen-containing gas and for an inorganic carbon-containing gas, gas-recovery equipment, gas transportation arrangements, and electricity generation and transmission arrangements, according to embodiments of the present invention.
Figure 2B:
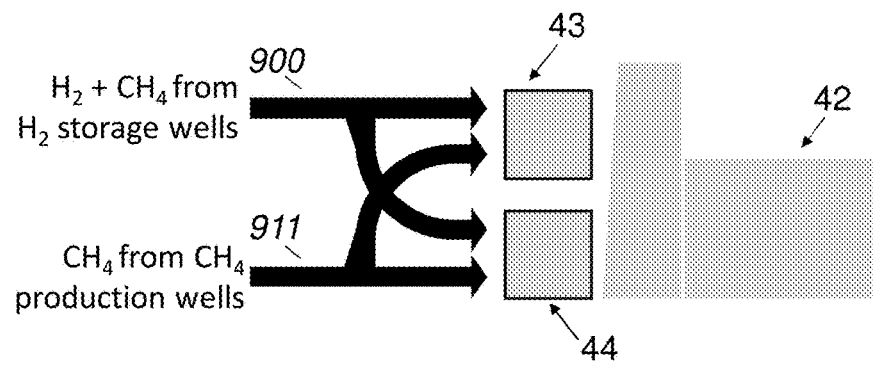
FIG. 2B is a schematic detail of a system producing, storing and subsequently recovering a hydrogen-containing gas comprising a steam-methane reformer, showing an SMR furnace, according to embodiments of the present invention.
Figure 2C:
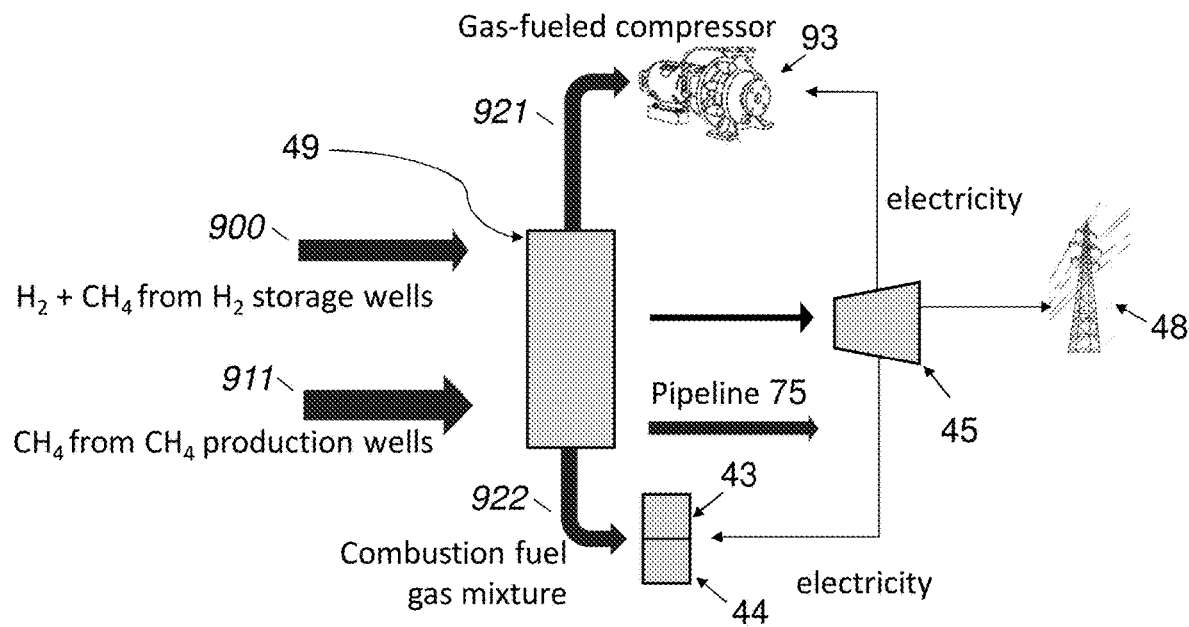
FIG. 2C is a schematic detail of a system producing, storing and subsequently recovering a hydrogen-containing gas comprising a steam-methane reformer, showing a blending facility, according to embodiments of the present invention.

Referring now to FIGS. 2A, 2B and 2C, a system 100 for producing, storing and subsequently recovering a hydrogen-containing gas includes a steam-methane reformer (SMR) 42. In the embodiment illustrated in FIG. 2A, the SMR 42 is located onsite, i.e., at or in proximity to a kerogen-rich unconventional gas reservoir 35. 'In proximity' can mean within 10 km, or within 50 km, or within 100 km, or within 250 km, or within 500 km of the gas reservoir.

The unconventional gas reservoir 35 is characterized by having multiple wells 11 drilled thereinto; in the example of FIG. 2, the multiple wells 11 include hydraulically-fractured wells $11_1$, $11_2$, $11_3$, $11_4$, drilled into the reservoir 35. A single one or more wells 11, drilled in reservoir 35. The skilled artisan will understand that these four wells are illustrative in nature and in practicing the embodiments it is likely to employ an unconventional gas reservoir having many more wells drilled into it. In some embodiments, a single SMR 42 serves some, many, most, or all the gas-producing wells 11 drilled into a reservoir 35.

The hydraulic and natural fractures in the respective wells are indicated by the arrows 32, where the direction of the arrows indicated whether a gas is being injected into the wells (as in wells $11_2$ and $11_3$) or recovered from the wells (as in wells $11_1$ and $11_4$). In the example of FIG. 2, wells $11_1$ and $11_4$ are being used for natural gas recovery, and respective gas recovery equipment 80 is in fluid communication with the respective wellbores of the two wells $11_1$ and $11_4$. Well $11_2$ is a partially depleted well, i.e., partially depleted of natural gas, and is being used for injecting a hydrogen-containing gas thereinto for storage and later recovery. Hydrogen-gas-pumping arrangements 90 and hydrogen-gas-recovery equipment 80 are both provided in fluid communication with the reservoir 35 via the wellbore of well $11_2$, respectively for injection of hydrogen into the well and for later recovery of the stored hydrogen. The pumping arrangements 80 include pumps and compressors, piping, power equipment, and other equipment as necessary for injecting the hydrogen gas into the well. The pumping arrangements 80 are configured to inject the hydrogen at a pressure higher than a current shut-in gas pressure at the wellbore of well $11_2$. Well $11_3$ is a partially depleted well being used for injecting an inorganic carbon-containing gas, e.g., $CO_2$ and/or CO, into the well for storage. The $CO_2$ and CO, which are products of the steam-reforming process, can be stored in the partially depleted gas wells indefinitely. $CO/CO_2$-gas-pumping arrangements 91 are provided in fluid communication with the reservoir 35 via the wellbore of well $11_3$, for injection of the inorganic carbon-containing gas into the well. $CO_2$ is preferentially adsorbed onto kerogen, displacing residual methane.

The SMR 42 receives a methane-containing gas recovered from the reservoir 35, e.g., via piping the gas recovered from wells $11_1$ and $11_4$, as indicated in FIG. 2 by the arrows marked 911 and 905, respectively. In some embodiments, a portion of the recovered methane-containing gas is diverted, as indicated by arrow 907, for shipping offsite by pipeline 72. The main products of the steam reforming process, $H_2$ and $CO/CO_2$, are delivered to respective pumping arrangements 90 and 91, by piping the gases from the SMR 42, as indicated in FIG. 2 by 901 and 910, respectively. In some implementations, a majority, or even all, of the hydrogen gas produced by the SMR 42 is piped (as indicated by arrow 902, for purposes other than storage in the well $11_2$. The system 100 can include a separator 60 for separating $H_2$ from other gases, especially $CH_4$. Non-limiting examples of suitable separators include an embedded membrane in a catalyst tube or a shell-and-tube configuration.

In a non-limiting example, some, or a majority, or even all, of the produced hydrogen gas is used to generate electricity onsite, for example by being piped, as indicated by arrow 903, to a gas turbine 45 or to a fuel cell 46. In another non-limiting example, some, or a majority, or even all, of the produced hydrogen gas, is sent offsite via a pipeline 71. As shown in FIG. 2, a hydrogen-containing gas recovered from well $11_2$ following storage therein is sent to the separator 60, as indicated by arrow 900, for separation of the $H_2$ from the $CH_4$, and/or is sent, as indicated by arrow 903, to a gas turbine 45 for generating electricity, either with or without separation of the methane at the separator 60. Hydrogen-containing gas exiting the separator 60, as indicated by arrow 904, yields $H_2$ which can be used to generate electricity, for example in the fuel cell 46 (or in the gas turbine 45), or can be shipped offsite by pipeline 71. $CH_4$ separated from the $H_2$ at the separator 60 can be shipped offsite by pipeline 72 or can be sent to the SMR 42. Electricity generated onsite is delivered offsite by electricity transmission arrangements 48. In some embodiments, some of the generated electricity can be used for compressing gases and injecting the compressed gases into the unconventional reservoir.

FIG. 2B shows a detail of an exemplary system 100 similar to that of FIG. 2A, in which gases, e.g., $H_2$ and/or $CH_4$, are combusted to create the heat necessary for the steam-methane reforming process. Two non-limiting examples of incoming gas flows to combustion facilities 43, 44 are shown: $H_2+CH_4$ from $H_2$-storage wells such as $H_2$-storage well $11_2$ of FIG. 2A, indicated again in FIG. 2B by arrow 900, and $CH_4$ from $CH_4$-production wells such as $CH_4$-production wells $11_1$ and $11_4$ of FIG. 2A, indicated again in FIG. 2B by arrow 911. These gas flows can first be routed to a separator 60. For example, if the combustion process requires only hydrogen, then the $H_2/CH_4$ flow 900 is routed first to a separator facility 60 and thence to the combustion facilities 43, 44. Other gas flows can be exploited for combustion or other purposes; as another non-limiting example, a portion of the $H_2$ yielded by the SMR facility 42 can be returned to the combustion facilities 43, 44 Of the SMR facility 42 and used for combustion.

In the example of FIG. 2B, a boiler 43 generates steam for mixing with the methane in the SMR process. Burners 44, e.g., top-fired, bottom-fired, and/or side-fired burners, superheat the catalyst-filled reaction tubes of packed-bed reactors.

FIG. 2C shows a detail of another exemplary system 100 similar to that of FIG. 2A, in which the system 100 includes a blending facility 49. According to embodiments, the blending facility 49 is configured to produce a blended stream comprising a fixed ratio between two or more gases, e.g., methane and hydrogen at a fixed ratio. FIG. 2C shows two non-limiting examples of incoming gas flows to the blending facility 49: $H_2+CH_4$ from $H_2$-storage wells such as $H_2$-storage well $11_2$ of FIG. 2A, indicated again in FIG. 2C by arrow 900, and $CH_4$ from $CH_4$-production wells such as $CH_4$-production wells $11_1$ and $11_4$ of FIG. 2A, indicated again in FIG. 2C by arrow 911. As shown, for purposes delivering a blended gas, the blending facility 49 can be arranged in fluid communication with an electrical generator such as a gas turbine 45, or a pipeline 75 for off-site transport of the blended gas.

The blending facility 49 can also be arranged to deliver a pre-determined mix to a gas-fueled compressor 93. In any of the disclosed embodiments of system 100, a methane-containing gas and/or a hydrogen-containing gas, either separately or in a mixture, can be used, e.g., combusted, directly in a gas-powered compressor 93 for compressing gases and injecting the compressed gases into the unconventional reservoir 35.

In another example shown in FIG. 2A, the gas flows of FIG. 2B can first be routed to a blending facility 49 in order to achieve a desired mix of combustion-fuel gases, indicated in FIG. 2C by arrow 922. for delivery to the boiler 43 and/or burners 44 of the SMR facility 42. Examples of suitable mixtures of combustion-fuel gases include a mix that comprises at least 15% $H_2$, or at least 50% $H_2$, or at least 85% $H_2$, or at least 90% $H_2$, or at least 95% $H_2$, or at least 98% $H_2$ (all by molar fraction).

Any or all the foregoing functions and features of the described systems can be combined in any manner in a single embodiment, and not every embodiment includes every function or feature discussed.

Figure 3:
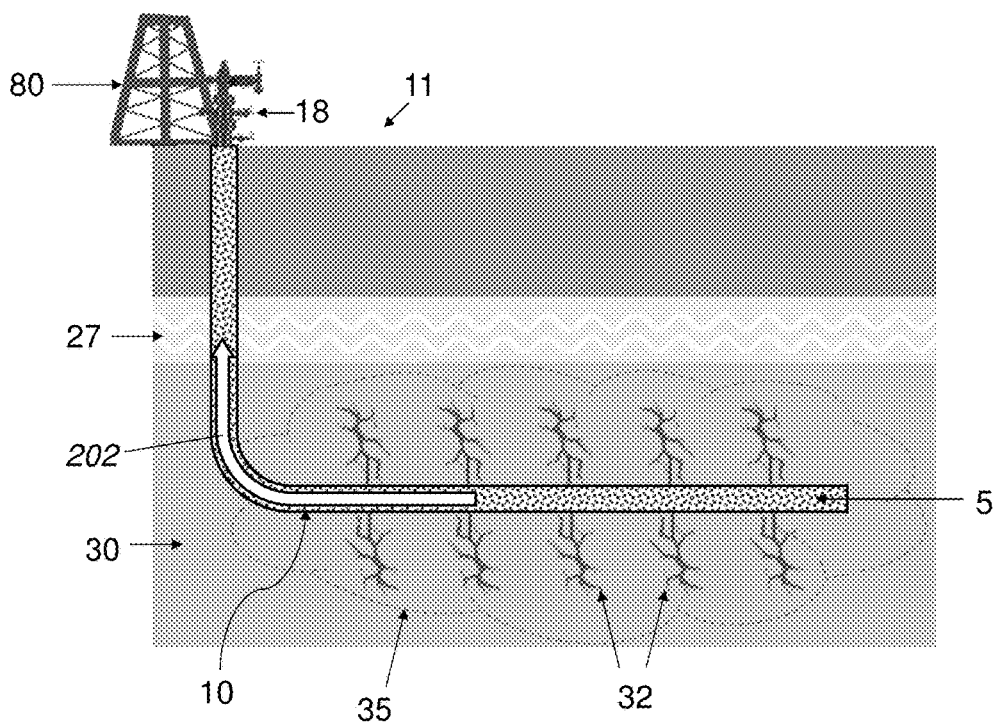
FIG. 3 is a schematic illustration showing recovery of a methane-containing gas from a geological formation through a horizontal wellbore, according to embodiments of the present invention.

FIG. 3 illustrates recovery of a methane-containing gas 5 through a wellbore 10 of a well 11, for example well $11_1$ of FIG. 2, drilled into the unconventional gas reservoir 35 developed in geological formation 30. As indicated by directional arrow 202, natural gas 5 is recovered through the wellbore 10 from the reservoir 35, including from the hydraulic fractures 32, and processed by gas recovery equipment 80 which is in fluid communication with the wellbore 10 at the wellhead 18.

In a well servicing an unconventional gas reservoir, natural gas is recovered at a flow rate that reaches, within a relatively short time, e.g., one month or less of post-hydraulic fracturing clean-up, a maximum flow rate $FLOW_{MAX}$, and the flow rate thereafter declines. The output process of gas flow can be described by a combination of mechanisms acting at different scales. In an initial period of gas recovery, the flow rate reaches maximum flow rate $FLOW_{MAX}$ and proceeds through the period of 'short-term decline'. The first mechanism is a flow of free (non-adsorbed and non-dissolved) gas molecules from pores and cracks in the shale formation. After equilibrium is disturbed, for example, by the hydraulic fracturing, the free gas molecules start flowing toward lower pressure, and are recovered through the wellbore. This flow is called viscous flow, or 'Darcy flow', because the flow through the porous medium follows Darcy's Law which states that flow of a gas through a porous medium has a linear relationship with both permeability and pressure differential, or, for a given permeability, flow is proportional to pressure differential. Additional gas flow (and recovery) during the 'short-term decline' period occurs by desorption of methane from kerogen and clay surfaces, and subsequent flow of the gas molecules under a pressure gradient. A longer, residual period of 'long-term decline' is characterized by gas recovered substantially by diffusion, e.g., Knudsen diffusion, and slip flow in smaller pores, e.g., nanopores.

Figure 4:
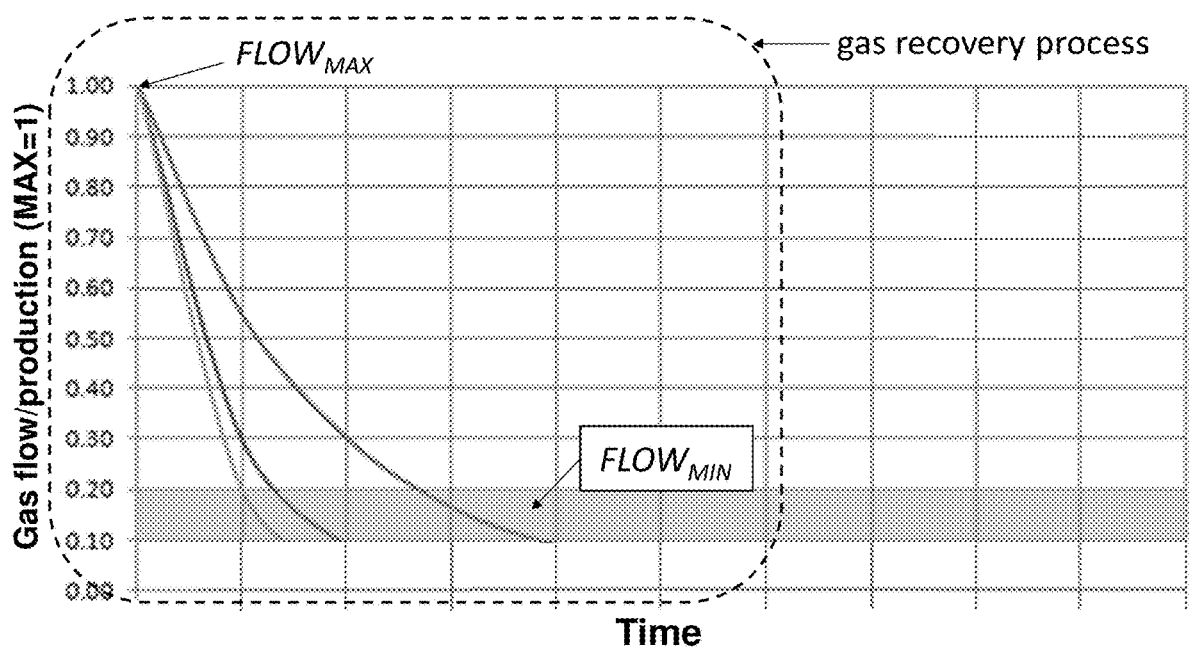
FIG. 4 shows a graph schematically showing the relationship between a minimum flow rate and a maximum flow rate in a gas-recovery process, according to embodiments of the present invention.

The recovery process of a reservoir or a particular well can be characterized, as illustrated schematically in FIG. 4, by a stretched exponential, or in some embodiments, hyperbolic, decline in gas recovery rate from a peak flow rate of $FLOW_{MAX}$ to a minimum flow rate of $FLOW_{MIN}$. In an example, the value of $FLOW_{MIN}$ of any given well can be selected based on the economic viability of maintaining the well as active beyond the minimum flow of $FLOW_{MIN}$, including operating the gas-recovery equipment associated with the well. In another example, wherein the well is associated with an SMR, the value of $FLOW_{MIN}$ can be selected to take into account the value, e.g., opportunity cost, of using the well for storage (and recovery) of the hydrogen gas produced by the SMR or for storage of the inorganic carbon-containing gas (CO and/or $CO_2$) produced by the SMR. FIG. 4 indicates a range of $FLOW_{MIN}$ between 10% and 20% of $FLOW_{MAX}$. These are exemplary values, and in other examples $FLOW_{MIN}$ can be selected to be less than 10% or more than 20% of $FLOW_{MAX}$.

Figure 5:
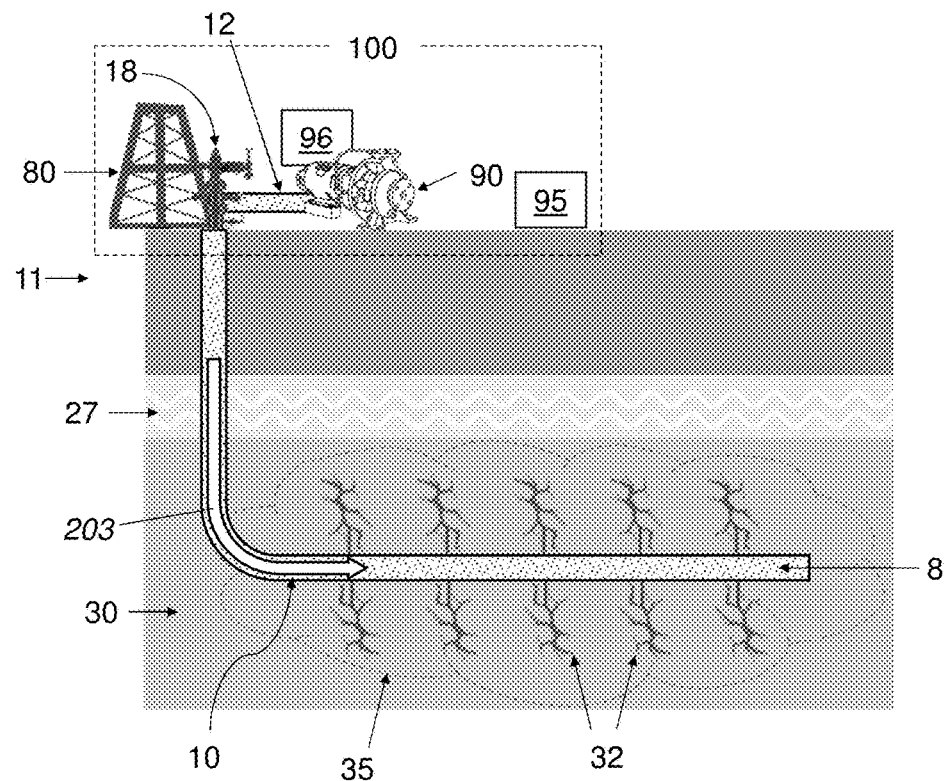
FIG. 5 is a schematic illustration showing injection of hydrogen gas through a horizontal wellbore into a geological formation, according to embodiments of the present invention.
Figure 6:
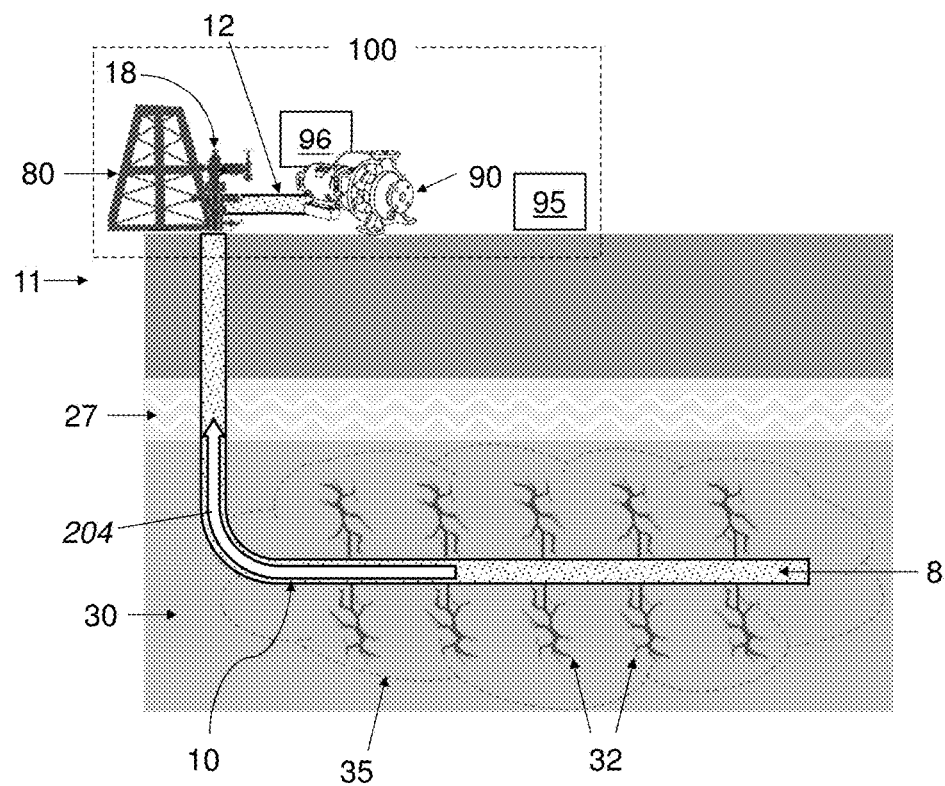
FIG. 6 is a schematic illustration showing recovery of a hydrogen-containing gas from a geological formation through a horizontal wellbore, according to embodiments of the present invention.

We now refer to FIGS. 5 and 6.

FIG. 5 illustrates the injection of hydrogen gas 8 into a well 11, for example, well $11_2$ of FIG. 2. The injection of the hydrogen 8 is represented schematically by the directional arrow 203. Subsequent recovery of the hydrogen-containing gas 8 is represented schematically by the directional arrow 204 of FIG. 6.

Several components of a system 100 for producing, storing and subsequently recovering a hydrogen-containing gas are shown in both FIGS. 5 and 6. Hydrogen-gas-pumping arrangements 90 are provided in fluid communication with the reservoir 35 via wellbore 10. The pumping arrangements 80 include pumps and compressors, piping (e.g., piping 12), power equipment, and other equipment as necessary for injecting the hydrogen gas 8. The pumping arrangements 90 are configured to inject the hydrogen 8 at a pressure higher than a current shut-in gas pressure at the wellbore 10. Gas-recovery equipment 80 is also in fluid communication with the reservoir 35 though the wellbore 10. The gas-recovery equipment 80 is operative to recover a portion of the stored hydrogen-containing gas 8 through the wellbore 10. The system 100 is operable such that the recovered portion of the hydrogen-containing gas 8 has an $H_2$ molar fraction of at least 85%. In various examples, the $H_2$ molar fraction is at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%. In embodiments, the remainder of the gas, i.e., after subtracting the $H_2$ molar fraction, is at least predominantly $CH_4$. In some embodiments, the pumping arrangements 90 are operative to inject the hydrogen-containing gas 8 at a pressure that is at least 500 PSI higher than the current shut-in gas pressure at the wellbore 10. In some embodiments, the pumping arrangements 90 are operative to inject the hydrogen-containing gas 8 at a pressure that is no more than 100 PSI less than a maximum wellhead pressure of the gas-recovery process of the reservoir 35. In some embodiments, the pumping arrangements 90 are operative to inject the hydrogen-containing gas 8 at a pressure that is no more than 50 PSI less than the maximum wellhead pressure.

In some embodiments, the system 100 additionally includes surface geophysical-monitoring equipment 95 for determining whether hydraulic fractures, e.g., one or more hydraulic fractures, are being extended by the hydrogen injection. Suitable examples of surface geophysical-monitoring equipment include microseismic arrays and tiltmeters. In some embodiments, the system 100 additionally includes a tracer-gas facility 96 for adding a gas-phase tracer to the injected hydrogen gas 8.

Figure 7:
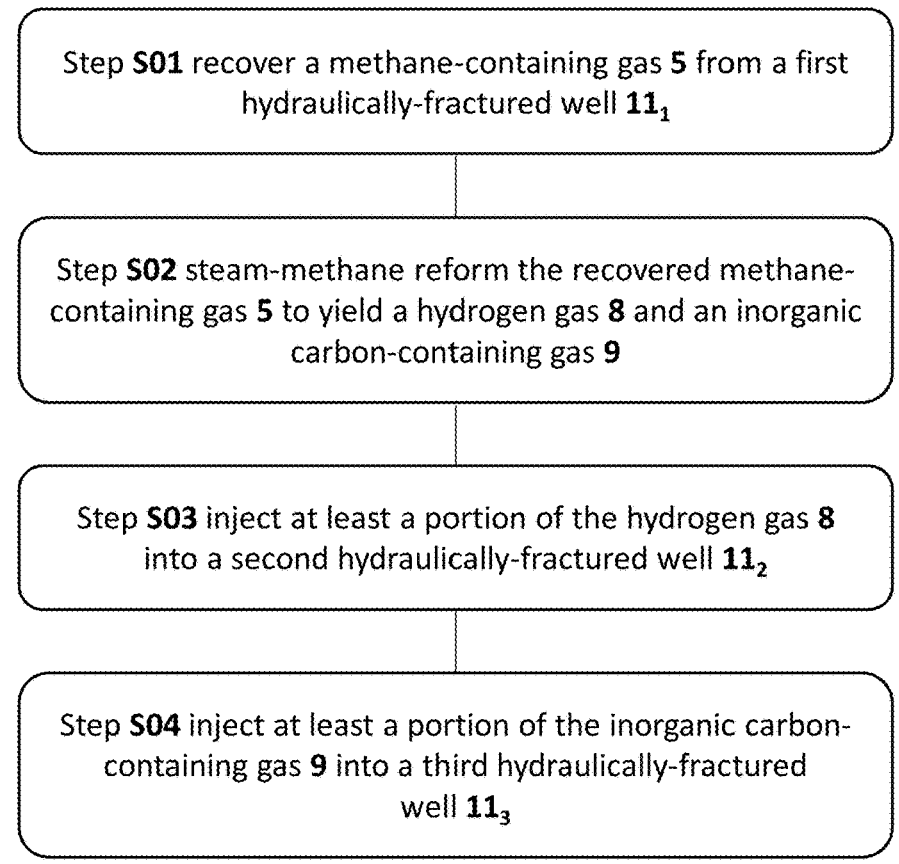

Referring now to FIG. 7, a method is disclosed for operating a kerogen-rich unconventional gas reservoir characterized by there being multiple hydraulically-fractured wells drilled thereinto. As illustrated by the flowchart in FIG. 7, the method comprises Steps S01, S02, S03, and S04, which are discussed in the following paragraphs.

Step S01: recovering a methane-containing gas 5 from a first hydraulically-fractured well $11_1$. In this step, natural gas 5 is recovered through the wellbore 10 from the reservoir 35, including from the hydraulic fractures 32, and processed by gas recovery equipment 80 which is in fluid communication with the wellbore 10 at the wellhead 18. The recovery of the methane-containing gas 5 is further discussed hereinabove with reference to FIGS. 3 and 4.

Step S02: steam-methane reforming the recovered methane-containing gas 5 to yield a hydrogen gas 8 and an inorganic carbon-containing gas 9. In embodiments, the steam-methane reforming of Step S02 includes performing the water-gas shift to convert at least a majority of the CO produced in the reforming to $CO_2$. An example of a suitable steam-methane reformer for performing the reforming is steam-methane reformer 42 shown in FIG. 2.

In a non-limiting and illustrative example of the reforming process, the four gas-producing wells $11_1$, $11_4$ (of FIG. 2) and two other gas-producing wells 11 (not shown) produce 400 tons of methane per day. According to the example, all the recovered gas 5 is routed to the SMR 42 for reforming. For the four gas-producing wells, each producing 100 tons of methane per day, totaling 400 tons per day, about 900 tons of water and over 1,000 MWh of heat are added per day in the steam-methane reforming and water-gas shift processes. The SMR 42 of this example produces 200 tons of hydrogen gas 8 per day, and about 1,100 tons of $CO_2$. In some embodiments, the SMR 42 uses energy produced at least in part from a portion of recovered hydrogen-containing gas.

Step S03: injecting at least a portion of the hydrogen gas 8 into a second hydraulically-fractured well $11_2$. As shown in the example of FIG. 5, where injection of the hydrogen 8 is represented schematically by the directional arrow 203, hydrogen-gas-pumping arrangements 90 are provided in fluid communication with the reservoir 35 via wellbore 10. The skilled artisan will understand that Step S03 can involve one or more preparatory steps before injecting hydrogen into the well, e.g., for the first time after a period during which the well was used to recover natural gas 5 or a hydrogen-containing gas 8. For example, it can be desirable to close valves at the surface to cause pressure in the reservoir 35 to reach an equilibrium pressure. This allows time for the wellhead pressure to increase from a flowing wellhead pressure to a shut-in wellhead pressure. Over a period of time, e.g., weeks, the shut-in wellhead pressure rises to an equilibrium pressure that is approximately equal to reservoir pressure. The injection of the hydrogen gas 8, e.g., pure $H_2$, or a hydrogen-containing gas that includes at least 99% $H_2$ or at least 98% $H_2$, or at least 97% $H_2$, or at least 96% $H_2$, or at least 95% $H_2$, is at a pressure higher than the current gas pressure at the wellhead 18, e.g., the shut-in wellhead pressure at a stabilized reservoir-equilibrium pressure, so as to ensure that the hydrogen gas 8 propagates throughout the well, i.e., including the hydraulic fractures 32 and natural cracks. In embodiments, the second hydraulically-fractured well $11_2$ is partially depleted by a methane-containing-gas recovery process characterized by (i) a maximum flow rate and (ii) a minimum flow rate that is not more than 20% of the maximum flow rate.

Step S04: injecting at least a portion of the inorganic carbon-containing gas 9 into a third hydraulically-fractured well $11_3$. In embodiments, the third hydraulically-fractured well $11_3$ is partially depleted by a methane-containing-gas recovery process characterized by (i) a maximum flow rate and (ii) a minimum flow rate that is at least 10% of the maximum flow rate. The inorganic carbon-containing gas can include carbon dioxide ($CO_2$) and/or carbon monoxide (CO) in any combination.

Figure 8:
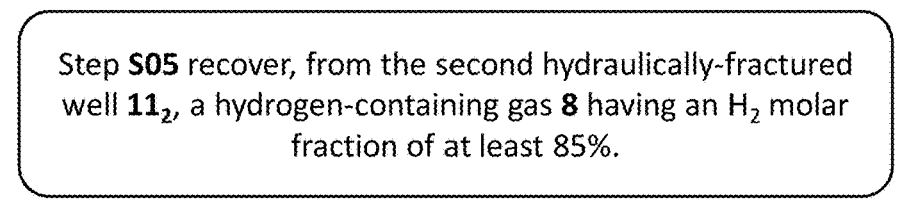

In some embodiments, as illustrated by the flow chart in FIG. 8, the method additionally comprises the following step:

Step S05: recovering, from the second hydraulically-fractured well $11_2$, a hydrogen-containing gas 8 having an $H_2$ molar fraction of at least 85%. In some embodiments, the hydrogen-containing gas 8 has an $H_2$ molar fraction of at least 90%, or at least 95%, or at least 97%. The $H_2$ molar fraction of the recovered gas can be directly impacted by the selection of the reservoir 35, e.g., selection of a kerogen-rich reservoir, and/or selection of a kerogen-rich reservoir with low permeability. The $H_2$ molar fraction of the recovered gas can be directly impacted by the minimum pressure of the gas-depletion.

The $H_2$ molar fraction of the recovered gas can be directly impacted by the conditions prevalent in the well $11_2$ at the time that the gas recovery from the well $11_2$ was stopped for initiating the injection of hydrogen gas into the reservoir, e.g., what flowrate and/or pressure was prevalent in the well $11_2$ at that time. In embodiments, the transition to injection of hydrogen can be chosen to correspond to a state of the reservoir in which pore methane and kerogen-adsorbed methane is largely already recovered, such that the hydrogen gas replaces the methane in the faster-recovery locations of the shale formation.

As was shown in the example of FIG. 6, where recovery of the hydrogen-containing gas 8 is represented schematically by the directional arrow 204, hydrogen-gas-recovery equipment 80 is provided in fluid communication with the reservoir 35 via wellbore 10. The recovered hydrogen-containing gas 8 can include bulk-phase $H_2$ in hydraulic fractures, $H_2$ in kerogen pore spaces, $H_2$ adsorbed on kerogen surfaces, $H_2$ dissolved in kerogen, and/or bulk-phase $H_2$ contained in the non-organic pores or adsorbed on clays of the matrix of the geological formation 30.

Figure 9:
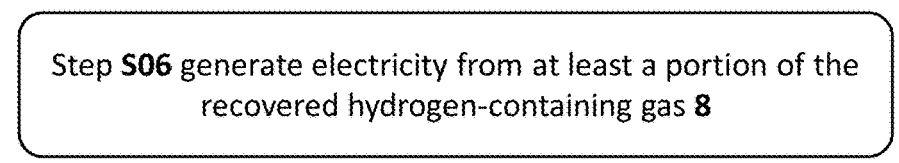

In some embodiments, as illustrated by the flow chart in FIG. 9, the method additionally comprises the following step:

Step S06: generating electricity from at least a portion of the recovered hydrogen-containing gas 8. In some embodiments, the electricity is generated using a gas turbine, e.g., gas turbine 45 of FIG. 2. In some embodiments, the electricity is generated using a reciprocating engine. In some embodiments, electricity is generated using a fuel cell, e.g., fuel cell 46 of FIG. 2. In some embodiments, at least a portion of the generated electricity is used in the steam-methane reforming of Step S02. In some embodiments, a majority of the generated electricity is used in the steam-methane reforming of Step S02. In some embodiments, a majority of the generated electricity is delivered to a distribution network of an electric utility, e.g., via transmission arrangements 48, and, for example, is sold commercially. Transmission arrangements 48 can include electrical subsystem equipment such as transformers, power conditioning equipment, inverters (for electricity generated by fuel cells 46), etc. In some embodiments, any or all the electricity can be generated from a gas mixture comprising methane and hydrogen.

In some embodiments, as illustrated by the flow chart in FIG. 10, the method additionally comprises the following step:

Step S07: performing surface geophysical monitoring to determine whether hydraulic fractures 32 are being extended by the injecting of the hydrogen gas 8 or of the inorganic carbon-containing gas 9. According to non-limiting examples, surface geophysical monitoring can include the use of surface geophysical monitoring equipment 95 such as microseismic arrays or tiltmeters.

In some embodiments, as illustrated by the flow chart in FIG. 11, the method additionally comprises the following step:

Step S08: employing a gas phase tracer to verify that hydraulic fractures 32 of a given hydraulically-fractured well 11 drilled into the gas reservoir 35 do not extend into a fracture 32 that is in fluid communication with a different hydraulically-fractured well 11. Suitable gas phase tracers include tritiated hydrogen such as HT or $T_2$ in the range of 3 to $30 \times 10^{\wedge}10$ Becquerel (Bq) that may be detected at extremely low concentrations in nearby production wells. According to a non-limiting example, a tracer-gas facility 96 for adding a gas-phase tracer to the injected hydrogen gas 8 is provided at or near the wellhead 18.

Referring now to FIG. 12, a system 100 for producing, storing and subsequently recovering a hydrogen-containing gas includes a steam-methane reformer (SMR) 42. In the embodiment illustrated in FIG. 12, the SMR 42 is located onsite, i.e., at or in proximity to a kerogen-rich unconventional gas reservoir 35. 'In proximity' can mean within 10 km, or within 50 km, or within 100 km, or within 250 km, or within 500 km of the gas reservoir. In some embodiments, the SMR 42 can be located onsite at a kerogen-rich unconventional gas reservoir 35 which is no longer used for producing natural gas.

The unconventional gas reservoir 35 is characterized by having multiple wells 11 drilled thereinto; in the example of FIG. 12, the multiple wells 11 include (at least) hydraulically-fractured wells $11_2$ and $11_3$ drilled into the reservoir 35. A single SMR 42 can serve one or more wells 11, i.e., reform the methane gas recovered from one or more wells 11, drilled in reservoir 35. The skilled artisan will understand that these wells are illustrative in nature and in practicing the embodiments it is likely to employ an unconventional gas reservoir having many more wells drilled into it. In some embodiments, a single SMR 42 serves some, many, most, or all of the gas-producing (including formerly gas-producing) wells 11 drilled into a reservoir 35.

The hydraulic and natural fractures in the respective wells are indicated by the arrows 32. Hydrogen-gas-pumping arrangements 90 and hydrogen-gas-recovery equipment 80 are both provided in fluid communication with the reservoir 35 via the wellbore of well $11_2$, respectively for injection of hydrogen into the well and for later recovery of the stored hydrogen. The pumping arrangements 90 include pumps and compressors, piping, power equipment, and other equipment as necessary for injecting the hydrogen gas into the well. The pumping arrangements 90 are configured to inject the hydrogen at a pressure higher than a current shut-in gas pressure at the wellbore of well $11_2$. Well $11_3$ is a partially depleted well, being used for injecting an inorganic carbon-containing gas, e.g., $CO_2$ and/or CO, into the well for storage. The $CO_2$ and CO, which are products of the steam-reforming process, can be stored in the partially depleted gas wells indefinitely. $CO/CO_2$-gas-pumping arrangements 91 are provided in fluid communication with the reservoir 35 via the wellbore of well $11_3$, for injection of the inorganic carbon-containing gas into the well.

In the non-limiting example illustrated in FIG. 12, the SMR 42 receives natural gas (methane) from offsite, e.g., through pipeline 73 or by other transportation means (not shown) such as vehicles and/or ships. The main products of the steam reforming process, $H_2$ and $CO/CO_2$, are delivered to respective pumping arrangements 90 and 91, by piping the gases from the SMR 42, as indicated in FIG. 12 by 901 and 910, respectively. In some implementations, a majority, or even all, of the hydrogen gas produced by the SMR 42 is piped (as indicated by arrow 902), for purposes other than storage in the well $11_2$. The system 100 can include a separator 60 for separating $H_2$ from other gases, especially $CH_4$. Non-limiting examples of suitable separators include an embedded membrane in a catalyst tube or a shell-and-tube configuration.

In a non-limiting example, some, or a majority, or even all, of the produced hydrogen gas is used to generate electricity onsite, for example by being piped, as indicated by arrow 903, to a gas turbine 45 or to a fuel cell 46. In another non-limiting example, some, or a majority, or even all, of the produced hydrogen gas, is sent offsite via a pipeline 71. As shown in FIG. 12, a hydrogen-containing gas recovered from well $11_2$ following recovery from storage therein, indicated by arrow 900, is sent to the separator 60, as, for separation of the $H_2$ from the $CH_4$, and/or is sent, as indicated by arrow 903, to a gas turbine 45 for generating electricity, either with or without separation of the methane at the separator 60. Hydrogen-containing gas exiting the separator 60, as indicated by arrow 904, yields $H_2$ which can be used to generate electricity, for example in the fuel cell 46 (or in the gas turbine 45), or can be shipped offsite by pipeline 71. The $CH_4$ separated from the $H_2$ at the separator can be shipped offsite by pipeline 72, or can be sent to the SMR 42. Electricity generated onsite is delivered offsite by electricity transmission arrangements (not shown). Any or all of the foregoing functions and features of the system can be combined in any manner in a single embodiment, and not every embodiment includes every function or feature discussed.

In some embodiments, e.g., as illustrated in FIGS. 5 and 6, the system 100 additionally includes surface geophysical-monitoring equipment 95 for determining whether hydraulic fractures, e.g., one or more hydraulic fractures, are being extended by the hydrogen injection. Suitable examples of surface geophysical-monitoring equipment include micro-seismic arrays and tiltmeters. In some embodiments, the system 100 additionally includes a tracer-gas facility 96 for adding a gas-phase tracer to the injected hydrogen gas 8.

In some embodiments, e.g., as illustrated in FIGS. 2B and 2C, gases, e.g., $H_2$ and/or $CH_4$, are combusted to create the heat necessary for the steam-methane reforming process. For example, $H_2+CH_4$ from $H_2$-storage wells such as $H_2$-storage well $11_2$ of FIG. 2A, $CH_4$ received by pipeline, or $H_2$ yielded by the SMR facility 42 itself can be used for combustion. Any gas flows for combustion can first be routed to a separator 60 (also shown in FIG. 12). For example, if the combustion process requires only hydrogen, then the $H_2/CH_4$ flow 900 is routed first to a separator facility 60 and thence to the combustion facilities 43, 44 of FIG. 2B-C, which can also be provided in system 100 of FIG. 12. Examples of suitable mixtures of combustion-fuel gases include a mix that comprises at least 15% $H_2$, or at least 50% $H_2$, or at least 85% $H_2$, or at least 90% $H_2$, or at least 95% $H_2$, or at least 98% $H_2$ (all percentages by molar weight).

System 100 of FIG. 12 can also include the blending facility 49 of FIG. 2C, configured to produce a blended stream comprising a fixed ratio between two or more gases, e.g., methane and hydrogen at a fixed ratio. In another example shown in FIG. 2A, the gas flows of FIG. 2B can first be routed to a blending facility 49 in order to achieve a desired mix of combustion-fuel gases, indicated in FIG. 2C by arrow 922. for delivery to the boiler 43 and/or burners 44 of the SMR facility 42. As shown in FIG. 2C, for purposes delivering a blended gas, the blending facility 49 can be arranged in fluid communication with an electrical generator such as a gas turbine 45, or a pipeline 75 for off-site transport of the blended gas. The blending facility 49 can also be arranged to deliver a pre-determined mix to a gas-fueled compressor 93.

Figures 13, 14, 15:
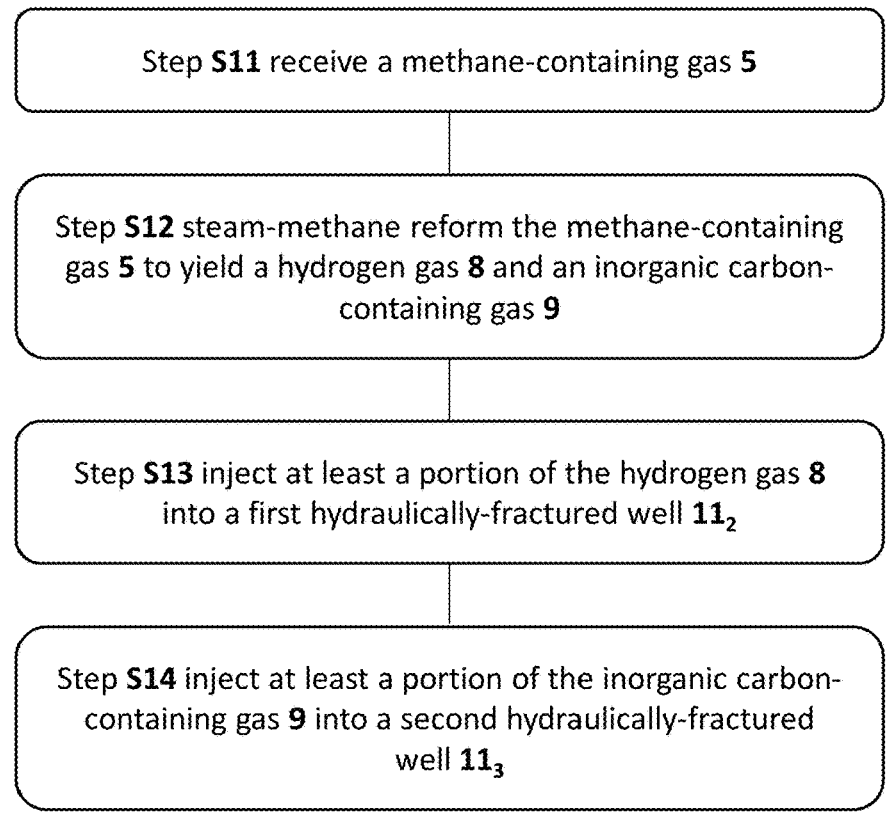

Referring now to FIG. 13, a method is disclosed for operating a kerogen-rich unconventional gas reservoir characterized by there being multiple hydraulically-fractured wells drilled thereinto. As illustrated by the flowchart in FIG. 7, the method comprises Steps S11, S12, S13, and S14, which are discussed in the following paragraphs.

Step S11: receiving a methane-containing gas 5 at an SMR, e.g., the SMR 42 of FIG. 12. In embodiments, the gas 5 is received from offsite, e.g., through pipeline 73 of FIG. 12, or by other transportation conveyances (not shown) such as vehicles and/or ships. In some embodiments, Step S1*l* is combined with Step S01, such that the SMR 42 receives gas 5 from both offsite onsite sources, i.e., from additional wells 11 servicing the reservoir 35 as shown in FIG. 2.

Step S12: steam-methane reforming gas 5 received in Step S1*l* (including, optionally, in combination with Step S01) to yield a hydrogen gas 8 and an inorganic carbon-containing gas 9. In embodiments, the steam-methane reforming of Step S12 includes performing the water-gas shift to convert at least a majority of CO produced in the reforming to $CO_2$. An example of a suitable steam-methane reformer for performing the reforming is steam-methane reformer 42 shown in FIG. 12. In a non-limiting and illustrative example of the reforming process, pipeline 73 delivers 1,000 tons of methane per day. According to the example, all of the received gas 5 is routed to the SMR 42 for reforming. Over 2,000 tons of water are added per day in the steam-methane reforming and water-gas shift processes, and over 2,500 MWh of heat. In some embodiments, the SMR 42 uses energy produced at least in part from a portion of recovered hydrogen-containing gas. The SMR 42 of the example produces 500 tons of hydrogen gas 8 per day, and about 2,700 tons of $CO_2$.

Step S13: injecting at least a portion of the hydrogen gas 8 into a first hydraulically-fractured well 11$_2$. As was shown in the example of FIG. 5, where injection of the hydrogen 8 is represented schematically by the directional arrow 203, hydrogen-gas-pumping arrangements 90 are provided in fluid communication with the reservoir 35 via wellbore 10. The skilled artisan will understand that Step S13 can involve one or more preparatory steps before injecting hydrogen into the well, e.g., for the first time after a period during which the well 11$_2$ was used to recover natural gas 5 or a hydrogen-containing gas 8. For example, it can be desirable to close valves at the surface to cause pressure in the reservoir 35 to reach an equilibrium pressure. This allows time for the wellhead pressure to increase from a flowing wellhead pressure to a shut-in wellhead pressure. Over a period of time, e.g., weeks, the shut-in wellhead pressure rises to an equilibrium pressure that is approximately equal to reservoir pressure. The injection of the hydrogen gas 8, e.g., pure $H_2$, or a hydrogen-containing gas that includes at least 99% $H_2$ or at least 98% $H_2$, or at least 97% $H_2$, or at least 96% $H_2$, or at least 95% $H_2$, is at a pressure higher than the current gas pressure at the wellhead 18, e.g., the shut-in wellhead pressure at a stabilized reservoir-equilibrium pressure, so as to ensure that the hydrogen gas 8 propagates throughout the well, i.e., including the hydraulic fractures 32 and natural cracks. In embodiments, the second hydraulically-fractured well 11$_2$ is partially depleted by a methane-containing-gas recovery process characterized by (i) a maximum flow rate and (ii) a minimum flow rate that is not more than 20% of the maximum flow rate.

Step S14: injecting at least a portion of the inorganic carbon-containing gas 9 into a second hydraulically-fractured well 11$_3$. In embodiments, the second hydraulically-fractured well 11$_3$ is partially depleted by a methane-containing-gas recovery process characterized by (i) a maximum flow rate and (ii) a minimum flow rate that is at least 10% of the maximum flow rate. The inorganic carbon-containing gas can include carbon monoxide (CO) and/or carbon dioxide ($CO_2$) in any combination.

In some embodiments, as illustrated by the flow chart in FIG. 14, the method additionally comprises the following step:

Step S15: recovering, from the first hydraulically-fractured well 11$_2$, a hydrogen-containing gas 8 having an $H_2$ molar fraction of at least 85%. In some embodiments, the hydrogen-containing gas 8 has an $H_2$ molar fraction of at least 90%, or at least 95%, or at least 97%. The $H_2$ molar fraction of the recovered gas can be directly impacted by the selection of the reservoir 35, e.g., selection of a kerogen-rich reservoir, and/or selection of a kerogen-rich reservoir with low permeability. The $H_2$ molar fraction of the recovered gas can be directly impacted by the minimum pressure of the gas-depletion The $H_2$ molar fraction of the recovered gas can be directly impacted by when (e.g., by what flowrate and/or pressure was prevalent in the well 11$_2$ the gas recovery from the well 11$_2$ was ceased for initiating the injection of hydrogen gas into the reservoir. In embodiments, the transition to injection of hydrogen can be chosen to correspond to a state of the reservoir in which pore methane and kerogen-adsorbed methane is largely already recovered, such that the hydrogen gas replaces the methane in the faster-recovery locations of the shale formation.

As shown in the example of FIG. 6, where recovery of the hydrogen-containing gas 8 is represented schematically by the directional arrow 204, hydrogen-gas-recovery equipment 80 is provided in fluid communication with the reservoir 35 via wellbore 10. The recovered hydrogen-containing gas 8 can include bulk-phase $H_2$ in hydraulic fractures, $H_2$ in kerogen pore spaces, $H_2$ adsorbed on kerogen surfaces, $H_2$ dissolved in kerogen, and/or bulk-phase $H_2$ contained in the non-organic pores or adsorbed on clays of the matrix of the geological formation 30.

In some embodiments, as illustrated by the flow chart in FIG. 15, the method additionally comprises the following step:

Step S16: generating electricity from at least a portion of the recovered hydrogen-containing gas 8. In some embodiments, the electricity is generated using a gas turbine, e.g., gas turbine 45 of FIG. 12. In some embodiments, the electricity is generated using a reciprocating engine. In some embodiments, electricity is generated using a fuel cell, e.g., fuel cell 46 of FIG. 12. In some embodiments, at least a portion of the generated electricity is used in the steam-methane reforming of Step S12. In some embodiments, a majority of the generated electricity is delivered to a distribution network of an electric utility, e.g., via transmission arrangements 48, and, for example, is sold commercially. Transmission arrangements 48 can include electrical sub-system equipment such as transformers, power conditioning equipment, inverters (for electricity generated by fuel cells 46), etc. In some embodiments, any or all of the electricity is generated from a gas mixture comprising methane and hydrogen.

In some embodiments, as illustrated by the flow chart in FIG. 16, the method additionally comprises the following step:

Step S19: separating the yielded hydrogen gas from the inorganic carbon-containing gas yielded by the steam-methane reforming of Step S12. According to some embodiments, a system 100 according to any one of FIGS. 2A, 2B, 2C and 12 includes a separator facility (not illustrated) for separating hydrogen gas from an inorganic carbon-containing gas. Non-limiting examples of suitable technologies for performing the separation include pressure swing adsorption method, a cryogenic distillation method at a low temperature, and through membrane separators or porous ceramics.

In some embodiments, as illustrated by the flow chart in FIG. 17, the method additionally comprises the following step:

Step S20: further recovering, from the second hydraulically-fractured well 11$_3$, a methane-containing gas 5. The second hydraulically-fractured well 11$_3$, is the well into which the inorganic carbon-containing gas ($CO_2$ and/or CO) is injected into in Step S14. When $CO_2$ is injected into a partially-depleted unconventional well, it displaces $CH_4$ from the kerogen. Thus, when sequestering $CO_2$, if the well 11 is shut-in for a period of time, it is possible to produce additional $CH_4$ from the well where the $CO_2$ is stored. This step can be repeated until the well is fully depleted of $CH_4$. $CO_2$ recovered with the $CH_4$ can be returned to the well after separation.

In some embodiments, as illustrated by the flow chart in FIG. 18, the method additionally comprises the following step:

Step S17: performing surface geophysical monitoring to determine whether hydraulic fractures 32 are being extended by the injecting of the hydrogen gas 8 or of the inorganic carbon-containing gas 9. According to non-limiting examples, surface geophysical monitoring can include the use of surface geophysical monitoring equipment 95 such as microseismic arrays or tiltmeters.

In some embodiments, as illustrated by the flow chart in FIG. 19, the method additionally comprises the following step:

Step S18: employing a gas phase tracer to verify that hydraulic fractures 32 of a given hydraulically-fractured well 11 drilled into the gas reservoir 35 do not extend into a fracture 32 that is in fluid communication with a different hydraulically-fractured well 11. Suitable gas phase tracers include tritiated hydrogen such as HT or $T_2$ in the range of 3 to 30×10^10 Becquerel (Bq) that may be detected at extremely low concentrations in nearby production wells. According to a non-limiting example, a tracer-gas facility 96 for adding a gas-phase tracer to the injected hydrogen gas 8 is provided at or near the wellhead 18.

Figure 20:
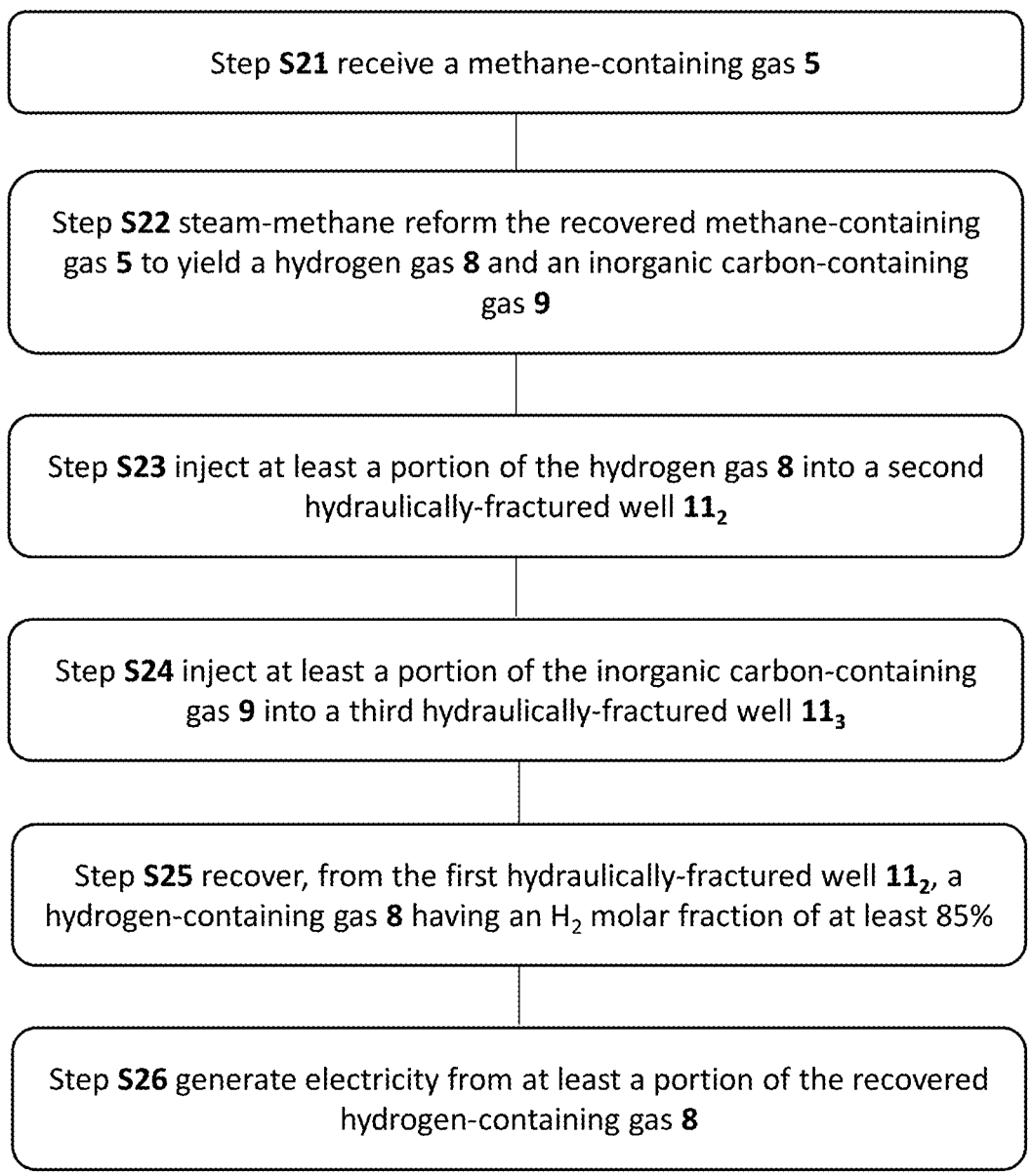

Referring now to FIG. 20, a method is disclosed for operating a kerogen-rich unconventional gas reservoir characterized by there being multiple hydraulically-fractured wells drilled thereinto. As illustrated by the flowchart in FIG. 20, the method comprises six method steps S21 . . . S26.

Step S21: receiving a methane-containing gas 5 at an SMR, e.g., the SMR 42 of FIG. 12. In some embodiments, the gas 5 is received from offsite, e.g., through pipeline 73 of FIG. 12, or by other transportation conveyances (not shown) such as vehicles and/or ships. In some embodiments, Step S21 additionally or alternatively includes performing the gas recovery activity of Step S01, such that the SMR 42 receives gas 5 from offsite, from onsite, or from both, either simultaneously or at different times. Gas received onsite is from wells 11 drilled in the reservoir 35 as illustrated in FIG. 2, where wells $11_1$ and $11_4$ are shown as producing gas.

Step S22: steam-methane reforming gas 5 received in Step S21 to yield a hydrogen gas 8 and an inorganic carbon-containing gas 9. In embodiments, the steam-methane reforming of Step S22 includes performing the water-gas shift to convert at least a majority of CO produced in the reforming to $CO_2$. An example of a suitable steam-methane reformer for performing the reforming is steam-methane reformer 42 shown in either FIG. 2 or FIG. 12. In a non-limiting and illustrative example of the reforming process, the SMR 42 receives 1,000 tons of methane per day from onsite and/or offsite sources. According to the example, all of the received gas 5 is routed to the SMR 42 for reforming. Over 2,000 tons of water are added per day in the steam-methane reforming and water-gas shift processes, and over 2,500 MWh of heat. In some embodiments, the SMR 42 uses energy produced at least in part from a portion of recovered hydrogen-containing gas. The SMR 42 of the example produces 500 tons of hydrogen gas 8 per day, and about 2,700 tons of $CO_2$.

Step S23: injecting at least a portion of the hydrogen gas 8 into a second hydraulically-fractured well $11_2$. As was shown in the example of FIG. 5, where injection of the hydrogen 8 is represented schematically by the directional arrow 203, hydrogen-gas-pumping arrangements 90 are provided in fluid communication with the reservoir 35 via wellbore 10. The skilled artisan will understand that Step S23 can involve one or more preparatory steps before injecting hydrogen into the well, e.g., for the first time after a period during which the well was used to recover natural gas 5 or a hydrogen-containing gas 8. For example, it can be desirable to close valves at the surface to cause pressure in the reservoir 35 to reach an equilibrium pressure. This allows time for the wellhead pressure to increase from a flowing wellhead pressure to a shut-in wellhead pressure. Over a period of time, e.g., weeks, the shut-in wellhead pressure rises to an equilibrium pressure that is approximately equal to reservoir pressure. The injection of the hydrogen gas 8, e.g., pure $H_2$, or a hydrogen-containing gas that includes at least 99% $H_2$ or at least 98% $H_2$, or at least 97% $H_2$, or at least 96% $H_2$, or at least 95% $H_2$, is at a pressure higher than the current gas pressure at the wellhead 18, e.g., the shut-in wellhead pressure at a stabilized reservoir-equilibrium pressure, so as to ensure that the hydrogen gas 8 propagates throughout the well, i.e., including the hydraulic fractures 32 and natural cracks. In embodiments, the second hydraulically-fractured well $11_2$ is partially depleted by a methane-containing-gas recovery process characterized by (i) a maximum flow rate and (ii) a minimum flow rate that is not more than 20% of the maximum flow rate.

Step S24: injecting at least a portion of the inorganic carbon-containing gas 9 into a third hydraulically-fractured well $11_3$. In embodiments, the third hydraulically-fractured well $11_3$ is partially depleted by a methane-containing-gas recovery process characterized by (i) a maximum flow rate and (ii) a minimum flow rate that is at least 10% of the maximum flow rate. The inorganic carbon-containing gas can include carbon monoxide (CO) and/or carbon dioxide ($CO_2$) in any combination.

Step S25: recovering, from the second hydraulically-fractured well $11_2$, a hydrogen-containing gas 8 having an $H_2$ molar fraction of at least 85%. In some embodiments, the hydrogen-containing gas 8 has an $H_2$ molar fraction of at least 90%, or at least 95%, or at least 97%. The $H_2$ molar fraction of the recovered gas can be directly impacted by the selection of the reservoir 35, e.g., selection of a kerogen-rich reservoir, and/or selection of a kerogen-rich reservoir with low permeability. The $H_2$ molar fraction of the recovered gas can be directly impacted by the minimum pressure of the gas-depletion.

The $H_2$ molar fraction of the recovered gas can be directly impacted by when (e.g., by what flowrate and/or pressure was prevalent in the well $11_2$ the gas recovery from the well $11_2$ was ceased for initiating the injection of hydrogen gas into the reservoir. In embodiments, the transition to injection of hydrogen can be chosen to correspond to a state of the reservoir in which pore methane and kerogen-adsorbed methane is largely already recovered, such that the hydrogen gas replaces the methane in the faster-recovery locations of the shale formation.

As was shown in the example of FIG. 6, where recovery of the hydrogen-containing gas 8 is represented schematically by the directional arrow 204, hydrogen-gas-recovery equipment 80 is provided in fluid communication with the reservoir 35 via wellbore 10. The recovered hydrogen-containing gas 8 can include bulk-phase $H_2$ in hydraulic fractures, $H_2$ in kerogen pore spaces, $H_2$ adsorbed on kerogen surfaces, $H_2$ dissolved in kerogen, and/or bulk-phase $H_2$ contained in the non-organic pores or adsorbed on clays of the matrix of the geological formation 30.

Step S26: generating electricity from at least a portion of the recovered hydrogen-containing gas 8. In some embodiments, the electricity is generated using a gas turbine, e.g., gas turbine 45 of FIG. 12. In some embodiments, the electricity is generated using a reciprocating engine. In some embodiments, electricity is generated using a fuel cell, e.g., fuel cell 46 of FIG. 12. In some embodiments, at least a portion of the generated electricity is used in the steam-methane reforming of Step S12. In some embodiments, a majority of the generated electricity is used in the steam-methane reforming of Step 12. In some embodiments, a majority of the generated electricity is delivered to a distribution network of an electric utility, e.g., via transmission arrangements 48, and, for example, is sold commercially. Transmission arrangements 48 can include electrical subsystem equipment such as transformers, power conditioning equipment, inverters (for electricity generated by fuel cells 46), etc. In some embodiments, any or all of the electricity is generated from a gas mixture comprising methane and hydrogen.

Any of the disclosed embodiments can be combined in any practical manner. In any of the disclosed methods, not all of the steps need be performed Any of the steps of any of the disclosed methods can be combined in any way to create combinations not explicitly disclosed and any such combinations are within the scope of the invention.

Unless otherwise specified, the term 'portion' as used in the present disclosure means a non-zero fraction that is less than 1. Unless otherwise specified, the term 'at least a portion' means a non-zero fraction can also be 1.

According to further embodiments of the invention, an unconventional gas reservoir can be suitable for long-term and/or short-term storage of hydrogen gas after partial depletion of the natural gas. The timeline of FIG. 21 shows a sequence of stages associated with the use of a partially depleted unconventional gas reservoir for storage and recovery of hydrogen in accordance with embodiments. In a first stage, before Time=$T_0$, a suitable gas-containing reservoir is selected, e.g., based on one or more technical and/or economic selection criteria, and a deep horizontal wellbore is established in the reservoir. Non-limiting examples of technical selection criteria include, and not exhaustively: low permeability, e.g., permeability lower than $10^{-1}$ millidarcy (mD), lower than $10^{-2}$ mD, lower than $10^{-3}$ mD, or lower than $10^{-4}$ mD; proportion of organic matter (i.e., kerogen), e.g., at least 1% kerogen, at least 2% kerogen, or at least 3% kerogen; and distribution of pore volumes in the kerogen.

In a second stage, between Time=$T_0$ and Time=$T_1$, the reservoir is hydraulically fractured. The deep horizontal wellbore is perforated for hydraulic fracturing, e.g., by a perforating gun. A fracturing fluid is injected under pressure through a horizontal wellbore into the geological formation to effect the fracturing by propagation and expansion of cracks in the rock structure. The hydraulic fracturing process is used to facilitate and/or accelerate the recovery of gas from the reservoir by opening up cracks in the deep shale formations. As is known in the art, successive sections of the reservoir along the wellbore are fractured sequentially and not simultaneously. An example of a suitable fracturing fluid is a mixture of water, a proppant such as sand or a ceramic, and/or a chemical or polymer to improve a flow characteristic such as the water's surface friction and/or to act as a lubricant. In other examples, a suitable fracturing fluid can include an energized fluid, e.g., a fluid including at least one compressed or compressible gas-phase material, or an oil-based fluid.

In a third stage, between Time=$T_1$ and Time=$T_2$, natural gas is recovered from the hydraulically-fractured reservoir. The gas recovery process over time is characterized by a maximum flow rate of $FLOW_{MAX}$, and a minimum flow rate of $FLOW_{MIN}$.

In a fourth stage, between Time=$T_2$ and Time=$T_3$, hydrogen gas is injected into the reservoir. In embodiments, the transition from the third stage to the fourth stage, at Time=$T_2$, is based on a trigger criterion. The trigger criterion can include a trigger criterion that corresponds to gas production (recovery) falling over time to a production trigger criterion. An example of a production trigger criterion, e.g., in millions of cubic feet per day (MCF/day), is a flow-rate trigger criterion $FLOW_{TRIGGER}$ When a current flow rate $FLOW_{CURRENT}$ reaches the trigger criterion $FLOW_{TRIGGER}$ in a downward trend, e.g., in an exponentially-declining trend, operation of the reservoir transitions to injecting compressed hydrogen for long- and/or short-term storage.

In a fifth stage, between Time=$T_3$ and Time=$T_4$, stored hydrogen gas is recovered from the reservoir. The recovered hydrogen gas is mostly pure hydrogen, i.e., has an $H_2$ molar fraction of at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%. The remainder of the recovered gas mix can include methane, other hydrocarbon gases such as ethane and propane, and non-hydrocarbon gases such as carbon dioxide and nitrogen.

In a sixth stage, after Time=$T_4$, the injecting and recovering of hydrogen can be cycled. The sixth stage can thus be considered a repetition or cycling of the fourth and fifth stages. In some embodiments, when the hydrogen recovery of the fifth stage reaches a hydrogen-production trigger criterion, operation of reservoir reverts to injecting hydrogen, inter alia to increase pressure and improve future hydrogen recovery volume. In some embodiments, hydrogen is cycled on a daily basis, meaning that within a single diurnal cycle, hydrogen is injected, and then recovered. The diurnal cycle can repeat indefinitely. In some such embodiments, the fourth-stage injection of hydrogen can be up to a 'base level', on top of which there is a daily cycle of fluctuation, so that the daily recovery cycle is at a sufficiently high pressure to ensure rapid recovery.

Any or all of the times $T_0$, $T_1$, $T_2$, $T_3$ and $T_4$ can be points in time or periods of time, for example, days, weeks or months.

Referring now to FIG. 22, a method is disclosed for storing hydrogen gas in a kerogen-rich geological formation. As illustrated by the flowchart in FIG. 22, the method comprises Steps S101, S102, S103, S104 and S105, which are discussed in the following paragraphs.

Step S101

Step S101 includes injecting a fracturing fluid through a horizontal wellbore into the geological formation to cause fracturing within the geological formation. Arrangements for injecting a fracturing fluid into a geological formation are illustrated schematically in FIG. 23. A geological formation 30, shown in accordance with the description hereinabove of the second stage between Time=$T_0$ and Time=$T_1$, includes an organic-rich shale deposit (also called a shale formation). Hydraulic fracturing equipment 70 is disposed at a wellhead 18. The wellhead 18 is located at a wellpad 19 and is in fluid communication with an unconventional gas reservoir 35 located within the shale formation 30, which in the non-limiting example of FIG. 22 is below the water table 27.

The wellbore 10, including perforated casing, is horizontally-oriented at the depth of the shale formation 30, and can extend horizontally for tens, hundreds or thousands of meters. As indicated by the directional arrow 201, a hydraulic-fracturing fluid 3 is injected into (and through) the wellbore 10 and thence into fractures 32. The injecting is effective to increase pressure at the target depth of the reservoir 35, e.g., based on the depth of the wellbore, to exceed that of the fracture gradient of the rock. At a fracture-initiating pressure known as a 'breakdown pressure', the deep rock surrounding the wellbore 10 cracks with pressure. Once fracturing is initiated, pressure at the wellhead 18 drops and then starts increasing, as the fracturing fluid 3 permeates the rock, further extending the fractures. This occurs at the fracture-extending pressure $FRAC_{EXT}$. Fractures predominantly perpendicular to the wellbore may reach lengths of a few hundred feet long; the height of the fractures 32 is controlled by the stresses in the rock formations above and below the wellbore.

Figure 23:
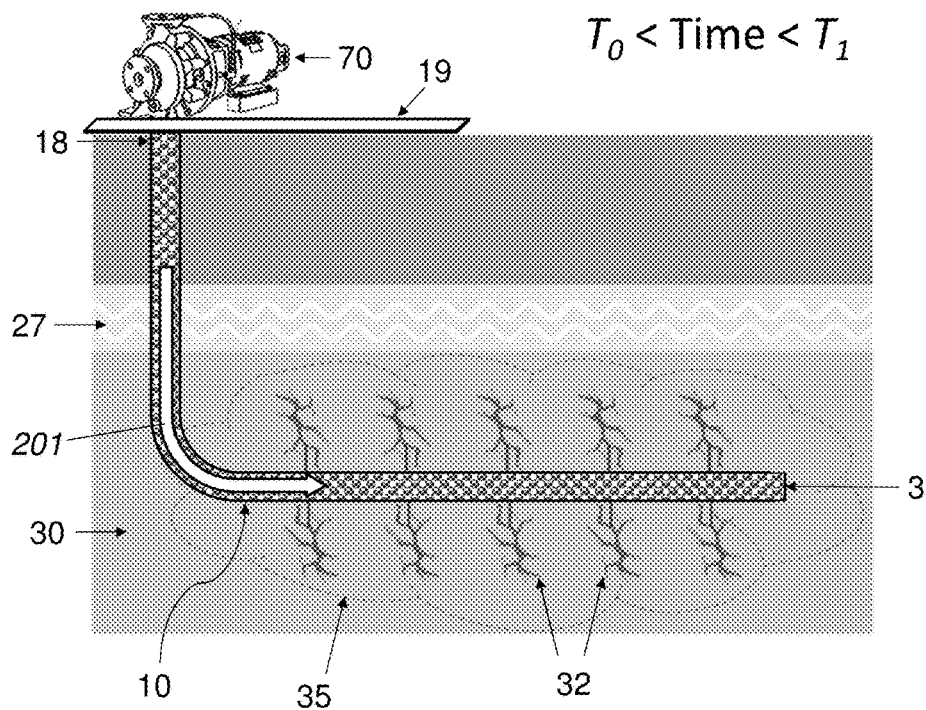
FIG. 23 is a schematic illustration showing injection of a fracturing fluid through a horizontal wellbore into a geological formation, according to embodiments of the present invention.
Figure 24:
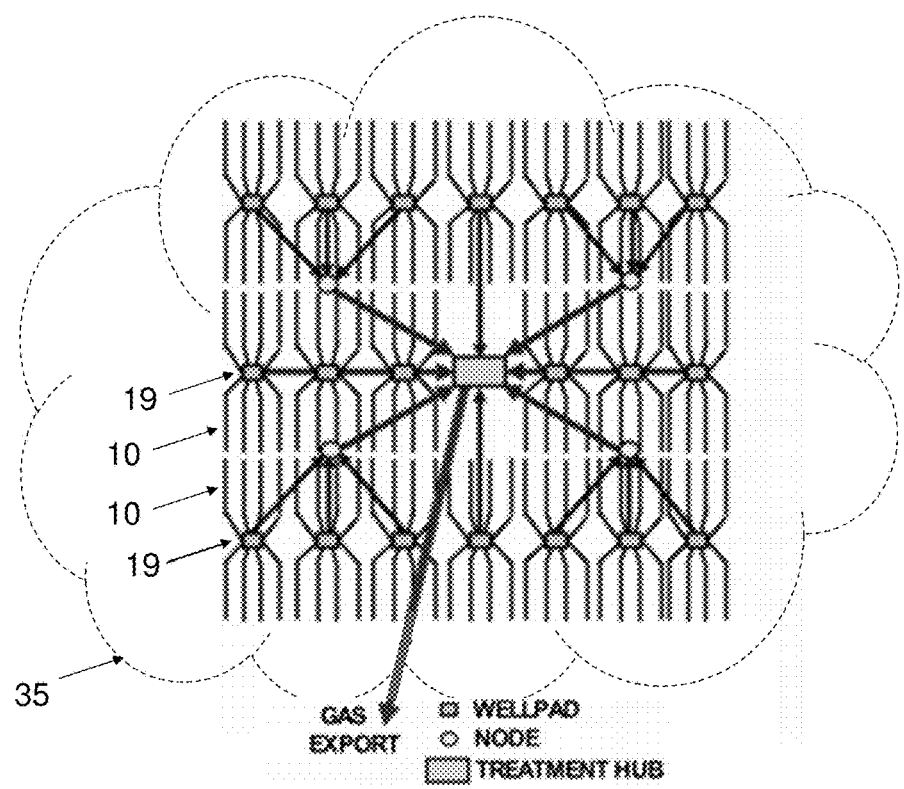
FIG. 24 is a schematic illustration showing multiple wells and multiple wellpads servicing a gas reservoir, according to embodiments of the present invention.

FIG. 23 illustrates only a single well, but a single geological formation 30 or a single unconventional gas reservoir 35 can be serviced by multiple wells, as shown in FIG. 24. FIG. 24 illustrates multiple wells (indicated by wellbores 10) at each wellpad 19, and multiple wellpads 19 servicing the gas reservoir 35. In the non-limiting example of FIG. 24, gas flows through a network of transmission nodes to a central treatment hub that services the multiple wells. The example of FIG. 24 shows 8 wells, i.e., wellbores 10, operating from each wellpad 19. In other examples, not illustrated, there can be any number of wells, such as for example, 16, 32 or 64 wells. Each well comprises a wellhead 18 and a wellbore 10. Pressure and flow measurements may be made using pressure and flow gauges at the wellhead 18 while flowing or during shut-in. Pressure may also be measured downhole using downhole pressure gauges.

Step S102

Figure 25:
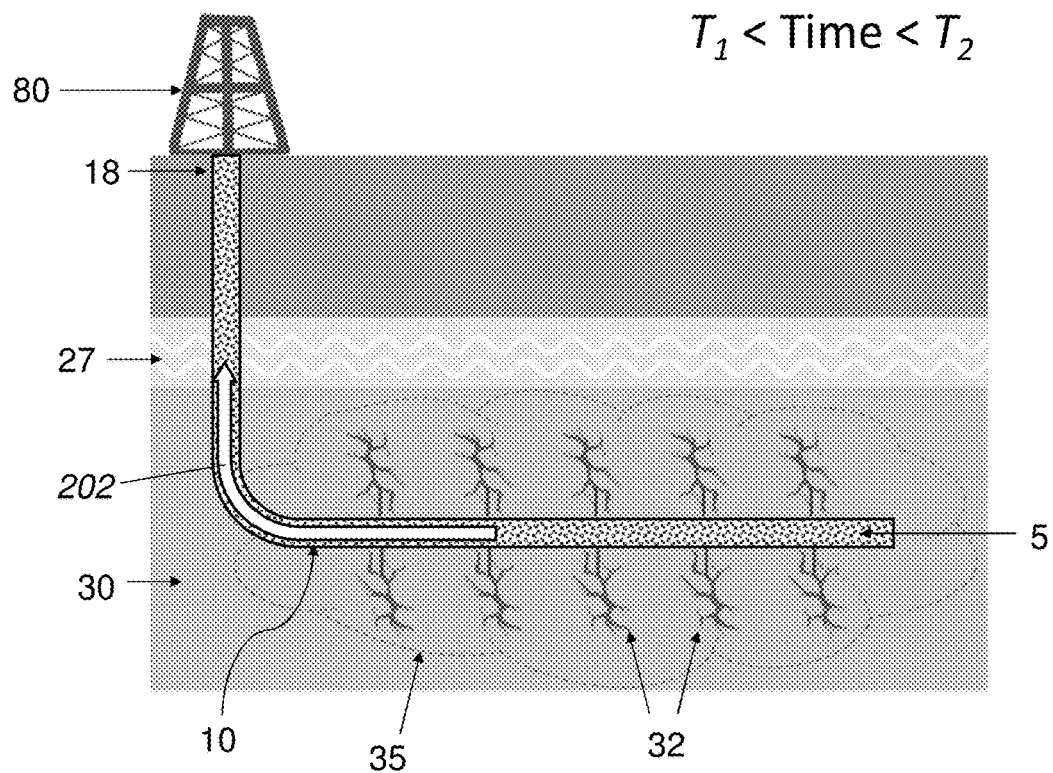
FIG. 25 is a schematic illustration showing recovery of a methane-containing gas from a geological formation through a horizontal wellbore, according to embodiments of the present invention.

Step S102 includes recovering a methane-containing gas through the wellbore. Referring to FIG. 25, gas-recovery activity at the wellhead 18 is illustrated during the third stage of the timeline of FIG. 21, i.e., between Time=$T_1$ and Time=$T_2$. As indicated by directional arrow 202, natural gas 5 is recovered through the wellbore 10 from the reservoir 35, including from the hydraulic fractures 32, and processed by gas recovery equipment 80 which is in fluid communication with the wellbore 10 at the wellhead 18.

Figure 26:
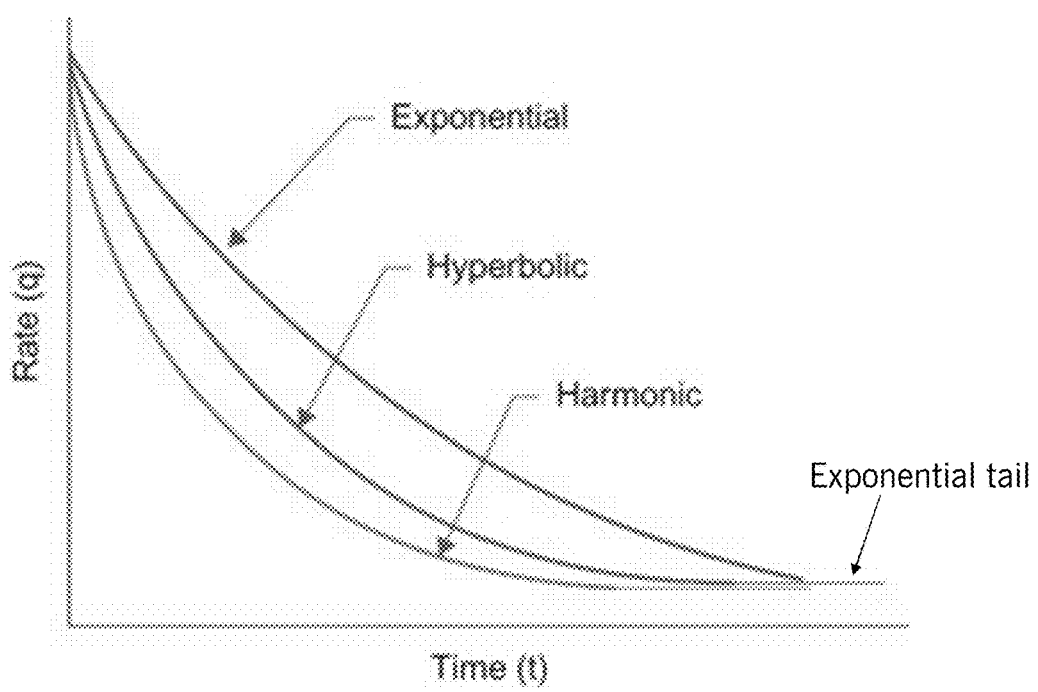
FIG. 26 is a graph schematically showing various gas flow-rate decline or decay curves.

During the third stage of activity, natural gas 5 is produced, i.e., recovered, at a flow rate that reaches, within a relatively short time, e.g., one month or less of post-hydraulic fracturing clean-up, a maximum flow rate $FLOW_{MAX}$, and the flow rate thereafter declines. The flow rate then undergoes a 'short-term decline' that, in various examples, can be fit to a stretched exponential decay curve, a hyperbolic decay curve, or other decay curve, as shown in FIG. 26. The 'short-term decline' can take place, if not interrupted, over a period of 12 to 24 months, or over a period of 12 to 36 months, or over a period of 12 to 48 months, or over a period of 12 to 60 months, or over a period of 24 to 36 months, or over a period of 24 to 48 months, or over a period of 24 to 60 months, or over a period of 36 to 48 months, or over a period of 36 to 60 months, or over a period of 36 to 48 months, or over a period of 36 to 60 months, or over a period of 48 to 60 months, or over a period of more than 60 months. Following the short-term decline according to one of the decline-curve types, 'long-term decline' of gas flow rate continues in a manner that can, in some examples, be fit to an exponential tail of any one of the curves. The 'long-term decline' can take place, if not interrupted, over a period of 10 to 20 years, or over a period of 10 to 30 years, or over a period of 20 to 30 years, or longer. The stages of decline are explained, inter alia, by the structure and makeup of the hydraulically-fractured well and the various mechanisms by which natural gas is released from low-permeability shale formations.

According to Step S102, the gas recovery is characterized by a maximum flow rate $FLOW_{MAX}$. The output process of gas flow can be described by a combination of mechanisms acting at different scales. In an initial period of gas recovery, the flow rate reaches maximum flow rate $FLOW_{MAX}$ and proceeds through the period of 'short-term decline'. The first mechanism is a flow of free (non-adsorbed and non-dissolved) gas molecules from pores and cracks in the shale formation. After equilibrium is disturbed, for example, by the hydraulic fracturing, the free gas molecules start flowing toward lower pressure, and are recovered through the wellbore. This flow is called viscous flow, or 'Darcy flow', because the flow through the porous medium follows Darcy's Law which states that flow of a gas through a porous medium has a linear relationship with both permeability and pressure differential, or, for a given permeability, flow is proportional to pressure differential.

Figure 27A:
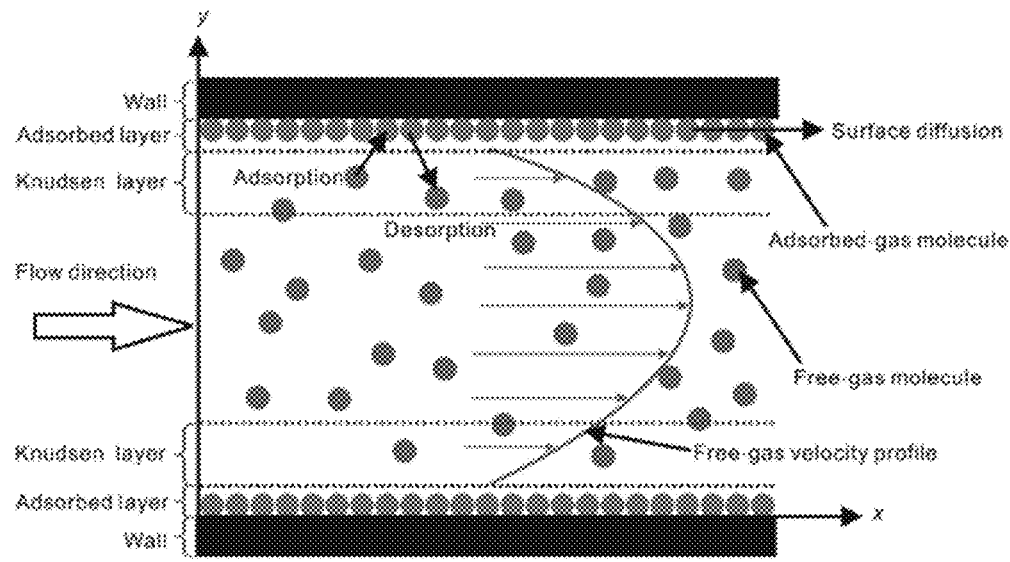
FIG. 27A is a schematic cross-sectional illustration of a kerogen-containing meso-micropore in a kerogen-containing matrix.
Figure 27B:
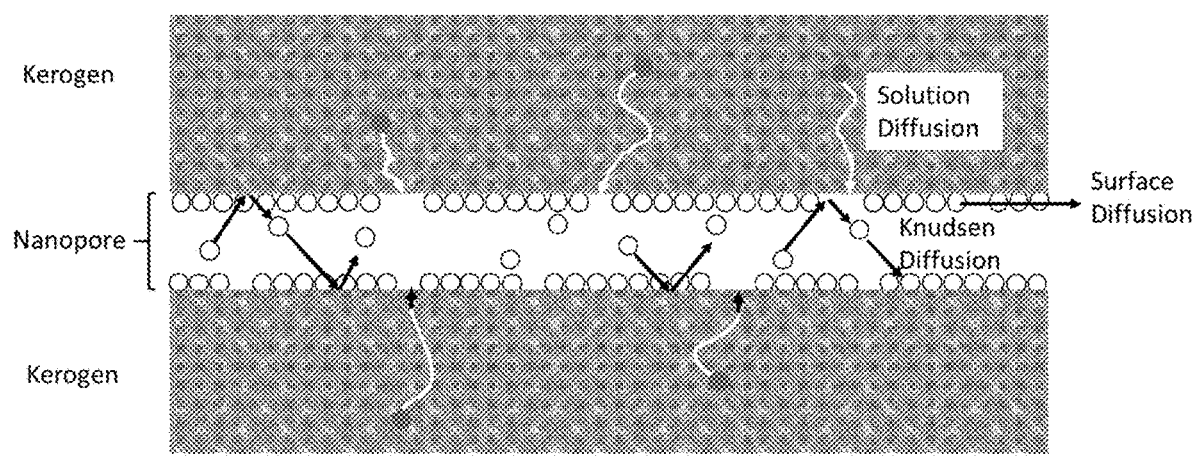
FIG. 27B is a schematic cross-sectional illustration of a nanopore in a kerogen-containing matrix.

We refer now to FIG. 27A, a schematic representation, in cross section, of a relatively large pore, e.g., a meso-micropore, in the unconventional gas reservoir. The Darcy flow regime is represented in the figure by the free-gas velocity profile. Additional gas flow (and recovery) during the 'short-term decline' period occurs by desorption of methane from kerogen and clay surfaces, and subsequent flow of the gas molecules under a pressure gradient. Areas of surface diffusion and absorption/desorption are marked in FIG. 27A. The longer, residual period of 'long-term decline' is characterized by gas recovered substantially by diffusion, e.g., Knudsen diffusion, and slip flow in smaller pores, e.g., nanopores. The phrase 'substantially Knudsen diffusion' means that at least 50% of the gas recovered is from Knudsen diffusion, or at least 60%, or at least 70%, or at least 80%, or at least 90%, or at least 95%. FIG. 27B illustrates Knudsen diffusion in a nanopore, where the mean pore diameter is smaller than the mean free path of the gas particles. FIG. 27B also illustrates the diffusion of solubilized methane through the pore due to concentration gradient. Knudsen-diffusion, and, to a lesser extent, other diffusion processes, becoming a predominant factor in the flow of recovered gas can be, according to embodiments, associated with a trigger criterion at Time=$T_2$ for beginning injection of hydrogen into the partially-depleted reservoir for long-term and/or short-term storage. In such embodiments, a trigger criterion can be selected as an indicator of the reservoir entering the long-term decline phase associated with gas flow dominated by diffusion processes.

Like the flow rate, the wellhead pressure is at its maximum at or near, e.g., shortly after, the beginning of production, and declines together with the flow rate, for example, exponentially or hyperbolically. In a field example, maximum flowing wellhead pressure $PRESSURE_{MAX}$ is 6,500 PSI (pounds per square inch) at the early production peak, but the flowing wellhead pressure declines to 2,175 psi after one year, and 725 psi after 1.5 years.

Step S103

Figure 28:
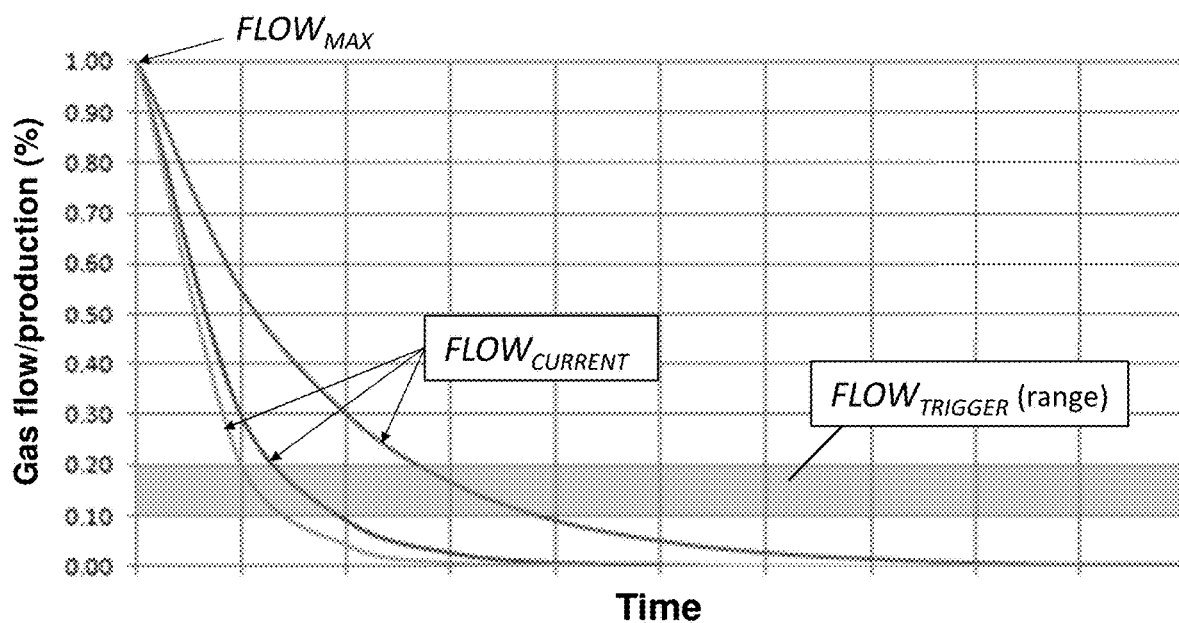
FIG. 28 is a graph schematically showing the relationship between a flow-rate trigger criterion and a variety of exponential flow-rate decay curves, according to embodiments of the present invention.

Step S103 includes monitoring a current flow rate $FLOW_{CURRENT}$ of the recovered methane-containing gas 5 over time, and takes place during the third stage (of the timeline of FIG. 21), e.g., alongside Step S102. FIG. 28 shows exponential decay curves for exemplary unconventional gas wells, e.g., wells producing natural gas from the reservoir 35 of FIG. 25. The y-axis of the graph represents current production, $FLOW_{CURRENT}$, as a percentage of the maximum gas recovery rate of $FLOW_{MAX}$. $FLOW_{CURRENT}$ is shown by each of the decay curves as a function of time, where time is represented schematically by the x-axis without units or scale. According to the method, the monitoring is, inter alia, for detecting that $FLOW_{CURRENT}$ becomes equal to or less than a flow-rate trigger criterion $FLOW_{TRIGGER}$. In embodiments, $FLOW_{TRIGGER}$ is set as being equal to at least 10% of $FLOW_{MAX}$ and not more than 15% of $FLOW_{MAX}$. In some embodiments, $FLOW_{TRIGGER}$ is set as being equal to at least 10% of $FLOW_{MAX}$ and not more than 20% or $FLOW_{MAX}$. In other embodiments, $FLOW_{TRIGGER}$ is set as being equal to at least 15% of $FLOW_{MAX}$ and not more than 20% of $FLOW_{MAX}$.

The monitoring can include direct flow measurements, and/or can include calculations based on measurements. The measurements, and calculations based on measurements, can include, for example and not exhaustively: measuring instantaneous flow rate and/or cumulative production over a period of time such as an hour, a day, or a shorter period or a longer period—monitoring the actual gas production rate is straightforward and is regularly accomplished in the industry with high precision; determining the composition of the gas being recovered; determining an isotope ratio such as a $^{12}C/^{13}C$ ratio of the methane recovered; and/or determining a fluid-flow regime in the reservoir, e.g., a dominant fluid-flow regime, such as viscous flow, desorption, surface diffusion, Knudsen diffusion, or dissolution, wherein the determining the fluid-flow regime can include determining that the dominant flow regime is Knudsen diffusion. Determining that the dominant flow regime is Knudsen diffusion can be on the basis of an isotope ratio such as a $^{12}C/^{13}C$ ratio. In an example, $^{12}C/^{13}C$ ratio can be tracked to calculate the prevalence of adsorbed methane (after pore space methane is substantially used up, i.e., recovered) and the subsequent depletion of adsorbed methane from the reservoir. As the adsorbed methane is desorbed, at first the isotopically lighter $^{12}C$ methane is released; after $^{12}C$ methane is substantially depleted, the isotopically heavier $^{13}C$ is preferentially desorbed, which is detectable by tracking the isotope ratio. In another example, the determining the fluid-flow regime can include determining that the dominant flow regime is desorption, e.g., at a point where kerogen has desorbed at least half the methane adsorption sites.

In some embodiments, a $FLOW_{TRIGGER}$ flow-rate trigger criterion is selected on an ad hoc basis. In an embodiment, $FLOW_{TRIGGER}$ is selected ad hoc on the basis of at least one measurement or at least one calculation based on a measurement. In a first use-case example, $FLOW_{TRIGGER}$ is reset ad hoc based at least in part on a change in flow rate, a change in a rate of change of flow rate, a change in a rate of change of an isotope ratio or a change in any other relevant parameter. According to the first use-case example, a tentative $FLOW_{TRIGGER}$ value of 10% of $FLOW_{MAX}$ had been selected and subsequently reset to 11% based on the monitoring. In a second use-case example, $FLOW_{TRIGGER}$ is selected ad hoc because it had not been previously set, and it is set on the basis of the actual decay curve derived from the monitoring data.

In some embodiments, a $FLOW_{TRIGGER}$ flow-rate trigger criterion is pre-selected, e.g., when selecting the reservoir in the first stage (Time<$T_0$), or when initiating gas recovery (at Time=$T_1$) or after production reaches maximum flow rate $FLOW_{MAX}$ and begins the exponential decline. In a third use-case example, the flow-rate trigger criterion is selected on the basis of the kerogen concentration in the geological formation and/or based on a permeability parameter of the geological formation. According to the non-limiting example. the kerogen concentration and permeability parameters are used to model, e.g., predict, a flow velocity for the Darcy flow during the 'short-term decline' represented by an exponential decay curve. In some embodiments, the selection of the reservoir includes selecting the reservoir on the basis of kerogen concentration in the geological formation. For the purposes of the present disclosure, the term 'kerogen-rich' refers to a kerogen concentration of at least 1% organic content by volume, or at least 2%, or at least 3%, or at least 4%, or at least 5%. Kerogen concentration may be determined on cuttings or core material using the area under the S2 peak of a Rock-Eval analysis, or, in well logging, from the difference between the neutron and density porosities after accounting for the kerogen density and hydrogen index (HI) of clays, or using a pulsed-neutron spectroscopy logging tool. Kerogen concentration may also be determined from an equation based on total organic carbon (TOC). The adsorption on kerogen may be determined by integration of petrophysical analysis from lab and well logging data with $N_2$, $CH_4$, and $H_2$ adsorption isotherms.

Step S104

Figure 29:
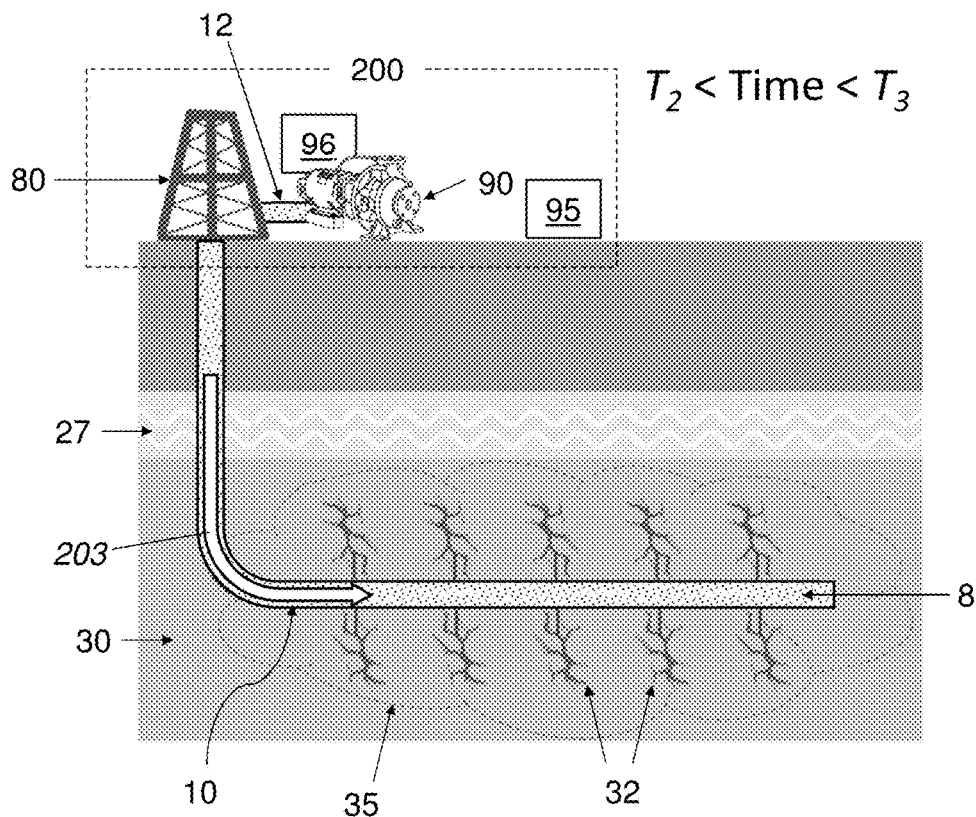
FIG. 29 is a schematic illustration showing injection of hydrogen gas through a horizontal wellbore into a geological formation, according to embodiments of the present invention.

Step S104 includes injecting a hydrogen gas 8 through the wellbore 10 into the geological formation 30, during the fourth stage of the timeline, between Time=$T_2$ and Time=$T_3$. As shown in the example of FIG. 29, where injection of the hydrogen 8 is represented schematically by the directional arrow 203, hydrogen-gas-pumping arrangements 90 are provided in fluid communication with the reservoir 35 via wellbore 10. In embodiments, the reservoir 35 and wellbore 10 are the same reservoir 35 and wellbore 10 as in FIGS. 23 and 25.

The skilled artisan will understand that the transition from the third stage of recovering methane to the fourth stage of injecting hydrogen at Time=$T_2$ can involve one or more preparatory steps performed between Steps S103 and S104 of the method. For example, it can be desirable to close valves at the surface to cause pressure in the reservoir 35 to reach an equilibrium pressure. This can include closing the valves at the surface to end gas recovery upon detecting the $FLOW_{TRIGGER}$ flow-rate trigger criterion, and allowing time for the wellhead pressure to increase from a flowing wellhead pressure to a shut-in wellhead pressure. Over a period of weeks the shut-in wellhead pressure rises to an equilibrium pressure that is approximately equal to reservoir pressure.

The injection of the hydrogen gas 8, e.g., pure $H_2$, or a hydrogen-containing gas that includes at least 99% $H_2$ or at least 98% $H_2$, or at least 97% $H_2$, or at least 96% $H_2$, or at least 95% $H_2$, is at a pressure higher than the current gas pressure at the wellhead 18, e.g., the shut-in wellhead pressure at a stabilized reservoir-equilibrium pressure, so as to ensure that the hydrogen gas 8 propagates throughout the well, i.e., including the hydraulic fractures 32 and natural cracks. In some embodiments, the injection of hydrogen gas is at a pressure that is at least 100 PSI higher than the current shut-in gas pressure at the wellbore 10 or at least 200 PSI higher, or at least 300 PSI higher, or at least 400 PSI higher, or at least 500 psi higher, or at least 800 PSI higher. In embodiments, the initial injecting of the hydrogen gas 8 is at a pressure below the maximum gas-recovery pressure $PRESSURE_{MAX}$, or 50 or more PSI lower than $PRESSURE_{MAX}$ or 100 or more PSI lower than $PRESSURE_{MAX}$ or 200 or more PSI lower than $PRESSURE_{MAX}$. In embodiments, the initial injecting of the hydrogen gas 8 is at a pressure below a hydrogen fracture extension pressure $H_2FRAC_{EXT}$ at which the injection of the hydrogen gas 8 would cause extension of the existing fractures, including those propagated during the hydraulic fracturing of Step S101. The hydrogen fracture extension pressure $H_2FRAC_{EXT}$ is different than the $FRAC_{EXT}$ with fracturing fluid discussed in Step S101 because of the weight of the hydraulic column and the fluid friction. In some embodiments, $H_2FRAC_{EXT}$ can be computed from $FRAC_{EXT}$, e.g., to act as a pressure limit during hydrogen injection. In other embodiments, $H_2FRAC_{EXT}$ can be measured using a diagnostic fracture injection test (DFIT), or it can be measured by microseismic monitoring.

The injection of the hydrogen gas of Step 04 is initiated responsively to—and contingent upon—a determination, based on the monitoring or Step S103, that the monitored $FLOW_{CURRENT}$ is equal to or less than the flow-rate trigger criterion $FLOW_{TRIGGER}$. The relationship between the declining $FLOW_{CURRENT}$ and a range of values for $FLOW_{TRIGGER}$ is illustrated in the graph of FIG. 28. $FLOW_{CURRENT}$ declines, for example, according to any one of the various exemplary exponential-decline curves of FIG. 28, until it reaches the flow-rate trigger criterion $FLOW_{TRIGGER}$. FIG. 28 shows a range of possible selected values of $FLOW_{TRIGGER}$ from 10% to 20%, and other ranges are possible. In some embodiments, the flow-rate trigger criterion $FLOW_{TRIGGER}$ is a single value, i.e., of the percentage of $FLOW_{MAX}$, and in other embodiments $FLOW_{TRIGGER}$ is a range of values that are suitable for triggering the injection of hydrogen 8 into the partially-depleted reservoir 35.

In embodiments, the injection of hydrogen gas 8 is at a pressure that is not higher than the hydrogen-injection fracture extension pressure $H_2FRAC_{EXT}$. Inter alia, this limitation is useful for avoiding, at least partly, damage outside the wellbore 10 and the extension and broadening of the existing hydraulic fractures 32, for example to prevent the release of additional free methane in and from the newly expanded fractures which affects the hydrogen purity during hydrogen production, and to prevent hydrogen loss to the formation. In some embodiments, the injecting of the hydrogen gas 8 is at a pressure that is at least 200 PSI or at least 500 PSI less than $H_2FRAC_{EXT}$. In some embodiments, the initial injecting of the hydrogen gas 8 is at a pressure just below $H_2FRAC_{EXT}$. In an example, the injecting of the hydrogen gas includes injecting the hydrogen gas at a pressure that is 100 PSI less than $H_2FRAC_{EXT}$. In some embodiments, surface geophysical monitoring, i.e., geophysical monitoring of the geological structure from the surface, is performed during hydrogen injection to determine whether or not hydraulic fractures 32 are being extended by the hydrogen injection. According to non-limiting examples, surface geophysical monitoring can include the use of surface geophysical monitoring equipment 95 such as microseismic arrays or tiltmeters. Gas phase tracers may also be added to the injected hydrogen 8 to see whether there is any communication of the hydrogen with adjacent production wells on the wellhead. Suitable gas phase tracers are tritiated hydrogen such as HT or $T_2$ in the range of 3 to 30×10^10 Becquerel (Bq) that may be detected at extremely low concentrations in nearby production wells. According to a non-limiting example, a tracer-gas facility 96 for adding a gas-phase tracer to the injected hydrogen gas 8 is provided at or near the wellhead 10.

Step S105

Figure 30:
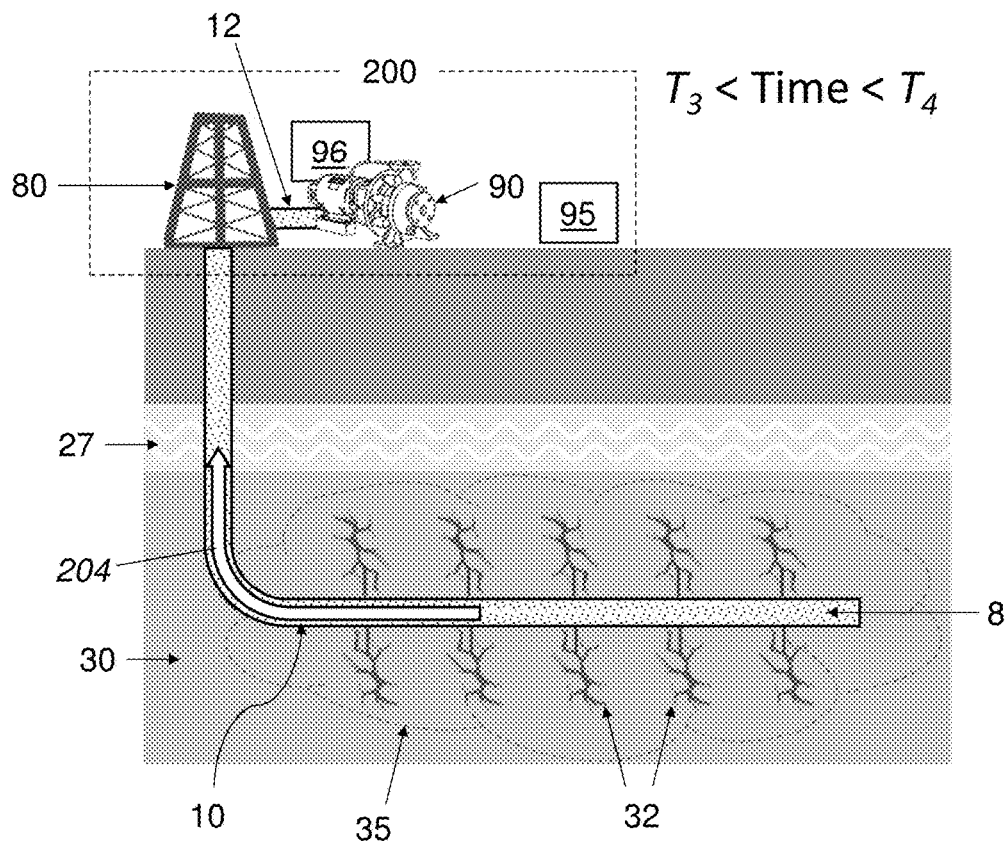
FIG. 30 is a schematic illustration showing recovery of a hydrogen-containing gas from a geological formation through a horizontal wellbore, according to embodiments of the present invention.

Step S105 includes recovering stored hydrogen gas 8 through the wellbore 10, during the fifth stage of the timeline, between Time=$T_3$ and Time=$T_4$. As shown in the example of FIG. 30, where recovery of the hydrogen-containing gas 8 is represented schematically by the directional arrow 204, hydrogen-gas-recovery equipment 80 is provided in fluid communication with the reservoir 35 via wellbore 10. In embodiments, the reservoir 35 and wellbore 10 are the same reservoir 35 and wellbore 10 as in FIGS. 23, 25 and 29. The recovered hydrogen-containing gas 8 can include, as illustrated schematically in FIG. 31, bulk-phase $H_2$ in hydraulic fractures, $H_2$ in kerogen pore spaces, $H_2$ adsorbed on kerogen surfaces, $H_2$ dissolved in kerogen, and/or bulk-phase $H_2$ contained in the non-organic pores or adsorbed on clays of the matrix of the geological formation 30.

According to the method, the recovered hydrogen-containing gas 8 has an $H_2$ molar fraction of at least 85%. The $H_2$ molar fraction of the recovered gas can be directly impacted by the selection of the reservoir in the first stage, e.g., selection of a kerogen-rich reservoir, and/or selection of a kerogen-rich reservoir with low permeability, as the terms have been defined herein. The $H_2$ molar fraction of the recovered gas can be directly impacted by the selection of a flow-rate trigger criterion $FLOW_{TRIGGER}$ with respect to the current flow rate $FLOW_{CURRENT}$ of natural gas for initiating the injection of hydrogen gas into the reservoir to begin the fourth stage. In embodiments, $FLOW_{TRIGGER}$ is chosen to correspond to a state of the reservoir in which pore methane and kerogen-adsorbed methane is largely already recovered, such that the hydrogen gas replaces the methane in the faster-recovery locations of the shale formation. The proper selection of a $FLOW_{TRIGGER}$ in terms of the timing of the initiating can lead to avoiding significant contamination of the $H_2$ by $CH_4$ in the pore spaces or desorbed from kerogen surfaces, and thus the recovered hydrogen can be of higher purity, where purity refers to the $H_2$ molar fraction of the recovered gas. In various examples, the purity is at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%. In embodiments, the remainder of the gas, i.e., after subtracting the $H_2$ molar fraction, is at least predominantly $CH_4$.

In some embodiments, not all the steps S101, S102, S103, S104, S105 of the method are performed.

Figure 31:
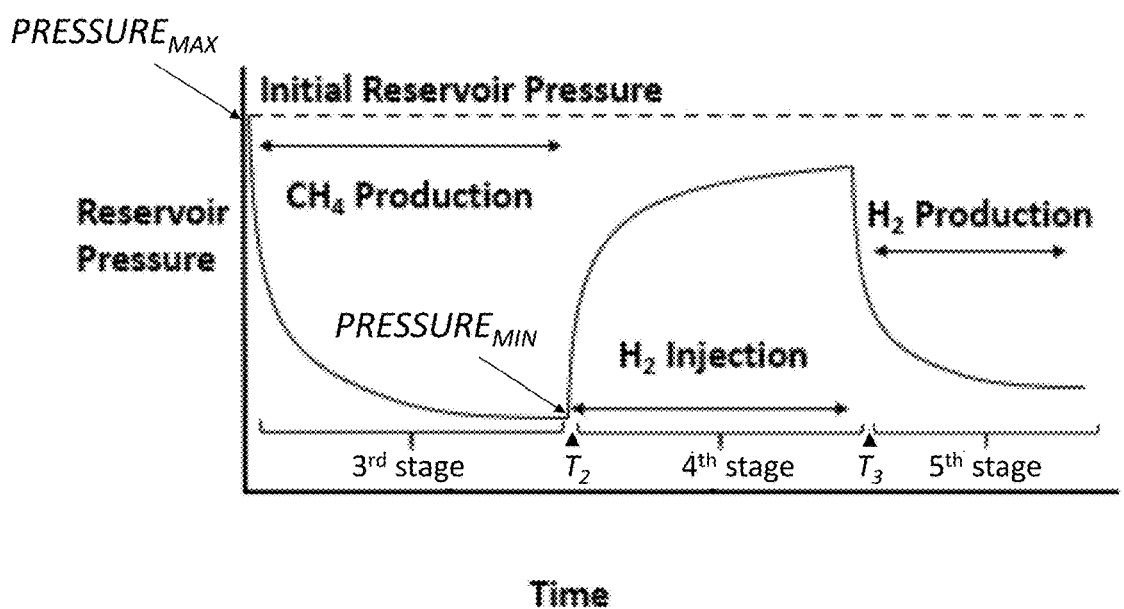
FIG. 31 is a graph schematically illustrating various phases of gas recovery and storage, according to embodiments of the present invention.

We now refer to FIG. 31. The chart in FIG. 31 schematically illustrates changes in gas pressure in the hydraulically fractured reservoir 35 over time, specifically during the third, fourth and fifth stages as described hereinabove, corresponding to Steps S102, S104 and S105, respectively, of the foregoing method. As seen in the portion of the chart related to the third stage and before Time=$T_2$, reservoir pressure peaks quickly at the maximum pressure $PRESSURE_{MAX}$ and declines, e.g., exponentially, or in some examples hyperbolically, to the minimum pressure $PRESSURE_{MIN}$ at Time=$T_2$. In other words, the minimum pressure $PRESSURE_{MIN}$ of FIG. 31 occurs at the same time as the flow-rate trigger criterion $FLOW_{TRIGGER}$ of FIG. 28. Once $H_2$ injection (fourth stage) is initiated at Time=$T_2$, reservoir pressure rises until the reservoir pressure approaches $PRESSURE_{MAX}$, e.g., within 100 PSI of $PRESSURE_{MAX}$, or within 50 PSI of $PRESSURE_{MAX}$, at Time=$T_3$. After Time=$T_3$, recovery of hydrogen can commence (fifth stage), and again the pressure falls exponentially, or in some examples, hyperbolically. In some embodiments, the $H_2$ injection of the fourth stage, e.g., of Step S104, proceeds more rapidly than the gas-recovery phase of the third stage, e.g., of Step S102, such that the fourth stage lasts one-half or one-third or some other fraction (<1) of the time of the third stage. In some embodiments, the $H_2$ recovery of the fifth stage, e.g., of Step S105, can proceed more rapidly than the gas-recovery phase of the third stage, e.g., of Step S102, such that the fifth stage lasts one-half or one-third or some other fraction (<1) of the length of time of the third stage. Thus, the decline in pressure in the $H_2$-recovery phase of the fifth stage is faster, e.g., twice as fast or three times as fast, than in the natural-gas-recovery phase of the third stage, because of the lower viscosity and higher diffusivity of $H_2$ gas compared to $CH_4$ gas.

Referring again to FIGS. 29 and 30, a system 200 for storing and subsequently recovering a hydrogen-containing gas 8 comprises pumping arrangements 80 for the hydrogen-containing gas 8. The pumping arrangements 80 are in fluid communication with the wellbore 10 and are configured to inject hydrogen gas 8 therethrough into the hydraulically-fractured reservoir 35. In some embodiments, kerogen concentration in the reservoir is at least 1% by volume, or at least 2%, or at least 3%. The pumping arrangements 80 include pumps and compressors, piping (e.g., piping 12), power equipment, and other equipment as necessary for injecting the hydrogen gas 8. The pumping arrangements 80 are configured to inject the hydrogen 8 at a pressure higher than a current shut-in gas pressure at the wellbore. According to embodiments, the reservoir 35 is partially depleted by a methane-containing-gas recovery process.

Figures 32, 33:
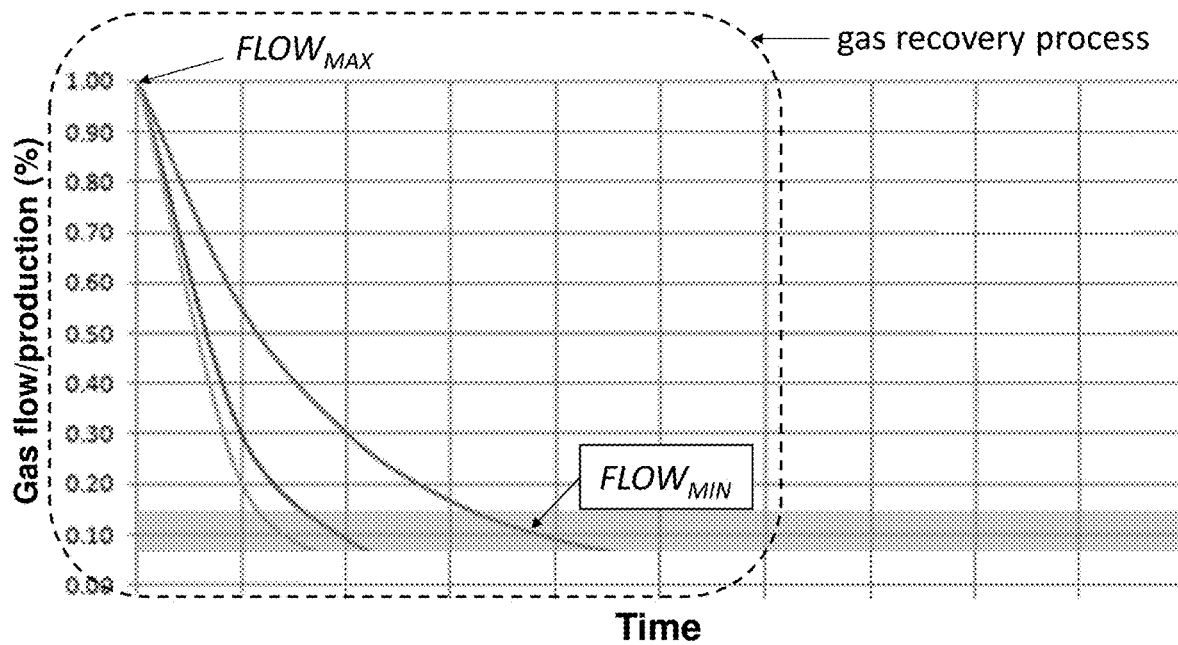

The gas-recovery process of the reservoir 35 is characterized, as illustrated schematically in FIG. 32, by a stretched exponential, or in some embodiments, hyperbolic, decline in gas recovery rate from a peak flow rate of $FLOW_{MAX}$ to a minimum flow rate of $FLOW_{MIN}$ which at least 10% of $FLOW_{MAX}$ and not more than 15% of $FLOW_{MAX}$. In embodiments, $FLOW_{MIN}$ is at least 10% of $FLOW_{MAX}$ and not more than 20% of $FLOW_{MAX}$. In other embodiments, $FLOW_{MIN}$ is at least 15% of $FLOW_{MAX}$ and not more than 20% of $FLOW_{MAX}$. In some embodiments, the fluid flow regime of the reservoir is substantially diffusional. The phrase 'substantially diffusional' means that at least 50% of the gas recovered at the end of the gas recovery process was from diffusion. or at least 60%, or at least 70%, or at least 80%, or at least 90%, or at least 95%. In various examples, the diffusion includes Knudsen, surface and/or solution diffusion.

The system 200 additionally comprises gas-recovery equipment 80, also in fluid communication with the reservoir 35 though the wellbore 10. The gas-recovery equipment 80 is operative to recover a portion of the stored hydrogen-containing gas 8 through the wellbore 10. The system is operable such that the recovered portion of the hydrogen-containing gas 8 has an $H_2$ molar fraction of at least 85%. In various examples, the $H_2$ molar fraction is at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%. In embodiments, the remainder of the gas, i.e., after subtracting the $H_2$ molar fraction, is at least predominantly $CH_4$.

In some embodiments, the pumping arrangements 80 are operative to inject the hydrogen-containing gas 8 at a pressure that is at least 500 PSI higher than the current shut-in gas pressure at the wellbore 10. In some embodiments, the pumping arrangements 90 are operative to inject the hydrogen-containing gas 8 at a pressure that is no more than 100 PSI less than a maximum wellhead pressure of the gas-recovery process of the reservoir 35, $PRESSURE_{MAX}$. In some embodiments, the pumping arrangements 90 are operative to inject the hydrogen-containing gas 8 at a pressure that is no more than 50 PSI less than $PRESSURE_{MAX}$.

In some embodiments, the system 200 additionally includes surface geophysical-monitoring equipment for determining whether hydraulic fractures, e.g., one or more hydraulic fractures, are being extended by the hydrogen injection. Suitable examples of surface geophysical-monitoring equipment include microseismic arrays and tiltmeters.

Referring now to FIG. 33, a method is disclosed for storing and subsequently recovering a hydrogen gas. As illustrated by the flowchart in FIG. 33, the method comprises Steps S111 and S112, which are discussed in the following paragraphs. A suitable system for use in performing the method is the system 200 described above in connection with FIGS. 29 and 30.

Step S111

Step S111 includes injecting hydrogen gas 8 through a horizontal wellbore 10 into a hydraulically-fractured, kerogen-rich, and partially-depleted reservoir of a methane-containing gas 3, at a pressure higher than a current shut-in gas pressure at the wellhead 10. For the purposes of the present disclosure, the term 'kerogen-rich' refers to a kerogen concentration of at least 1% organic content by volume, or at least 2%, or at least 3% The partial depletion of the partially-depleted reservoir is by a methane-containing-gas recovery process that is characterized, e.g., as illustrated in FIG. 33, by a maximum flow rate of $FLOW_{MAX}$, and a minimum flow rate of $FLOW_{MIN}$ that is at least 10% of $FLOW_{MAX}$ and not more than 15% of $FLOW_{MAX}$. In embodiments, $FLOW_{MIN}$ is at least 10% of $FLOW_{MAX}$ and not more than 20% of $FLOW_{MAX}$. In other embodiments, $FLOW_{MIN}$ is at least 15% of $FLOW_{MAX}$ and not more than 20% of $FLOW_{MAX}$.

In some embodiments, the methane-containing-gas recovery process is additionally characterized by a maximum wellhead pressure of $PRESSURE_{MAX}$, and the injecting of the hydrogen gas 8 of Step S111 includes injecting the hydrogen gas 8 at a pressure that is 100 or more PSI less than $PRESSURE_{MAX}$, i.e., at most ($PRESSURE_{MAX}$–100 PSI). In embodiments, the injecting of the hydrogen gas 8 includes injecting the hydrogen gas 8 at a pressure that is at least 500 PSI higher than the current shut-in gas pressure at the wellhead 10.

In some embodiments, the injecting of the hydrogen gas 8 is at a pressure that is at least 200 PSI or at least 500 PSI less than the hydrogen fracture extension pressure $H_2FRAC_{EXT}$. In some embodiments, the initial injecting of the hydrogen gas 8 is at a pressure just below the hydrogen fracture extension pressure $H_2FRAC_{EXT}$. In some embodiments, surface geophysical monitoring, i.e., geophysical monitoring of the geological structure 30 from the surface, is performed during hydrogen injection to determine whether or not hydraulic fractures 32 are being extended by the hydrogen injection. According to non-limiting examples, surface geophysical monitoring can include the use of surface geophysical monitoring equipment 95 such as microseismic arrays or tiltmeters. According to a non-limiting example, a tracer-gas facility 96 for adding a gas-phase tracer to the injected hydrogen gas 8 is provided at or near the wellhead 10.

Step S112

Step S112 includes recovering a portion of the stored hydrogen gas 8 through the wellbore 10. The recovered hydrogen gas is mostly pure hydrogen, i.e., has an $H_2$ molar fraction of at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%. The remainder of the recovered gas mix can include methane and other hydrocarbon gases such as ethane and propane, and non-hydrocarbon gases such as carbon dioxide and nitrogen.

Referring now to FIG. 34, a method is disclosed for storing and subsequently recovering a hydrogen gas. As illustrated by the flowchart in FIG. 34, the method comprises Steps S121, S111 and S112. Steps S111 and S112 have been discussed hereinabove, and Step S121 is discussed in the following paragraph. A suitable system for use in performing the method is the system 200 described above in connection with FIGS. 29 and 30.

Step S121

Step S121 includes selecting the unconventional gas reservoir 35 based on a kerogen concentration in the reservoir 35. Examples of suitable kerogen concentration levels include at least 1% organic content by volume, or at least 2%, or at least 3%.

Referring now to FIG. 35, a method is disclosed for storing and subsequently recovering a hydrogen gas. As illustrated by the flowchart in FIG. 35, the method comprises Steps S131, S111 and S112. Steps S111 and S112 have been discussed hereinabove, and Step S131 is discussed in the following paragraph. A suitable system for use in performing the method is the system 200 described above in connection with FIGS. 29 and 30.

Step S131

Step S131 includes selecting the unconventional gas reservoir 35 based on a fluid-flow regime of the reservoir 35. An example of a suitable fluid-flow regime is a substantially Knudsen-diffusion fluid-flow regime. The phrase 'substantially diffusional' means that at least 50% of the gas recovered at the end of the gas recovery process was from diffusion. or at least 60%, or at least 70%, or at least 80%, or at least 90%, or at least 95%. In various examples, the diffusion includes Knudsen, surface and/or solution diffusion.

According to still further embodiments of the invention, an unconventional gas reservoir can be suitable for long-term and/or short-term storage of hydrogen gas after partial depletion of the natural gas. The timeline of FIG. 36 shows a sequence of stages associated with the use of a partially-depleted unconventional gas reservoir for storage and recovery of hydrogen in accordance with embodiments. In a first stage, before Time=$T_0$, a suitable gas-containing reservoir is selected, e.g., based on one or more technical and/or economic selection criteria, and a deep horizontal wellbore is established in the reservoir. Non-limiting examples of technical selection criteria include, and not exhaustively: low permeability, e.g., permeability lower than $10^{-1}$ millidarcy (mD), lower than $10^{-2}$ mD, lower than $10^{-3}$ mD, or lower than $10^{-4}$ mD; proportion of solid organic matter (i.e., kerogen), e.g., at least 1% kerogen, at least 2% kerogen, or at least 3% kerogen; and distribution of pore volumes in the kerogen.

In a second stage, between Time=$T_0$ and Time=$T_1$, the reservoir is hydraulically fractured. The deep horizontal wellbore is perforated for hydraulic fracturing, e.g., by a perforating gun. A fracturing fluid is injected under pressure through a horizontal wellbore into the geological formation to cause the fracturing by propagation and expansion of cracks in the rock structure. The hydraulic fracturing process is used to facilitate and/or accelerate the recovery of gas from the reservoir by opening up cracks in the deep shale formations. As is known in the art, successive sections of the reservoir along the wellbore are fractured sequentially and not simultaneously. An example of a suitable fracturing fluid is a mixture of water, a proppant such as sand or a ceramic, and/or a chemical or polymer to improve a flow characteristic such as the water's surface friction and/or to act as a lubricant. In other examples, a suitable fracturing fluid can include an energized fluid, e.g., a fluid including at least one compressed or compressible gas-phase material, or an oil-based fluid.

In a third stage, between Time=$T_1$ and Time=$T_2$, natural gas is recovered from the hydraulically-fractured reservoir. The gas recovery process over time is characterized by one or more isotope ratios that change over time, as will be further described hereinbelow.

In a fourth stage, between Time=$T_2$ and Time=$T_3$, hydrogen gas is injected into the reservoir. In embodiments, the transition from the third stage to the fourth stage, at Time=$T_2$, is based on a trigger criterion. The trigger criterion can include a trigger criterion that corresponds to a change in an isotope ratio matching an isotope-signature trigger criterion. An example of an isotopic-signature trigger criterion suitable for triggering a transition of operation of an unconventional gas reservoir to injecting compressed hydrogen for long- and/or short-term storage is a $\delta\delta(^{13}C)$ isotopic signature based on a ratio of $^{13}C$ to $^{12}C$ (or vice versa). In a first exemplary implementation, the $\delta(^{13}C)$ isotopic signature of a specific hydrocarbon in the gas recovered from the reservoir, such as methane, ethane, propane, butane, or pentane is monitored with respect to the isotopic-signature trigger criterion. In a second exemplary implementation, the $\delta(^{13}C)$ isotopic signature of a mix of one or more, or all, hydrocarbons in the gas recovered from the reservoir is monitored with respect to the isotopic-signature trigger criterion.

Another example of a suitable isotopic-signature trigger criterion for triggering a transition to hydrogen injection includes a $\delta(C_XH_{Y-1}D/C_XH_Y)$ isotopic signature, which represents a ratio of deuterated hydrocarbon molecules to non-deuterated molecules where X and Y are the number of carbon and hydrogen atoms, respectfully. This expression (and similar expressions throughout the present disclosure), which include a single deuteron in the numerator, is used for convenience and is not intended to imply that all deuterated hydrocarbon molecules detected are specifically monodeuterated molecules. A small and typically insignificant number of molecules are not monodeuterated, i.e., have multiple deuteron atoms in a molecule, and such molecules are included in any analysis of monitored isotope signatures. Examples of suitable hydrocarbons having the form $C_XH_Y$ include members of the monodeuterated C1-C5 alkane group consisting of: methane, ethane, propane, butane and pentane, and a $\delta(C_XH_{Y-1}D/C_XH_Y)$ isotopic signature can refer to any one of such hydrocarbons having the form $C_XH_Y$.

Further examples of suitable isotopic-signature trigger criteria for triggering a transition to hydrogen injection include isotopic signatures having the generalized form $\delta(EXP_1/EXP_2)$, where:

In a first further example, $EXP_1$ is an expression representing a monodeuterated multi-alkane sum of respective concentrations of one or more of: monodeuterated ethane, monodeuterated propane, monodeuterated butane, and monodeuterated pentane, and $EXP_2$ is an expression representing a concentration of monodeuterated methane.

In a second further example, $EXP_1$ is an expression representing a monodeuterated-methane concentration, and $EXP_2$ is an expression representing a respective concentration of any one of: monodeuterated ethane, monodeuterated propane, monodeuterated butane, and monodeuterated pentane.

In a third further example, $EXP_1$ is an expression representing respective concentrations of one or more members of the monodeuterated C1-C5 alkane group consisting of monodeuterated methane, monodeuterated ethane, monodeuterated propane, monodeuterated butane, and monodeuterated pentane, and $EXP_2$ is an expression representing respective concentrations of one or more members of the same monodeuterated C1-C5 alkane group with the exception of the one or more members represented in $EXP_1$.

In a fourth further example, $EXP_1$ is an expression representing any member of the same monodeuterated C1-C5 alkane group, and $EXP_2$ is an expression representing any other member of the same monodeuterated C1-C5 alkane group.

Still further examples of suitable isotopic-signature trigger criteria for triggering a transition to hydrogen injection include isotopic signatures having the form a $\delta(C_XH_{Y-1}D/C_AH_B)$, where $C_XH_{Y-1}D$ is a monodeuterated molecule of a first hydrocarbon, and $C_AH_B$ is a non-deuterated molecule of a second hydrocarbon that is not the first hydrocarbon. It will be clear to the skilled artisan that any of the foregoing ratios can be expressed in other ways, for example by reversing numerators and denominators of any ratio, i.e., flipping over the ratios such that where an isotopic-signature value based on any of the foregoing ratios might increase based on physical analysis, such a value would instead decrease, and vice versa.

In a fifth stage, between Time=$T_3$ and Time=$T_4$, stored hydrogen gas is recovered from the reservoir. The recovered hydrogen gas is mostly pure hydrogen, i.e., has an $H_2$ molar fraction of at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%. The remainder of the recovered gas mix can include methane, other hydrocarbon gases such as ethane and propane, and non-hydrocarbon gases such as carbon dioxide and nitrogen.

In a sixth stage, after Time=$T_4$, the injecting and recovering of hydrogen can be cycled. The sixth stage can thus be considered a repetition or cycling of the fourth and fifth stages. In some embodiments, when the hydrogen recovery of the fifth stage reaches a hydrogen-production trigger criterion, operation of the reservoir reverts to injecting hydrogen, inter alia to increase pressure and improve future hydrogen recovery volume. In some embodiments, hydrogen is cycled on a daily basis, meaning that within a single diurnal cycle, hydrogen is injected, and then recovered. The diurnal cycle can repeat indefinitely. In some such embodiments, the fourth-stage injection of hydrogen can be up to a 'base level', on top of which there is a daily cycle of fluctuation, so that the daily recovery cycle is at a sufficiently high pressure to ensure rapid recovery. In other embodiments, the cycle of injecting hydrogen and subsequently recovering a hydrogen-containing gas can take place over weeks, months or years.

Any or all of the times $T_0$, $T_1$, $T_2$, $T_3$ and $T_4$ can be points in time or periods of time, for example, days, weeks or months.

Referring now to FIG. 37, a method is disclosed for storing hydrogen gas in a kerogen-rich geological formation. As illustrated by the flowchart in FIG. 37, the method comprises Steps S201, S202, S203, S204 and S205, which are discussed in the following paragraphs.

Step S201

Step S201 includes injecting a fracturing fluid through a horizontal wellbore into the geological formation to cause fracturing within the geological formation. Arrangements for injecting a fracturing fluid into a geological formation are illustrated schematically in FIG. 38. A geological formation 30, shown in accordance with the description hereinabove of the second stage between Time=$T_0$ and Time=$T_1$, includes an organic-rich shale deposit (also called a shale formation). Hydraulic fracturing equipment 70 is disposed at a wellhead 18. The wellhead 18 is located at a well pad 19 and is in fluid communication with an unconventional gas reservoir 35 located within the shale formation 30, which in the non-limiting example of FIG. 38 is below the water table 27.

The wellbore 10, including perforated casing, is horizontally-oriented at the depth of the shale formation 30, and can extend horizontally for tens, hundreds or thousands of meters. As indicated by the directional arrow 201, a hydraulic-fracturing fluid 3 is injected into (and through) the wellbore 10 and thence into fractures 32. The injecting is effective to increase pressure at the target depth of the reservoir 35, e.g., based on the depth of the wellbore, to exceed that of the fracture gradient of the rock. At a fracture-initiating pressure known as a 'breakdown pressure', the deep rock surrounding the wellbore 10 cracks with pressure. Once fracturing is initiated, pressure at the wellhead 18 drops and then starts increasing, as the fracturing fluid 3 permeates the rock, further extending the fractures. This occurs at the fracture-extending pressure $FRAC_{EXT}$. Fractures predominantly perpendicular to the wellbore may reach lengths of a few hundred feet long; the height of the fractures 32 is controlled by the stresses in the rock formations above and below the wellbore.

Figure 38:
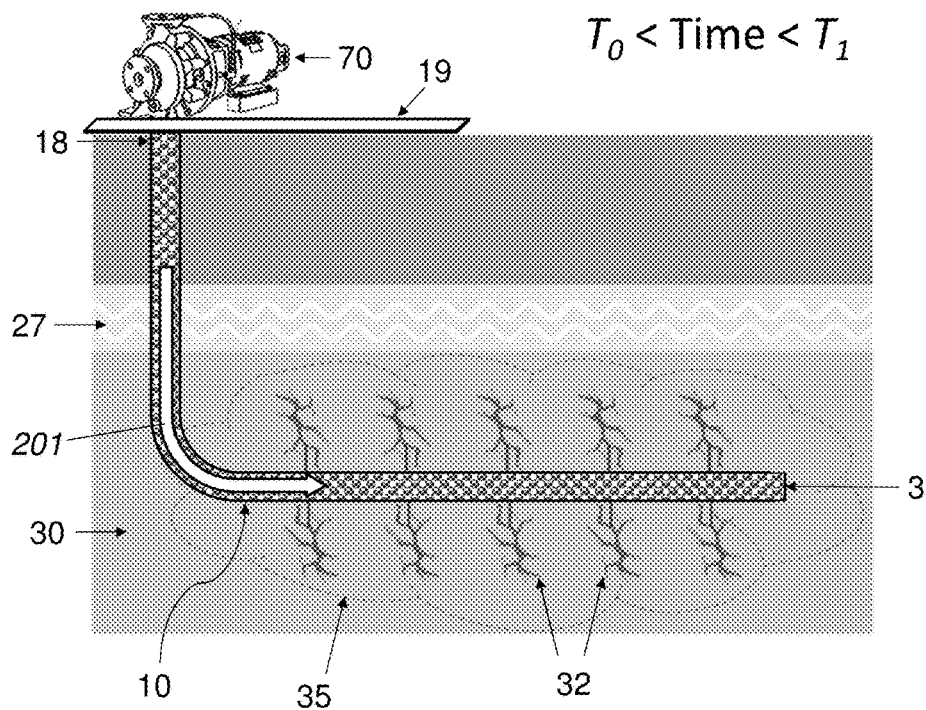
FIG. 38 is a schematic illustration showing injection of a fracturing fluid through a horizontal wellbore into a geological formation, according to embodiments of the present invention.
Figure 39:
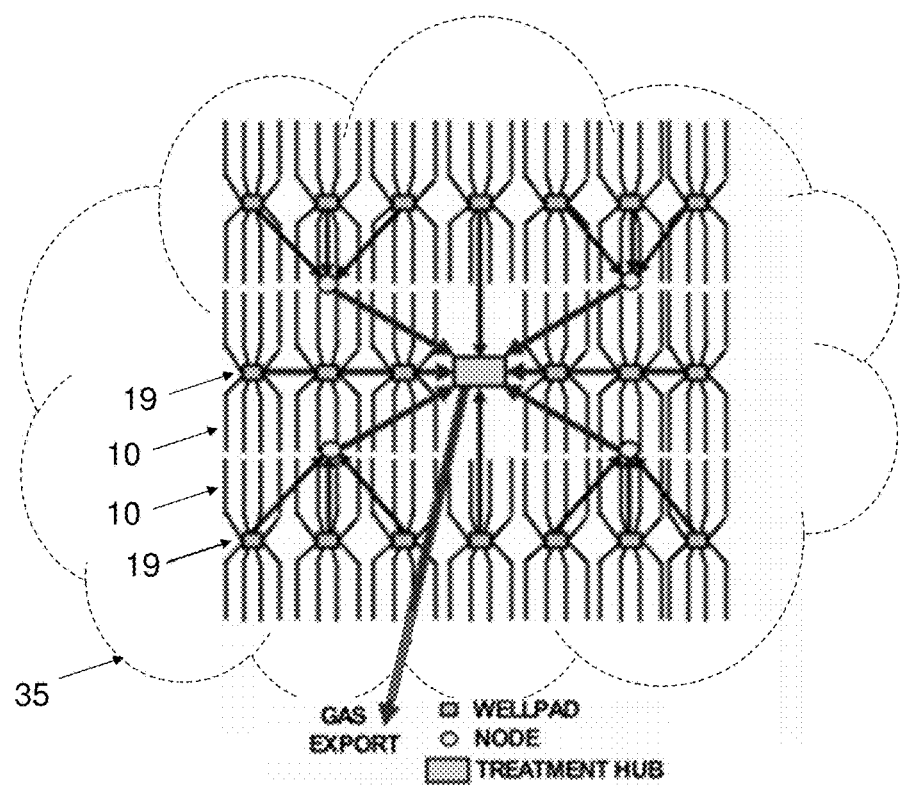
FIG. 39 is a schematic illustration showing multiple wells and multiple well pads servicing a gas reservoir, according to embodiments of the present invention.

FIG. 38 illustrates only a single well, but a single geological formation 30 or a single unconventional gas reservoir 35 can be serviced by multiple wells, as shown in FIG. 39. FIG. 39 illustrates multiple wells (indicated by wellbores 10) at each well pad 19, and multiple well pads 19 servicing the gas reservoir 35. In the non-limiting example of FIG. 39, gas flows through a network of transmission nodes to a central treatment hub that services the multiple wells. The example of FIG. 39 shows 8 wells, i.e., wellbores 10, operating from each well pad 19. In other examples, not illustrated, there can be any number of wells, such as for example, 16, 32 or 64 wells. Each well comprises a wellhead 18 and a wellbore 10. Pressure and flow measurements may be made using pressure and flow gauges at the wellhead 18 while flowing or during shut-in. Pressure may also be measured downhole using downhole pressure gauges.

Step S202

Figure 40:
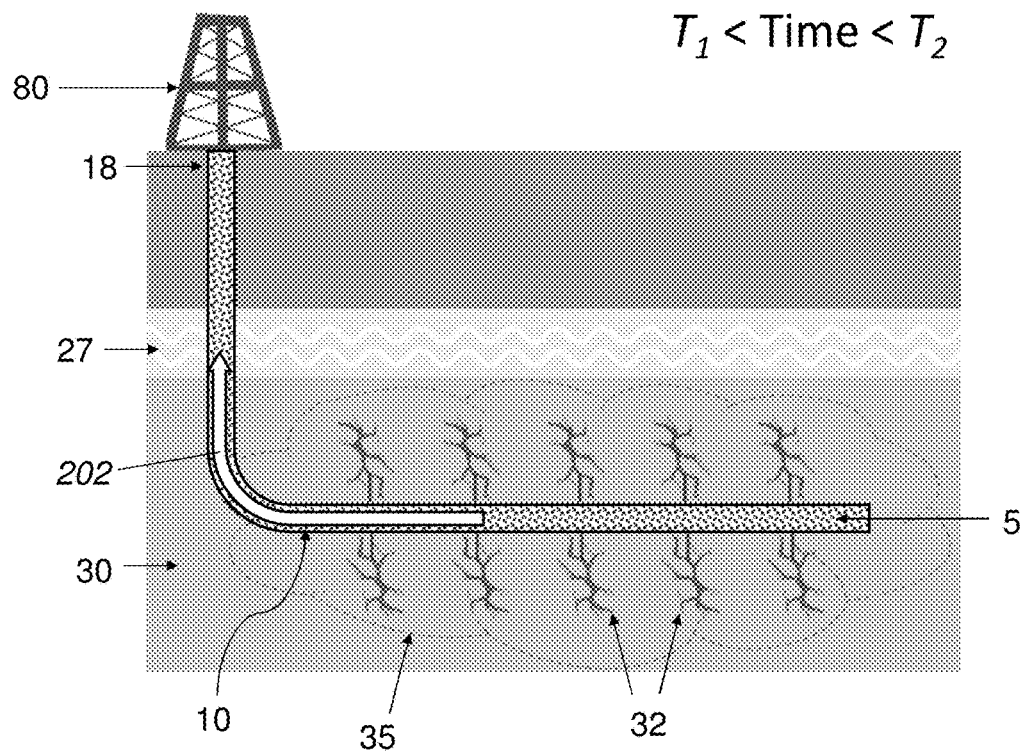
FIG. 40 is a schematic illustration showing recovery of a methane-containing gas from a geological formation through a horizontal wellbore, according to embodiments of the present invention.

Step S202 includes recovering a methane-containing gas 5 through the wellbore. Referring to FIG. 40, gas-recovery activity at the wellhead 18 is illustrated during the third stage of the timeline of FIG. 36, i.e., between Time=$T_1$ and Time=$T_2$. As indicated by directional arrow 202, natural gas 5 is recovered through the wellbore 10 from the reservoir 35, including from the hydraulic fractures 32, and processed by gas recovery equipment 80 which is in fluid communication with the wellbore 10 at the wellhead 18.

Step S203

Step S203 includes monitoring an isotopic signature of a molecular component of the recovered methane-containing gas. According to embodiments, any one (or, in some embodiments: more than one) of several isotopic signatures can be used to determine a 'trigger' criterion for initiating a transition from recovering the methane-containing gas 5 from the reservoir 35 to injecting compressed hydrogen for long- and/or short-term storage.

In embodiments, the monitoring includes periodically sampling and analyzing the methane-containing gas 5 produced from the reservoir 35.

First Example

A first example of a suitable isotopic signature for monitoring as a trigger criterion is a $\delta(^{13}C)$ isotopic signature based on a ratio of $^{13}C$ to $^{12}C$ (or vice versa) for methane, although isotopic signatures of other component gases of the recovered natural gas 5, e.g., ethane, propane, butane and pentane, are also suitable.

Figure 41:
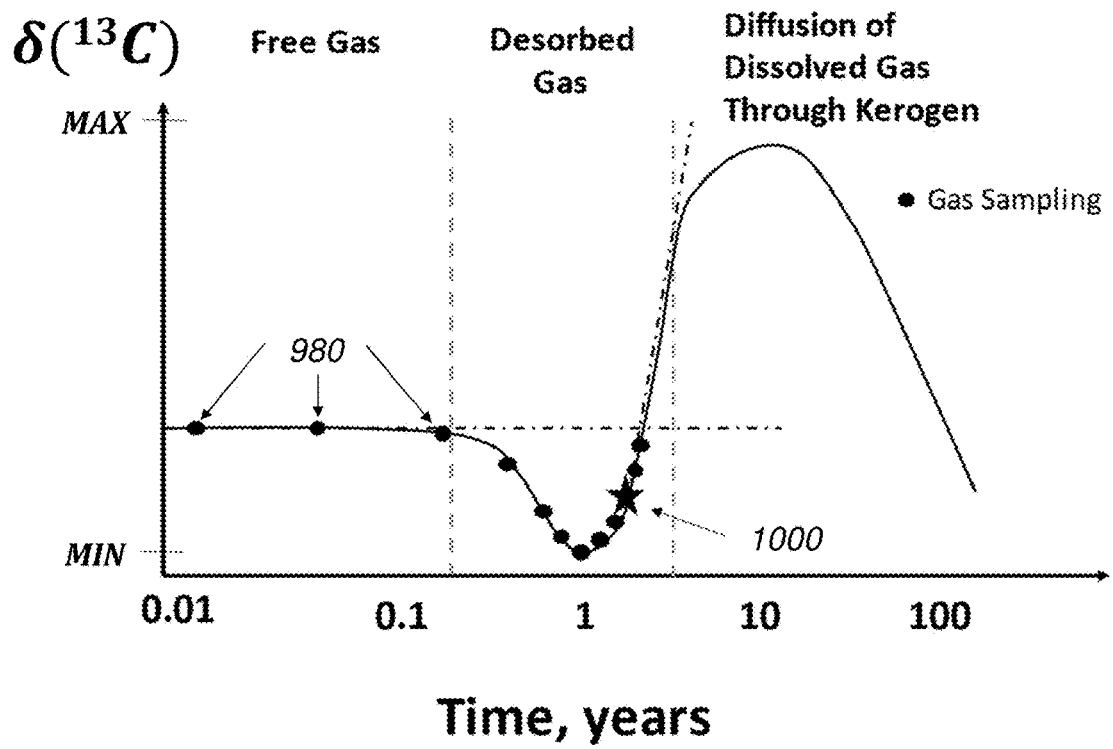
FIG. 41 is a chart showing an exemplary graph of a $\delta(^{13}C)$ isotopic signature over time, according to embodiments of the present invention.

FIG. 41 is a chart showing an exemplary graph of a $\delta(^{13}C)$ isotopic signature for methane over time, i.e., during the third-stage gas-recovery period between Time=$T_1$ and Time=$T_2$. FIG. 41 illustrates that carbon isotope ratio in the methane gas produced from the shale gas reservoir 35 can change over time during the commercial life of the unconventional gas reservoir. According to embodiments, these changes can be monitored in order to detect matching a 'trigger criterion' that can be used to trigger a transition to injecting hydrogen into the reservoir. Exemplary periodic gas sampling points are indicated in FIG. 41 by periodic sampling points 980. The time between sampling points 980 is not necessarily constant. As previously discussed, similar $\delta(^{13}C)$ isotopic signatures can be obtained for ethane, for propane, for butane, and for other hydrocarbon gases produced from the shale gas reservoir. Ratios of $^{13}C$ isotopic signatures respective of the various component gases of the recovered natural gas 5 may also be obtained, for example in the form $\delta(^{13}C)_{ALKANE1}/\delta(^{13}C)_{ALKANE2}$ where ALKANE1 and ALKANE2 are selected from the C1-C5 alkane group consisting of methane, ethane, propane, butane and pentane. Additionally or alternatively, either or both of the numerator and the denominator can include a $\delta(^{13}C)$ isotopic signature expression arithmetically combining multiple members of the C1-C5 alkane group.

As is known in the art, gas is produced, i.e., recovered, from an unconventional gas reservoir from three sources: free gas, desorbed gas, and diffusion of dissolved gas through kerogen. At different times during a project, gas from different sources can be the dominant component in gas recovered from the reservoir. For purposes of illustration, the graph of FIG. 41 indicates three periods corresponding to these three gas sources, for specific periods of time shown in years on the logarithmic x-axis of the graph. This 'assignment' to specific periods of time reflects a schematically-drawn example of a specific type of reservoir, and the actual durations of each of the three successive periods varies from reservoir to reservoir, depending on the specific geologic attributes of each reservoir. In some examples, each one of the three periods can be longer or shorter than shown in the example. In some examples, the transition from one such period to another can start earlier or later, or end earlier or later, than shown in the example. In some examples, there can be transition periods in which the dominant component switches back and forth for some period of time.

The graph of FIG. 41 shows the recovered gas as having a value of $\delta(^{13}C)$, e.g., in methane or another component gas of the recovered gas 5 such as a different member of the C1-C5 alkane group, that is substantially constant with time of production during the 'free-gas' period. This value, $\delta(^{13}C)_{INITIAL}$, varies among unconventional gas reservoirs and is largely determined by initial geological conditions of the specific reservoir. The $\delta(^{13}C)$ isotopic signature can defined by the ratio of $^{13}C/^{12}C$ relative to an international standard known as VPDB; $\delta(^{13}C)_{INITIAL}$ generally varies −20 to −50‰ (VPDB), depending on the geological age of the reservoir formation, the type of kerogen, and the geothermal history.

During the monitoring step of S203, a change in isotopic signature $\delta(^{13}C)$ can be defined by: $\delta(^{13}C)_{INITIAL}-\delta(^{13}C)_T$ where $\delta(^{13}C)_T$ is the isotopic signature at a later time during the gas recovery period between Time=$T_2$ and Time=$T_3$. As can be seen in the graph of FIG. 41, $\delta(^{13}C)$ can undergo substantial changes during the period labeled as dominated by 'desorbed-gas' production; in this example, after a period of 0.5-6 months from the beginning of gas production, $\delta(^{13}C)$ is shown as decreasing below the initial 'free-gas' period value. In embodiments, $\delta(^{13}C)$ reaches a minimum value $\delta(^{13}C)_{MIN}$ during the 'desorbed-gas' production period. The value of $\delta(^{13}C)_{MIN}$ can depend on a combination of factors including the amount of kerogen in the selected reservoir, the reservoir pressure, and the reservoir temperature. Typical values of $\Delta(\delta^{13}C)_{MIN}$ may be between −1 and −5‰.

According to embodiments, the isotopic signature $\delta(^{13}C)$ starts to rise after reaching the minimum value $\delta(^{13}C)_{MIN}$, and can eventually rise above the $\delta(^{13}C)_{INITIAL}$ signature value of the initial free-gas period. As shown in FIG. 41, the value of $\delta(^{13}C)_T$ reaches a maximum value $\delta(^{13}C)_{MAX}$ after at least 2 years of gas recovery, or after at least 5 years of gas recovery, or after at least 10 years of gas recovery, or after at least 15 years of gas recovery, and then start to decrease once again. Typical values of $\Delta(\delta^{13}C)_{MAX}$ may be between +1 and +15‰.

Second Example

A second example of a suitable isotopic signature for monitoring as a trigger criterion is one that is based on a deuterium-isotope ratio of a hydrocarbon-molecule component found in the methane-containing gas. For a hydrocarbon molecule given the general formula $C_XH_Y$ (X carbon atoms and Y hydrogen atoms), the isotope signature to be monitored is $\delta(C_XH_{Y-1}D/C_XH_Y)$ based on the isotope ratio $C_XH_{Y-1}D/C_XH_Y$, or, equivalently in terms of suitability, $C_XH_{Y-1}D/(C_XH_Y+C_XH_{Y-1}D)$.

A first example of a hydrocarbon-molecule component is methane ($CH_4$). A suitable isotope ratio for monitoring as a trigger criterion relates to monodeuterated methane: $CH_3D/CH_4$ or, equivalently in terms of suitability, $CH_3D/(CH_4+CH_3D)$. As discussed earlier, there can be some methane molecules with multiple protium atoms substituted by deuterium atoms, and these are included in the analysis along with the monodeuterated methane molecules.

A second example of a hydrocarbon-molecule component is ethane ($C_2H_6$). A suitable isotope ratio for monitoring as a trigger criterion relates to monodeuterated ethane: $C_2H_5D/C_2H_6$ or, equivalently in terms of suitability, $C_2H_5D/(C_2H_6+C_2H_5D)$. As discussed earlier, there can be some ethane molecules with multiple protium atoms substituted by deuterium atoms and these are included in the analysis along with the monodeuterated ethane molecules.

A third example of a hydrocarbon-molecule component is propane ($C_3H_8$). A suitable isotope ratio for monitoring as a trigger criterion relates to monodeuterated propane: $C_3H_7D/C_3H_8$ or, equivalently in terms of suitability, $C_3H_7D/(C_3H_8+C_3H_7D)$. As discussed earlier, there can be some propane molecules with multiple protium atoms substituted by deuterium atoms and these are included in the analysis along with the monodeuterated propane molecules.

A fourth example of a hydrocarbon-molecule component is butane ($C_4/H_{10}$). A suitable isotope ratio for monitoring as a trigger criterion relates to monodeuterated butane: $C_4H_9D/C_4H_{10}$ or, equivalently in terms of suitability, $C_4H_9D/(C_4H_{10}+C_4H_9D)$. As discussed earlier, there can be some butane molecules with multiple protium atoms substituted by deuterium atoms and these are included in the analysis along with the monodeuterated butane molecules.

A fifth example of a hydrocarbon-molecule component is pentane ($C_5H_{12}$). A suitable isotope ratio for monitoring as a trigger criterion relates to monodeuterated pentane: $C_5H_{11}D/C_5H_{12}$ or, equivalently in terms of suitability, $C_5H_{11}D/(C_5H_{12}+C_5H_{11}D)$. As discussed earlier, there can be some pentane molecules with multiple protium atoms substituted by deuterium atoms and these are included in the analysis along with the monodeuterated pentane molecules.

Figure 42:
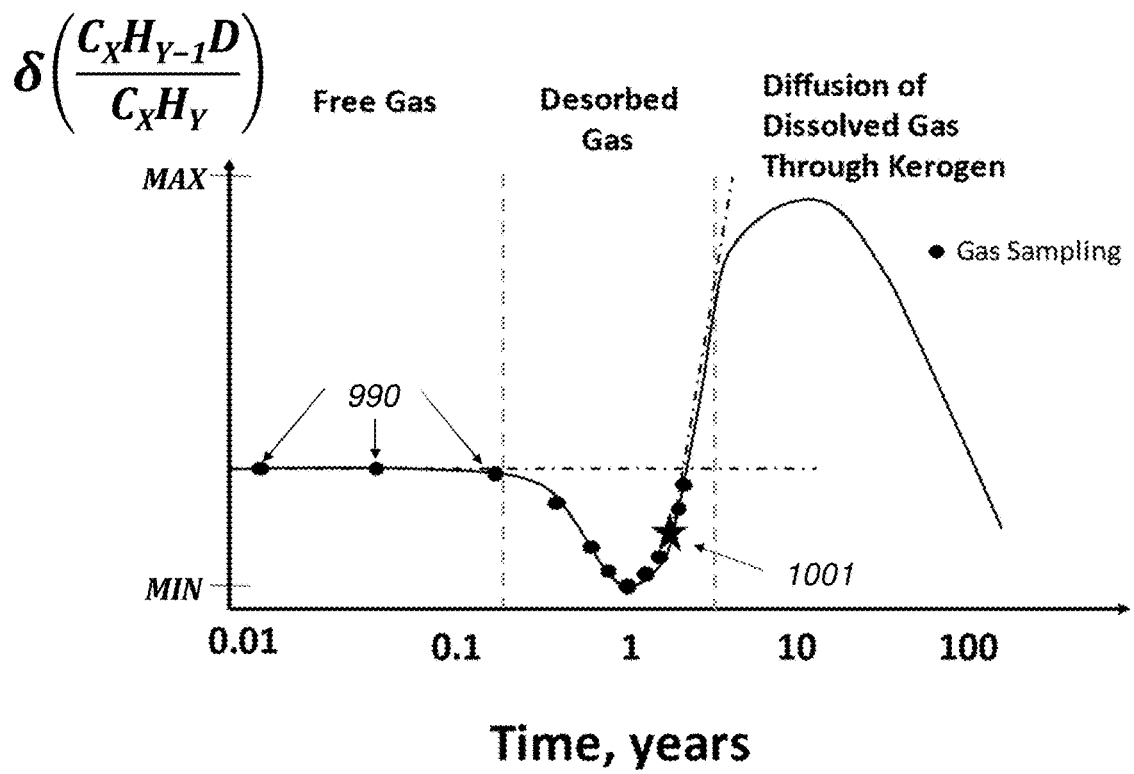
FIG. 42 is a chart showing an exemplary graph of a deuterated hydrocarbon isotope ratio over time, according to embodiments of the present invention.

Collectively, methane, ethane, propane, butane and pentane are members of the C1-C5 alkane group, and monodeuterated methane, monodeuterated ethane, monodeuterated propane, monodeuterated butane and monodeuterated pentane are members of the monodeuterated C1-C5 alkane group FIG. 42 includes a chart, similar to the chart of FIG. 41, showing an exemplary graph of a $\delta(C_XH_{Y-1}D/C_XH_Y)$ isotopic signature over time, i.e., during the third-stage gas-recovery period between Time=$T_1$ and Time=$T_2$. FIG. 42 illustrates that a hydrocarbon-molecule isotope ratio in the methane gas produced from the shale gas reservoir 35 can change over time during the commercial life of the unconventional gas reservoir. According to embodiments, these changes can be monitored in order to detect matching a 'trigger criterion' that can be used to trigger a transition to injecting hydrogen into the reservoir. Exemplary periodic gas sampling points are indicated in FIG. 42 by periodic sampling points 990. The time between sampling points 990 is not necessarily constant.

The graph of FIG. 42 shows the recovered gas as having a value of $\delta(C_XH_{Y-1}D/C_XH_Y)$ that is substantially constant with time of production during the 'free-gas' period. This value, $\delta(C_XH_{Y-1}D/C_XH_Y)_{INITIAL}$, varies among unconventional gas reservoirs and is largely determined by initial geological conditions of the specific reservoir. As can be seen in the graph of FIG. 42, $\delta(C_XH_{Y-1}D/C_XH_Y)$ can undergo substantial changes during the period labeled as dominated by 'desorbed-gas' production; in this example, after a period of 0.5-6 months from the beginning of gas production, $\delta(C_XH_{Y-1}D/C_XH_Y)$ is shown as decreasing below the initial 'free-gas' period value. In embodiments, $\delta(C_XH_{Y-1}D/C_XH_Y)$ reaches a minimum value $\delta(C_XH_{Y-1}D/C_XH_Y)_{MIN}$ during the 'desorbed-gas' production period. The value of $\delta(C_XH_{Y-1}D/C_XH_Y)_{MIN}$ can depend on a combination of factors including the amount of kerogen in the selected reservoir, the reservoir pressure, and the reservoir temperature.

According to embodiments, the isotopic signature $\delta(C_XH_{Y-1}D/C_XH_Y)$ starts to rise after reaching the minimum value $\delta(C_XH_{Y-1}D/C_XH_Y)_{MIN}$, and can eventually rise above the $\delta(C_XH_{Y-1}D/C_XH_Y)_{INITIAL}$ signature value of the initial free-gas period. As shown in FIG. 42, the value of $\delta(C_XH_{Y-1}D/C_XH_Y)_T$ can reach a maximum value $\delta(C_XH_{Y-1}D/C_XH_Y)_{MAX}$ after at least 5 years of gas recovery, or after at least 10 years of gas recovery, or after at least 15 years of gas recovery, and then start to decrease once again.

Step S204

Figure 43:
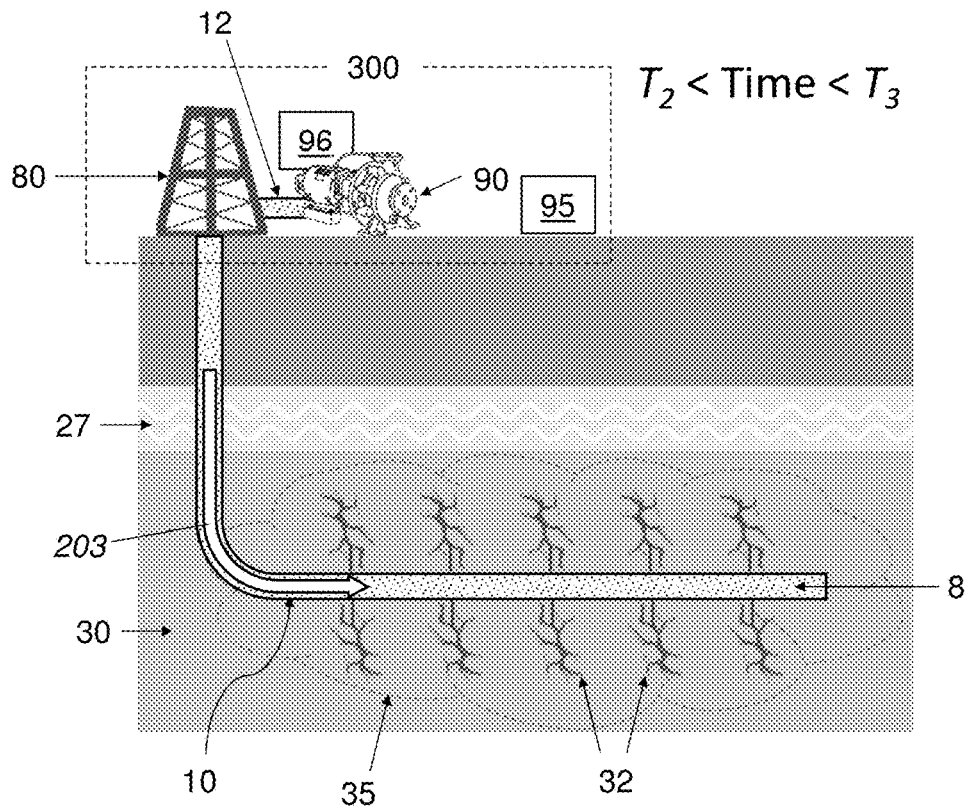
FIG. 43 is a schematic illustration showing injection of hydrogen gas through a horizontal wellbore into a geological formation, according to embodiments of the present invention.

Step S204 includes injecting a hydrogen gas 8 through the wellbore 10 into the geological formation 30, i.e., into the reservoir 35, during the fourth stage of the timeline, between Time=$T_2$ and Time=$T_3$. As shown in the example of FIG. 43, where injection of the hydrogen 8 is represented schematically by the directional arrow 203, hydrogen-gas-pumping arrangements 90 are provided in fluid communication with the reservoir 35 via wellbore 10. In embodiments, the reservoir 35 and wellbore 10 are the same reservoir 35 and wellbore 10 as in FIGS. 38 and 40.

The skilled artisan will understand that the transition from the third stage of recovering methane to the fourth stage of injecting hydrogen at Time=$T_2$ can involve one or more preparatory steps performed between Steps S203 and S204 of the method. For example, it can be desirable to close valves at the surface to cause pressure in the reservoir 35 to reach an equilibrium pressure. This can include closing the valves at the surface to end gas recovery and allowing time for the wellhead pressure to increase from a flowing wellhead pressure to a shut-in wellhead pressure. Over a period of weeks, the shut-in wellhead pressure rises to an equilibrium pressure that is approximately equal to reservoir pressure.

The injection of the hydrogen gas 8, e.g., pure $H_2$, or a hydrogen-containing gas that includes at least 99% $H_2$ or at least 98% $H_2$, or at least 97% $H_2$, or at least 96% $H_2$, or at least 95% $H_2$, is at a pressure higher than the current gas pressure at the wellhead 18, e.g., the shut-in wellhead pressure at a stabilized reservoir-equilibrium pressure, so as to ensure that the hydrogen gas 8 propagates throughout the well, i.e., including the hydraulic fractures 32 and natural cracks. In some embodiments, the injection of hydrogen gas is at a pressure that is at least 100 PSI higher than the current shut-in gas pressure at the wellbore 10 or at least 200 PSI higher, or at least 300 PSI higher, or at least 400 PSI higher, or at least 500 psi higher, or at least 800 PSI higher. In embodiments, the initial injecting of the hydrogen gas 8 is at a pressure below a maximum gas-recovery pressure $PRESSURE_{MAX}$ encountered in Step S202, or 50 or more PSI lower than $PRESSURE_{MAX}$, or 100 or more PSI lower than $PRESSURE_{MAX}$, or 200 or more PSI lower than $PRESSURE_{MAX}$. In embodiments, the initial injecting of the hydrogen gas 8 is at a pressure below a hydrogen fracture extension pressure $H_2FRAC_{EXT}$ at which the injection of the hydrogen gas 8 would cause extension of the existing fractures, including those propagated during the hydraulic fracturing of Step S201. The hydrogen fracture extension pressure $H_2FRAC_{EXT}$ is different than the $FRAC_{EXT}$ of fracturing fluid discussed in Step S201 because of the weight of the hydraulic column and the fluid friction. In some embodiments, $H_2FRAC_{EXT}$ can be computed from $FRAC_{EXT}$, e.g., to act as a pressure limit during hydrogen injection. In other embodiments, $H_2FRAC_{EXT}$ can be measured using a diagnostic fracture injection test (DFIT), or it can be measured by microseismic monitoring.

In embodiments, the injection of hydrogen gas 8 is at a pressure that is not higher than the hydrogen-injection fracture extension pressure $H_2FRAC_{EXT}$. Inter alia, this limitation is useful for avoiding, at least partly, damage outside the wellbore 10 and the extension and broadening of the existing hydraulic fractures 32, for example to prevent the release of additional free methane in and from the newly expanded fractures which affects the hydrogen purity during hydrogen production, and to prevent hydrogen loss to the formation. In some embodiments, the injecting of the hydrogen gas 8 is at a pressure that is at least 200 PSI or at least 500 PSI less than $H_2FRAC_{EXT}$. In some embodiments, the initial injecting of the hydrogen gas 8 is at a pressure just below $H_2FRAC_{EXT}$. In an example, the injecting of the hydrogen gas includes injecting the hydrogen gas at a pressure that is 100 PSI less than $H_2FRAC_{EXT}$. In some embodiments, surface geophysical monitoring, i.e., geophysical monitoring of the geological structure from the surface, is performed during hydrogen injection to determine whether or not hydraulic fractures 32 are being extended by the hydrogen injection. According to non-limiting examples, surface geophysical monitoring can include the use of surface geophysical monitoring equipment 95 such as microseismic arrays or tiltmeters. Gas phase tracers may also be added to the injected hydrogen 8 to see whether there is any communication of the hydrogen with adjacent production wells on the wellhead. Suitable gas phase tracers are tritiated hydrogen such as HT or $T_2$ in the range of 3 to 30×10^10 Becquerel (Bq) that may be detected at extremely low concentrations in nearby production wells. According to a non-limiting example, a tracer-gas facility 96 for adding a gas-phase tracer to the injected hydrogen gas 8 is provided at or near the wellhead 10.

The injection of the hydrogen gas of Step S204 is initiated responsively to—and contingent upon—a determination, based on the monitoring or Step S203, that an isotopic signature has reached a trigger criterion for triggering a transition of the unconventional reservoir 35 from recovering the methane-containing gas 5 to injecting a hydrogen gas 8.

In embodiments, a transition to injecting hydrogen gas into the reservoir 35 is triggered upon detecting that an isotopic signature, e.g., $\delta(^{13}C)$ or $\delta(C_HH_{Y-1}D/C_XH_Y)$, is rising. For example, this can include detecting a rise in isotopic signature at two consecutive sampling points 980 (FIG. 41) or 990 (FIG. 42) after the respective minimum isotopic signature $\delta(^{13}C)_{MIN}$ or $\delta(C_XH_{Y-1}D/C_XH_Y)_{MIN}$ has been observed. In some examples, hydrogen injection is triggered after detecting a rise in the isotopic signature at more than consecutive two sampling points. The number of consecutive sampling points required for triggering the transition to hydrogen injection is a design choice that can be based on, for example, and not exhaustively: sampling frequency during the monitoring of Step S203, magnitude of signature increase, or detected randomness in monitored signature values over time. Exemplary trigger points based on an after-minimum rising isotopic signature are at the point labeled 1000 in FIG. 41 for $\delta(^{13}C)$ and at the point labeled 1001 in FIG. 42 for $\delta(C_XH_{Y-1}D/C_XH_Y)$. In the case that the trigger point is used to transition to hydrogen injection, the trajectory of the signature curve beyond that trigger point becomes moot. It will be obvious to the skilled artisan that when ratios informing isotopic signatures are 'flipped', i.e., the numerators and denominators disclosed herein are exchanged with each other, as discussed hereinabove, what is described in the present disclosure as an 'increase' in an isotopic-signature value will actually be a decrease, and vice versa.

Step S205

Step S205 includes recovering stored hydrogen gas 8 through the wellbore 10, during the fifth stage of the timeline, between Time=$T_3$ and Time=$T_4$. As shown in the example of FIG. 44, where recovery of the hydrogen-containing gas 8 is represented schematically by the directional arrow 204, hydrogen-gas-recovery equipment 80 is provided in fluid communication with the reservoir 35 via wellbore 10. In some embodiments, the reservoir 35 and wellbore 10 are the same reservoir 35 and wellbore 10 as in FIGS. 38, 40 and 43.

According to the method, the recovered hydrogen-containing gas 8 has an $H_2$ molar fraction of at least 85%. The $H_2$ molar fraction of the recovered gas can be directly impacted by the selection of the reservoir in the first stage, e.g., selection of a kerogen-rich reservoir, and/or selection of a kerogen-rich reservoir with low permeability, as the terms have been defined herein. The $H_2$ molar fraction of the recovered gas can be directly impacted by the selection of an isotope-signature trigger criterion for initiating the injection of hydrogen gas into the reservoir to begin the fourth stage. The proper selection of a trigger criterion in terms of the timing during in the 'desorbed-gas' period shown schematically in FIGS. 41 and 42 can lead to avoiding significant contamination of the $H_2$ by $CH_4$ in the pore spaces or desorbed from kerogen surfaces, and thus the recovered hydrogen can be of higher purity, where purity refers to the $H_2$ molar fraction of the recovered gas. In various examples, the purity is at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%. In embodiments, the remainder of the gas, i.e., after subtracting the $H_2$ molar fraction, is at least predominantly $CH_4$.

In some embodiments, not all steps S201, S202, S203, S204, S205 of the method are performed.

Referring again to FIGS. 43 and 44, a system 300 for storing and subsequently recovering a hydrogen-containing gas 8 comprises pumping arrangements 80 for the hydrogen-containing gas 8. The pumping arrangements 80 are in fluid communication with the wellbore 10 and are configured to inject hydrogen gas 8 therethrough into the hydraulically-fractured reservoir 35. In some embodiments, kerogen concentration in the reservoir is at least 1% by volume, or at least 2%, or at least 3%. The pumping arrangements 80 include pumps and compressors, piping (e.g., piping 12), power equipment, and other equipment as necessary for injecting the hydrogen gas 8. The pumping arrangements 80 are configured to inject the hydrogen 8 at a pressure higher than a current shut-in gas pressure at the wellbore. According to embodiments, the reservoir 35 is partially depleted by a methane-containing-gas recovery process.

The gas-recovery process of the reservoir 35 is characterized by an initial isotope signature value $\delta(MC)_{INITIAL}$, a minimum isotopic signature value $\delta(MC)_{MIN}$, and a current isotopic signature value $\delta(MC)_T$ greater than $\delta(MC)_{MIN}$, wherein MC is a molecular component in the sampled methane-containing gas according to the embodiments disclosed herein, and $\delta(MC)$ is based upon an isotope ratio of the molecular component MC of the methane-containing gas. Examples of $\delta(MC)$ include $\delta(^{13}C)$, $\delta(CH_3D/CH_4)$, $\delta(C_2H_5D/C_2H_6)$, and $\delta(C_3H_7D/C_3H_8)$.

The system 300 additionally comprises gas-recovery equipment 80, also in fluid communication with the reservoir 35 though the wellbore 10. The gas-recovery equipment 80 is operative to recover a portion of the stored hydrogen-containing gas 8 through the wellbore 10. The system is operable such that the recovered portion of the hydrogen-containing gas 8 has an $H_2$ molar fraction of at least 85%. In various examples, the $H_2$ molar fraction is at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%. In embodiments, the remainder of the gas, i.e., after subtracting the $H_2$ molar fraction, is at least predominantly $CH_4$.

In some embodiments, the pumping arrangements 80 are operative to inject the hydrogen-containing gas 8 at a pressure that is at least 500 PSI higher than the current shut-in gas pressure at the wellbore 10. In some embodiments, the pumping arrangements 90 are operative to inject the hydrogen-containing gas 8 at a pressure that is no more than 100 PSI less than a maximum wellhead pressure of the gas-recovery process of the reservoir 35, $PRESSURE_{MAX}$. In some embodiments, the pumping arrangements 90 are operative to inject the hydrogen-containing gas 8 at a pressure that is no more than 50 PSI less than $PRESSURE_{MAX}$.

In some embodiments, the system 300 additionally includes surface geophysical-monitoring equipment for determining whether hydraulic fractures, e.g., one or more hydraulic fractures, are being extended by the hydrogen injection. Suitable examples of surface geophysical-monitoring equipment include microseismic arrays and tiltmeters.

Referring now to FIG. 45, a method is disclosed for storing and subsequently recovering a hydrogen gas. As illustrated by the flowchart in FIG. 45, the method comprises Steps S211, S212, S213 and S214, which are discussed in the following paragraphs. A suitable system for use in performing the method is the system 300 described above in connection with FIGS. 43 and 44.

Step S211

Step S211 includes sampling, at a plurality of times, a methane-containing gas 5 recovered from a geological formation 30 through a horizontal wellbore 10. In non-limiting examples, the sampling is carried out periodically at sampling points such as exemplary sampling points 980 shown in FIG. 41 or sampling points 990 shown in FIG. 42. Sampling points, in embodiments, are chosen to have sufficient frequency for detecting an increase in an isotopic signature following achieving a minimum value of the isotopic signature. The time between sampling points is not necessarily constant.

Step S212

Step S212 includes monitoring an isotopic signature of a molecular component of the sampled methane-containing gas, and as such is identical to Step S203 discussed hereinabove. The discussion of Step S203 is not repeated here, for the sake of brevity.

Step S213

Step S213 includes injecting hydrogen gas 8 through a horizontal wellbore 10 into a hydraulically-fractured, kerogen-rich, and partially-depleted reservoir of a methane-containing gas 3, at a pressure higher than a current shut-in gas pressure at the wellhead 10. For the purposes of the present disclosure, the term 'kerogen-rich' refers to a kerogen concentration of at least 1% organic content by volume, or at least 2%, or at least 3% The partial depletion of the partially-depleted reservoir is by a methane-containing-gas recovery process that is characterized by an initial isotope signature value $\delta(MC)_{INITIAL}$, a minimum isotopic signature value $\delta(MC)_{MIN}$, and a current isotopic signature value $\delta(MC)_T$ greater than $\delta(MC)_{MIN}$, wherein MC is a molecular component in the sampled methane-containing gas according to the embodiments disclosed herein, and $\delta(MC)$ is based upon an isotope ratio of the molecular component MC of the methane-containing gas. Examples of $\delta(MC)$ include $\delta(^{13}C)$, $\delta(CH_3D/CH_4)$, $\delta(C_2H_5D/C_2H_6)$, and $\delta(C_3H_7D/C_3H_8)$.

In some embodiments, the methane-containing-gas recovery process is additionally characterized by a maximum wellhead pressure of $PRESSURE_{MAX}$, and the injecting of the hydrogen gas 8 of Step S213 includes injecting the hydrogen gas 8 at a pressure that is 100 or more PSI less than $PRESSURE_{MAX}$, i.e., at most ($PRESSURE_{MAX}$−100 PSI). In embodiments, the injecting of the hydrogen gas 8 includes injecting the hydrogen gas 8 at a pressure that is at least 500 PSI higher than the current shut-in gas pressure at the wellhead 10.

In some embodiments, the injecting of the hydrogen gas 8 is at a pressure that is at least 200 PSI or at least 500 PSI less than the hydrogen fracture extension pressure $H_2FRAC_{EXT}$. In some embodiments, the initial injecting of the hydrogen gas 8 is at a pressure just below the hydrogen fracture extension pressure $H_2FRAC_{EXT}$. In some embodiments, surface geophysical monitoring, i.e., geophysical monitoring of the geological structure 30 from the surface, is performed during hydrogen injection to determine whether hydraulic fractures 32 are being extended by the hydrogen injection. According to non-limiting examples, surface geophysical monitoring can include the use of surface geophysical monitoring equipment 95 such as microseismic arrays or tiltmeters. According to a non-limiting example, a tracer-gas facility 96 for adding a gas-phase tracer to the injected hydrogen gas 8 is provided at or near the wellhead 10.

Step S214

Step S214 includes recovering a portion of the stored hydrogen gas 8 through the wellbore 10. The recovered hydrogen gas is mostly pure hydrogen, i.e., has an $H_2$ molar fraction of at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%. The remainder of the recovered gas mix can include methane and other hydrocarbon gases such as ethane and propane, and non-hydrocarbon gases such as carbon dioxide and nitrogen.

According to yet further embodiments of the invention, an unconventional gas reservoir can be suitable for long-term and/or short-term storage of hydrogen gas after partial depletion of the natural gas. The timeline of FIG. 46 shows a sequence of stages associated with the use of a partially depleted unconventional gas reservoir for storage and recovery of hydrogen in accordance with embodiments.

In a first stage, before Time=$T_0$, a suitable gas-containing reservoir is selected, e.g., based on one or more technical and/or economic selection criteria, and a deep horizontal wellbore is established in the reservoir. Non-limiting examples of technical selection criteria include, and not exhaustively: low permeability, e.g., permeability lower than $10^{-1}$ millidarcy (mD), lower than $10^{-2}$ mD, lower than $10^{-3}$ mD, or lower than $10^{-4}$ mD; proportion of organic matter (i.e., kerogen), e.g., at least 1% kerogen, at least 2% kerogen, or at least 3% kerogen; and distribution of pore volumes in the kerogen.

In a second stage, between Time=$T_0$ and Time=$T_1$, the reservoir is hydraulically fractured. The deep horizontal wellbore is perforated for hydraulic fracturing, e.g., by a perforating gun. A fracturing fluid is injected under pressure through a horizontal wellbore into the geological formation to effect the fracturing by propagation and expansion of cracks in the rock structure. The hydraulic fracturing process is used to facilitate and/or accelerate the recovery of gas from the reservoir by opening cracks in the deep shale formations. As is known in the art, successive sections of the reservoir along the wellbore are fractured sequentially and not simultaneously. An example of a suitable fracturing fluid is a mixture of water, a proppant such as sand or a ceramic, and/or a chemical or polymer to improve a flow characteristic such as the water's surface friction and/or to act as a lubricant. In other examples, a suitable fracturing fluid can include an energized fluid, e.g., a fluid including at least one compressed or compressible gas-phase material, or an oil-based fluid.

In a third stage, between Time=$T_1$ and Time=$T_2$, natural gas is recovered from the hydraulically-fractured reservoir. The gas recovery process over time is characterized by one or more isotope ratios that change over time, as will be further described hereinbelow.

In a fourth stage, between Time=$T_2$ and Time=$T_3$, hydrogen gas is injected into the reservoir. In embodiments, the transition from the third stage to the fourth stage, at Time=$T_2$, is based on a trigger criterion. The trigger criterion can include a trigger criterion that corresponds to a change in an isotope ratio matching an isotope-signature trigger criterion. Matching an isotope-signature trigger criterion can be based on projecting isotope ratio values of the reservoir based on values obtained from a core sample extracted from the reservoir. The core sample values can include isotope ratio values relating to various measured pressures, e.g., in an instrumented core sample holder. During the economic life of the unconventional gas reservoir in the third stage, matching the isotope-signature trigger criterion involves monitoring the pressure in the reservoir to determine when a reservoir pressure matches a core-sample pressure that corresponds to one or more core-sample isotope ratio values associated with an isotope-signature trigger criterion. According to embodiments, the projecting can provide advance indications of when the reservoir will reach the isotope-signature trigger criterion so that the transition to injection of hydrogen into the reservoir can begin.

An example of an isotopic-signature trigger criterion suitable for triggering a transition of operation of an unconventional gas reservoir to injecting compressed hydrogen for long- and/or short-term storage is a $\delta(^{13}C)$ isotopic signature based on a ratio of $^{13}C$ to $^{12}C$ (or vice versa). Another example of a suitable isotopic-signature trigger criterion for triggering a transition to hydrogen injection is a $\delta(C_XH_{Y-1}D/C_XH_Y)$ isotopic signature, which represents a ratio of deuterated hydrocarbon molecules to non-deuterated molecules where X and Y are the number of carbon and hydrogen atoms, respectfully. This expression (and similar expressions throughout the present disclosure), which include a single deuteron in the numerator, is used for convenience and is not intended to imply that all deuterated hydrocarbon molecules detected are specifically monodeuterated molecules. A small and typically insignificant number of molecules are not monodeuterated, i.e., have multiple deuterons in a molecule, and such molecules are included in any analysis of monitored isotope signatures.

In a fifth stage, between Time=$T_3$ and Time=$T_4$, stored hydrogen gas is recovered from the reservoir. The recovered hydrogen gas is mostly pure hydrogen, i.e., has an $H_2$ molar fraction of at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%. The remainder of the recovered gas mix can include methane, other hydrocarbon gases such as ethane and propane, and non-hydrocarbon gases such as carbon dioxide and nitrogen.

In a sixth stage, after Time=$T_4$, the injecting and recovering of hydrogen can be cycled. The sixth stage can thus be considered a repetition or cycling of the fourth and fifth stages. In some embodiments, when the hydrogen recovery of the fifth stage reaches a hydrogen-production trigger criterion, operation of reservoir reverts to injecting hydrogen, inter alia to increase pressure and improve future hydrogen recovery volume. In some embodiments, hydrogen is cycled daily, meaning that within a single diurnal cycle, hydrogen is injected, and then recovered. The diurnal cycle can repeat indefinitely. In some such embodiments, the fourth-stage injection of hydrogen can be up to a 'base level', on top of which there is a daily cycle of fluctuation, so that the daily recovery cycle is at a sufficiently high pressure to ensure rapid recovery.

Any or all of the times $T_0$, $T_1$, $T_2$, $T_3$ and $T_4$ can be points in time or periods of time, for example, days, weeks or months.

Referring now to FIG. 47A, a method is disclosed for storing hydrogen gas in a kerogen-rich geological formation, including for subsequently recovering the hydrogen therefrom. As illustrated by the flowchart in FIG. 47A, the method comprises Steps S301, S302, S303, S304 and S305, which are discussed in the following paragraphs.

Step S301

Step S301 includes injecting a fracturing fluid through a horizontal wellbore into the geological formation to cause fracturing within the geological formation. Arrangements for injecting a fracturing fluid into a geological formation are illustrated schematically in FIG. 48. A geological formation 30, shown in accordance with the description hereinabove of the second stage between Time=$T_0$ and Time=$T_1$, includes an organic-rich shale deposit (also called a shale formation). Hydraulic fracturing equipment 70 is disposed at a wellhead 18. The wellhead 18 is located at a wellpad 19 and is in fluid communication with an unconventional gas reservoir 35 located within the shale formation 30, which in the non-limiting example of FIG. 48 is below the water table 27.

The wellbore 10, including perforated casing, is horizontally oriented at the depth of the shale formation 30, and can extend horizontally for tens, hundreds or thousands of meters. As indicated by the directional arrow 201, a hydraulic-fracturing fluid 3 is injected into (and through) the wellbore 10 and thence into fractures 32. The injecting is effective to increase pressure at the target depth of the reservoir 35, e.g., based on the depth of the wellbore, to exceed that of the fracture gradient of the rock. At a fracture-initiating pressure known as a 'breakdown pressure', the deep rock surrounding the wellbore 10 cracks with pressure. Once fracturing is initiated, pressure at the wellhead 18 drops and then starts increasing, as the fracturing fluid 3 permeates the rock, further extending the fractures. This occurs at the fracture-extending pressure $FRAC_{EXT}$. Fractures predominantly perpendicular to the wellbore may reach lengths of a few hundred feet long; the height of the fractures 32 is controlled by the stresses in the rock formations above and below the wellbore.

Figure 48:
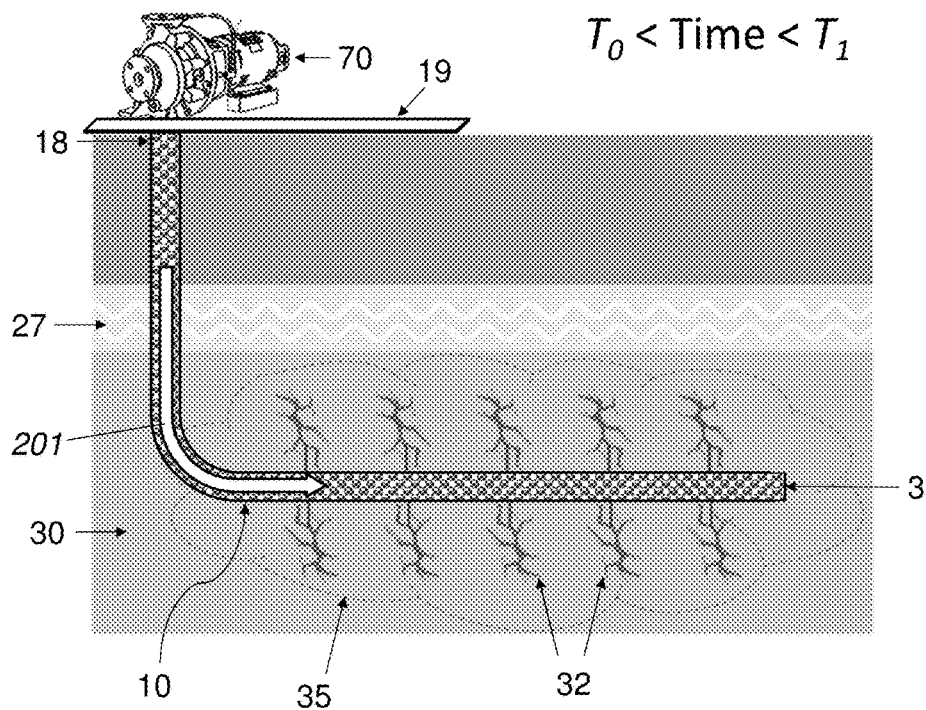
FIG. 48 is a schematic illustration showing injection of a fracturing fluid through a horizontal wellbore into a geological formation, according to embodiments of the present invention.
Figure 49:
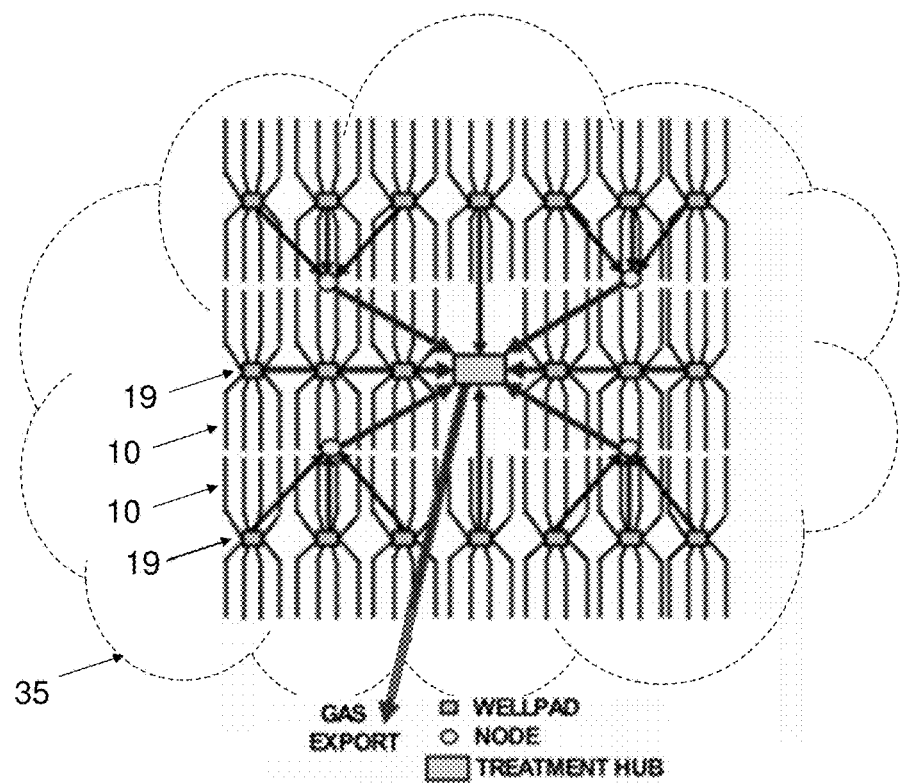
FIG. 49 is a schematic illustration showing multiple wells and multiple wellpads servicing a gas reservoir, according to embodiments of the present invention.

FIG. 48 illustrates a single well, but a single geological formation 30 or a single unconventional gas reservoir 35 can be serviced by multiple wells, as shown in FIG. 49. FIG. 49 illustrates multiple wells (indicated by wellbores 10) at each wellpad 19, and multiple wellpads 19 servicing the gas reservoir 35. In the non-limiting example of FIG. 49, gas flows through a network of transmission nodes to a central treatment hub that services the multiple wells. The example of FIG. 49 shows 8 wells, i.e., wellbores 10, operating from each wellpad 19. In other examples, not illustrated, there can be any number of wells, such as for example, 16, 32 or 64 wells. Each well comprises a wellhead 18 and a wellbore 10. Pressure and flow measurements may be made using pressure and flow gauges at the wellhead 18 while flowing or during shut-in. Pressure may also be measured downhole using downhole pressure gauges.

Step S302

Figure 50:
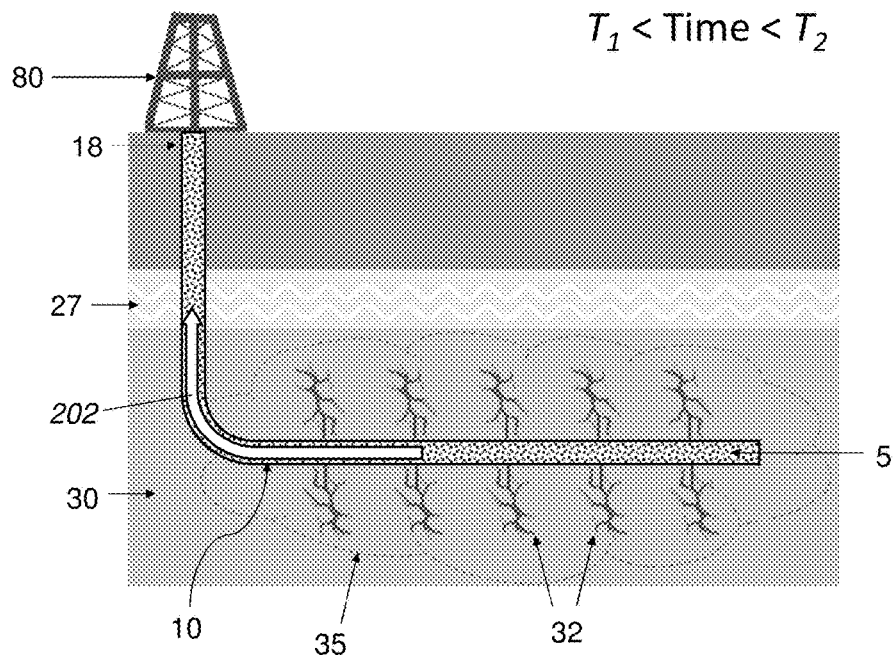
FIG. 50 is a schematic illustration showing recovery of a methane-containing gas from a geological formation through a horizontal wellbore, according to embodiments of the present invention.

Step S302 includes recovering a methane-containing gas 5 through the wellbore. Referring to FIG. 50, gas-recovery activity at the wellhead 18 is illustrated during the third stage of the timeline of FIG. 46, i.e., between Time=$T_1$ and Time=$T_2$. As indicated by directional arrow 202, natural gas 5 is recovered through the wellbore 10 from the reservoir 35, including from the hydraulic fractures 32, and processed by gas recovery equipment 80 which is in fluid communication with the wellbore 10 at the wellhead 18. Recovery of the gas 5 reaches a maximum pressure $PRESSURE_{MAX}$ after a short period (weeks or months) after gas recovery begins, and declines thereafter.

Step S303

Step S303 includes projecting a reservoir isotope ratio value $I\text{-}RATIO_{RES}$ for the recovered methane-containing gas 5 at each of a plurality of corresponding reservoir pressures $PRESSURE_{RES}$ at respective reservoir times $T_{RES}$.

The projecting is done based on an isotope ratio value $I\text{-}RATIO_{CS}$ measured in gas recovered from a core sample in a core-sample chamber (or, equivalently, core-sample holder), e.g., in a laboratory. The core sample is taken from the unconventional reservoir 35, a kerogen-rich geological formation, in which hydrogen is to be stored. In some embodiments, the core sample is taken from or near a specific well 11 of interest.

An isotope ratio value $I\text{-}RATIO_{CS}$ corresponds to a pressure $PRESSURE_{CS}$ in the core-sample holder at any time $T_{CS}$. $T_{CS}$ represents, for example, how much time has elapsed since the beginning of off-gassing by the core sample in a particular off-gassing session in the core-sample chamber. An off-gassing session of the core sample is generally started from an initial $PRESSURE_{CS}$ being set to equal the initial reservoir pressure measured at the beginning of Step S302. Both the isotope ratio value $I\text{-}RATIO_{CS}(T_{CS})$ and the $PRESSURE_{CS}(T_{CS})$ are measured at each time $T_{CS}$. When an isotopic-signature trigger criterion is reached, e.g., a desired value of isotope ratio value $I\text{-}RATIO_{CS}$, the corresponding core-sample pressure value $PRESSURE_{CS}$ for the same time $T_{CS}$ is used for setting the 'given' reservoir pressure $PRESSURE_{RES}$. Thus, measuring the given reservoir pressure $PRESSURE_{RES}(T_{RES})$ at the reservoir at a time $T_{RES}$ indicates that the current isotope ratio value $I\text{-}RATIO_{RES}(T_{RES})$ in the reservoir at the same time $T_{RES}$ corresponds to reaching the isotopic-signature trigger criterion in the reservoir. The nomenclature $T_{RES}$ is introduced to differentiate elapsed time of gas recovery in the reservoir ($T_{RES}$) from elapsed time of gas recovery from a core sample ($T_{CS}$), e.g., in a laboratory, which can be used in the projecting of Step S303.

The isotope ratio value $I\text{-}RATIO_{RES}(T_{RES})$ relates to one or more component gas molecules in the recovered methane-containing gas 5 at each of a plurality of corresponding reservoir pressures $PRESSURE_{RES}(T_{RES})$, i.e., values of $PRESSURE_{RES}$ at respective reservoir times $T_{RES}$. The reservoir times $T_{RES}$ can be any time during the second stage, i.e., recovery of methane-containing gas 5 from the reservoir 35. $T_{RES}$ can be measured, for example, as the time elapsed from the beginning of gas recovery at Time=$T_1$, which can be at the beginning of Step S302.

A first example of a suitable reservoir isotope ratio value $I\text{-}RATIO_{RES}$ for monitoring as an isotopic-signature trigger criterion is a $\delta(^{13}C)$ isotopic signature based on a ratio of $^{13}C$ to $^{12}C$ (or vice versa).

A second example of a suitable reservoir isotope ratio value $I\text{-}RATIO_{RES}$ for monitoring as an isotopic-signature trigger criterion is one that is based on a deuterium-isotope ratio of a hydrocarbon-molecule component found in the methane containing gas.

A first example of a hydrocarbon-molecule component is methane ($CH_4$). A suitable reservoir isotope ratio value $I\text{-}RATIO_{RES}$ for monitoring as an isotopic-signature trigger criterion relates to monodeuterated methane: $CH_3D/CH_4$ or, equivalently in terms of suitability, $CH_3D/(CH_4+CH_3D)$. As discussed earlier, there can be some methane molecules with multiple protium atoms substituted by deuterium atoms and these are included in the analysis along with the monodeuterated methane molecules.

A second example of a hydrocarbon-molecule component is ethane ($C_2H_6$). A suitable reservoir isotope ratio value $I\text{-}RATIO_{RES}$ for monitoring as an isotopic-signature trigger criterion relates to monodeuterated ethane: $C_2H_5D/C_2H_6$ or, equivalently in terms of suitability, $C_2H_5D/(C_2H_6+C_2H_5D)$. As discussed earlier, there can be some ethane molecules with multiple protium atoms substituted by deuterium atoms and these are included in the analysis along with the monodeuterated ethane molecules.

A third example of a hydrocarbon-molecule component is propane ($C_3H_8$). A suitable reservoir isotope ratio value $I\text{-}RATIO_{RES}$ for monitoring as an isotopic-signature trigger criterion relates to monodeuterated propane: $C_3H_7D/C_3H_8$ or, equivalently in terms of suitability, $C_3H_7D/(C_3H_8+C_3H_7D)$. As discussed earlier, there can be some propane molecules with multiple protium atoms substituted by deuterium atoms and these are included in the analysis along with the monodeuterated propane molecules.

A fourth example of a hydrocarbon-molecule component is butane ($C_4H_{10}$). A suitable reservoir isotope ratio value $I\text{-}RATIO_{RES}$ for monitoring as an isotopic-signature trigger criterion relates to monodeuterated butane: $C_4H_9D/C_4H_{10}$ or, equivalently in terms of suitability, $C_4H_9D/(C_4H_{10}+C_4H_9D)$. As discussed earlier, there can be some butane molecules with multiple protium atoms substituted by deuterium atoms and these are included in the analysis along with the monodeuterated butane molecules.

A fifth example of a hydrocarbon-molecule component is pentane ($C_5H_{12}$). A suitable reservoir isotope ratio value $I\text{-}RATIO_{RES}$ for monitoring as an isotopic-signature trigger criterion relates to monodeuterated pentane: $C_5H_{11}D/C_5H_{12}$ or, equivalently in terms of suitability, $C_5H_{11}D/(C_5H_{12}+C_5H_{11}D)$. As discussed earlier, there can be some pentane molecules with multiple protium atoms substituted by deuterium atoms and these are included in the analysis along with the monodeuterated pentane molecules.

Collectively, methane, ethane, propane, butane, and pentane are members of the C1-C5 alkane group, and monodeuterated methane, monodeuterated ethane, monodeuterated propane, monodeuterated butane and monodeuterated pentane are members of the monodeuterated C1-C5 alkane group.

According to embodiments, Step S303 is performed by carrying out two sub-steps S303A and S303B, which are illustrated in the flowchart of FIG. 47B:

Step S303A: sampling a gas mixture recovered from a core sample to determine a plurality of core-sample value-pairs—a core-sample isotope ratio $I\text{-}RATIO_{CS}(T_{CS})$ value and a respective core-sample pressure value $PRESSURE_{CS}(T_{CS})$—for respective core-sample times $T_{CS}$. Each core-sample value-pair, i.e., for each sampling time $T_{CS}$, includes a core-sample isotope ratio $I\text{-}RATIO_{CS}(T_{CS})$ value and a respective core-sample pressure value $PRESSURE_{CS}(T_{CS})$.

Figure 51A:
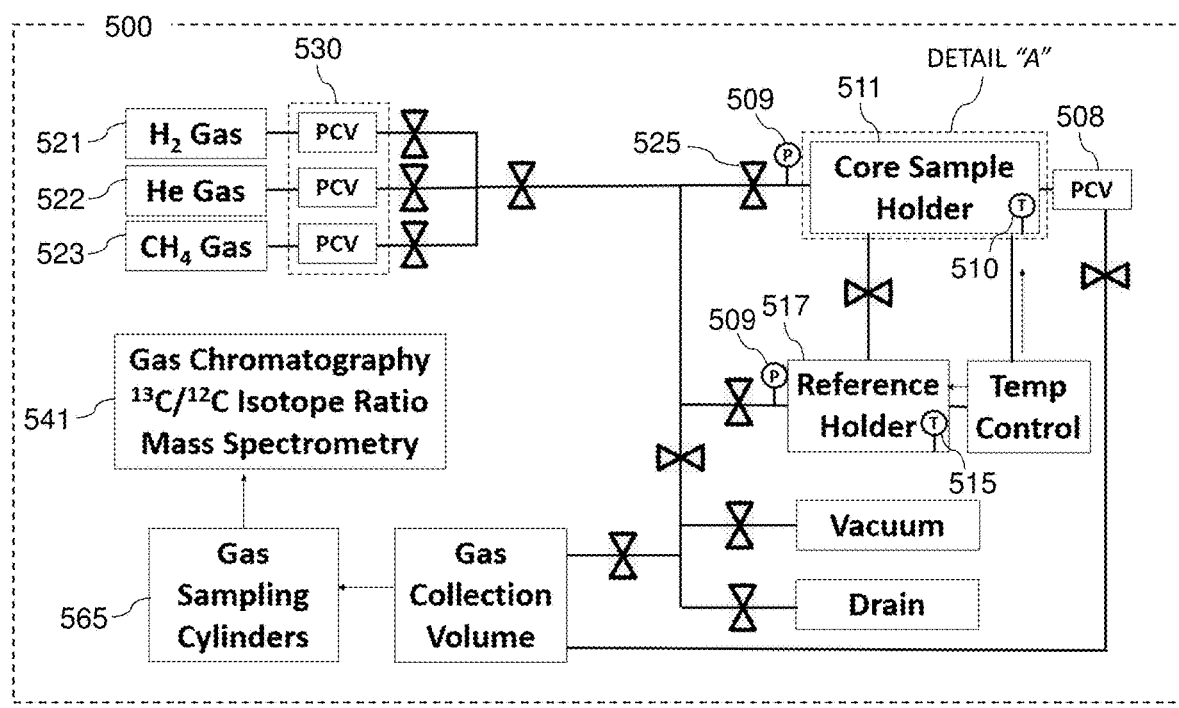
FIGS. 51A and 51B show a block diagram of a system for measuring isotope ratios, according to embodiments of the present invention.
Figure 51B:
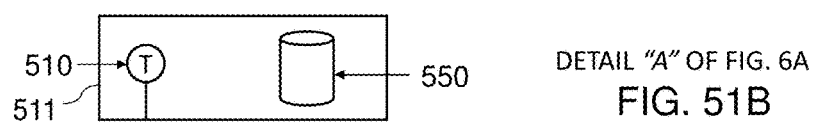

FIGS. 51A and 51B show block diagrams of laboratory apparatus 500 configured for use in Step S303A for measuring values of isotopic signatures and/or isotope ratios, e.g., an isotope ratio value I-RATIO, using one or more core samples 550 extracted from the unconventional gas reservoir 35. The reference sample holder 517 provides a comparison measurement of the amount of adsorbed gas, as per measurements of Langmuir isotherms. A pump (not shown) can be used to evacuate the core sample holder 511 containing the sample. Pressure Control Valves (PCV) 508 are provided for changing the gas pressure of the measurements in the core sample holder 511 and the reference holder 517. Pressure (P) 509 and Temperature (T) 510 sensors are located in the core sample holder 511 and reference cell, as shown in FIG. 51A. FIG. 51B shows an operational situation in which the core sample holder 511 contains a core sample 550.

In some embodiments, Step S303A is performed by carrying out four sub-steps S303A-1, S303A-2, S303A-3, and S303A-4, which are illustrated in the flowchart of FIG. 47C:

Step S303A-1: receiving a core sample obtained from the gas reservoir 35 in a core-sample holder 511. In an exemplary procedure, the core sample 550 is first dried and weighed, then placed in the temperature-controlled core sample holder 511. The core sample 550 delivered from the unconventional gas reservoir 35 is mostly depleted of natural gas by the time it reaches the lab. In the lab, it must be re-saturated with natural gas at a reservoir pressure and allowed to equilibrate. In an example, the core sample 550 is re-saturated to an initial reservoir pressure of the reservoir 35 from which it is taken. In another example, the core sample 550 is re-saturated to the $PRESSURE_{RES}$ of the reservoir 35 at the time that the core sample 550 was taken. In another example, the core sample 550 is re-saturated to a pressure of the reservoir 35 at the time of the re-saturating in the core-sample holder 511. In embodiments, it can be desirable for the pressure of the re-saturation in the core-sample holder 511 to match a relevant pressure in the reservoir, while in other embodiments, arithmetic adjustments can be made to calculations of Step S303 to overcome any discrepancy between an initial core-sample holder pressure $PRESSURE_{CS}$ and an unmatched reservoir pressure $PRESSURE_{RES}$.

Step S303A-2: introducing a methane-containing gas (or other gas, as appropriate) with a known isotope ratio I-RATIO into the core-sample holder, while regulating an internal gas pressure of the core-sample holder to an initial core-sample holder pressure $PRESSURE_{CS\text{-}INIT}$. In the non-limiting example of FIGS. 51A-B, two gases are provided for testing: He 522 and $CH_4$ 523, although in some other exemplary laboratory setups (not shown) other gases such as ethane ($C_2H_6$), propane ($C_3H_8$), butane ($C_4H_{10}$) or pentane ($C_5H_{12}$) are used in the same manner as described here for $CH_4$, mutatis mutandis. The $CH_4$ gas 523 (for example) can have a known (i.e., measured) $^{13}C/^{12}C$ isotopic ratio and/or a measured $CH_3D/CH_4$ isotopic ratio (a deuterated-to-non-deuterated methane ratio).

Step S303A-3: periodically sampling a gas mixture produced by the core sample in the core-sample holder at a core-sample pressure $PRESSURE_{CS}(T_{CS})$ The periodicity of the sampling need not be constant during the off-gassing process. Any number or timing of sampling times $T_{CS}$ may be selected. In an exemplary analytical procedure, after pressure in the core-sample holder 511 is brought to a predetermined pressure that matches the initial pressure in the conventional gas reservoir 35 from which the core sample 550 was taken, the core sample is sealed in by the shutoff valve 525 and allowed to equilibrate with the methane gas 523. After equilibration, the off-gassing core sample is then allowed to produce gas through the PCV 508. Sampling (and analysis) of the gas produced in the core sample holder 511 of the lab setup 500 of FIGS. 51A-B as required for the sampling to be carried out periodically and at different pressures, for example with gas sampling cylinders 565.

Figure 52:
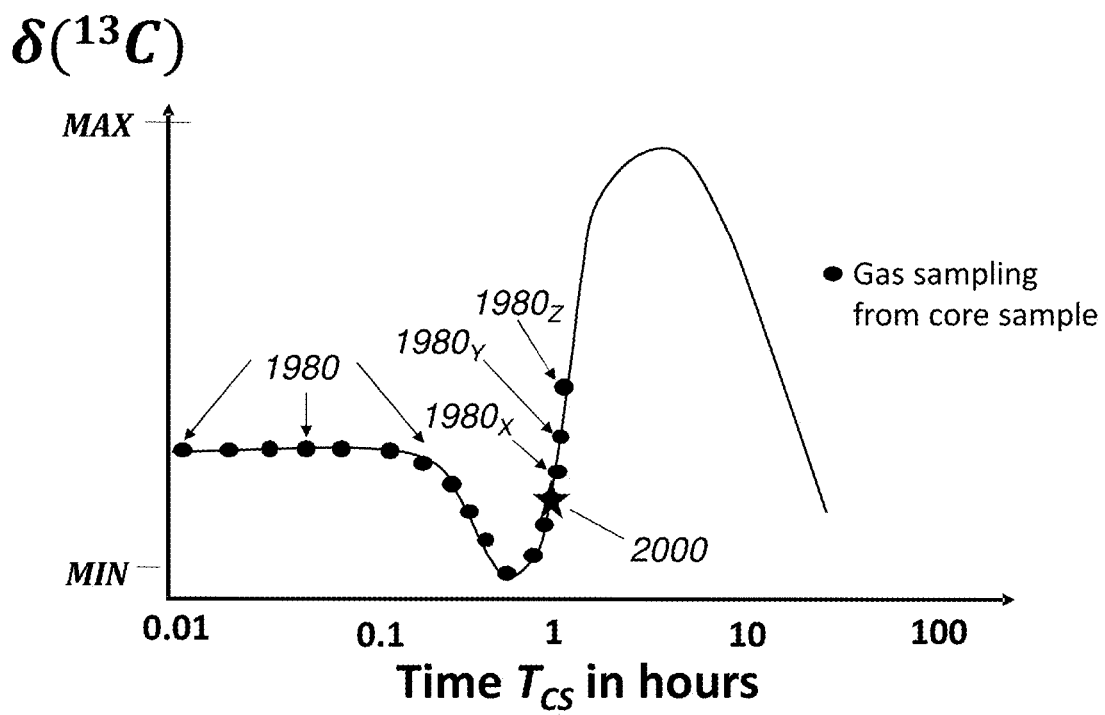
FIG. 52 is a chart showing an exemplary graph of a δ($^{13}$C) isotopic signature over time of a core sample from an unconventional gas reservoir, according to embodiments of the present invention.

FIG. 52 illustrates a non-limiting example of a periodic sampling regime. FIG. 52 shows a series of points 1980 along the x-axis, which represents time $T_{CS}$, in hours, since the beginning of off-gassing of a given core sample 550. The y-axis represents values of the isotopic signature $\delta(^{13}C)$ for each $T_{CS}$ value. An isotope-trigger point 2000 is the specific point ($T_{CS}$ value) 1980 at which the measured/calculated $\delta(^{13}C)$ value reaches a predetermined trigger criterion based on the isotopic signature $\delta(^{13}C)$. In other examples, other isotopic signatures such as, and not exhaustively, $\delta(CH_3D/CH_4)$, $\delta(C_2H_5D/C_2H_6)$, or $\delta(C_3H_7D/C_3H_8)$ can be measured/calculated for each point ($T_{CS}$ value) 1980. As shown in the example of FIG. 52, additional more samples can be taken, e.g., at points $1980_X$, $1980_Y$, $1980_Z$, after reaching the isotope-trigger point 2000 to check whether the trend of the isotope signature values $\delta(^{13}C)$ continues. Once it becomes clear that the isotope ratio is trending away from the trigger point, it is possible to stop sampling.

Step S303A-4: determining a core-sample isotope ratio $I\text{-}RATIO_{CS}(T_{CS})$ of the sampled gas mixture for each periodic sampling corresponding to respective values of $PRESSURE_{CS}(T_{CS})$. A core-sample value-pair can be measured and/or calculated for each respective core-sample time $T_{CS}$, where each core-sample value-pair includes a core-sample isotope ratio $I\text{-}RATIO_{CS}(T_{CS})$ value and a respective core-sample pressure value $PRESSURE_{CS}(T_{CS})$. The $\delta(^{13}C)$ and/or the $\delta(CH_3D/CH_4)$— or in other examples, $\delta(C_2H_5D/C_2H_6)$ or $\delta(C_3H_7D/C_3H_8)$ isotope ratios in the gas sampling cylinders are measured by gas chromatography and isotope ratio mass spectrometry 550. The helium gas 522 can be used, inter alia, as a carrier gas for the gas chromatography.

Step S303B: matching $PRESSURE_{RES}(T_{RES})$ values with respective $PRESSURE_{CS}(T_{CS})$ values, to project $I\text{-}RATIO_{RES}(T_{RES})$ values based on $I\text{-}RATIO_{CS}(T_{CS})$ values corresponding to the matched respective $PRESSURE_{CS}(T_{CS})$ values. In this manner, at any time during the productive life of the reservoir or well, it is possible to project that a desired isotope ratio has been reached in the reservoir 35 or well 11.

We now refer to FIGS. 52, 53, 54 and 55. These figures, when taken together, can be used to illustrate the process of Step S303B. FIG. 52, as mentioned previously, illustrates the identification of an isotope-trigger point 2000 in the core-sample laboratory 500. The isotope-trigger point 2000 corresponds to a core-sample value pair for the respective core-sample time $T_{CS}$ of isotope-trigger point 2000.

Figure 53:
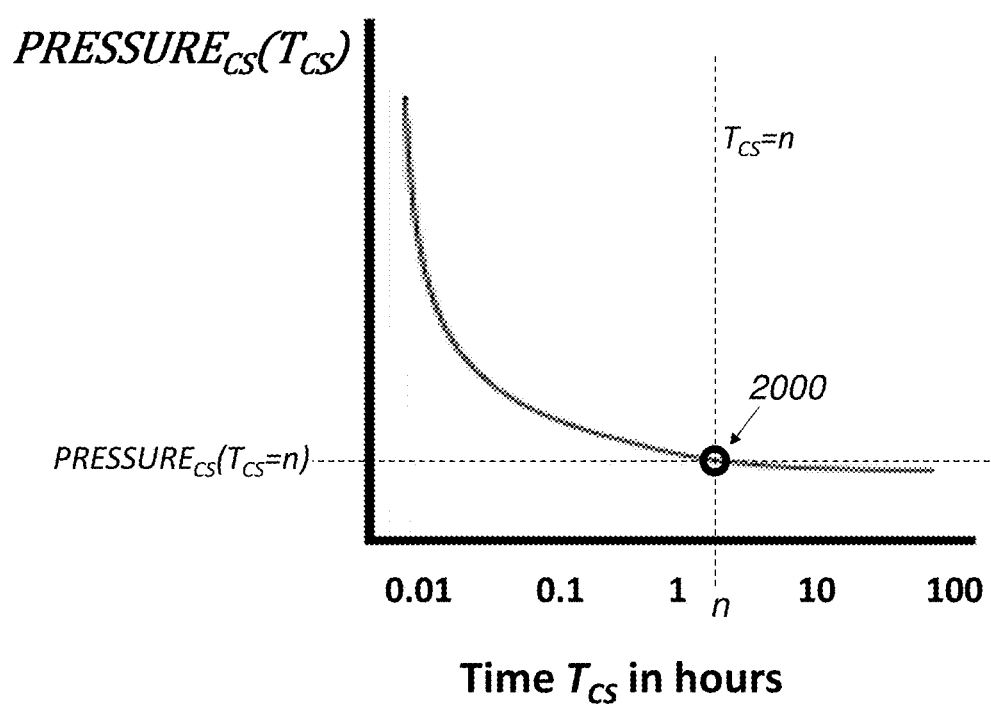
FIGS. 53 and 54 are charts showing exemplary graphs of a gas pressure over time, of a core sample from an unconventional gas reservoir and of the gas reservoir, respectively, according to embodiments of the present invention.

As shown in FIG. 53, The core-sample pair for the isotope-trigger point 2000 at time $T_{CS}=n$ corresponds to a core sample pressure of $PRESSURE_{CS}(T_{CS}=n)$ and an isotope signature or ratio $I\text{-}RATIO_{CS}(T_{CS=n})$, which matches the isotope-trigger value.

Figure 54:
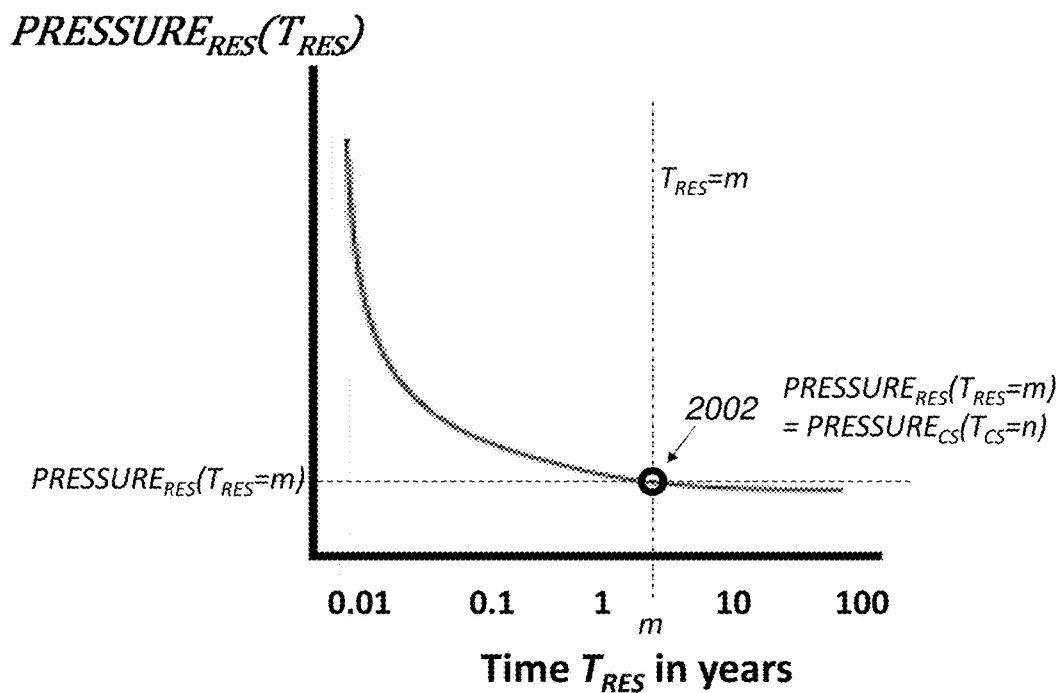

In the reservoir 35, as shown in FIG. 54, the reservoir pressure $PRESSURE_{RES}(T_{RES})$ is monitored, and at time $T_{RES}=m$, the reservoir pressure $PRESSURE_{RES}(T_{RES}=m)$ matches the core sample pressure $PRESSURE_{CS}(T_{CS}=n)$ of isotope-trigger point 2000 of FIG. 53. At the point where the pressures match, as indicated by $T_{RES}$ point 2002 at $T_{RES}=m$, the reservoir isotopic signature value $I\text{-}RATIO_{RES}(T_{RES}=m)$ equals the isotope trigger value $I\text{-}RATIO_{CS}(T_{CS}=n)$—i.e., the core-sample isotopic signature value corresponding to the isotope-trigger point 2000 of FIG. 53.

Step S304

Step S304 includes injecting hydrogen gas through the wellbore 10 according to an isotopic-signature trigger criterion, based upon reservoir isotope ratio values I-RATIO$_{RES}$(T$_{RES}$) projected in Step S303. According to the method, it can be desirable to initiate injection of hydrogen into a partially-depleted well at T$_{RES}$=m, corresponding to the isotope-trigger point 2002 of FIG. 54.

Figure 56:
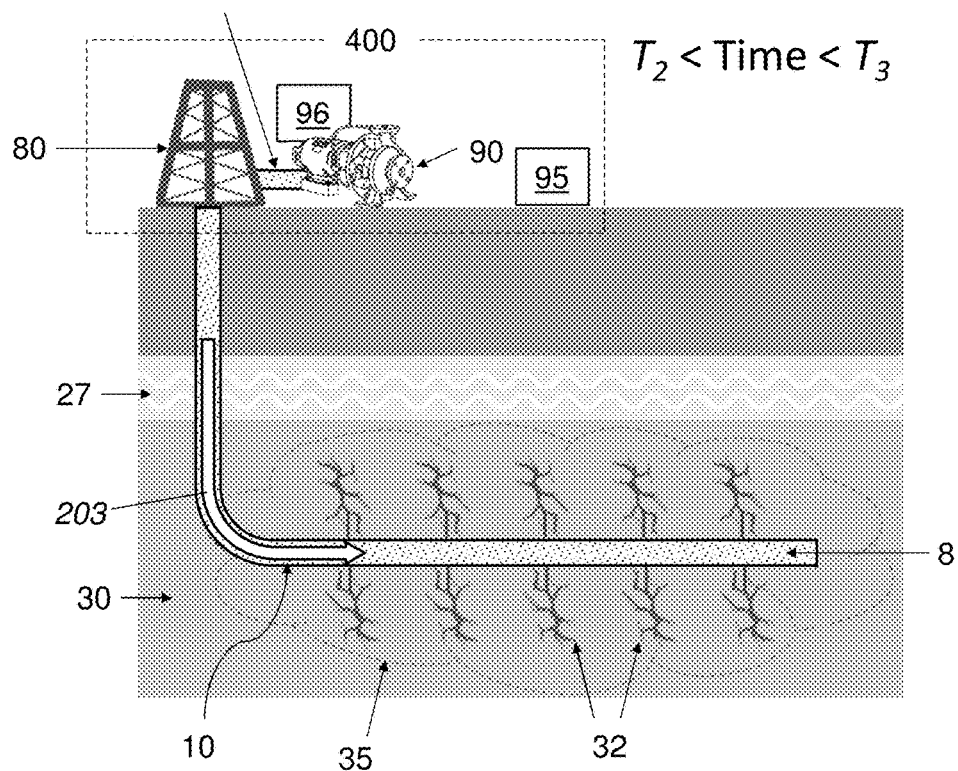
FIG. 56 is a schematic illustration showing injection of hydrogen gas through a horizontal wellbore into a geological formation, according to embodiments of the present invention.

Step S304 takes place during the fourth stage of the timeline, between Time=T$_2$ and Time=T$_3$. As shown in the example of FIG. 56, where injection of the hydrogen 8 is represented schematically by the directional arrow 203, hydrogen-gas-pumping arrangements 90 are provided in fluid communication with the reservoir 35 via wellbore 10. In embodiments, the reservoir 35 and wellbore 10 are the same reservoir 35 and wellbore 10 as in FIGS. 48 and 50.

The skilled artisan will understand that the transition from the third stage of recovering methane to the fourth stage of injecting hydrogen at Time=T$_2$ can involve one or more preparatory steps performed between Steps S303 and S304 of the method. For example, it can be desirable to close valves at the surface to cause pressure in the reservoir 35 to reach an equilibrium pressure. This can include closing the valves at the surface to end gas recovery, and allowing time for the wellhead pressure to increase from a flowing wellhead pressure to a shut-in wellhead pressure. Over a period of weeks the shut-in wellhead pressure rises to an equilibrium pressure that is approximately equal to reservoir pressure.

The injection of the hydrogen gas 8, e.g., pure H$_2$, or a hydrogen-containing gas that includes at least 99% H$_2$ or at least 98% H$_2$, or at least 97% H$_2$, or at least 96% H$_2$, or at least 95% H$_2$, is at a pressure higher than the current gas pressure at the wellhead 18, e.g., the shut-in wellhead pressure at a stabilized reservoir-equilibrium pressure, so as to ensure that the hydrogen gas 8 propagates throughout the well, i.e., including the hydraulic fractures 32 and natural cracks. In some embodiments, the injection of hydrogen gas is at a pressure that is at least 100 PSI higher than the current shut-in gas pressure at the wellbore 10 or at least 200 PSI higher, or at least 300 PSI higher, or at least 400 PSI higher, or at least 500 psi higher, or at least 800 PSI higher. In embodiments, the initial injecting of the hydrogen gas 8 is at a pressure below the maximum gas-recovery pressure PRESSURE$_{MAX}$ of Step S302, or 50 or more PSI lower than PRESSURE$_{MAX}$, or 100 or more PSI lower than PRESSURE$_{MAX}$, or 200 or more PSI lower than PRESSURE$_{MAX}$. In embodiments, the initial injecting of the hydrogen gas 8 is at a pressure below a hydrogen fracture extension pressure H$_2$FRAC$_{EXT}$ at which the injection of the hydrogen gas 8 would cause extension of the existing fractures, including those propagated during the hydraulic fracturing of Step S301. The hydrogen fracture extension pressure H$_2$FRAC$_{EXT}$ is different than the FRAC$_{EXT}$ of fracturing fluid discussed in Step S301 because of the weight of the hydraulic column and the fluid friction. In some embodiments, H$_2$FRAC$_{EXT}$ can be computed from FRAC$_{EXT}$, e.g., to act as a pressure limit during hydrogen injection. In other embodiments, H$_2$FRAC$_{EXT}$ can be measured using a diagnostic fracture injection test (DFIT), or it can be measured by microseismic monitoring.

In embodiments, the injection of hydrogen gas 8 is at a pressure that is not higher than the hydrogen-injection fracture extension pressure H$_2$FRAC$_{EXT}$. Inter alia, this limitation is useful for avoiding, at least partly, damage outside the wellbore 10 and the extension and broadening of the existing hydraulic fractures 32, for example to prevent the release of additional free methane in and from the newly expanded fractures which affects the hydrogen purity during hydrogen production, and to prevent hydrogen loss to the formation. In some embodiments, the injecting of the hydrogen gas 8 is at a pressure that is at least 200 PSI or at least 500 PSI less than H2FRAC$_{EXT}$. In some embodiments, the initial injecting of the hydrogen gas 8 is at a pressure just below H$_2$FRAC$_{EXT}$. In an example, the injecting of the hydrogen gas includes injecting the hydrogen gas at a pressure that is 100 PSI less than H2FRAC$_{EXT}$. In some embodiments, surface geophysical monitoring, i.e., geophysical monitoring of the geological structure from the surface, is performed during hydrogen injection to determine whether hydraulic fractures 32 are being extended by the hydrogen injection. According to non-limiting examples, surface geophysical monitoring can include the use of surface geophysical monitoring equipment 95 such as microseismic arrays or tiltmeters. Gas phase tracers may also be added to the injected hydrogen 8 to see whether there is any communication of the hydrogen with adjacent production wells on the wellhead. Suitable gas phase tracers are tritiated hydrogen such as HT or T$_2$ in the range of 3 to 30×10^10 Becquerel (Bq) that may be detected at extremely low concentrations in nearby production wells. According to a non-limiting example, a tracer-gas facility 96 for adding a gas-phase tracer to the injected hydrogen gas 8 is provided at or near the wellhead 10.

The injection of the hydrogen gas of Step S304 is initiated responsively to—and contingent upon—a determination, based on the monitoring or Step S303, that an isotopic signature has reached a projected trigger criterion for triggering a transition of the unconventional reservoir 35 from recovering the methane-containing gas 5 to injecting a hydrogen gas 8. For example, a carbon isotope ratio in the methane gas produced from the shale gas reservoir 35 changes over time during the commercial life of the unconventional gas reservoir, and the inventors have found that these changes, when can be monitored in order to project matching a 'trigger criterion' that can be used, according to embodiments, to trigger a transition to injecting H$_2$ into the reservoir.

Step S305

Figure 55:
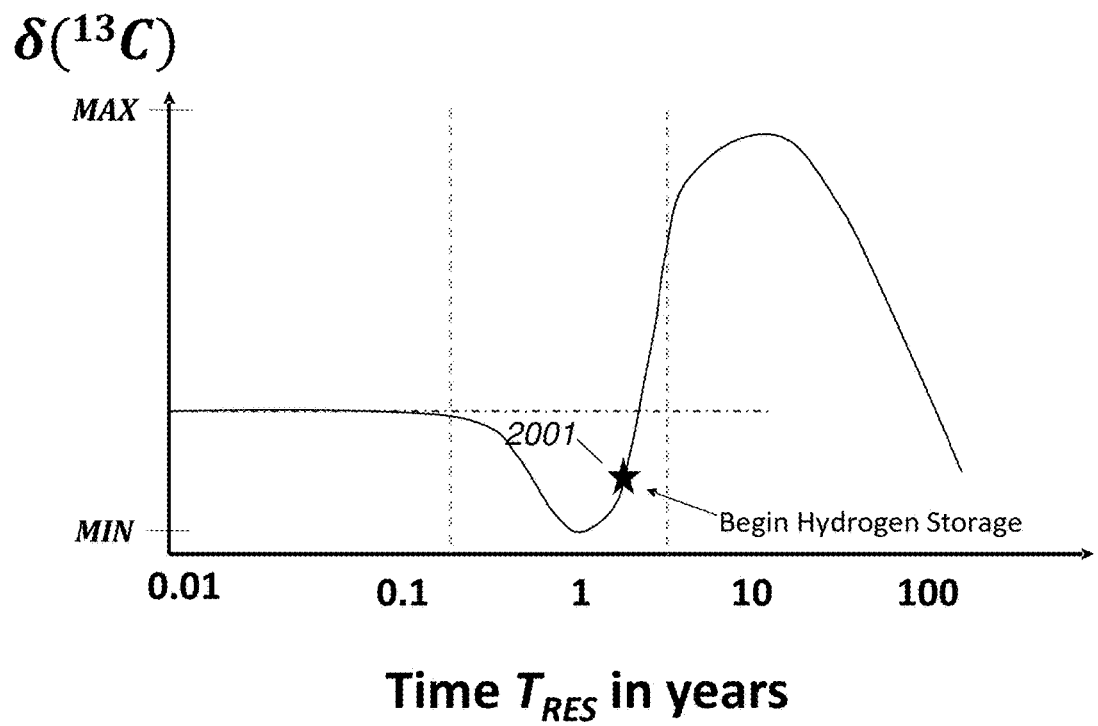
FIG. 55 is a chart showing an exemplary graphs of a projected δ($^{13}$C) isotopic signature of the gas reservoir over time, according to embodiments of the present invention.

Step S305 includes recovering stored hydrogen gas 8 through the wellbore 10, during the fifth stage of the timeline, between Time=T$_3$ and Time=T$_4$. As shown in the example of FIG. 55, where recovery of the hydrogen-containing gas 8 is represented schematically by the directional arrow 204, hydrogen-gas-recovery equipment 80 is provided in fluid communication with the reservoir 35 via wellbore 10. In embodiments, the reservoir 35 and wellbore 10 are the same reservoir 35 and wellbore 10 as in FIGS. 48, 50 and 54. The recovered hydrogen-containing gas 8 can include, as illustrated schematically in FIG. 56, bulk-phase H$_2$ in hydraulic fractures, H$_2$ in kerogen pore spaces, H$_2$ adsorbed on kerogen surfaces, H$_2$ dissolved in kerogen, and/or bulk-phase H$_2$ contained in the non-organic pores or adsorbed on clays of the matrix of the geological formation 30.

According to the method, the recovered hydrogen-containing gas 8 has an H$_2$ molar fraction of at least 85%. The H$_2$ molar fraction of the recovered gas can be directly impacted by the selection of the reservoir in the first stage, e.g., selection of a kerogen-rich reservoir, and/or selection of a kerogen-rich reservoir with low permeability, as the terms have been defined herein. The H$_2$ molar fraction of the recovered gas can be directly impacted by the selection of a flow-rate trigger criterion FLOW$_{TRIGGER}$ with respect to the current flow rate $FLOW_{CURRENT}$ of natural gas for initiating the injection of hydrogen gas into the reservoir to begin the fourth stage. In embodiments, $FLOW_{TRIGGER}$ is chosen to correspond to a state of the reservoir in which pore methane and kerogen-adsorbed methane is largely already recovered, such that the hydrogen gas replaces the methane in the faster-recovery locations of the shale formation. The proper selection of a $FLOW_{TRIGGER}$ in terms of the timing of the initiating can lead to avoiding significant contamination of the $H_2$ by $CH_4$ in the pore spaces or desorbed from kerogen surfaces, and thus the recovered hydrogen can be of higher purity, where purity refers to the $H_2$ molar fraction of the recovered gas. In various examples, the purity is at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%. In embodiments, the remainder of the gas, i.e., after subtracting the $H_2$ molar fraction, is at least predominantly $CH_4$.

In some embodiments, not all the steps S301, S302, S303, S304, S305 of the method, including respective sub-steps are performed.

Referring again to FIGS. 56 and 57, a system 400 for storing and subsequently recovering a hydrogen-containing gas 8 comprises pumping arrangements 80 for the hydrogen-containing gas 8. The pumping arrangements 80 are in fluid communication with the wellbore 10 and are configured to inject hydrogen gas 8 therethrough into the hydraulically-fractured reservoir 35. In some embodiments, kerogen concentration in the reservoir is at least 1% by volume, or at least 2%, or at least 3%. The pumping arrangements 80 include pumps and compressors, piping (e.g., piping 12), power equipment, and other equipment as necessary for injecting the hydrogen gas 8. The pumping arrangements 80 are configured to inject the hydrogen 8 at a pressure higher than a current shut-in gas pressure at the wellbore. According to embodiments, the reservoir 35 is partially depleted by a methane-containing-gas recovery process.

Figure 57:
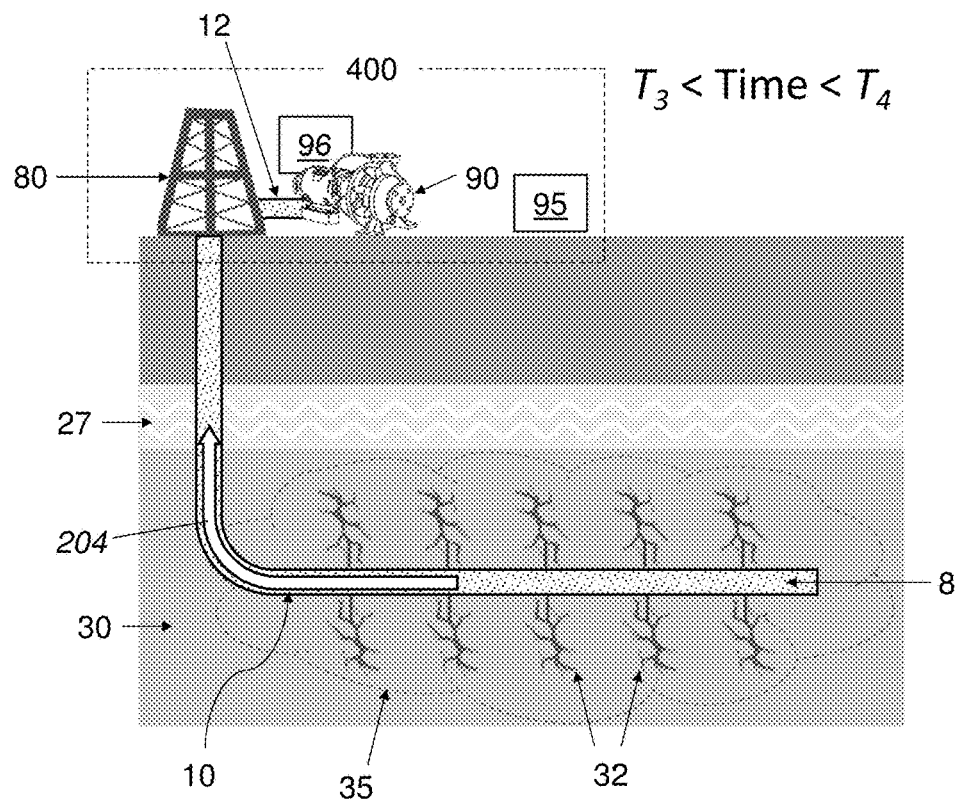
FIG. 57 is a schematic illustration showing recovery of a hydrogen-containing gas from a geological formation through a horizontal wellbore, according to embodiments of the present invention.

The gas-recovery process of the reservoir 35 is characterized, as illustrated schematically in FIG. 57, by a stretched exponential, or in some embodiments, hyperbolic, decline in gas recovery rate from a peak flow rate of $FLOW_{MAX}$ to a minimum flow rate of $FLOW_{MIN}$ which at least 10% of $FLOW_{MAX}$ and not more than 15% of $FLOW_{MAX}$. In embodiments, $FLOW_{MIN}$ is at least 10% of $FLOW_{MAX}$ and not more than 20% of $FLOW_{MAX}$. In other embodiments, $FLOW_{MIN}$ is at least 15% of $FLOW_{MAX}$ and not more than 20% of $FLOW_{MAX}$. In some embodiments, the fluid flow regime of the reservoir is substantially diffusional. The phrase 'substantially diffusional' means that at least 50% of the gas recovered at the end of the gas recovery process was from diffusion. or at least 60%, or at least 70%, or at least 80%, or at least 90%, or at least 95%. In various examples, the diffusion includes Knudsen, surface and/or solution diffusion.

The system 400 additionally comprises gas-recovery equipment 80, also in fluid communication with the reservoir 35 though the wellbore 10. The gas-recovery equipment 80 is operative to recover a portion of the stored hydrogen-containing gas 8 through the wellbore 10. The system is operable such that the recovered portion of the hydrogen-containing gas 8 has an $H_2$ molar fraction of at least 85%. In various examples, the $H_2$ molar fraction is at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%. In embodiments, the remainder of the gas, i.e., after subtracting the $H_2$ molar fraction, is at least predominantly $CH_4$.

In some embodiments, the pumping arrangements 80 are operative to inject the hydrogen-containing gas 8 at a pressure that is at least 500 PSI higher than the current shut-in gas pressure at the wellbore 10. In some embodiments, the pumping arrangements 90 are operative to inject the hydrogen-containing gas 8 at a pressure that is no more than 100 PSI less than a maximum wellhead pressure of the gas-recovery process of the reservoir 35, $PRESSURE_{MAX}$. In some embodiments, the pumping arrangements 90 are operative to inject the hydrogen-containing gas 8 at a pressure that is no more than 50 PSI less than $PRESSURE_{MAX}$.

In some embodiments, the system 400 additionally includes surface geophysical-monitoring equipment for determining whether hydraulic fractures, e.g., one or more hydraulic fractures, are being extended by the hydrogen injection. Suitable examples of surface geophysical-monitoring equipment include microseismic arrays and tiltmeters.

Referring now to FIG. 58A, a method is disclosed for storing and recovering a hydrogen gas in a kerogen-rich unconventional gas reservoir. As illustrated by the flowchart in FIG. 58A, the method comprises Steps S311, S312, S313, S314, and S315, all of which are discussed in the following paragraphs. A suitable system for use in performing the method is the system 400 described above in connection with FIGS. 56 and 57.

Step S311

Step S311 includes injecting a fracturing fluid through a horizontal wellbore into the geological formation to cause fracturing within the geological formation. Arrangements for injecting a fracturing fluid into a geological formation are illustrated schematically in FIG. 48. A geological formation 30, shown in accordance with the description hereinabove of the second stage between Time=$T_0$ and Time=$T_1$, includes an organic-rich shale deposit (also called a shale formation). Hydraulic fracturing equipment 70 is disposed at a wellhead 18. The wellhead 18 is located at a wellpad 19 and is in fluid communication with an unconventional gas reservoir 35 located within the shale formation 30, which in the non-limiting example of FIG. 48 is below the water table 27.

Step S312

Step S312 includes recovering a methane-containing gas 5 through the wellbore. Referring to FIG. 50, gas-recovery activity at the wellhead 18 is illustrated during the third stage of the timeline of FIG. 46, i.e., between Time=$T_1$ and Time=$T_2$. As indicated by directional arrow 202, natural gas 5 is recovered through the wellbore 10 from the reservoir 35, including from the hydraulic fractures 32, and processed by gas recovery equipment 80 which is in fluid communication with the wellbore 10 at the wellhead 18. Recovery of the gas 5 reaches a maximum pressure $PRESSURE_{MAX}$ after a short period (weeks or months) after gas recovery begins, and declines thereafter.

Step S313

Step S313 includes projecting an $H_2$ molar fraction $\chi(H_2)_{RES}(T_{RES})$ of a hydrogen-containing gas recovered from the unconventional gas reservoir 35 at each of a plurality of corresponding reservoir pressures $PRESSURE_{RES}(T_{RES})$ at respective reservoir times $T_{RES}$.

The projecting is done on the basis of $H_2$ molar fraction values $\chi(H_2)_{CS}$ measured in gas recovered from a core sample in a core-sample chamber (or, equivalently, core-sample holder), e.g., in a laboratory. The core sample is taken from the unconventional reservoir 35, a kerogen-rich geological formation, in which hydrogen is to be stored. In some embodiments, the core sample is taken from or near a specific well 11 of interest.

According to embodiments, Step S313 is performed by carrying out two sub-steps S313A and S313B, which are illustrated in the flowchart of FIG. 58B:

Step S313A: sampling a recovered hydrogen-containing gas from a gas-reservoir core sample held in the core-sample holder, to determine a plurality of core-sample value-pairs— an $H_2$ molar fraction value $\chi(H_2)_{CS}(T_{CS})$ and a respective core-sample pressure value $PRESSURE_{CS}(T_{CS})$—for respective core-sample times $T_{CS}$.

The laboratory apparatus 500 of FIGS. 51A-51B can also be used for performing Step S313A.

In some embodiments, Step S313A includes introducing a hydrogen-containing gas for which an $H_2$ molar fraction $\chi(H_2)$ is known, into a core-sample holder 511. As discussed in the following paragraphs, the hydrogen-containing gas is introduced into the core-sample holder 511 at a sampling point 1990 representing an off-gassing time $T_{CS}$ (unless a different re-saturation pressure is used, in which case adjustments can be made to the calculation, e.g., based on core-sample pressures $PRESSURE_{CS}$.

An $H_2$ molar fraction $\chi(H_2)_{CS}$ corresponds to a pressure $PRESSURE_{CS}$ in the core-sample holder at any time $T_{CS}$. $T_{CS}$ represents, for example, how much time has elapsed since the beginning of off-gassing of natural gas by the core sample in a particular off-gassing session in the core-sample chamber. An off-gassing session of the core sample can be brought about through different procedures. For any of such procedures, the first off-gassing session is managed as follows: Because a core sample taken from the unconventional gas reservoir is mostly depleted of natural gas by the time it reaches the lab, it is re-saturated with natural gas, e.g., to reservoir pressure, and allowed to equilibrate. The natural gas is then allowed to produce until a first sampling point e.g., point $1990_1$ in FIG. 59, which shows several sampling points 1990 at various core-sample points of time $T_{CS}$. Hydrogen gas is then injected back up to the initial reservoir pressure, or other selected initial core-sample pressure. $H_2$ gas is recovered from the core sample, and the $H_2$ fraction is measured, producing a 'core-sample value pair' for each point 1990, the value pair including a core-sample pressure $PRESSURE_{CS}(T_{CS})$ and an $H_2$ molar fraction $\chi(H_2)_{CS}(T_{CS})$.

According to a first exemplary procedure, following the first sampling, the hydrogen and residual natural gas are evacuated from the core sample, e.g., by lowering the pressure to atmospheric pressure, evacuating the core sample under vacuum, and raising the temperature until all degassing stops. At this stage, the same core sample is re-saturated with natural gas up to the reservoir pressure, and the general process repeats for the next $H_2$ injection and sampling.

According to a second exemplary procedure, a new core sample, e.g., one taken from the unconventional gas reservoir adjacent to the first core sample, can be used for a subsequent $H_2$ injection at a later sampling point 1990. This alternative may be quicker than fully desaturating a single core sample many times, but involves taking multiple core samples from the unconventional gas reservoir 35.

Either of the two procedures can be repeated until a hydrogen-purity trigger is reached by a measured or calculated value of $\chi(H_2)_{CS}(T_{CS})$ In embodiments, it can be preferable to re-saturate the core sample with natural gas to the same pressure each time for ease of tracking, i.e., so that an off-gassing time $T_{CS}$ of one cycle is comparable to an off-gassing time $T_{CS}$ of another cycle. In some cases this is not necessary if the new pressure is higher than the intended sampling pressure. In such cases, adjustments to the procedure can be made based on comparing core-sample pressures $PRESSURE_{CS}$ without depending on the corresponding times $T_{CS}$.

Both the $H_2$ molar fraction $\chi(H_2)_{CS}(T_{CS})$ and the $PRESSURE_{CS}(T_{CS})$ are measured at each time $T_{CS}$. When an $H_2$-purity trigger criterion is reached, e.g., a desired value of $H_2$ purity for hydrogen to be recovered from storage in the reservoir 35, the corresponding core-sample pressure value $PRESSURE_{CS}$ for the same time $T_{CS}$ is used for setting the 'given' reservoir pressure $PRESSURE_{RES}$.

FIG. 59 illustrates a non-limiting example of a periodic sampling regime. FIG. 59 shows a series of points 1990 along the x-axis, which represents time $T_{CS}$, in hours, since the beginning of off-gassing of a given core sample 550. As described earlier, each point 1990 represents a different off-gassing session, whether of the same core sample 550 or of a substitute core sample used, e.g., to save the time of completely desaturating the previous one. The y-axis represents values of hydrogen purity, i.e., ($H_2$ molar fraction, $\chi(H_2)_{CS}$, in the recovered hydrogen for each $T_{CS}$ value. A hydrogen-purity trigger point 2005 is the specific point ($T_{CS}$ value) 1990 at which the measured/calculated $H_2$ molar fraction $\chi(H_2)_{CS}$ reaches a predetermined trigger criterion.

Step S313B: matching $PRESSURE_{RES}(T_{RES})$ values with respective $PRESSURE_{CS}(T_{CS})$ values, to project $\chi(H_2)_{RES}(T_{RES})$ values based on $\chi(H_2)_{CS}(T_{CS})$ values corresponding to the matched respective $PRESSURE_{CS}(T_{CS})$ values.

In Step S313A, both the hydrogen-purity value $\chi(H_2)_{CS}(T_{CS})$ and the $PRESSURE_{CS}(T_{CS})$ are measured at each time $T_{CS}$. When a hydrogen-purity trigger criterion is reached, e.g., a desired value of hydrogen-purity value $\chi(H_2)_{CS}$, the corresponding core-sample pressure value $PRESSURE_{CS}$ for the same time $T_{CS}$ is used for setting the 'given' reservoir pressure $PRESSURE_{RES}$. Thus, measuring the reservoir pressure $PRESSURE_{RES}(T_{RES})$ at the reservoir at a time $T_{RES}$ indicates that the $H_2$ molar fraction $\chi(H_2)_{RES}(T_{RES})$ in the reservoir at the time $T_{RES}$ corresponds to reaching the hydrogen-purity trigger criterion in the reservoir. The nomenclature $T_{RES}$ is introduced to differentiate elapsed time of gas recovery in the reservoir ($T_{RES}$) from elapsed time of gas recovery from a core sample ($T_{CS}$), e.g., in a laboratory. The reservoir times $T_{RES}$ can be any time during the second stage, i.e., recovery of methane-containing gas 5 from the reservoir 35. $T_{RES}$ can be measured, for example, as the time elapsed from the beginning of gas recovery at Time=$T_1$, which can be at the beginning of Step S312.

Figure 60:
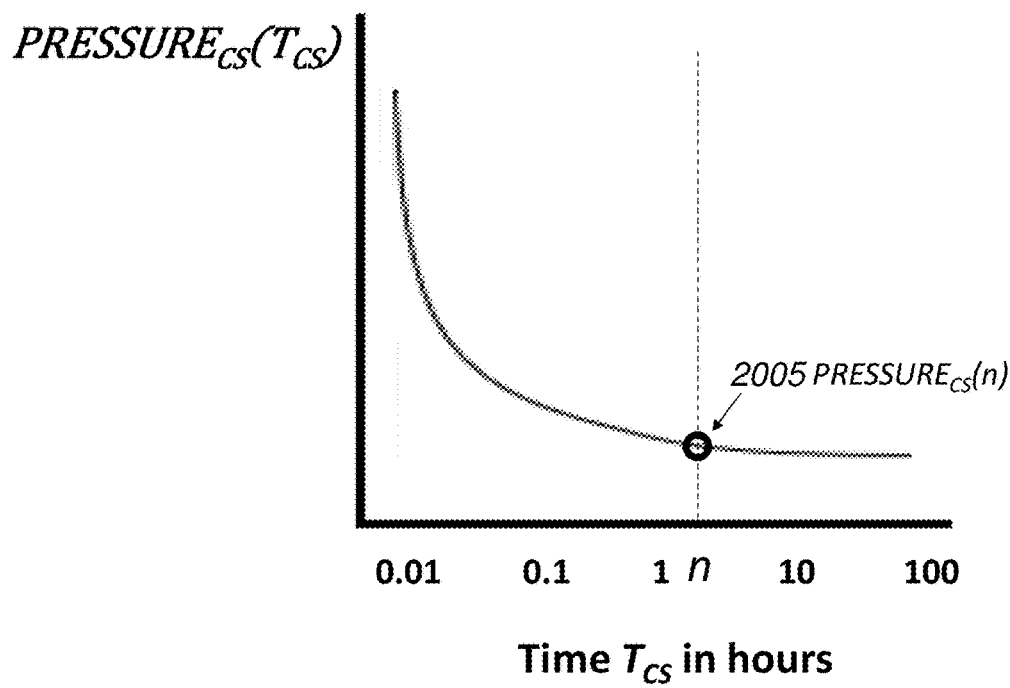
FIGS. 60 and 61 are charts showing exemplary graphs of a gas pressure over time, of a core sample from an unconventional gas reservoir and of the gas reservoir, respectively, according to embodiments of the present invention.
Figure 61:
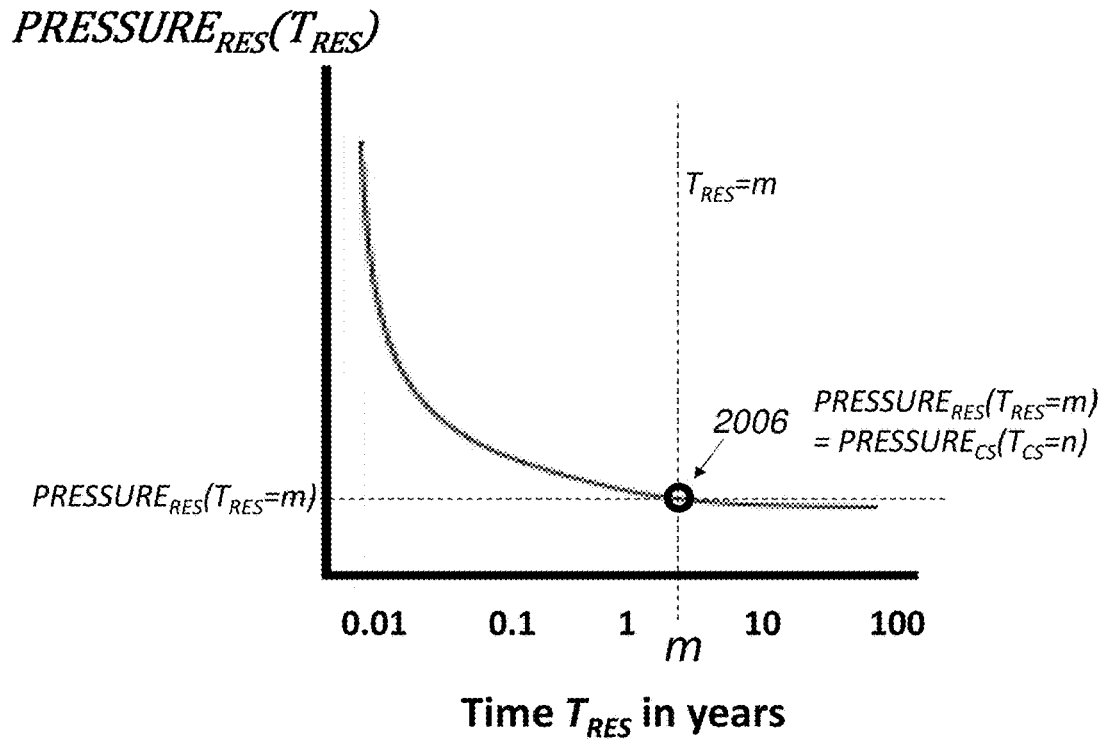

We now refer to FIGS. 59, 60, and 61. These figures, when taken together, can be used to illustrate the process of Step S313B. FIG. 59, as mentioned previously, illustrates the identification of a hydrogen-purity trigger point 2005 in the core-sample laboratory 500. The hydrogen-purity trigger point 2005 corresponds to a core-sample value pair for the respective core-sample time $T_{CS}$ of hydrogen-purity trigger point 2005.

As shown in FIG. 60, The core-sample pair for the hydrogen-purity trigger point 2005 at time $T_{CS}$=n corresponds to a core sample pressure of $PRESSURE_{CS}(T_{CS}=n)$ and a hydrogen-purity value $\chi(H_2)_{CS}(T_{CS}=n)$, which matches (or exceeds) the hydrogen-purity trigger value.

In the reservoir 35, as shown in FIG. 61, the reservoir pressure $PRESSURE_{RES}(T_{RES})$ is monitored, and at time $T_{RES}$=m, the reservoir pressure $PRESSURE_{RES}(T_{RES}=m)$ matches the core sample pressure $PRESSURE_{CS}(T_{CS}=n)$ of hydrogen-purity trigger point 2005 of FIG. 60. At the point where the pressures match, as indicated by $T_{RES}$ point 2006 at $T_{RES}=m$, the reservoir hydrogen-purity value $\chi(H_2)_{RES}$ ($T_{RES}=m$), equals the hydrogen-purity trigger value $\chi(H_2)_{CS}(T_{CS}=n)$, i.e., the core-sample hydrogen-purity value corresponding to the hydrogen-purity trigger value 2005 of FIG. 60.

Step S314

Step S314 includes injecting hydrogen gas through the wellbore 10 according to an isotopic-signature trigger criterion, based upon hydrogen-purity value $\chi(H_2)_{RES}$ ($T_{RES}=m$) projected in Step S313. According to the method, it can be desirable to initiate injection of hydrogen into a partially-depleted well at $T_{RES}=m$, corresponding to the isotope-trigger point 2006 of FIG. 61.

Step S314 takes place during the fourth stage of the timeline, between Time=$T_2$ and Time=$T_3$. As shown in the example of FIG. 56, where injection of the hydrogen 8 is represented schematically by the directional arrow 203, hydrogen-gas-pumping arrangements 90 are provided in fluid communication with the reservoir 35 via wellbore 10. In embodiments, the reservoir 35 and wellbore 10 are the same reservoir 35 and wellbore 10 as in FIGS. 48 and 50.

The skilled artisan will understand that the transition from the third stage of recovering methane to the fourth stage of injecting hydrogen at Time=$T_2$ can involve one or more preparatory steps performed between Steps S313 and S314 of the method. For example, it can be desirable to close valves at the surface to cause pressure in the reservoir 35 to reach an equilibrium pressure. This can include closing the valves at the surface to end gas recovery, and allowing time for the wellhead pressure to increase from a flowing wellhead pressure to a shut-in wellhead pressure. Over a period of weeks the shut-in wellhead pressure rises to an equilibrium pressure that is approximately equal to reservoir pressure.

The injection of the hydrogen gas 8, e.g., pure $H_2$, or a hydrogen-containing gas that includes at least 99% $H_2$, or at least 98% $H_2$, or at least 97% $H_2$, or at least 96% $H_2$, or at least 95% $H_2$, is at a pressure higher than the current gas pressure at the wellhead 18, e.g., the shut-in wellhead pressure at a stabilized reservoir-equilibrium pressure, so as to ensure that the hydrogen gas 8 propagates throughout the well, i.e., including the hydraulic fractures 32 and natural cracks. In some embodiments, the injection of hydrogen gas is at a pressure that is at least 100 PSI higher than the current shut-in gas pressure at the wellbore 10 or at least 200 PSI higher, or at least 300 PSI higher, or at least 400 PSI higher, or at least 500 psi higher, or at least 800 PSI higher. In embodiments, the initial injecting of the hydrogen gas 8 is at a pressure below the maximum gas-recovery pressure $PRESSURE_{MAX}$ of Step S302, or 50 or more PSI lower than $PRESSURE_{MAX}$, or 100 or more PSI lower than $PRESSURE_{MAX}$, or 200 or more PSI lower than $PRESSURE_{MAX}$. In embodiments, the initial injecting of the hydrogen gas 8 is at a pressure below a hydrogen fracture extension pressure $H_2FRAC_{EXT}$ at which the injection of the hydrogen gas 8 would cause extension of the existing fractures, including those propagated during the hydraulic fracturing of Step S301. The hydrogen fracture extension pressure $H_2FRAC_{EXT}$ is different than the $FRAC_{EXT}$ of fracturing fluid discussed in Step S301 because of the weight of the hydraulic column and the fluid friction. In some embodiments, $H_2FRAC_{EXT}$ can be computed from $FRAC_{EXT}$, e.g., to act as a pressure limit during hydrogen injection. In other embodiments, $H_2FRAC_{EXT}$ can be measured using a diagnostic fracture injection test (DFIT), or it can be measured by microseismic monitoring.

In embodiments, the injection of hydrogen gas 8 is at a pressure that is not higher than the hydrogen-injection fracture extension pressure $H_2FRAC_{EXT}$. Inter alia, this limitation is useful for avoiding, at least partly, damage outside the wellbore 10 and the extension and broadening of the existing hydraulic fractures 32, for example to prevent the release of additional free methane in and from the newly expanded fractures which affects the hydrogen purity during hydrogen production, and to prevent hydrogen loss to the formation. In some embodiments, the injecting of the hydrogen gas 8 is at a pressure that is at least 200 PSI or at least 500 PSI less than $H2FRAC_{EXT}$. In some embodiments, the initial injecting of the hydrogen gas 8 is at a pressure just below $H2FRAC_{EXT}$. In an example, the injecting of the hydrogen gas includes injecting the hydrogen gas at a pressure that is 100 PSI less than $H2FRAC_{EXT}$. In some embodiments, surface geophysical monitoring, i.e., geophysical monitoring of the geological structure from the surface, is performed during hydrogen injection to determine whether hydraulic fractures 32 are being extended by the hydrogen injection. According to non-limiting examples, surface geophysical monitoring can include the use of surface geophysical monitoring equipment 95 such as microseismic arrays or tiltmeters. Gas phase tracers may also be added to the injected hydrogen 8 to see whether there is any communication of the hydrogen with adjacent production wells on the wellhead. Suitable gas phase tracers are tritiated hydrogen such as HT or $T_2$ in the range of 3 to 30×10^10 Becquerel (Bq) that may be detected at extremely low concentrations in nearby production wells. According to a non-limiting example, a tracer-gas facility 96 for adding a gas-phase tracer to the injected hydrogen gas 8 is provided at or near the wellhead 10.

According to embodiments, the injection of the hydrogen gas of Step S314 is initiated responsively to—and contingent upon—a determination, based on the results of Step S313, that a hydrogen-purity value has reached a projected trigger criterion for triggering a transition of the unconventional reservoir 35 from recovering the methane-containing gas 5 to injecting a hydrogen gas 8.

Step S315

Step S315 includes recovering stored hydrogen gas 8 through the wellbore 10, during the fifth stage of the timeline, between Time=$T_3$ and Time=$T_4$. As shown in the example of FIG. 55, where recovery of the hydrogen-containing gas 8 is represented schematically by the directional arrow 204, hydrogen-gas-recovery equipment 80 is provided in fluid communication with the reservoir 35 via wellbore 10. In embodiments, the reservoir 35 and wellbore 10 are the same reservoir 35 and wellbore 10 as in FIGS. 48, 50 and 54. The recovered hydrogen-containing gas 8 can include, as illustrated schematically in FIG. 56, bulk-phase $H_2$ in hydraulic fractures, $H_2$ in kerogen pore spaces, $H_2$ adsorbed on kerogen surfaces, $H_2$ dissolved in kerogen, and/or bulk-phase $H_2$ contained in the non-organic pores or adsorbed on clays of the matrix of the geological formation 30.

According to the method, the recovered hydrogen-containing gas 8 has an $H_2$ molar fraction of at least 85%. The $H_2$ molar fraction of the recovered gas can be directly impacted by the selection of the reservoir in the first stage, e.g., selection of a kerogen-rich reservoir, and/or selection of a kerogen-rich reservoir with low permeability, as the terms have been defined herein. The $H_2$ molar fraction of the recovered gas can be directly impacted by the selection of a flow-rate trigger criterion $FLOW_{TRIGGER}$ with respect to the current flow rate $FLOW_{CURRENT}$ of natural gas for initiating the injection of hydrogen gas into the reservoir to begin the fourth stage. In embodiments, $FLOW_{TRIGGER}$ is chosen to correspond to a state of the reservoir in which pore methane and kerogen-adsorbed methane is largely already recovered, such that the hydrogen gas replaces the methane in the faster-recovery locations of the shale formation. The proper selection of a $FLOW_{TRIGGER}$ in terms of the timing of the initiating can lead to avoiding significant contamination of the $H_2$ by $CH_4$ in the pore spaces or desorbed from kerogen surfaces, and thus the recovered hydrogen can be of higher purity, where purity refers to the $H_2$ molar fraction of the recovered gas. In various examples, the purity is at least 85%, or at least 86%, or at least 87%, or at least 88%, or at least 89%, or at least 90%, or at least 91%, or at least 92%, or at least 93%, or at least 94%, or at least 95%, or at least 96%, or at least 97%, or at least 98%, or at least 99%. In embodiments, the remainder of the gas, i.e., after subtracting the $H_2$ molar fraction, is at least predominantly $CH_4$.

In some embodiments, not all the steps S311, S312, S313, S314, S315 of the method, as well as respective sub-steps, are performed.

Referring now to FIG. 62, a method is disclosed for projecting an isotope ratio $I\text{-}RATIO_{RES}$ respective of one or more molecular components in a methane-containing gas recovered from a kerogen-rich unconventional gas reservoir. As illustrated by the flowchart in FIG. 62, the method comprises Steps S321, S322, S323, S324, and S325, which are discussed in the following paragraphs.

The laboratory apparatus 500 of FIGS. 51A-51B can be used for performing Steps S321, S322, S323, and S324.

Step S321: receiving a core sample obtained from a gas reservoir 35 in a core-sample holder 511. In an exemplary procedure, the core sample 550 is first dried and weighed, then placed in the temperature-controlled core sample holder 511. The core sample 550 delivered from the unconventional gas reservoir 35 is mostly depleted of natural gas by the time it reaches the lab. In the lab, it must be re-saturated with natural gas at a reservoir pressure and allowed to equilibrate. In an example, the core sample 550 is re-saturated to an initial reservoir pressure of the reservoir 35 from which it is taken. In another example, the core sample 550 is re-saturated to the $PRESSURE_{RES}$ of the reservoir 35 at the time that the core sample 550 was taken. In another example, the core sample 550 is re-saturated to a pressure of the reservoir 35 at the time of the re-saturating in the core-sample holder 511. In embodiments, it can be desirable for the pressure of the re-saturation in the core-sample holder 511 to match a relevant pressure in the reservoir, while in other embodiments, arithmetic adjustments can be made to calculations of Step S323 to overcome any discrepancy between an initial core-sample holder pressure $PRESSURE_{CS}$ and an unmatched reservoir pressure $PRESSURE_{RES}$.

Step S322: introducing into the core-sample holder 511, a methane-containing gas for which an isotope ratio I-RATIO is known.

Examples of suitable isotope ratio values $I\text{-}RATIO_{RES}$ include, and not exhaustively: a $\delta(^{13}C)$ isotopic signature based on a ratio of $^{13}C$ to $^{12}C$ (or vice versa), and an isotopic-signature trigger criterion based on a deuterium-isotope ratio of a hydrocarbon-molecule component found in the methane containing gas. Suitable examples of a hydrocarbon-molecule component include, and not exhaustively: methane ($CH_4$), where the isotopic-signature trigger criterion relates to monodeuterated methane: $CH_3D/CH_4$ or $CH_3D/(CH_4+CH_3D)$; ethane ($C_2H_6$), where the isotopic-signature trigger criterion relates to monodeuterated ethane: $C_2H_5D/C_2H_6$ or $C_2H_5D/(C2H_6+C_2H_5D)$; propane ($C_3H_8$), where the isotopic-signature trigger criterion relates to monodeuterated propane: $C_3H_7D/C_3H_8$ or $C_3H_7D/(C3H_8+C_3H_7D)$; butane ($C_4H_{10}$), where the isotopic-signature trigger criterion relates to monodeuterated butane: $C_4H_9D/C_4H_{10}$ or $C_4H_9D/(C_4H_{10}+C_4H_9D)$; and pentane ($C_5H_{12}$), where the isotopic-signature trigger criterion relates to monodeuterated pentane: $C_5H_{11}D/C_5H_{12}$ or $C_5H_{11}D/(C_5H_{12}+C_5H_{11}D)$. Collectively, methane, ethane, propane, butane, and pentane are members of the C1-C5 alkane group, and monodeuterated methane, monodeuterated ethane, monodeuterated propane, monodeuterated butane and monodeuterated pentane are members of the monodeuterated C1-C5 alkane group.

The introducing includes regulating an internal gas pressure of the core-sample holder to an initial core-sample pressure $PRESSURE_{CS\text{-}INIT}$. In the non-limiting example of FIGS. 51A-B, two gases are provided for testing: He 522 and $CH_4$ 523, although in some other exemplary laboratory setups (not shown) other gases such as ethane ($C_2H_6$), propane ($C_3H_8$), butane ($C_4H_{10}$) or pentane ($C_5H_{12}$) are used in the same manner as described here for $CH_4$, mutatis mutandis. The $CH_4$ gas 523 (for example) can have a known (i.e., measured) $^{13}C/^{12}C$ isotopic ratio and/or a measured $CH_3D/CH_4$ isotopic ratio (a deuterated-to-non-deuterated methane ratio).

Step S323 periodically sample a gas mixture produced by the core sample in the core-sample holder at a core-sample pressure $PRESSURE_{CS}(T_{CS})$. The periodicity of the sampling need not be constant during the off-gassing process. Any number or timing of sampling times $T_{CS}$ may be selected. In an exemplary analytical procedure, after pressure in the core-sample holder 511 is brought to a predetermined pressure that matches the initial pressure in the conventional gas reservoir 35 from which the core sample 550 was taken, the core sample is sealed in by the shutoff valve 525 and allowed to equilibrate with the methane gas 523. After equilibration, the off-gassing core sample is then allowed to produce gas through the PCV 508. Sampling (and analysis) of the gas produced in the core sample holder 511 of the lab setup 500 of FIGS. 51A-B as required for the sampling to be carried out periodically and at different pressures, for example with gas sampling cylinders 565.

Step S324 determine a core-sample isotope ratio $I\text{-}RATIO_{CS}(T_{CS})$ of the sampled gas mixture for each periodic sampling at respective values of $PRESSURE_{CS}(T_{CS})$. A core-sample value-pair can be measured and/or calculated for each respective core-sample time $T_{CS}$, where each core-sample value-pair includes a core-sample isotope ratio $I\text{-}RATIO_{CS}(T_{CS})$ value and a respective core-sample pressure value $PRESSURE_{CS}(T_{CS})$. The $\delta(^{13}C)$ and/or the $\delta(CH_3D/CH_4)$— or in other examples, $\delta(C_2H_5D/C_2H_6)$ or $\delta(C_3H_7D/C_3H_8)$ isotope ratios in the gas sampling cylinders are measured by gas chromatography and isotope ratio mass spectrometry 550.

Step S325 projecting a reservoir isotope ratio $I\text{-}RATIO_{RES}(T_{RES})$ value for a gas recovered from the gas reservoir at a corresponding reservoir pressure $PRESSURE_{RES}(T_{RES})$ at respective reservoir times $T_{RES}$, by using a recorded plurality of core-sample value pairs each including a $I\text{-}RATIO_{CS}(T_{CS})$ value and a corresponding $PRESSURE_{CS}(T_{CS})$ value In some embodiments, $PRESSURE_{CS\text{-}INIT}$ equals $PRESSURE_{RES\text{-}INIT}$, and the projecting includes projecting a $I\text{-}RATIO_{RES}(T_{RES})$ value as being equal to a $I\text{-}RATIO_{CS}(T_{CS})$ value of a given core-sample value pair, for a corresponding reservoir pressure $PRESSURE_{RES}(T_{RES})$ equal to a $PRESSURE_{CS}(T_{CS})$ value of the same given core-sample value pair. In some embodiments, $PRESSURE_{CS-INIT}$ is not equal to $PRESSURE_{RES-INIT}$, and the projecting includes adjusting a projected value of $I-RATIO_{RES}(T_{RES})$ for a difference between $PRESSURE_{CS-INIT}$ and $PRESSURE_{RES-INIT}$.

In some embodiments, not all the steps S321, S322, S323, S324, and S325 of the method are performed.

Referring now to FIG. 63, a method is disclosed for projecting an $H_2$ molar fraction $\chi(H_2)_R$ of a hydrogen-containing gas recovered from storage in a kerogen-rich unconventional gas reservoir. As illustrated by the flowchart in FIG. 63, the method comprises Steps S331, S332, S333, and S334, which are discussed in the following paragraphs.

The laboratory apparatus 500 of FIGS. 51A-51B can be used for performing Step S331, S332, and S333.

Step S331: receiving a core sample obtained from a gas reservoir in a core-sample holder. In an exemplary procedure, the core sample 550 is first dried and weighed, then placed in the temperature-controlled core sample holder 511.

Step S332: periodically sampling a gas mixture comprising a hydrogen-containing gas produced by the core sample in the core-sample holder at a core-sample pressure $PRESSURE_{CS}(T_{CS})$.

In some embodiments, Step S332 includes introducing a hydrogen-containing gas for which an $H_2$ molar fraction $\chi(H_2)$ is known, into a core-sample holder 511. As discussed in the following paragraphs, the hydrogen-containing gas is introduced into the core-sample holder 511 at a sampling point representing a specific off-gassing time $T_{CS}$. $T_{CS}$ represents, for example, how much time has elapsed since the beginning of off-gassing of natural gas by the core sample in a particular off-gassing session in the core-sample chamber. An off-gassing session of the core sample can be brought about through different procedures.

For any of such procedures, the first off-gassing session is managed as follows: Because a core sample taken from the unconventional gas reservoir is mostly depleted of natural gas by the time it reaches the lab, it is re-saturated with natural gas, e.g., to reservoir pressure, and allowed to equilibrate. The natural gas is then allowed to off-gas until a first sampling point at a first time $T_{CS}$. Hydrogen gas is then injected into the core-sample holder 511 back up to the initial reservoir pressure, or other selected initial core-sample pressure. A hydrogen-containing gas is then recovered from the core sample, and the $H_2$ fraction of the recovered gas is measured.

According to a first exemplary procedure, following the first sampling, the hydrogen and residual natural gas are evacuated from the core sample, e.g., by lowering the pressure to atmospheric pressure, evacuating the core sample under vacuum, and raising the temperature until all degassing stops. At this stage, the same core sample is re-saturated with natural gas up to the reservoir pressure, and the general process repeats for the next $H_2$ injection and Step S332 sampling.

According to a second exemplary procedure, a new core sample, e.g., one taken from the unconventional gas reservoir adjacent to the first core sample, can be used for a subsequent $H_2$ injection at a later sampling point. This alternative may be quicker than fully desaturating a single core sample many times, but involves taking multiple core samples from the unconventional gas reservoir 35.

In embodiments, it can be preferable to re-saturate the core sample with natural gas to the same pressure each time for ease of tracking, i.e., so that an off-gassing time $T_{CS}$ of one sampling 'cycle' is comparable to an off-gassing time $T_{CS}$ of another sampling cycle. In some cases this is not necessary if the new pressure is higher than the intended sampling pressure. In such cases, adjustments to the procedure can be made, e.g., based on comparing core-sample pressures $PRESSURE_{CS}$ without depending on the corresponding times $T_{CS}$.

Step S333: determining a core-sample $H_2$ molar fraction $\chi(H_2)_{CS}(T_{CS})$ of the sampled gas mixture for each of a plurality of samplings. For each sampling in Step S333, a 'core-sample value pair' is produced, the value pair including a core-sample pressure $PRESSURE_{CS}(T_{CS})$, and an $H_2$ molar fraction $\chi(H_2)_{CS}(T_{CS})$.

Step S334 projecting a reservoir isotope ratio $\chi(H_2)_{RES}(T_{RES})$ value for a hydrogen-containing gas recovered from the reservoir at a corresponding reservoir pressure $PRESSURE_{RES}(T_{RES})$, by using a recorded plurality of core-sample value pairs each including a $\chi(H_2)_{CS}(T_{CS})$ value and a corresponding $PRESSURE_{CS}(T_{CS})$ value.

In some embodiments, $PRESSURE_{CS-INIT}$ equals $PRESSURE_{RES-INIT}$, and the projecting includes projecting a $\chi(H_2)_{RES}(T_{RES})$ value as being equal to a $\chi(H_2)_{CS}(T_{CS})$ value of a given core-sample value pair, for a corresponding reservoir pressure $PRESSURE_{RES}(T_{RES})$ equal to a $PRESSURE_{CS}(T_{CS})$ value of the same given core-sample value pair. In some embodiments, $PRESSURE_{CS-INIT}$ is not equal to $PRESSURE_{RES-INIT}$, and the projecting includes adjusting a projected value of $\chi(H_2)_{RES}(T_{RES})$ for a difference between $PRESSURE_{CS-INIT}$ and $PRESSURE_{RES-INIT}$.

In some embodiments, not all the steps S331, S332, S333, and S334 of the method are performed.

Any of the method steps disclosed herein can be combined with any other method steps, any such combinations being within the scope of the embodiments. Any of the disclosed embodiments can be combined in any practical manner. In any of the disclosed methods, not all of the steps need be performed. Any of the steps of any of the disclosed methods can be combined in any way to create combinations not explicitly disclosed and any such combinations are within the scope of the invention.

Additional Discussion

Some presently-disclosed embodiments relate, inter alia, to the following inventive concepts.

Inventive concept 1. A method of operating a kerogen-rich unconventional gas reservoir characterized by there being multiple hydraulically-fractured wells drilled thereinto, the method comprising: a. recovering a methane-containing gas from a first hydraulically-fractured well drilled into the gas reservoir; b. steam-methane reforming the recovered methane-containing gas to yield a hydrogen gas and an inorganic carbon-containing gas; c. injecting at least a portion of the hydrogen gas into a second hydraulically-fractured well drilled into the gas reservoir; and d. injecting at least a portion of the inorganic carbon-containing gas into a third hydraulically-fractured well drilled into the gas reservoir.

Inventive concept 2. The method of Inventive concept 1, additionally comprising: recovering, from the second hydraulically-fractured well, a hydrogen-containing gas having an $H_2$ molar fraction of at least 85%.

Inventive concept 3. The method of either one of Inventive concepts 1 or 2, wherein the second hydraulically-fractured well is partially depleted by a methane-containing-gas recovery process characterized by (i) a maximum flow rate and (ii) a minimum flow rate that is not more than 20% of the maximum flow rate.

Inventive concept 4. The method of any one of the preceding Inventive concepts, wherein the third hydraulically-fractured well is partially depleted by a methanecontaining-gas recovery process characterized by (i) a maximum flow rate and (ii) a minimum flow rate that is at least 10% of the maximum flow rate.

Inventive concept 5. The method of any one of the preceding Inventive concepts, additionally comprising, after the injecting of at least a portion of the inorganic carbon-containing gas into the third hydraulically-fractured well: further recovering, from the third hydraulically-fractured well, a methane-containing gas.

Inventive concept 6. The method of any one of Inventive concepts 2 to 5, wherein the steam-methane reforming uses energy produced from a portion of the recovered hydrogen-containing gas.

Inventive concept 7. The method of Inventive concept 6, wherein at least a portion of the produced energy is in the form of heat.

Inventive concept 8. The method of Inventive concept 7, wherein the heat is generated by combusting a gas mixture comprising hydrogen and methane.

Inventive concept 9. The method of Inventive concept 8, wherein the combusted gas mixture comprises a portion of the recovered hydrogen.

Inventive concept 10. The method of any one of Inventive concepts 2 to 9, additionally comprising: generating electricity from a portion of the recovered hydrogen-containing gas.

Inventive concept 11. The method of Inventive concept 10, wherein the electricity is generated using a gas turbine.

Inventive concept 12. The method of Inventive concept 10, wherein the electricity is generated using a reciprocating engine.

Inventive concept 13. The method of Inventive concept 10, wherein the electricity is generated using a fuel cell.

Inventive concept 14. The method of any one of Inventive concepts 10 to 13, wherein a portion of the generated electricity is used in the steam-methane reforming.

Inventive concept 15. The method of any one of Inventive concepts 10 to 13, wherein a majority of the generated electricity is delivered to a distribution network of an electric utility.

Inventive concept 16. The method of any one of Inventive concepts 10 to 15, wherein the electricity is generated from a gas mixture comprising methane and hydrogen.

Inventive concept 17. The method of any one of the preceding Inventive concepts, additionally including: performing surface geophysical monitoring to determine whether hydraulic fractures are being extended by the injecting of the hydrogen gas or of the inorganic carbon-containing gas.

Inventive concept 18. The method of any one of the preceding Inventive concepts, wherein the multiple hydraulically-fractured wells are non-communicating and non-intersecting with each other.

Inventive concept 19. The method of any one of the preceding Inventive concepts, additionally including: employing a gas phase tracer to verify that hydraulic fractures of a given hydraulically-fractured well drilled into the gas reservoir do not extend into a fracture that is in fluid communication with a different hydraulically-fractured well drilled into the gas reservoir.

Inventive concept 20. The method of any one of the preceding Inventive concepts, wherein the inorganic carbon-containing gas includes carbon dioxide.

Inventive concept 21. The method of any one of the preceding Inventive concepts, wherein the inorganic carbon-containing gas includes carbon monoxide.

Inventive concept 22. The method of any one of Inventive concepts 2 to 21, wherein the recovered hydrogen-containing gas has an $H_2$ molar fraction of at least 90%.

Inventive concept 23. The method of any one of Inventive concepts 2 to 21, wherein the recovered hydrogen-containing gas has an $H_2$ molar fraction of at least 95%.

Inventive concept 24. The method of any one of Inventive concepts 2 to 21, wherein the recovered hydrogen-containing gas has an $H_2$ molar fraction of at least 97%.

Inventive concept 25. A method of operating a kerogen-rich unconventional gas reservoir characterized by there being multiple hydraulically-fractured wells drilled thereinto, the method comprising: a. receiving a methane-containing gas; b. steam-methane reforming the methane-containing gas to yield a hydrogen gas and an inorganic carbon-containing gas; c. injecting at least a portion of the hydrogen gas into a first hydraulically-fractured well drilled into the gas reservoir; and d. injecting at least a portion of the inorganic carbon-containing gas into a second hydraulically-fractured well drilled into the gas reservoir.

Inventive concept 26. The method of Inventive concept 25, additionally comprising: separating the yielded hydrogen gas from the yielded inorganic carbon-containing gas.

Inventive concept 27. The method of either one of Inventive concepts 25 or 26, additionally comprising: recovering, from the first hydraulically-fractured well, a hydrogen-containing gas having an $H_2$ molar fraction of at least 85%.

Inventive concept 28. The method of any one of Inventive concepts 25 to 27, wherein the first hydraulically-fractured well is partially depleted by a methane-containing-gas recovery process characterized by (i) a maximum flow rate and (ii) a minimum flow rate that is not more than 20% of the maximum flow rate.

Inventive concept 29. The method of any one of Inventive concepts 25 to 28, wherein the second hydraulically-fractured well is partially depleted by a methane-containing-gas recovery process characterized by (i) a maximum flow rate and (ii) a minimum flow rate that is at least 10% of the maximum flow rate.

Inventive concept 30. The method of any one of Inventive concepts 25 to 29, additionally comprising, after the injecting of at least a portion of the inorganic carbon-containing gas into the second hydraulically-fractured well: further recovering, from the second hydraulically-fractured well, a methane-containing gas.

Inventive concept 31. The method of any one of Inventive concepts 27 to 30, wherein the steam-methane reforming uses energy produced from a portion of the recovered hydrogen-containing gas.

Inventive concept 32. The method of Inventive concept 31, wherein a portion of the produced energy is in the form of heat.

Inventive concept 33. The method of Inventive concept 32, wherein the heat is generated by a combusting a gas mixture comprising methane and hydrogen.

Inventive concept 34. The method of Inventive concept 33, wherein the combusted gas mixture comprises a portion of the recovered hydrogen.

Inventive concept 35. The method of any one of Inventive concepts 27 to 34, additionally comprising: generating electricity from a portion of the recovered hydrogen-containing gas.

Inventive concept 36. The method of Inventive concept 35, wherein the electricity is generated using a gas turbine.

Inventive concept 37. The method of Inventive concept 35, wherein the electricity is generated using a reciprocating engine.

Inventive concept 38. The method of Inventive concept 35, wherein the electricity is generated using a fuel cell.

Inventive concept 39. The method of any one of Inventive concepts 35 to 38, wherein a portion of the generated electricity is used in the steam-methane reforming.

Inventive concept 40. The method of any one of Inventive concepts 35 to 38, wherein a majority of the generated electricity is delivered to a distribution network of an electric utility.

Inventive concept 41. The method of any one of Inventive concepts 33 to 40, wherein the electricity is generated from a gas mixture comprising methane and hydrogen.

Inventive concept 42. The method of any one of Inventive concepts 25 to 41, additionally including: performing surface geophysical monitoring to determine whether hydraulic fractures are being extended by the injecting of the hydrogen gas or of the inorganic carbon-containing gas.

Inventive concept 43. The method of any one of Inventive concepts 25 to 42, wherein the multiple hydraulically-fractured wells are non-communicating and non-intersecting with each other.

Inventive concept 44. The method of any one of Inventive concepts 25 to 43, additionally including: employing a gas phase tracer to verify that hydraulic fractures of a given hydraulically-fractured well drilled into the gas reservoir do not extend into a fracture that is in fluid communication with a different hydraulically-fractured well drilled into the gas reservoir.

Inventive concept 45. The method of any one of Inventive concepts 25 to 44, wherein the inorganic carbon-containing gas includes carbon dioxide.

Inventive concept 46. The method of any one of Inventive concepts 25 to 44, wherein the inorganic carbon-containing gas includes carbon monoxide.

Inventive concept 47. The method of any one of Inventive concepts 27 to 46, wherein the recovered hydrogen-containing gas has an $H_2$ molar fraction of at least 90%.

Inventive concept 48. The method of any one of Inventive concepts 27 to 46, wherein the recovered hydrogen-containing gas has an $H_2$ molar fraction of at least 95%.

Inventive concept 49. The method of any one of Inventive concepts 27 to 46, wherein the recovered hydrogen-containing gas has an $H_2$ molar fraction of at least 97%.

Inventive concept 50. The method of any one of Inventive concepts 25 to 49, wherein the received methane-containing gas is recovered from a third hydraulically-fractured well drilled into the gas reservoir.

Inventive concept 51. The method of any one of Inventive concepts 25 to 50, wherein the received methane-containing gas is received from a pipeline.

Inventive concept 52. A method of operating a kerogen-rich unconventional gas reservoir characterized by there being multiple hydraulically-fractured wells drilled thereinto by multiple hydraulically-fractured wells, the method comprising: a. receiving a methane-containing gas; b. steam-methane reforming the methane-containing gas to yield a hydrogen gas and an inorganic carbon-containing gas; c. injecting at least a portion of the hydrogen gas into a first hydraulically-fractured well drilled into the gas reservoir; d. injecting at least a portion of the inorganic carbon-containing gas into a second hydraulically-fractured well drilled into the gas reservoir; e. recovering, from the first hydraulically-fractured well, a hydrogen-containing gas having an $H_2$ molar fraction of at least 85%; and f. generating electricity from at least a portion of the recovered hydrogen-containing gas.

Inventive concept 53. The method of Inventive concept 52, wherein at least a portion of the received methane-containing gas is recovered from a third hydraulically-fractured well drilled into the gas reservoir.

Inventive concept 54. The method of either one of Inventive concepts 52 or 53, wherein at least a portion of the received methane-containing gas is recovered from the second hydraulically-fractured well after the injecting of the at least a portion of the inorganic carbon-containing gas into the second hydraulically-fractured well.

Inventive concept 55. The method of any one of Inventive concepts 52 to 54, wherein at least a portion of the received methane-containing gas is received from a pipeline.

Inventive concept 56. The method of any one of Inventive concepts 52 to 55, wherein the steam-methane reforming uses energy produced from a portion of the recovered hydrogen-containing gas.

Inventive concept 57. The method of Inventive concept 56, wherein at least a portion of the produced energy is in the form of heat.

Inventive concept 58. The method of Inventive concept 57, wherein the heat is generated by combusting a gas mixture comprising hydrogen and methane.

Inventive concept 59. The method of Inventive concept 58, wherein the combusted gas mixture comprises a portion of the recovered hydrogen.

Inventive concept 60. The method of any one of Inventive concepts 52 to 59, wherein the electricity is generated using a gas turbine.

Inventive concept 61. The method of any one of Inventive concepts 52 to 60, wherein the electricity is generated using a reciprocating engine.

Inventive concept 62. The method of any one of Inventive concepts 52 to 61, wherein the electricity is generated using a fuel cell.

Inventive concept 63. The method of any one of Inventive concepts 52 to 62, wherein a portion of the generated electricity is used in the steam-methane reforming.

Inventive concept 64. The method of any one of Inventive concepts 52 to 62, wherein a majority of the generated electricity is delivered to a distribution network of an electric utility.

Inventive concept 65. The method of any one of Inventive concepts 52 to 64, wherein the electricity is generated from a gas mixture comprising methane and hydrogen.

Inventive concept 66. A system for producing, storing and subsequently recovering a hydrogen-containing gas, the system comprising: a. a steam-methane reformer for receiving and steam-reforming a methane-containing gas to yield a hydrogen gas and an inorganic carbon-containing gas; b. pumping arrangements for the hydrogen-containing gas, disposed in fluid communication with a first partially-depleted, hydraulically-fractured well drilled into a kerogen-rich, unconventional reservoir of the methane-containing gas, and operative to inject the hydrogen gas through a respective horizontal wellbore into the first hydraulically-fractured well at a pressure higher than a current gas pressure at the wellbore, the partial depletion of the first hydraulically-fractured well being by a methane-containing-gas recovery process characterized by a maximum flow rate of $FLOW_{MAX}$, and a minimum flow rate of $FLOW_{MIN}$ that is at least 10% of $FLOW_{MAX}$ and not more than 20% of $FLOW_{MAX}$; c. pumping arrangements for the inorganic carbon-containing gas, disposed in fluid communication with a second partially-depleted, hydraulically-fractured well drilled into the kerogen-rich, unconventional reservoir, and operative to inject the hydrogen gas through a respective horizontal wellbore into the second hydraulically-fractured well at a pressure higher than a current gas pressure at the wellbore, the partial depletion of the second hydraulically-fractured well being by a methane-containing-gas recovery process characterized by a maximum flow rate of $FLOW_{MAX}$, and a minimum flow rate of $FLOW_{MIN}$ that is at least 10% of $FLOW_{MAX}$ and not more than 30% of $FLOW_{MAX}$; and d. gas-recovery equipment disposed in fluid communication with the first hydraulically-fractured well and operative to recover a portion of the hydrogen-containing gas through the respective horizontal wellbore, the recovered portion of the hydrogen-containing gas having an $H_2$ molar fraction of at least 85%.

Inventive concept 67. The system of Inventive concept 66, additionally including piping for delivering, to the steam-methane reformer, methane-containing gas recovered from a third partially-depleted, hydraulically-fractured well drilled into the kerogen-rich, unconventional reservoir.

Inventive concept 68. The system of either one of Inventive concepts 66 or 67, additionally including an electrical generator arranged to receive at least a portion of the recovered hydrogen-containing gas to generate electricity therefrom.

Inventive concept 69. The system of Inventive concept 68, wherein the electrical generator is also arranged to receive a least a portion of the yielded hydrogen gas from the steam-methane reformer.

Inventive concept 70. The system of any one of Inventive concepts 66 to 69, additionally including a separator facility for separating hydrogen gas from methane gas.

Inventive concept 71. The system of any one of Inventive concepts Inventive concept 66 to 70, additionally including a separator facility for separating hydrogen gas from an inorganic carbon-containing gas.

Inventive concept 72. The system of any one of Inventive concepts 66 to 70, additionally including electricity transmission arrangements for delivering electricity from the electrical generator to the steam-methane reformer.

Inventive concept 73. The system of any one of Inventive concepts 66 to 72, wherein the recovered portion of the hydrogen gas has an $H_2$ molar fraction of at least 90%.

Inventive concept 74. The system of any one of Inventive concepts 66 to 72, wherein the recovered portion of the hydrogen gas has an $H_2$ molar fraction of at least 95%.

Inventive concept 75. The system of any one of Inventive concepts 66 to 72, wherein the recovered portion of the hydrogen gas has an $H_2$ molar fraction of at least 97%.

Inventive concept 76. The system of any one of Inventive concepts 66 to 75, wherein a kerogen concentration in the reservoir is at least 2% by volume.

Inventive concept 77. The system of any one of Inventive concepts 66 to 76, additionally including surface geophysical-monitoring equipment for determining whether hydraulic fractures are being extended by the hydrogen injection.

Inventive concept 78. The system of any one of Inventive concepts 66 to 77, additionally including a tracer-gas facility for adding a gas-phase tracer to the injected hydrogen gas.

Inventive concept 79. The system of any one of Inventive concepts 66 to 78, additionally including a blending facility operative to yield a gas mixture with a preset $H_2$-to-$CH_4$ ratio.

Inventive concept 80. The system of Inventive concept 79, wherein the blending facility is in fluid communication with a pipeline.

Inventive concept 81. The system of either one of Inventive concepts 79 or 80, wherein the blending facility is in fluid communication with the electricity generator.

Inventive concept 82. A method of storing hydrogen gas in a kerogen-rich geological formation, the method comprising: a. injecting a fracturing fluid through a horizontal wellbore into the geological formation to cause fracturing within the geological formation; b. recovering a methane-containing gas through the wellbore, the recovering characterized by a maximum flow rate $FLOW_{MAX}$; c. monitoring a current flow rate $FLOW_{CURRENT}$ of the recovered methane-containing gas over time; d. responsively to and contingent upon the monitored $FLOW_{CURRENT}$ being equal to or less than a flow-rate trigger criterion $FLOW_{TRIGGER}$, injecting a hydrogen gas through the wellbore into the geological formation at a pressure higher than a current shut-in gas pressure at the wellbore; and e. recovering, through the wellbore, a hydrogen-containing gas having an $H_2$ molar fraction of at least 85%, wherein $FLOW_{TRIGGER}$ is equal to at least 10% of $FLOW_{MAX}$ and not more than 20% of $FLOW_{MAX}$.

Inventive concept 83. The method of Inventive concept 82, wherein $FLOW_{TRIGGER}$ is equal to at least 10% of $FLOW_{MAX}$ and not more than 15% of $FLOW_{MAX}$.

Inventive concept 84. The method of either one of Inventive concepts 82 or 83, wherein $FLOW_{TRIGGER}$ is selected based on a kerogen concentration in the geological formation.

Inventive concept 85. The method of any one of Inventive concepts 82 to 84, wherein $FLOW_{TRIGGER}$ is selected based on a fluid flow regime of the geological formation.

Inventive concept 86. The method of Inventive concept 85 wherein the fluid flow regime of the geological formation is substantially characterized by diffusional processes.

Inventive concept 87. The method of Inventive concept 86 wherein the fluid flow regime of the geological formation is substantially Knudsen diffusion.

Inventive concept 88. The method of any one of Inventive concepts 85 to 87 wherein the fluid flow regime in the reservoir is monitored by a delta(C13) isotope ratio in the produced methane.

Inventive concept 89. The method of any one of Inventive concepts 82 to 88, wherein (i) the recovering of the methane-containing gas is additionally characterized by a maximum wellhead pressure of $PRESSURE_{MAX}$, and (ii) the injecting of the hydrogen gas includes injecting the hydrogen gas at a pressure that is 100-or-more PSI lower than $PRESSURE_{MAX}$.

Inventive concept 90. The method of any one of Inventive concepts 82 to 89, wherein the injecting of the hydrogen gas includes injecting the hydrogen gas at a pressure that is at least 500 PSI higher than the current shut-in gas pressure at the wellbore.

Inventive concept 91. The method of any one of Inventive concepts 82 to 90, wherein the injecting of the hydrogen gas is at a pressure that is less than a calculated hydrogen fracture extension pressure $H_2FRAC_{EXT}$ within the geological formation.

Inventive concept 92. The method of any one of Inventive concepts 82 to 91, wherein surface geophysical monitoring is performed during hydrogen injection to determine whether hydraulic fractures are being extended by the hydrogen injection.

Inventive concept 93. The method of any one of Inventive concepts 82 to 92, wherein the injecting of the hydrogen gas is at a pressure that is at least 500 PSI less than a calculated hydrogen fracture extension pressure $H_2FRAC_{EXT}$ at the wellhead.

Inventive concept 94. The method of any one of Inventive concepts 82 to 93, wherein a gas phase tracer is used to determine whether hydraulic fractures extend into a fracture that is in fluid communication with a second wellbore.

Inventive concept 95. The method of any one of Inventive concepts 82 to 94, wherein the monitoring of the current flow rate $FLOW_{CURRENT}$ includes determining the flow regime in the reservoir.

Inventive concept 96. The method of any one of Inventive concepts 82 to 95, wherein the recovered hydrogen-containing gas has an $H_2$ molar fraction of at least 90%.

Inventive concept 97. The method of any one of Inventive concepts 82 to 96, wherein the recovered hydrogen-containing gas has an $H_2$ molar fraction of at least 95%.

Inventive concept 98. The method of any one of Inventive concepts 82 to 97, wherein the recovered hydrogen-containing gas has an $H_2$ molar fraction of at least 97%.

Inventive concept 99. The method of any one of Inventive concepts 82 to 98, wherein the kerogen concentration of the kerogen-rich geological formation is at least 2% by volume.

Inventive concept 100. A method of storing and subsequently recovering a hydrogen gas, the method comprising: a. injecting the hydrogen gas through a horizontal wellbore into a hydraulically-fractured, kerogen-rich, and partially-depleted reservoir of a methane-containing gas, at a pressure higher than a current gas pressure at the wellbore, the partial depletion of the reservoir being by a methane-containing-gas recovery process characterized by a maximum flow rate of $FLOW_{MAX}$, and a minimum flow rate of $FLOW_{MIN}$ that is at least 10% of $FLOW_{MAX}$ and not more than 20% of $FLOW_{MAX}$; b. recovering a portion of the hydrogen gas through the wellbore, the recovered portion of the hydrogen gas having an $H_2$ molar fraction of at least 85%.

Inventive concept 101. The method of Inventive concept 100, wherein FLOW/wry is equal to at least 10% of $FLOW_{MAX}$ and not more than 15% of $FLOW_{MAX}$.

Inventive concept 102. The method of either one of Inventive concepts 100 or 101, additionally comprising a step, performed before the injecting of the hydrogen gas, of selecting the reservoir based on a kerogen concentration in the reservoir.

Inventive concept 103. The method of either one of Inventive concepts 100 or 101, additionally comprising a step, performed before the injecting of the hydrogen gas, of selecting the reservoir based on a fluid flow regime of the reservoir.

Inventive concept 104. The method of Inventive concept 103 wherein the fluid flow regime of the geological formation is substantially characterized by diffusional processes.

Inventive concept 105. The method of Inventive concept 104 wherein the fluid flow regime of the geological formation is substantially Knudsen diffusion.

Inventive concept 106. The method of any one of Inventive concepts 100 to 105, wherein (i) the methane-containing-gas recovery process is additionally characterized by a maximum wellhead pressure of $PRESSURE_{MAX}$, and (ii) the injecting of the hydrogen gas includes injecting the hydrogen gas at a pressure that is 100-or-more PSI less than $PRESSURE_{MAX}$.

Inventive concept 107. The method of any one of Inventive concepts 100 to 106, wherein the injecting of the hydrogen gas includes injecting the hydrogen gas at a pressure that is at least 500 PSI higher than the current shut-in gas pressure at the wellbore.

Inventive concept 108. The method of any one of Inventive concepts 100 to 107 wherein the injecting of the hydrogen gas includes surface geophysical monitoring to verify that hydraulic fractures are not being extended by the injecting.

Inventive concept 109. The method of any one of Inventive concepts 100 to 108, wherein a gas phase tracer is used to verify that hydraulic fractures do not extend into a fracture that is in fluid communication with a second wellbore.

Inventive concept 110. The method of any one of Inventive concepts 100 to 109, wherein the recovered portion of the hydrogen gas has an $H_2$ molar fraction of at least 90%.

Inventive concept $11_1$. The method of any one of Inventive concepts 100 to 110, wherein the recovered portion of the hydrogen gas has an $H_2$ molar fraction of at least 95%.

Inventive concept 112. The method of any one of Inventive concepts 100 to $11_1$, wherein the recovered portion of the hydrogen gas has an $H_2$ molar fraction of at least 97%.

Inventive concept $11_3$. The method of any one of Inventive concepts 100 to 112, wherein the kerogen concentration in the reservoir is at least 2% by volume.

Inventive concept 114. A system for storing and subsequently recovering a hydrogen-containing gas, the system comprising: a. pumping arrangements for hydrogen-containing gas, disposed in fluid communication with a hydraulically-fractured, kerogen-rich and partially-depleted reservoir of a methane-containing gas and operative to inject the hydrogen gas through a horizontal wellbore into the reservoir at a pressure higher than a current gas pressure at the wellbore, the partial depletion of the reservoir being by a methane-containing-gas recovery process characterized by a maximum flow rate of $FLOW_{MAX}$, and a minimum flow rate of FLOW/wry that is at least 10% of $FLOW_{MAX}$ and not more than 20% of $FLOW_{MAX}$; and b. gas-recovery equipment disposed in fluid communication with the reservoir and operative to recover a portion of the hydrogen-containing gas through the wellbore, the recovered portion of the hydrogen-containing gas having an $H_2$ molar fraction of at least 85%.

Inventive concept 115. The system of Inventive concept 114, wherein FLOW/wry is equal to at least 10% of $FLOW_{MAX}$ and not more than 15% of $FLOW_{MAX}$.

Inventive concept 116. The system of either one of Inventive concepts 114 or 115, wherein the fluid flow regime of the geological formation is substantially characterized by diffusional processes.

Inventive concept 117. The system of Inventive concept 116 wherein the fluid flow regime of the geological formation is substantially Knudsen diffusion.

Inventive concept 118. The system of any one of Inventive concepts 114 to 117, wherein (i) the methane-containing-gas recovery process is additionally characterized by a maximum wellhead pressure of $PRESSURE_{MAX}$, and (ii) the pumping arrangements are operative to inject the hydrogen-containing gas at a pressure that is 100-or-more PSI less than $PRESSURE_{MAX}$.

Inventive concept 119. The system of any one of Inventive concepts 114 to 118, wherein the pumping arrangements are operative to inject the hydrogen-containing gas at a pressure that is at least 500 PSI higher than the current shut-in gas pressure at the wellbore.

Inventive concept 120. The system of any one of Inventive concepts 114 to 119, additionally including surface geophysical-monitoring equipment for determining whether hydraulic fractures are being extended by the hydrogen injection.

Inventive concept 121. The system of any one of Inventive concepts 114 to 120, additionally including a tracer-gas facility for adding a gas-phase tracer to the injected hydrogen gas.

Inventive concept 122. The system of any one of Inventive concepts 114 to 121, wherein the recovered portion of the hydrogen gas has an $H_2$ molar fraction of at least 90%.

Inventive concept 123. The system of any one of Inventive concepts 114 to 121, wherein the recovered portion of the hydrogen gas has an $H_2$ molar fraction of at least 95%.

Inventive concept 124. The system of any one of Inventive concepts 114 to 121, wherein the recovered portion of the hydrogen gas has an $H_2$ molar fraction of at least 97%.

Inventive concept 125. The system of any one of Inventive concepts 114 to 124, wherein a kerogen concentration in the reservoir is at least 2% by volume.

Inventive concept 126. A method of storing and subsequently recovering hydrogen gas in a kerogen-rich unconventional gas reservoir, the method comprising: a. injecting a fracturing fluid through a horizontal wellbore into the geological formation to cause fracturing within the gas reservoir; b. recovering a methane-containing gas through the wellbore; c. monitoring an isotopic signature respective of at least one molecular component of the recovered methane-containing gas; d. responsively to and contingent upon reaching an isotopic-signature trigger criterion based upon the monitored isotopic signature, injecting hydrogen gas through the wellbore into the geological formation at a pressure higher than a shut-in gas pressure at a wellhead; and e. recovering, through the wellbore, a hydrogen-containing gas having an $H_2$ molar fraction of at least 85%.

Inventive concept 127. The method of Inventive concept 126, wherein the isotopic signature is based upon an isotope ratio, and the isotope ratio is $\delta(^{13}C)$.

Inventive concept 128. The method of Inventive concept 126, wherein the isotopic signature is based upon an isotope ratio having the form $\delta(C_XH_{Y-1}D/C_XH_Y)$.

Inventive concept 129. The method of any one of Inventive concepts 126 to 128, wherein the at least one molecular component comprises methane.

Inventive concept 130. The method of any one of Inventive concepts 126 to 128, wherein the at least one molecular component comprises ethane.

Inventive concept 131. The method any one of Inventive concepts 126 to 128, wherein the at least one molecular component comprises propane.

Inventive concept 132. The method of any one of Inventive concepts 126 to 128, wherein the at least one molecular component comprises butane.

Inventive concept 133. The method of any one of Inventive concepts 126 to 128, wherein the at least one molecular component comprises pentane.

Inventive concept 134. The method of Inventive concept 126, wherein (i) the isotopic signature is based upon an isotope ratio, and the isotope ratio is of the form $\delta(C_XH_{Y-1}D/C_AH_B)$, (ii) $C_XH_{Y-1}D$ is a monodeuterated molecule of a first hydrocarbon selected from a hydrocarbon group consisting of: methane, ethane, propane, butane and pentane hydrocarbon, and (iii) $C_AH_B$ is a non-deuterated molecule of a second hydrocarbon that is not the first hydrocarbon, selected from the hydrocarbon group.

Inventive concept 135. The method of Inventive concept 126, wherein (i) the isotopic signature has the form $\delta(EXP_1/EXP_2)$, (ii) $EXP_1$ is an expression representing a monodeuterated multi-alkane sum of respective concentrations of one or more of: monodeuterated ethane, monodeuterated propane, monodeuterated butane, and monodeuterated pentane, and (iii) $EXP_2$ is an expression representing a concentration of monodeuterated methane.

Inventive concept 136. The method of Inventive concept 126, wherein (i) the isotopic signature has the form $\delta(EXP_1/EXP_2)$, (ii) $EXP_1$ is an expression representing a monodeuterated-methane concentration, and (iii) $EXP_2$ is an expression representing a respective concentration of any one of: monodeuterated ethane, monodeuterated propane, monodeuterated butane, and monodeuterated pentane.

Inventive concept 137. The method of Inventive concept 126, wherein (i) the isotopic signature has the form $\delta(EXP_1/EXP_2)$, (ii) $EXP_1$ is an expression representing respective concentrations of one or more members of the monodeuterated C1-C5 alkane group consisting of monodeuterated methane, monodeuterated ethane, monodeuterated propane, monodeuterated butane, and monodeuterated pentane, and (iii) $EXP_2$ is an expression representing respective concentrations of one or more members of said monodeuterated C1-C5 alkane group with the exception of the one or more members represented in $EXP_1$.

Inventive concept 138. The method of Inventive concept 126, wherein (i) the isotopic signature has the form $\delta(EXP_1/EXP_2)$, (ii) $EXP_1$ is an expression representing any member of the monodeuterated C1-C5 alkane group consisting of monodeuterated methane, monodeuterated ethane, monodeuterated propane, monodeuterated butane, and monodeuterated pentane, and (iii) $EXP_2$ is an expression representing any other member of said monodeuterated C1-C5 alkane group.

Inventive concept 139. The method of Inventive concept 126, wherein the isotopic signature is based upon a ratio of isotope ratios and has the form $\delta(^{13}C)_{ALKANE1}/\delta(^{13}C)_{ALKANE2}$, where each of ALKANE1 and ALKANE2 includes an alkane selected from an alkane group consisting of: methane, ethane, propane, butane and pentane.

Inventive concept 140. The method of Inventive concept 139, wherein at least one of ALKANE1 and ALKANE2 includes an arithmetic combination of multiple alkanes selected from the alkane group.

Inventive concept 141. The method of any one of Inventive concepts 126 to 140, wherein monitoring the isotopic signature includes detecting a decrease in the isotope ratio from an initial value to a minimum value and, subsequently thereto, detecting an increase in the isotope ratio.

Inventive concept 142. The method of Inventive concept 141, wherein reaching the isotopic-signature-trigger criterion includes detecting an increase in the isotope ratio in at least two successive samples of the recovered methane-containing gas.

Inventive concept 143. The method of any one of Inventive concepts 126 to 142, wherein the injecting of the hydrogen gas is at a pressure that is less than a calculated hydrogen fracture extension pressure $H_2FRAC_{EXT}$ within the geological formation.

Inventive concept 144. The method of any one of Inventive concepts 126 to 143, wherein surface geophysical monitoring is performed during hydrogen injection to determine whether hydraulic fractures are being extended by the hydrogen injection.

Inventive concept 145. The method of any one of Inventive concepts 126 to 144, wherein a gas phase tracer is used to determine whether hydraulic fractures extend into a fracture that is in fluid communication with a second wellbore.

Inventive concept 146. The method of any one of Inventive concepts 126 to 145, wherein the recovered hydrogen-containing gas has an $H_2$ molar fraction of at least 90%.

Inventive concept 147. The method of any one of Inventive concepts 126 to 146, wherein the recovered hydrogen-containing gas has an $H_2$ molar fraction of at least 95%.

Inventive concept 148. The method of any one of Inventive concepts 126 to 147, wherein the recovered hydrogen-containing gas has an $H_2$ molar fraction of at least 97%.

Inventive concept 149. The method of any one of Inventive concepts 126 to 148, wherein the kerogen concentration of the kerogen-rich geological formation is at least 2% by volume.

Inventive concept 150. A method of storing and subsequently recovering hydrogen gas in a kerogen-rich, hydraulically-fractured unconventional gas reservoir, the method comprising: a. sampling, at a plurality of times, a methane-containing gas recovered from the geological formation through a horizontal wellbore; b. determining, from each sampling, an isotopic signature of a molecular component in the sampled methane-containing gas, the isotopic signature being based upon an isotope ratio; c. responsively to and contingent upon detecting an increase in the isotopic signature of at least two successive samplings, injecting hydrogen gas through the wellbore into the geological formation at a pressure higher than a shut-in gas pressure; and d. recovering, through the wellbore, a hydrogen-containing gas having an $H_2$ molar fraction of at least 85%.

151. The method of Inventive concept 150, wherein the isotope ratio is $\delta(^{13}C)$.

Inventive concept 152. The method of Inventive concept 150, wherein the isotope ratio is of the form $\delta(C_XH_{Y-1}D/C_XH_Y)$.

Inventive concept 153. The method of any one of Inventive concepts 150 to 152, wherein the molecular component comprises methane.

Inventive concept 154. The method of any one of Inventive concepts 150 to 152, wherein the molecular component comprises ethane.

Inventive concept 155. The method any one of Inventive concepts 150 to 152, wherein the molecular component comprises propane.

Inventive concept 156. The method of any one of Inventive concepts 150 to 152, wherein the molecular component comprises butane.

Inventive concept 157. The method of any one of Inventive concepts 150 to 152, wherein the molecular component comprises pentane.

Inventive concept 158. The method of Inventive concept 150, wherein (i) the isotopic signature is based upon an isotope ratio, and the isotopic ratio is of the form $\delta(C_XH_{Y-1}D/C_AH_B)$, (ii) $C_XH_{Y-1}D$ is a monodeuterated molecule of a first hydrocarbon selected from a hydrocarbon group consisting of: methane, ethane, propane, butane and pentane hydrocarbon, and (iii) $C_AH_B$ is a non-deuterated molecule of a second hydrocarbon that is not the first hydrocarbon, selected from the hydrocarbon group.

Inventive concept 159. The method of Inventive concept 150, wherein (i) the isotopic signature has the form $\delta(EXP_1/EXP_2)$, (ii) $EXP_1$ is an expression representing a monodeuterated multi-alkane sum of respective concentrations of one or more of: monodeuterated ethane, monodeuterated propane, monodeuterated butane, and monodeuterated pentane, and (iii) $EXP_2$ is an expression representing a concentration of monodeuterated methane.

Inventive concept 160. The method of Inventive concept 150, wherein (i) the isotopic signature has the form $\delta(EXP_1/EXP_2)$, (ii) $EXP_1$ is an expression representing a monodeuterated-methane concentration, and (iii) $EXP_2$ is an expression representing a respective concentration of any one of: monodeuterated ethane, monodeuterated propane, monodeuterated butane, and monodeuterated pentane.

Inventive concept 161. The method of Inventive concept 150, wherein (i) the isotopic signature has the form $\delta(EXP_1/EXP_2)$, (ii) $EXP_1$ is an expression representing respective concentrations of one or more members of the monodeuterated C1-C5 alkane group consisting of monodeuterated methane, monodeuterated ethane, monodeuterated propane, monodeuterated butane, and monodeuterated pentane, and (iii) $EXP_2$ is an expression representing respective concentrations of one or more members of said monodeuterated C1-C5 alkane group with the exception of the one or more members represented in $EXP_1$.

Inventive concept 162. The method of Inventive concept 150, wherein (i) the isotopic signature has the form $\delta(EXP_1/EXP_2)$, (ii) $EXP_1$ is an expression representing any member of the monodeuterated C1-C5 alkane group consisting of monodeuterated methane, monodeuterated ethane, monodeuterated propane, monodeuterated butane, and monodeuterated pentane, and $EXP_2$ is an expression representing any other member of said monodeuterated C1-C5 alkane group.

Inventive concept 163. The method of Inventive concept 150, wherein the isotopic signature is based upon a ratio of isotope ratios and has the form $\delta(^{13}C)_{ALKANE1}/\delta(^{13}C)_{ALKANE2}$, where each of ALKANE1 and ALKANE2 includes an alkane selected from an alkane group consisting of: methane, ethane, propane, butane and pentane.

Inventive concept 164. The method of Inventive concept 163, wherein at least one of ALKANE1 and ALKANE2 includes an arithmetic combination of multiple alkanes selected from the alkane group.

Inventive concept 165. The method of any one of Inventive concepts 150 to 164, wherein the injecting of the hydrogen gas is at a pressure that is less than a calculated hydrogen fracture extension pressure $H_2FRAC_{EXT}$ within the geological formation.

Inventive concept 166. The method of any one of Inventive concepts 150 to 165 wherein the injecting of the hydrogen gas includes surface geophysical monitoring to determine whether hydraulic fractures are being extended by the injecting.

Inventive concept 167. The method of any one of Inventive concepts 150 to 166, wherein a gas phase tracer is used to verify that hydraulic fractures do not extend into a fracture that is in fluid communication with a second wellbore.

Inventive concept 168. The method of any one of Inventive concepts 150 to 167, wherein the recovered portion of the hydrogen gas has an $H_2$ molar fraction of at least 90%.

Inventive concept 169. The method of any one of Inventive concepts 150 to 168, wherein the recovered portion of the hydrogen gas has an $H_2$ molar fraction of at least 95%.

Inventive concept 170. The method of any one of Inventive concepts 150 to 169, wherein the recovered portion of the hydrogen gas has an $H_2$ molar fraction of at least 97%.

Inventive concept 171. The method of any one of Inventive concepts 150 to 170, wherein the kerogen concentration in the reservoir is at least 2% by volume.

Inventive concept 172. A system for storing and subsequently recovering a hydrogen-containing gas, the system comprising: a. pumping arrangements for a hydrogen-containing gas, disposed in fluid communication with a hydraulically-fractured, kerogen-rich and partially-depleted reservoir of a methane-containing gas and operative to inject the hydrogen gas through a horizontal wellbore into the reservoir at a pressure higher than a current gas pressure wellhead at a pressure higher than the shut-in gas pressure at a wellhead, the partial depletion of the reservoir being by a methane-containing-gas recovery process characterized by an initial isotope signature value $\delta(MC)_{INITIAL}$, a minimum isotopic signature value $\delta(MC)_{MIN}$, and a current isotopic signature value $\delta(MC)_{CURRENT}$ greater than $\delta(MC)_{MIN}$, wherein MC is a molecular component in the sampled methane-containing gas and $\delta(MC)$ is based upon an isotope ratio of the molecular component MC of the methane-containing gas, and b. gas-recovery equipment disposed in fluid communication with the reservoir and operative to recover a portion of the hydrogen-containing gas through the wellbore, the recovered portion of the hydrogen-containing gas having an $H_2$ molar fraction of at least 85%.

Inventive concept 173. The system of Inventive concept 172, wherein the isotope ratio is $\delta(^{13}C)$.

Inventive concept 174. The system of Inventive concept 172, wherein the isotope ratio is of the form $\delta(C_XH_{Y-1}D/C_XH_Y)$.

Inventive concept 175. The system of any one of Inventive concepts 172 to 174, wherein the molecular component comprises methane.

Inventive concept 176. The system of any one of Inventive concepts 172 to 174, wherein the molecular component comprises ethane.

Inventive concept 177. The system any one of Inventive concepts 172 to 174, wherein the molecular component comprises propane.

Inventive concept 178. The system of any one of Inventive concepts 172 to 174, wherein the molecular component comprises butane.

Inventive concept 179. The system of any one of Inventive concepts 172 to 174, wherein the molecular component comprises pentane.

Inventive concept 180. The system of Inventive concept 172, wherein (i) the isotopic signature is based upon an isotope ratio, and the isotope ratio is of the form $\delta(C_XH_{Y-1}D/C_AH_B)$, $C_XH_{Y-1}D$ is a monodeuterated molecule of a first hydrocarbon selected from a hydrocarbon group consisting of: methane, ethane, propane, butane and pentane hydrocarbon, and (iii) $C_AH_B$ is a non-deuterated molecule of a second hydrocarbon that is not the first hydrocarbon, selected from the hydrocarbon group.

Inventive concept 181. The system of Inventive concept 172, wherein (i) the isotopic signature has the form $\delta(EXP_1/EXP_2)$, (ii) $EXP_1$ is an expression representing a monodeuterated multi-alkane sum of respective concentrations of one or more of:

monodeuterated ethane, monodeuterated propane, monodeuterated butane, and monodeuterated pentane, and (iii) $EXP_2$ is an expression representing a concentration of monodeuterated methane.

Inventive concept 182. The system of Inventive concept 172, wherein (i) the isotopic signature has the form $\delta(EXP_1/EXP_2)$, (ii) $EXP_1$ is an expression representing a monodeuterated-methane concentration, and (iii) $EXP_2$ is an expression representing a respective concentration of any one of: monodeuterated ethane, monodeuterated propane, monodeuterated butane, and monodeuterated pentane.

Inventive concept 183. The system of Inventive concept 172, wherein (i) the isotopic signature has the form $\delta(EXP_1/EXP_2)$, (ii) $EXP_1$ is an expression representing respective concentrations of one or more members of the monodeuterated C1-C5 alkane group consisting of monodeuterated methane, monodeuterated ethane, monodeuterated propane, monodeuterated butane, and monodeuterated pentane, and (iii) $EXP_2$ is an expression representing respective concentrations of one or more members of said monodeuterated C1-C5 alkane group with the exception of the one or more members represented in $EXP_1$, wherein (i) the isotopic signature has the form $\delta(EXP_1/EXP_2)$, (ii) $EXP_1$ is an expression representing any member of the monodeuterated C1-C5 alkane group consisting of monodeuterated methane, monodeuterated ethane, monodeuterated propane, monodeuterated butane, and monodeuterated pentane, and $EXP_2$ is an expression representing any other member of said monodeuterated C1-C5 alkane group.

Inventive concept 185. The system of Inventive concept 172, wherein the isotopic signature is based upon a ratio of isotope ratios and has the form $\delta(^{13}C)_{ALKANE1}/\delta(^{13}C)_{ALKANE2}$, where each of ALKANE1 and ALKANE2 includes an alkane selected from an alkane group consisting of: methane, ethane, propane, butane and pentane.

Inventive concept 186. The system of Inventive concept 185, wherein at least one of ALKANE1 and ALKANE2 includes an arithmetic combination of multiple alkanes selected from the alkane group.

Inventive concept 187. The system of any one of Inventive concepts 172 to 186, wherein the pumping arrangements are operative to inject the hydrogen-containing gas at a pressure that is at least 500 PSI higher than the current shut-in gas pressure at the wellbore.

Inventive concept 188. The system of any one of Inventive concepts 172 to 187, additionally including surface geophysical-monitoring equipment for determining whether hydraulic fractures are being extended by the hydrogen injection.

Inventive concept 189. The system of any one of Inventive concepts 172 to 188, additionally including a tracer-gas facility for adding a gas-phase tracer to the injected hydrogen gas.

Inventive concept 190. The system of any one of Inventive concepts 172 to 189, wherein the recovered portion of the hydrogen gas has an $H_2$ molar fraction of at least 90%.

Inventive concept 191. The system of any one of Inventive concepts 172 to 190, wherein the recovered portion of the hydrogen gas has an $H_2$ molar fraction of at least 95%.

Inventive concept 192. The system of any one of Inventive concepts 172 to 191, wherein the recovered portion of the hydrogen gas has an $H_2$ molar fraction of at least 97%.

Inventive concept 193. The system of any one of Inventive concepts 172 to 192, wherein a kerogen concentration in the reservoir is at least 2% by volume.

Inventive concept 194. A method of storing and recovering hydrogen gas in a kerogen-rich unconventional gas reservoir, the method comprising: a. injecting a fracturing fluid through a horizontal wellbore into the gas reservoir to cause fracturing within the gas reservoir; b. recovering a methane-containing gas through the wellbore; c. projecting a reservoir isotope ratio value $I\text{-}RATIO_{RES}(T_{RES})$ respective of one or more molecular components of a methane-containing gas recovered from the gas reservoir at each of a plurality of corresponding reservoir pressures $PRESSURE_{RES}(T_{RES})$ at respective reservoir times $T_{RES}$, wherein the projecting includes: i. sampling a gas mixture recovered from a gas-reservoir core sample to determine a plurality of core-sample value-pairs for respective core-sample times $T_{CS}$, each core-sample value-pair including a core-sample isotope ratio $I\text{-}RATIO_{CS}(T_{CS})$ value and a respective core-sample pressure value $PRESSURE_{CS}(T_{CS})$, and ii. matching $PRESSURE_{RES}(T_{RES})$ values with respective $PRESSURE_{CS}(T_{CS})$ values of the plurality of core-sample value-pairs to project $I\text{-}RATIO_{RES}(T_{RES})$ values based on respective $I\text{-}RATIO_{CS}(T_{CS})$ values corresponding to the matched respective $PRESSURE_{CS}(T_{CS})$ values; d. responsively to and contingent upon reaching an isotopic-signature trigger criterion based upon said projecting of reservoir isotope ratio values I $I\text{-}RATIO_{RES}(T_{RES})$, injecting hydrogen gas through the wellbore into the geological formation at a shut-in gas pressure at a wellhead; and e. recovering, through the wellbore, a hydrogen-containing gas having an $H_2$ molar fraction of at least 85%.

Inventive concept 195. The method of Inventive concept 194, wherein the sampling of the recovered gas mixture includes: i. receiving, in a core-sample holder, a core sample obtained from the gas reservoir, ii. introducing, into the core-sample holder, a methane-containing gas for which an isotope ratio I-RATIO is known, the introducing including regulating an internal gas pressure of the core-sample holder to an initial core-sample pressure $PRESSURE_{CS\text{-}INIT}$, iii. periodically sampling a gas mixture comprising a methane-containing gas produced by the core sample in the core-sample holder at a core-sample pressure $PRESSURE_{CS}(T_{CS})$, and iv. determining a core-sample isotope ratio $I\text{-}RATIO_{CS}(T_{CS})$ of the sampled gas mixture, for each of a plurality of periodic samplings at respective values of $PRESSURE_{CS}(T_{CS})$.

Inventive concept 196. The method of either one of Inventive concepts 194 or 195, wherein the reaching the isotopic-signature trigger criterion includes detecting a decrease in the projected reservoir isotope ratio $I\text{-}RATIO_{RES}(T_{RES})$ from an initial value to a minimum value and, subsequently thereto, detecting an increase in the projected reservoir isotope ratio $I\text{-}RATIO_{RES}(T_{RES})$.

Inventive concept 197. The method of Inventive concept 196, wherein reaching the isotopic-signature trigger criterion includes detecting an increase in the projected reservoir isotope ratio $I\text{-}RATIO_{RES}(T_{RES})$ respective of at least two successive samplings of the recovered methane-containing gas.

Inventive concept 198. The method of any one of Inventive concepts 194 to 197, wherein (i) $PRESSURE_{CS\text{-}INIT}$ equals $PRESSURE_{RES\text{-}INIT}$, and (ii) the projecting includes projecting a $I\text{-}RATIO_{RES}(T_{RES})$ value as being equal to a $I\text{-}RATIO_{CS}(T_{CS})$ value of a given core-sample value pair, for a corresponding reservoir pressure $PRESSURE_{RES}(T_{RES})$ equal to a $PRESSURE_{CS}(T_{CS})$ value of the same given core-sample value pair.

Inventive concept 199. The method of any one of Inventive concepts 194 to 198, wherein (i) $PRESSURE_{CS\text{-}INIT}$ is not equal to $PRESSURE_{RES\text{-}INIT}$, and (ii) the projecting includes adjusting a projected value of $I\text{-}RATIO_{RES}(T_{RES})$ for a difference between $PRESSURE_{CS\text{-}INIT}$ and $PRESSURE_{RES\text{-}INIT}$.

Inventive concept 200. The method of any one of Inventive concepts 194 to 199, wherein the isotope ratio I-RATIO has the form $\delta(^{13}C)$.

Inventive concept 201. The method of any one of Inventive concepts any one of Inventive concepts 194 to 199, wherein the isotope ratio I-RATIO has the form $\delta(C_X H_{Y-1} D/C_X H_Y)$.

Inventive concept 202. The method of any one of Inventive concepts any one of Inventive concepts 194 to 201, wherein the one or more molecular components comprises methane, and the isotope ratio I-RATIO is $\delta(CH_3D/CH_4)$.

Inventive concept 203. The method of any one of Inventive concepts 194 to 201, wherein the one or more molecular components comprises ethane, and the isotope ratio I-RATIO is $\delta(C_2H_5D/C_2H_6)$.

Inventive concept 204. The method of any one of Inventive concepts 194 to 201, wherein the one or more molecular components comprises propane, and the isotope ratio I-RATIO is $\delta(C_3H_7D/C_3H_8)$.

Inventive concept 205. The method of any one of Inventive concepts 194 to 201, wherein the one or more molecular components comprises butane, and the isotope ratio I-RATIO is $\delta(C_4H_9D/C_4H_{10})$.

Inventive concept 206. The method of any one of Inventive concepts 194 to 201, wherein the one or more molecular components comprises pentane, and the isotope ratio I-RATIO is $\delta(C_5H_{11}D/C5H_{12})$.

Inventive concept 207. The method of any one of Inventive concepts any one of Inventive concepts 194 to 199, wherein (i) the isotope ratio I-RATIO has the form $\delta(C_X H_{Y-1} D/C_A H_B)$, $C_X H_{Y-1} D$ is a monodeuterated molecule of a first hydrocarbon selected from a hydrocarbon group consisting of: methane, ethane, propane, butane, and pentane hydrocarbon, and (iii) $C_A H_B$ is a non-deuterated molecule of a second hydrocarbon that is not the first hydrocarbon, selected from the hydrocarbon group.

Inventive concept 208. The method of any one of Inventive concepts 194 to 199, wherein (i) the isotope ratio I-RATIO has the form $\delta(EXP_1/EXP_2)$, (ii) $EXP_1$ is an expression representing a monodeuterated multi-alkane sum of respective concentrations of one or more of: monodeuterated ethane, monodeuterated propane, monodeuterated butane, and monodeuterated pentane, and (iii) $EXP_2$ is an expression representing a concentration of monodeuterated methane.

Inventive concept 209. The method of any one of Inventive concepts 194 to 199, wherein (i) the isotope ratio I-RATIO has the form $\delta(EXP_1/EXP_2)$, (ii) $EXP_1$ is an expression representing a monodeuterated-methane concentration, and (iii) $EXP_2$ is an expression representing a respective concentration of any one of: monodeuterated ethane, monodeuterated propane, monodeuterated butane, and monodeuterated pentane.

Inventive concept 210. The method of any one of Inventive concepts 194 to 199, wherein (i) the isotope ratio I-RATIO has the form $\delta(EXP_1/EXP_2)$, (ii) $EXP_1$ is an expression representing respective concentrations of one or more members of the monodeuterated C1-C5 alkane group consisting of monodeuterated methane, monodeuterated ethane, monodeuterated propane, monodeuterated butane, and monodeuterated pentane, and (iii) $EXP_2$ is an expression representing respective concentrations of one or more members of said monodeuterated C1-C5 alkane group with the exception of the one or more members represented in $EXP_1$.

Inventive concept 211. The method of any one of Inventive concepts 194 to 199, wherein (i) the isotope ratio I-RATIO has the form $\delta(EXP_1/EXP_2)$, (ii) $EXP_1$ is an expression representing any member of the monodeuterated C1-C5 alkane group consisting of monodeuterated methane, monodeuterated ethane, monodeuterated propane, monodeuterated butane, and monodeuterated pentane, and (iii) $EXP_2$ is an expression representing any other member of said monodeuterated C1-C5 alkane group.

Inventive concept 212. The method of any one of Inventive concepts 194 to 199, wherein the isotope ratio I-RATIO is based upon a ratio of isotope ratios and has the form $\delta(^{13}C)_{ALKANE1}/\delta(^{13}C)_{ALKANE2}$, where each of ALKANE1 and ALKANE2 includes an alkane selected from an alkane group consisting of: methane, ethane, propane, butane and pentane.

Inventive concept 213. The method of any one of Inventive concepts 194 to 212, wherein for any two successive samplings, the time between $T_{RES}$ values respective of $PRESSURE_{RES}(T_{RES})$ values matching the $PRESSURE_{CS}(T_{CS})$ values of the two successive samples is at least 50 times longer than the time between the corresponding $T_{CS}$ values of the two successive samples.

Inventive concept 214. The method of any one of Inventive concepts 194 to 213, wherein the recovered hydrogen-containing gas has an H2 molar fraction of at least 90%.

Inventive concept 215. The method of any one of Inventive concepts 194 to 214, wherein the recovered hydrogen-containing gas has an $H_2$ molar fraction of at least 95%.

Inventive concept 216. The method of any one of Inventive concepts 194 to 215, wherein the recovered hydrogen-containing gas has an $H_2$ molar fraction of at least 97%.

Inventive concept 217. The method of any one of Inventive concepts 194 to 216, wherein the kerogen concentration of the kerogen-rich geological formation is at least 2% by volume.

Inventive concept 218. A method of storing and recovering hydrogen gas in a kerogen-rich unconventional gas reservoir, the method comprising: a. injecting a fracturing fluid through a horizontal wellbore into the gas reservoir to cause fracturing within the gas reservoir; b. recovering a methane-containing gas through the wellbore; c. projecting an $H_2$ molar fraction $\chi(H_2)_{RES}(T_{RES})$ of a hydrogen-containing gas recovered from the gas reservoir at each of a plurality of corresponding reservoir pressures $PRESSURE_{RES}(T_{RES})$ at respective reservoir times $T_{RES}$, the projecting including: i. sampling a hydrogen-containing gas recovered from a gas-reservoir core sample held in the core-sample holder, to determine a plurality of core-sample value-pairs for respective core-sample times $T_{CS}$, each core-sample value-pair including an $H_2$ molar fraction value $\chi(H_2)_{CS}(T_{CS})$ and a respective core-sample pressure value $PRESSURE_{CS}(T_{CS})$, and ii. matching $PRESSURE_{RES}(T_{RES})$ values with respective $PRESSURE_{CS}(T_{CS})$ values of the plurality of core-sample value-pairs to project $\chi(H_2)_{RES}(T_{RES})$ values based on respective $\chi(H_2)_{CS}(T_{CS})$ values corresponding to the matched respective $PRESSURE_{CS}(T_{CS})$ values; d. responsively to and contingent upon reaching a hydrogen-purity trigger criterion based upon said projecting of $H_2$ molar fraction values $\chi(H_2)_{RES}(T_{RES})$, injecting hydrogen gas through the wellbore into the gas reservoir at a shut-in gas pressure at a wellhead; and e. recovering, through the wellbore, a hydrogen-containing gas having an $H_2$ molar fraction equal to or greater than the hydrogen-purity trigger criterion.

Inventive concept 219. The method of Inventive concept 218, wherein the sampling includes introducing a hydrogen-containing gas for which an $H_2$ molar fraction $\chi(H_2)$ is known into the core-sample holder at a pressure higher than an equilibrium gas pressure therein.

Inventive concept 220. The method of Inventive concept 219, wherein each periodic sampling is of a respective hydrogen-containing gas recovered from a same gas-reservoir core sample.

Inventive concept 221. The method of Inventive concept 219, wherein at least two periodic samplings are of a respective hydrogen-containing gas recovered from different gas-reservoir core samples.

Inventive concept 222. The method of any one of Inventive concepts 218 to 221, wherein the hydrogen-purity trigger criterion is that the hydrogen-containing gas has an $H_2$ molar fraction of at least 85%.

Inventive concept 223. The method of any one of Inventive concepts 218 to 222, wherein the hydrogen-purity trigger criterion is that the hydrogen-containing gas has an $H_2$ molar fraction of at least 90%.

Inventive concept 224. The method of any one of Inventive concepts 218 to 223, wherein the hydrogen-purity trigger criterion is that the hydrogen-containing gas has an $H_2$ molar fraction of at least 95%.

Inventive concept 225. The method of any one of Inventive concepts 218 to 224, wherein the hydrogen-purity trigger criterion is that the hydrogen-containing gas has an $H_2$ molar fraction of at least 97%.

Inventive concept 226. The method of any one of Inventive concepts 218 to 225, wherein the kerogen concentration of the kerogen-rich geological formation is at least 2% by volume.

Inventive concept 227. The method of any one of Inventive concepts 218 to 226, wherein the known $H_2$ molar fraction of the hydrogen-containing gas introduced into the core-sample holder is greater than or equal to the $H_2$ molar fraction respective of the hydrogen-purity trigger criterion.

Inventive concept 228. The method of any one of Inventive concepts 218 to 227, wherein for any two successive periodic samplings, the time between $T_{RES}$ values respective of $PRESSURE_{RES}(T_{RES})$ values matching the $PRESSURE_{CS}(T_{CS})$ values of the two successive samples is at least 50 times longer than the time between the corresponding $T_{CS}$ values of the two successive samples.

Inventive concept 229. A method of projecting an isotope ratio $I\text{-}RATIO_{RES}$ respective of one or more molecular components in a methane-containing gas recovered from a kerogen-rich unconventional gas reservoir, the method comprising: a. receiving, in a core-sample holder, a core sample acquired from the gas reservoir; b. introducing, into the core-sample holder, a methane-containing gas for which an isotope ratio I-RATIO is known, the introducing including regulating an internal gas pressure of the core-sample holder to an initial core-sample pressure $PRESSURE_{CS\text{-}INIT}$; c. sampling, periodically, a gas mixture comprising a methane-containing gas produced by a core sample held in the core-sample holder at a core-sample pressure $PRESSURE_{CS}(T_{CS})$ at respective core-sample times $T_{CS}$; d. determining a core-sample isotope ratio $I\text{-}RATIO_{CS}(T_{CS})$ of the sampled gas mixture for each of a plurality of samplings; and e. projecting a reservoir isotope ratio $I\text{-}RATIO_{RES}(T_{RES})$ value for a methane-containing gas recovered from the gas reservoir at a corresponding reservoir pressure $PRESSURE_{RES}(T_{RES})$ at respective reservoir times $T_{RES}$, by using a recorded plurality of core-sample value pairs each including a $I\text{-}RATIO_{CS}(T_{CS})$ value and a corresponding $PRESSURE_{CS}(T_{CS})$ value.

Inventive concept 230. The method of Inventive concept 229, wherein (i) $PRESSURE_{CS\text{-}INIT}$ equals $PRESSURE_{RES\text{-}INIT}$, and (ii) the projecting includes projecting a $I\text{-}RATIO_{RES}(T_{RES})$ value as being equal to a $I\text{-}RATIO_{CS}(T_{CS})$ value of a given core-sample value pair, for a corresponding reservoir pressure $PRESSURE_{RES}(T_{RES})$ equal to a $PRESSURE_{CS}(T_{CS})$ value of the same given core-sample value pair.

Inventive concept 231. The method of Inventive concept 229, wherein (i) $PRESSURE_{CS\text{-}INIT}$ is not equal to $PRESSURE_{RES\text{-}INIT}$, and (ii) the projecting includes adjusting a projected value of $I\text{-}RATIO_{RES}(T_{RES})$ for a difference between $PRESSURE_{CS\text{-}INIT}$ and $PRESSURE_{RES\text{-}INIT}$.

Inventive concept 232. The method of any one of Inventive concepts 229 to 231, wherein the isotope ratio I-RATIO has the form $\delta(^{13}C)$.

Inventive concept 233. The method of any one of Inventive concepts 229 to 231, wherein the isotope ratio I-RATIO has the form $\delta(C_XH_{Y-1}D/C_XH_Y)$.

Inventive concept 234. The method of any one of Inventive concepts 229 to 233, wherein the one or more molecular components comprises methane, and the isotope ratio I-RATIO is $\delta(CH_3D/CH_4)$.

Inventive concept 235. The method of any one of Inventive concepts 229 to 233, wherein the one or more molecular components comprises ethane, and the isotope ratio I-RATIO is $\delta(C_2H_5D/C_2H_6)$.

Inventive concept 236. The method of any one of Inventive concepts 229 to 233, wherein the one or more molecular components comprises propane, and the isotope ratio I-RATIO is $\delta(C_3H_7D/C_3H_8)$.

Inventive concept 237. The method of any one of Inventive concepts 229 to 233, wherein the one or more molecular components comprises butane, and the isotope ratio I-RATIO is $\delta(C_4H_9D/C_4H_{10})$.

Inventive concept 238. The method of any one of Inventive concepts 229 to 233, wherein the one or more molecular components comprises pentane, and the isotope ratio I-RATIO is $\delta(C_5H_{11}D/C5H_{12})$.

Inventive concept 239. The method of any one of Inventive concepts 229 to 231, wherein (i) the isotope ratio I-RATIO has the form $\delta(C_XH_{Y-1}D/C_AH_B)$, (ii) $C_XH_{Y-1}D$ is a monodeuterated molecule of a first hydrocarbon selected from a hydrocarbon group consisting of: methane, ethane, propane, butane and pentane hydrocarbon, and (iii) $C_AH_B$ is a non-deuterated molecule of a second hydrocarbon that is not the first hydrocarbon, selected from the hydrocarbon group.

Inventive concept 240. The method of any one of Inventive concepts 229 to 231, wherein (i) the isotope ratio I-RATIO has the form $\delta(EXP_1/EXP_2)$, (ii) $EXP_1$ is an expression representing a monodeuterated multi-alkane sum of respective concentrations of one or more of: monodeuterated ethane, monodeuterated propane, monodeuterated butane, and monodeuterated pentane, and (iii) $EXP_2$ is an expression representing a concentration of monodeuterated methane.

Inventive concept 241. The method of any one of Inventive concepts 229 to 231, wherein (i) the isotope ratio I-RATIO has the form $\delta(EXP_1/EXP_2)$, (ii) $EXP_1$ is an expression representing a monodeuterated-methane concentration, and (iii) $EXP_2$ is an expression representing a respective concentration of any one of: monodeuterated ethane, monodeuterated propane, monodeuterated butane, and monodeuterated pentane.

Inventive concept 242. The method of any one of Inventive concepts 229 to 231, wherein (i) the isotope ratio I-RATIO has the form $\delta(EXP_1/EXP_2)$, (ii) $EXP_1$ is an expression representing respective concentrations of one or more members of the monodeuterated C1-C5 alkane group consisting of monodeuterated methane, monodeuterated ethane, monodeuterated propane, monodeuterated butane, and monodeuterated pentane, and (iii) $EXP_2$ is an expression representing respective concentrations of one or more members of said monodeuterated C1-C5 alkane group with the exception of the one or more members represented in $EXP_1$.

Inventive concept 243. The method of any one of Inventive concepts 229 to 231, wherein (i) the isotope ratio I-RATIO has the form $\delta(EXP_1/EXP_2)$, (ii) $EXP_1$ is an expression representing any member of the monodeuterated C1-C5 alkane group consisting of monodeuterated methane, monodeuterated ethane, monodeuterated propane, monodeuterated butane, and monodeuterated pentane, and (iii) $EXP_2$ is an expression representing any other member of said monodeuterated C1-C5 alkane group.

Inventive concept 244. The method of any one of Inventive concepts 229 to 231, wherein the isotope ratio I-RATIO is based upon a ratio of isotope ratios and has the form $\delta(^{13}C)_{ALKANE1}/\delta(^{13}C)_{ALKANE2}$, where each of ALKANE1 and ALKANE2 includes an alkane selected from an alkane group consisting of: methane, ethane, propane, butane, and pentane.

Inventive concept 245. A method of projecting an $H_2$ molar fraction $\chi(H_2)_{RES}$ of a hydrogen-containing gas recovered from storage in a kerogen-rich unconventional gas reservoir, the method comprising: a. receiving, in a core-sample holder, a core sample acquired from the gas reservoir; b. sampling, periodically, a gas mixture comprising a hydrogen-containing gas produced by the core sample in the core-sample holder at a core-sample pressure $PRESSURE_{CS}(T_{CS})$; c. determining a core-sample $H_2$ molar fraction $\chi(H_2)_{CS}(T_{CS})$ of the sampled gas mixture for each of a plurality of samplings; and d. projecting a reservoir isotope ratio $\chi(H_2)_{RES}(T_{RES})$ value for a hydrogen-containing gas recovered from the reservoir at a corresponding reservoir pressure $PRESSURE_{RES}(T_{RES})$, by using a recorded plurality of core-sample value pairs each including a $\chi(H_2)_{CS}(T_{CS})$ value and a corresponding $PRESSURE_{CS}(T_{CS})$ value.

Inventive concept 246. The method of Inventive concept 245, wherein the sampling includes introducing, into the core-sample holder, a hydrogen-containing gas for which an $H_2$ molar fraction $\chi(H_2)$ is known, the introducing including regulating an internal gas pressure of the core-sample holder to an initial core-sample pressure $PRESSURE_{CS-INIT}$.

Inventive concept 247. The method of Inventive concept 246, wherein each periodic sampling is of a respective hydrogen-containing gas recovered from a same gas-reservoir core sample.

Inventive concept 248. The method of Inventive concept 247, wherein at least two periodic samplings are of a respective hydrogen-containing gas recovered from different gas-reservoir core samples.

Inventive concept 249. Apparatus comprising: a. a core-sample holder for receiving a core sample acquired from a kerogen-rich unconventional gas reservoir; b. pressure-regulating arrangements arranged to be placed in fluid communication with the core-sample holder and to evacuate the core-sample holder; c. at least one of: i. a pressurized volume of a methane-containing gas for which an isotope ratio I-RATIO respective of one or more molecular components of the methane-containing gas is known, arranged to be placed in fluid communication with the evacuated core-sample holder and effective to achieve a gas pressure therein equal to the initial reservoir pressure $PRESSURE_{RES-INIT}$, and ii. a pressurized volume of a hydrogen-containing gas for which an $H_2$ molar fraction $\chi(H_2)$ is known, arranged to be placed in fluid communication with the evacuated core-sample holder and effective to achieve a gas pressure therein equal to the initial reservoir pressure $PRESSURE_{R-INIT}$; d. a pressure-control valve configured to allow passage therethrough of a gas mixture which comprises a methane-containing gas produced by the core sample, at a core-sample pressure $PRESSURE_{CS}(T_{CS})$ at respective core-sample times $T_{CS}$; e. one or more gas-sampling containers arranged to receive the gas mixture passed through the pressure-control valve; and f. instrumentation for measuring the core-sample pressure $PRESSURE_{CS}(T_{CS})$ and a core-sample isotope ratio $I\text{-}RATIO_{CS}(T_{CS})$ of the gas mixture at respective core-sample times $T_{CS}$.

Inventive concept 250. The apparatus of Inventive concept 249, wherein the isotope ratio I-RATIO has the form $\delta(^{13}C)$.

Inventive concept 251. The apparatus of Inventive concept 249, wherein the isotope ratio I-RATIO has the form $\delta(C_XH_{Y-1}D/C_XH_Y)$.

Inventive concept 252. The apparatus of any one of Inventive concepts 249 to 251, wherein the one or more molecular components comprises methane, and the isotope ratio I-RATIO is $\delta(CH_3D/CH_4)$.

Inventive concept 253. The apparatus of any one of Inventive concepts 249 to 251, wherein the one or more molecular components comprises ethane, and the isotope ratio I-RATIO is $\delta(C_2H_5D/C_2H_6)$.

Inventive concept 254. The apparatus of any one of Inventive concepts 249 to 251, wherein the one or more molecular components comprises propane, and the isotope ratio I-RATIO is $\delta(C_3H_7D/C_3H_8)$.

Inventive concept 255. The apparatus of any one of Inventive concepts 249 to 251, wherein the one or more molecular components comprises butane, and the isotope ratio I-RATIO is $\delta(C_4H_9D/C_4H_{10})$.

Inventive concept 256. The apparatus of any one of Inventive concepts 249 to 251, wherein the one or more molecular components comprises pentane, and the isotope ratio I-RATIO is $\delta(C_5H_{11}D/C5H_{12})$.

Inventive concept 257. The apparatus of Inventive concept 249, wherein (i) the isotope ratio I-RATIO has the form $\delta(C_XH_{Y-1}D/C_AH_B)$, $C_XH_{Y-1}D$ is a monodeuterated molecule of a first hydrocarbon selected from a hydrocarbon group consisting of: methane, ethane, propane, butane, and pentane hydrocarbon, and (iii) $C_AH_B$ is a non-deuterated molecule of a second hydrocarbon that is not the first hydrocarbon, selected from the hydrocarbon group.

Inventive concept 258. The apparatus of Inventive concept 249, wherein (i) the isotope ratio I-RATIO has the form $\delta(EXP_1/EXP_2)$, (ii) $EXP_1$ is an expression representing a monodeuterated multi-alkane sum of respective concentrations of one or more of: monodeuterated ethane, monodeuterated propane, monodeuterated butane, and monodeuterated pentane, and (iii) $EXP_2$ is an expression representing a concentration of monodeuterated methane.

Inventive concept 259. The apparatus of Inventive concept 249, wherein (i) the isotope ratio I-RATIO has the form $\delta(EXP_1/EXP_2)$, (ii) $EXP_1$ is an expression representing a monodeuterated-methane concentration, and (iii) $EXP_2$ is an expression representing a respective concentration of any one of: monodeuterated ethane, monodeuterated propane, monodeuterated butane, and monodeuterated pentane.

Inventive concept 260. The apparatus of Inventive Concept 249, wherein (i) the isotope ratio I-RATIO has the form $\delta(EXP_1/EXP_2)$, (ii) $EXP_1$ is an expression representing respective concentrations of one or more members of the monodeuterated C1-C5 alkane group consisting of: monodeuterated methane, monodeuterated ethane, monodeuterated propane, monodeuterated butane, and monodeuterated pentane, and (iii) $EXP_2$ is an expression representing respective concentrations of one or more members of said monodeuterated C1-C5 alkane group with the exception of the one or more members represented in $EXP_1$.

Inventive concept 261. The apparatus of Inventive concept 249, wherein (i) the isotope ratio I-RATIO has the form $\delta(EXP_1/EXP_2)$, (ii) $EXP_1$ is an expression representing any member of the monodeuterated C1-C5 alkane group consisting of monodeuterated methane, monodeuterated ethane, monodeuterated propane, monodeuterated butane, and monodeuterated pentane, and (iii) $EXP_2$ is an expression representing any other member of said monodeuterated C1-C5 alkane group.

Inventive concept 262. The apparatus of Inventive concept 249, wherein the isotope ratio I-RATIO is based upon a ratio of isotope ratios and has the form $\delta(^{13}C)_{ALKANE1}/\delta(^{13}C)_{ALKANE2}$, where each of ALKANE1 and ALKANE2 includes an alkane selected from an alkane group consisting of: methane, ethane, propane, butane and pentane.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

The invention claimed is:

1. A method of storing hydrogen gas in a kerogen-rich geological formation, the method comprising:
   a. injecting a fracturing fluid through a horizontal wellbore into the geological formation to cause fracturing within the geological formation;
   b. recovering a methane-containing gas through the wellbore, the recovering characterized by a maximum flow rate $FLOW_{MAX}$;
   c. monitoring a current flow rate $FLOW_{CURRENT}$ of the recovered methane-containing gas over time;
   d. determining a flow-rate trigger criterion $FLOW_{TRIGGER}$ at or below which hydrogen injected into the geological formation is subsequently recoverable in a hydrogen-containing gas having an $H_2$ molar fraction of at least 85%;
   e. responsively to and contingent upon the monitored $FLOW_{CURRENT}$ being equal to or below $FLOW_{TRIGGER}$, ceasing the recovering of the methane-containing gas and injecting a hydrogen gas through the wellbore into the geological formation at a pressure higher than a current shut-in gas pressure at the wellbore; and
   f. subsequent to the injecting, recovering, through the wellbore, the hydrogen-containing gas having the $H_2$ molar fraction of at least 85%.

2. The method of claim 1, wherein $FLOW_{TRIGGER}$ is equal to at least 10% of $FLOW_{MAX}$ and not more than 20% of $FLOW_{MAX}$.

3. The method of claim 1, wherein $FLOW_{TRIGGER}$ is determined based at least in part on a kerogen concentration in the geological formation.

4. The method of claim 1, wherein $FLOW_{TRIGGER}$ is determined based at least in part on a fluid flow regime of the geological formation.

5. The method of claim 1, wherein the injecting of the hydrogen gas is at a pressure that is less than a calculated hydrogen fracture extension pressure $H2FRAC_{EXT}$ within the geological formation.

6. The method of claim 1, wherein the monitoring of the current flow rate $FLOW_{CURRENT}$ includes determining the flow regime in the geological formation.

7. The method of claim 1, wherein (i) the determining includes determining the flow-rate trigger criterion $FLOW_{TRIGGER}$ at or below which hydrogen injected into the geological formation is subsequently recoverable in a hydrogen-containing gas having an $H_2$ molar fraction of at least 90%, and (ii) the recovered hydrogen-containing gas has an $H_2$ molar fraction of at least 90%.

8. The method of claim 1, wherein the kerogen concentration of the kerogen-rich geological formation is at least 2% by volume.

9. A method of storing and subsequently recovering a hydrogen gas, the method comprising:
 a. injecting the hydrogen gas through a horizontal wellbore into a hydraulically-fractured, kerogen-rich, and partially-depleted reservoir of a methane-containing gas, at a pressure higher than a current shut-in gas pressure at the wellbore, the partial depletion of the reservoir being by a methane-containing-gas recovery process characterized by a maximum flow rate of $FLOW_{MAX}$;
 b. determining a flow-rate trigger criterion $FLOW_{TRIGGER}$ below which hydrogen injected into the reservoir is subsequently recoverable in a hydrogen-containing gas having an $H_2$ molar fraction of at least 85%; and
 c. recovering a portion of the hydrogen gas through the wellbore, the recovered portion of the hydrogen gas having an $H_2$ molar fraction of at least 85%,
 wherein $FLOW_{TRIGGER}$ is equal to at least 10% of $FLOW_{MAX}$ and not more than 20% of $FLOW_{MAX}$.

10. The method of claim 9, additionally comprising a step, performed before the injecting of the hydrogen gas, of selecting the reservoir based on a kerogen concentration in the reservoir.

11. The method of claim 9, additionally comprising a step, performed before the injecting of the hydrogen gas, of selecting the reservoir based on a fluid flow regime of the reservoir.

12. The method of claim 9, wherein (i) the determining includes determining the flow-rate trigger criterion $FLOW_{TRIGGER}$ at or below which hydrogen injected into the reservoir is subsequently recoverable in a hydrogen-containing gas having an $H_2$ molar fraction of at least 90%, and (ii) the recovered hydrogen-containing gas has an $H_2$ molar fraction of at least 90%.

13. The method of claim 9, wherein the kerogen concentration in the reservoir is at least 2% by volume.

14. A system configured for storing and subsequently recovering a hydrogen-containing gas by performing the method of claim 9, the system comprising:
 a. pumping arrangements for injecting hydrogen-containing gas, disposed in fluid communication with the hydraulically-fractured, kerogen-rich and partially-depleted reservoir of a methane-containing gas and operative to inject the hydrogen gas through a horizontal wellbore into the reservoir at a pressure higher than a shut-in gas pressure at the wellbore; and
 b. gas-recovery equipment disposed in fluid communication with the reservoir and operative to recover the portion of the hydrogen-containing gas through the wellbore.

15. The system of claim 14, wherein the fluid flow regime of the reservoir is substantially characterized by diffusional processes.

16. The system of claim 14, wherein the fluid flow regime of the reservoir is substantially Knudsen diffusion.

17. The system of claim 14, additionally comprising equipment for monitored by a delta (C13) isotope ratio in the recovered methane to determine a fluid flow regime in the reservoir.

* * * * *